US012700305B2

(12) United States Patent
Germain

(10) Patent No.: US 12,700,305 B2
(45) Date of Patent: Aug. 4, 2026

(54) SENSOR BASED ROADWAY TRAFFIC CONTROL SYSTEM

(71) Applicant: XRoadz Inc, Cambridge, MA (US)

(72) Inventor: Bryce Germain, Waltham, MA (US)

(73) Assignee: XRoadz Inc, Cambridge (CA)

( * ) Notice: Subject to any disclaimer, the term of this patent is extended or adjusted under 35 U.S.C. 154(b) by 0 days.

(21) Appl. No.: 19/388,860

(22) Filed: Nov. 13, 2025

(65) Prior Publication Data

US 2026/0141804 A1 May 21, 2026

Related U.S. Application Data

(60) Provisional application No. 63/721,034, filed on Nov. 15, 2024.

(51) Int. Cl.
| | |
|---|---|
| *G08G 1/07* | (2006.01) |
| *G08G 1/01* | (2006.01) |
| *G08G 1/083* | (2006.01) |
| *G08G 1/087* | (2006.01) |
| *G08G 1/09* | (2006.01) |

(Continued)

(52) U.S. Cl.
CPC ........... *G08G 1/087* (2013.01); *G08G 1/0116* (2013.01); *G08G 1/0133* (2013.01); *G08G 1/0141* (2013.01); *G08G 1/0145* (2013.01); *G08G 1/083* (2013.01); *G08G 1/09* (2013.01); *G08G 1/164* (2013.01); *G08G 1/166* (2013.01); *H04W 4/44* (2018.02)

(58) Field of Classification Search
CPC .... G08G 1/087; G08G 1/0116; G08G 1/0133; G08G 1/0141; G08G 1/0145; G08G 1/083; G08G 1/09; G08G 1/164; G08G 1/166; H04W 4/04; H04W 4/44

USPC .......................... 340/906, 907, 905, 909, 925
See application file for complete search history.

(56) References Cited

U.S. PATENT DOCUMENTS

| | | |
|---|---|---|
| 9,978,270 B2 * | 5/2018 | Raamot ................ G08G 1/0116 |
| 2014/0195138 A1 | 7/2014 | Stelzig et al. |

(Continued)

FOREIGN PATENT DOCUMENTS

WO      WO-2022/096130 A1      5/2022

OTHER PUBLICATIONS

International Search Report on PCT/US2025/055422 dated Mar. 9, 2026.
Written Opinion on PCT/US2025/055422 dated Mar. 9, 2026.

*Primary Examiner* — Anh V La
(74) *Attorney, Agent, or Firm* — Foley & Lardner LLP

(57) ABSTRACT

Roadway intersection signaling solution is provided having systems and methods that can include a processor to identify a setting for roadway signaling. The setting can include predetermined phases to apply according to time intervals to control traffic objects at the intersection. The processor can identify data from a sensor on an object and an environmental condition at the roadway intersection. The processor can determine, based on the object and the environmental condition input into a machine learning (ML) model, a timing for the object to pass the roadway intersection. The processor can adjust, based on the timing for the object to pass the roadway intersection, the setting for signaling at the roadway intersection and generate an instruction to a signaling device at the roadway intersection based on the adjusted setting.

20 Claims, 69 Drawing Sheets

(51) Int. Cl.
  *G08G 1/16*         (2006.01)
  *H04W 4/44*         (2018.01)

(56)                References Cited

U.S. PATENT DOCUMENTS

2016/0155334  A1*   6/2016  Jansson ................... G08G 1/07
                                                          340/906
2019/0080607  A1*   3/2019  McClain .............. G08G 1/0116
2020/0065711  A1    2/2020  Clement et al.
2021/0295686  A1*   9/2021  Cross .................... G08G 1/087
2022/0092973  A1    3/2022  Mohamad Alizadeh Shabestary
                                    et al.
2022/0161830  A1*   5/2022  Devassy ........... B60W 50/0097
2024/0062652  A1*   2/2024  Vijaya Kumar ....... G08G 1/164

* cited by examiner

400

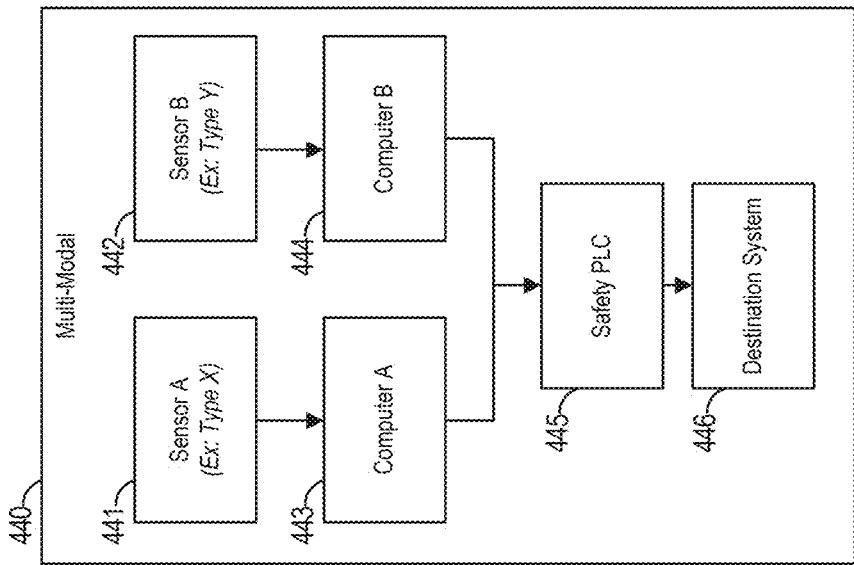
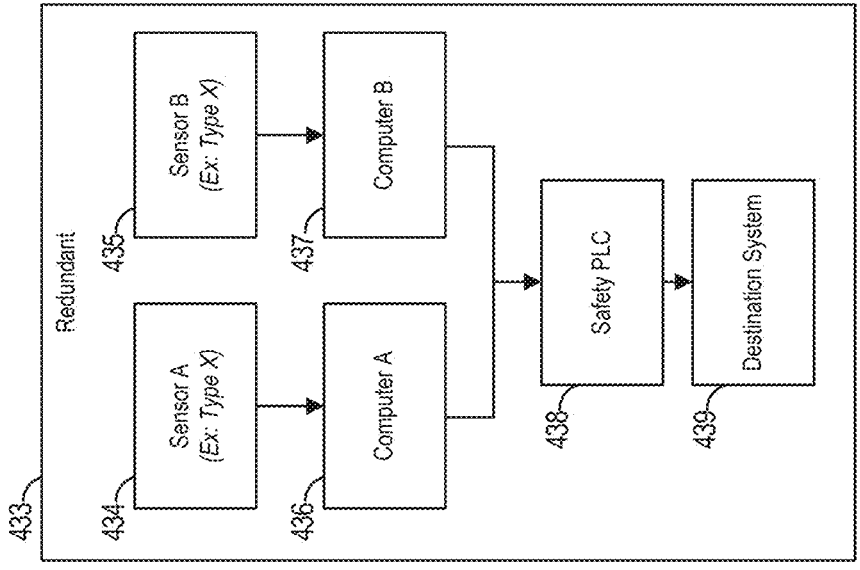
FIG. 4C

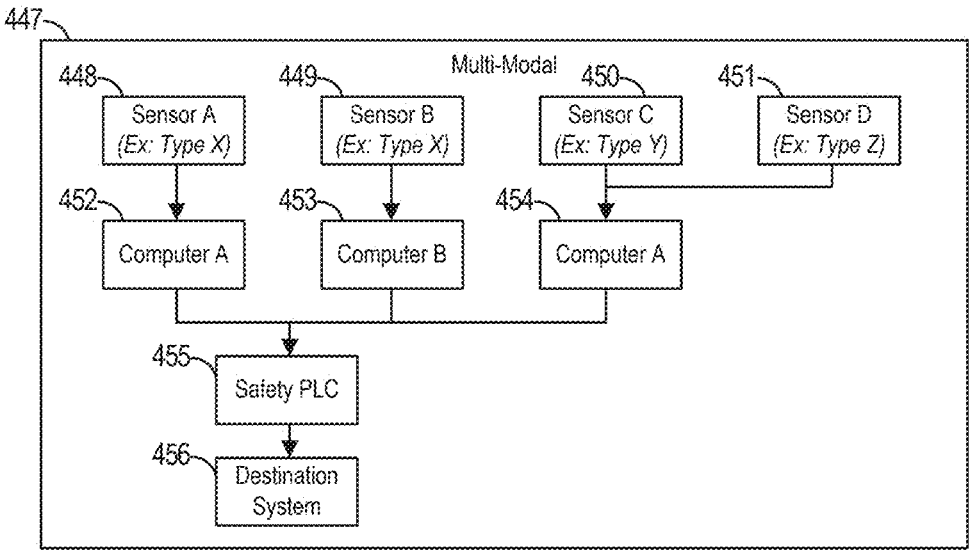
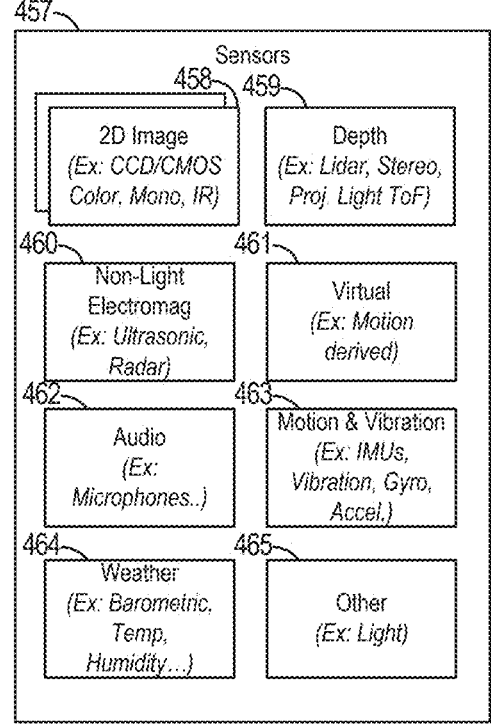
FIG. 4D

530

124

Caution
Skipping
Next
Yellow

Intended
Signage

700

750

Figure 8:
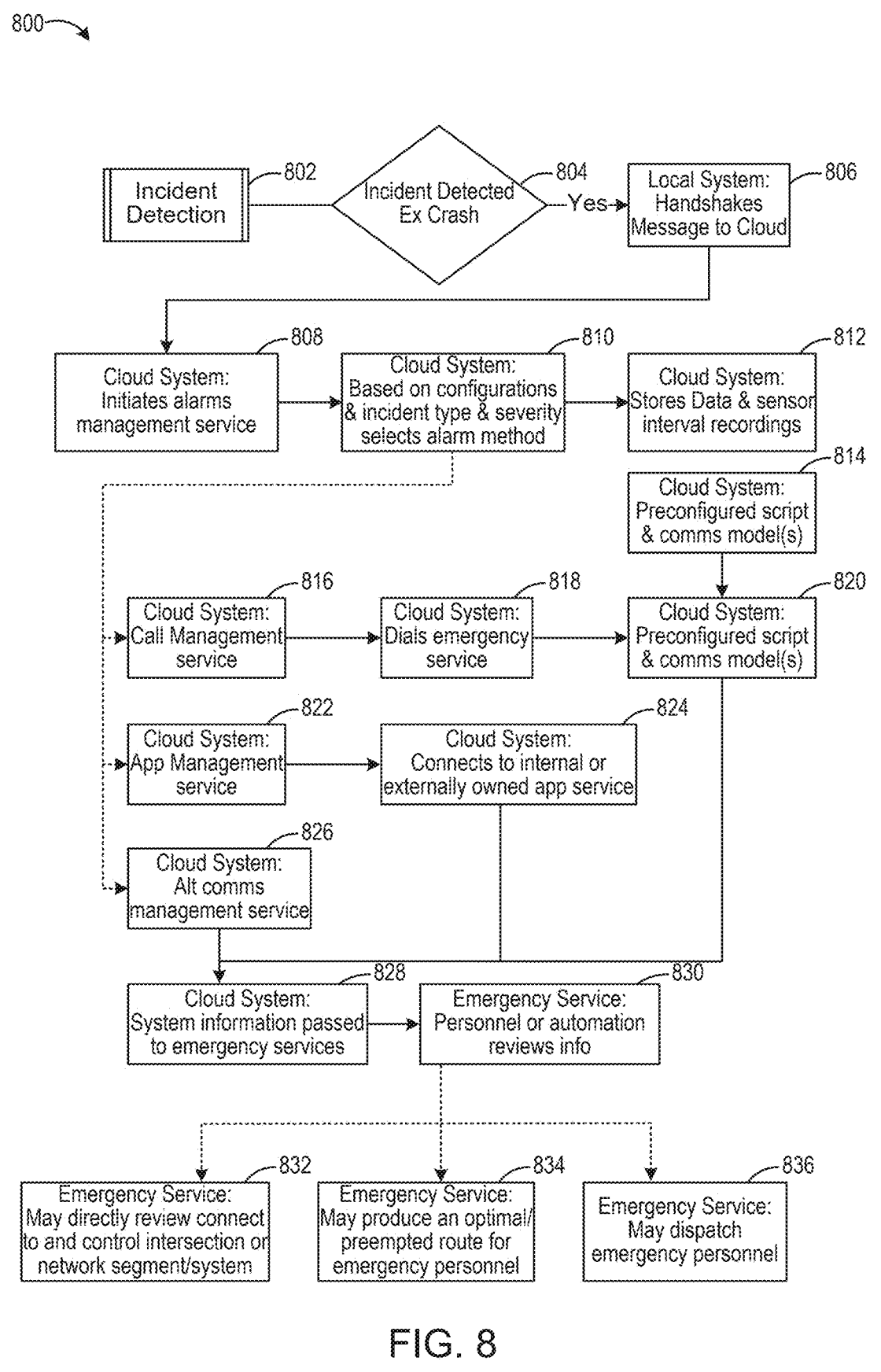

800

| 802 | 804 | 806 |
|---|---|---|
| Incident Detection | Incident Detected Ex Crash —Yes→ | Local System: Handshakes Message to Cloud |

| 808 | 810 | 812 |
|---|---|---|
| Cloud System: Initiates alarms management service | Cloud System: Based on configurations & incident type & severity selects alarm method | Cloud System: Stores Data & sensor interval recordings |

814
Cloud System: Preconfigured script & comms model(s)

| 816 | 818 | 820 |
|---|---|---|
| Cloud System: Call Management service | Cloud System: Dials emergency service | Cloud System: Preconfigured script & comms model(s) |

| 822 | 824 |
|---|---|
| Cloud System: App Management service | Cloud System: Connects to internal or externally owned app service |

826
Cloud System: Alt comms management service

| 828 | 830 |
|---|---|
| Cloud System: System information passed to emergency services | Emergency Service: Personnel or automation reviews info |

| 832 | 834 | 836 |
|---|---|---|
| Emergency Service: May directly review connect to and control intersection or network segment/system | Emergency Service: May produce an optimal/ preempted route for emergency personnel | Emergency Service: May dispatch emergency personnel |

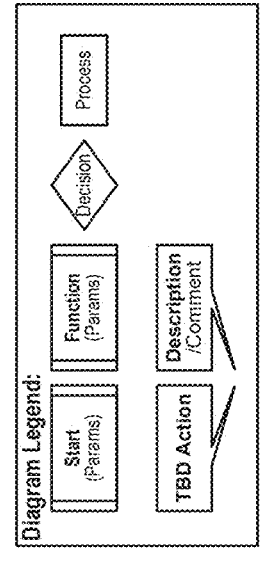

Diagram Legend:

Process

Decision

Start
(Params)

Function
(Params)

TBD Action

Description
/Comment

2100

2114 — Fast Phase Triggered

2108 — Any entities detected on the approach side of an active direction?

2110 — Pull configuration on-approach area.

2112 — Any entities in the configured on-approach areas?

For Each Lane/Direction

For Each Entity

Yes

No

2106 — No — Any entities in intersection?

2104 — Any entities in intersection?

2102 — Entity Detection (Position)

Start (Change interval time)

Yes

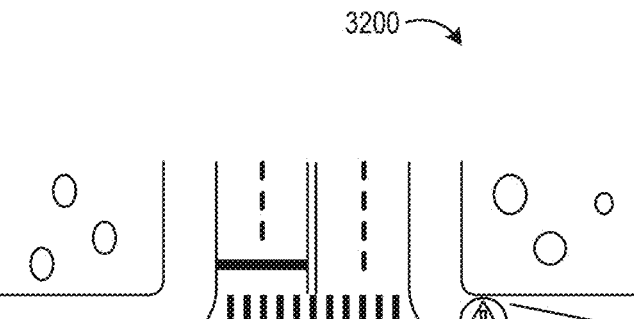
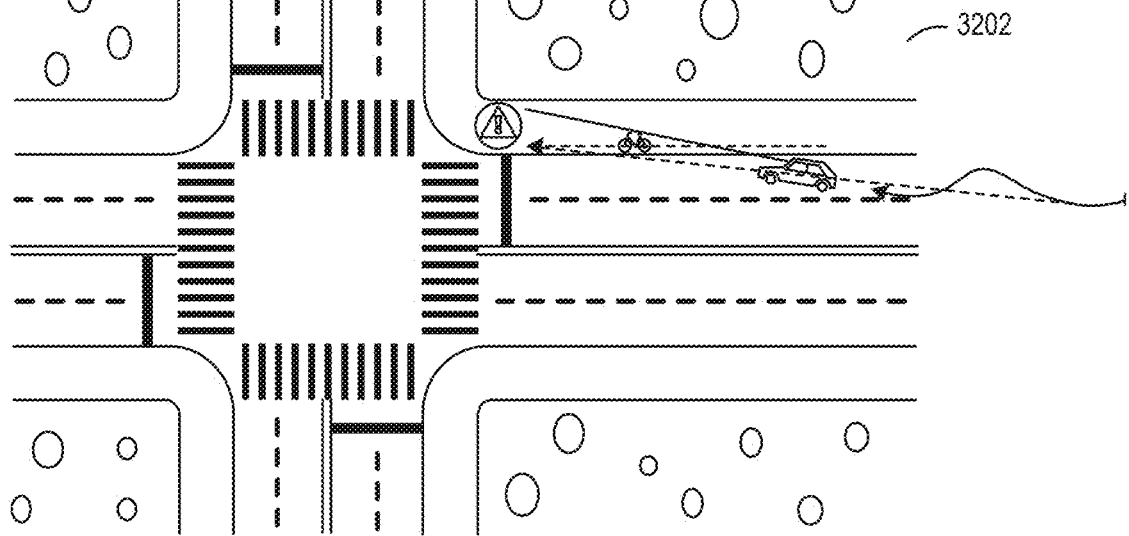
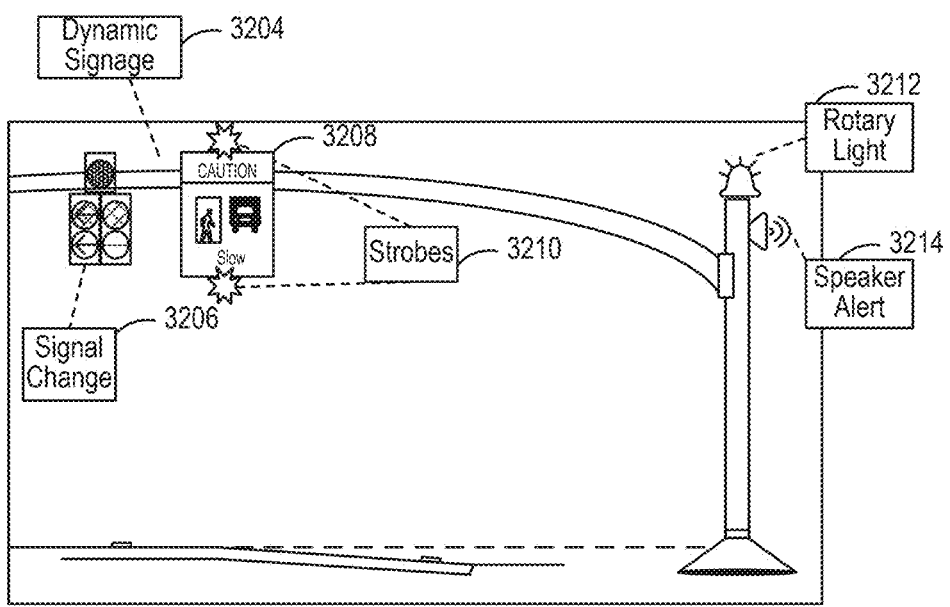
FIG. 32A

3250

3404

No observed (known) nor predicted immediate demand in this direction

3402

Vehicles Waiting On Red

3406

Vehicles Waiting or on-approach to Red

3400

3600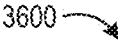

```
┌──────────────┐     ┌──────────────┐     ┌──────────────┐     ┌──────────────────┐
│  3602        │     │  3604        │     │  3606        │     │  3608            │
│ Response     │────▶│Tracks all    │────▶│ On Signal    │────▶│Configuration set │
│ Time Config  │     │entities      │     │ Change Stores│     │on how to call    │
│              │     │that traverse │     │ Movement Stats│    │data per          │
│              │     │each          │     │              │     │application function│
│              │     │intersection  │     │              │     │                  │
└──────────────┘     └──────────────┘     └──────────────┘     └──────────────────┘
       │                                                                 │
       ▼
┌──────────────┐     ┌──────────────┐
│              │ 3608│ Config       │
│ Aggregation  │────▶│ Available    │
│ performed    │     │ to Functions │
└──────────────┘     └──────────────┘
                      3610
```

```
┌──────────────┐     ┌──────────────┐     ┌──────────────┐     ┌──────────────┐
│  3612        │     │  3614        │     │              │     │ Observe      │
│ Slow Entity  │────▶│ Pull Response│────▶│ Signal Change│────▶│ Roadway Entity│
│ Response     │     │ Time Config  │     │              │     │ Motion       │
└──────────────┘     └──────────────┘     └──────────────┘     └──────────────┘
                                                  3610                 │
                                                                    3612
```

```
  3616                      3618             3620                      3622
   ╱╲                  ┌──────────┐          ╱╲                  ┌──────────┐
  ╱  ╲ Entity          │          │         ╱Clock╲             │          │
 ╱detected╲            │ Start    │        ╱Exceeds ╲   Yes      │ Signal   │
╱ moving at ╲──No─────▶│Clock/    │──────▶╱ Config (by╲────────▶│ User     │
╲sufficient ╱          │Entity    │       ╲  Class/   ╱          │          │
 ╲speed/   ╱           └──────────┘        ╲ User?  ╱            └──────────┘
  ╲directioin?         
   ╲╱                                         ╲╱
    │ Yes                                    No
  3624                                        
┌──────────┐
│ Stop     │
│ Signaling│
│ User     │
└──────────┘
```

```
  3626              3628              3630                   3632
┌──────────┐    ┌──────────┐          ╱╲              ┌──────────┐
│Distracted│    │Facial/   │         ╱  ╲             │          │
│Entity    │───▶│Focus     │───────▶╱ User ╲─────────▶│ Signal   │
│Response  │    │Recognition│        ╲Distracted?    │ User     │
└──────────┘    │A.I.      │         ╲  ╱             └──────────┘
                └──────────┘          ╲╱
                     ▲                 │
                     └──────No─────────┘
```

SENSOR BASED ROADWAY TRAFFIC CONTROL SYSTEM

CROSS-REFERENCES TO RELATED APPLICATIONS

This application claims priority under 35 U.S.C. § 119 to a U.S. Provisional Patent Application No. 63,721,034, titled "SENSOR BASED ROADWAY TRAFFIC CONTROL SYSTEM," and filed Nov. 15, 2024, which is hereby incorporated by reference herein in its entirety and for all purposes.

FIELD OF THE DISCLOSURE

The present disclosure relates generally to roadway traffic signaling and particularly to systems and methods for managing roadway traffic signals using roadway traffic sensor data.

BACKGROUND

Roadway traffic can include various objects (e.g., vehicles and pedestrians) moving at different speeds and towards different destinations along different routes (e.g., roads, streets, highways or pedestrian pathways). Intersections at which two or more such routes intersect can include various traffic objects traversing paths of other objects in the traffic, increasing the risk of accidents and traffic congestion. Intersection traffic signaling systems operating at predetermined signaling phases can reduce the likelihood of such accidents, facilitating the management of the traffic flow across the intersections.

SUMMARY OF THE DISCLOSURE

While roadway intersection signaling systems operating at predetermined phases can improve the safety and throughput of traffic objects, inefficiencies and accidents may still occur, at least in part, due to the lack of awareness of traffic objects with respect to emerging occurrences along the way. Such emerging occurrences can include, for example, a traffic object moving towards a potential collision with another object or an opening in the intervening traffic that can be used to increase the throughput of the traffic along the intersecting lane. The technical solutions of the present disclosure can utilize roadway intersection traffic sensor data and machine learning to dynamically adjust the phases of the roadway intersections signals, taking advantage of the opportunities to increase the awareness of the traffic objects as well as improve traffic throughput and efficiency and traffic safety.

An aspect of the technical solutions can be directed to a system. The system can include one or more processors, coupled with memory. The one or more processors can be configured (e.g., via instructions and data stored in the memory) to implement operations of the system. The one or more processors can be configured to identify a setting for one or more signaling devices at a roadway intersection, the setting configured to control multiple predetermined phases to be applied according to predetermined time intervals to control movement of objects moving via the roadway intersection. The one or more processors can be configured to identify, from one or more sensors, data on one or more objects within an area comprising the roadway intersection and one or more environmental conditions within the area. The one or more processors can be configured to determine, based on the data on one or more objects and one or more environmental conditions input into a machine learning (ML) model trained on a plurality of data on a plurality of objects on a plurality of roadway intersections and environmental conditions on the plurality of roadway intersections, a timing for initiating one or more outputs of the one or more signaling devices to indicate to an object of the one or more objects to proceed via the roadway intersection. The one or more processors can be configured to adjust, based on the timing, the setting for the one or more signaling devices at the roadway intersection. The one or more processors can be configured to generate an instruction to a signaling device of the one or more signaling devices at the roadway intersection to initiate an output of the signaling device based on the adjusted setting.

The one or more processors can be configured to receive, from the one or more sensors, updated data comprising at least one of updated data on environmental conditions at the roadway intersection or updated data on the one or more objects moving at the roadway intersection. The one or more processors can be configured to determine, based on the updated data, an updated timing for initiating the one or more outputs of the one or more signaling devices to indicate to an object of the one or more objects to proceed via the roadway intersection. The one or more processors can be configured to adjust, based on the updated timing, the setting for signaling at the roadway intersection. The one or more processors can be configured to generate a second instruction to a signaling device at the roadway intersection based on the setting adjusted based on the updated timing.

The one or more sensors can include at least one of: a camera, a light detection and ranging device (lidar) or a radio detection and ranging device (radar) configured for detection or monitoring of the object. The one or more processors can be configured to determine, using the data from the one or more sensors, at least one of a velocity, direction, or a time to arrival of the object at the roadway intersection. The ML model can be trained on historical traffic data of the roadway intersection to adapt the ML model to the conditions of the roadway intersection.

The one or more processors can be configured to receive real-time data on traffic of objects at the roadway intersection. The one or more processors can be configured to determine, based on the real-time data input into the ML model and a number of objects along a first route of a plurality of routes intersecting at the roadway intersection exceeding a threshold, a second timing for the objects to move via the roadway intersection. The one or more processors can be configured to adjust, based on the second timing, the setting for the one or more signaling devices at the roadway intersection to increase a time duration for the objects along the first route to proceed via the roadway intersection to reduce congestion at the roadway intersection. A user interface can be provided at a remote client device. The user interface can provide an indication corresponding to the adjusted setting to a user monitoring traffic at the roadway intersection via the user interface.

An aspect of the technical solutions can be directed to a method. The method can include identifying, by one or more processors coupled with memory, a setting for one or more signaling devices at a roadway intersection, the setting configured to control multiple predetermined phases to be applied according to predetermined time intervals to control movement of objects moving via the roadway intersection. The method can include identifying, by the one or more processors, from one or more sensors, data on one or more objects within an area comprising the roadway intersection and one or more environmental conditions within the area. The method can include determining, by the one or more processors, based on the data on one or more objects and one or more environmental conditions input into a machine learning (ML) model trained on a plurality of data on a plurality of objects on a plurality of roadway intersections and environmental conditions on the plurality of roadway intersections, a timing for actuating the one or more signaling devices to indicate to an object of the one or more objects to proceed via the roadway intersection. The method can include adjusting, by the one or more processors, based on the timing, the setting for the one or more signaling devices at the roadway intersection. The method can include generating, by the one or more processors, an instruction to a signaling device of the one or more signaling devices at the roadway intersection to initiate a signaling output of the signaling device based on the adjusted setting.

The method can include receiving, by the one or more processors, from the one or more sensors, updated data comprising at least one of updated data on environmental conditions at the roadway intersection or updated data on the one or more objects moving at the roadway intersection. The method can include determining, by the one or more processors, based on the updated data, an updated timing for actuating the one or more signaling devices to indicate to an object of the one or more objects to proceed via the roadway intersection. The method can include adjusting, by the one or more processors, based on the updated timing, the setting for signaling at the roadway intersection. The method can include generating, by the one or more processors, a second instruction to a signaling device at the roadway intersection based on the setting adjusted based on the updated timing.

The one or more sensors can include at least one of: a camera, a light detection and ranging device (lidar) or a radio detection and ranging device (radar) configured for detection or monitoring of the object. The method can include determining, by the one or more processors, using the data from the one or more sensors, at least one of a velocity, direction, or a time to arrival of the object at the roadway intersection. The method can include training, by the one or more processors, the ML model on historical traffic data of the roadway intersection to adapt the ML model to the conditions of the roadway intersection.

The method can include receiving, by the one or more processors, real-time data on traffic of objects at the roadway intersection. The method can include determining, by the one or more processors, based on the real-time data input into the ML model and a number of objects along a first route of a plurality of routes intersecting at the roadway intersection exceeding a threshold, a second timing for the objects to move via the roadway intersection. The method can include adjusting, by the one or more processors, based on the second timing, the setting for the one or more signaling devices at the roadway intersection to increase a time duration for the objects along the first route to proceed via the roadway intersection to reduce congestion at the roadway intersection. The method can include providing, by the one or more processors, a user interface at a remote client device, the user interface providing an indication corresponding to the adjusted setting to a user monitoring traffic at the roadway intersection via the user interface.

An aspect of the technical solutions can be directed to a non-transitory computer-readable medium storing instructions. The instructions, when executed by at least one processor, can cause the at least one processor to identify a setting for one or more signaling devices at a roadway intersection, the setting configured to control multiple predetermined phases to be applied according to predetermined time intervals to control movement of objects moving via the roadway intersection. The instructions, when executed by at least one processor, can cause the at least one processor to identify, from one or more sensors, data on one or more objects within an area comprising the roadway intersection and one or more environmental conditions within the area. The instructions, when executed by at least one processor, can cause the at least one processor to determine, based on the data on one or more objects and one or more environmental conditions input into a machine learning (ML) model trained on a plurality of data on a plurality of objects on a plurality of roadway intersections and environmental conditions on the plurality of roadway intersections, a timing for initiating one or more outputs of the one or more signaling devices to indicate to an object of the one or more objects to proceed via the roadway intersection. The instructions, when executed by at least one processor, can cause the at least one processor to adjust, based on the timing, the setting for the one or more signaling devices at the roadway intersection. The instructions, when executed by at least one processor, can cause the at least one processor to generate an instruction to a signaling device of the one or more signaling devices at the roadway intersection to initiate an output of the signaling device based on the adjusted setting.

The instructions, when executed by at least one processor, can cause the at least one processor to receive, from the one or more sensors, updated data comprising at least one of updated data on environmental conditions at the roadway intersection or updated data on the one or more objects moving at the roadway intersection. The instructions, when executed by at least one processor, can cause the at least one processor to determine, based on the updated data, an updated timing for initiating the one or more outputs of the one or more signaling devices to indicate to an object of the one or more objects to proceed via the roadway intersection. The instructions, when executed by at least one processor, can cause the at least one processor to adjust, based on the updated timing, the setting for signaling at the roadway intersection. The instructions, when executed by at least one processor, can cause the at least one processor to generate a second instruction to a signaling device at the roadway intersection based on the setting adjusted based on the updated timing.

The data from the one or more sensors can include data from at least one of: a camera, a light detection and ranging device (lidar) or a radio detection and ranging device (radar) configured for detection or monitoring of the object. The instructions, when executed by at least one processor, can cause the at least one processor to determine, using the data from the one or more sensors, at least one of a velocity, direction, or a time to arrival of the object at the roadway intersection.

The instructions, when executed by at least one processor, can cause the at least one processor to utilize the ML model that is trained on historical traffic data of the roadway intersection to adapt the ML model to the conditions of the roadway intersection. The instructions, when executed by at least one processor, can cause the at least one processor to receive real-time data on traffic of objects at the roadway intersection. The instructions, when executed by at least one processor, can cause the at least one processor to determine, based on the real-time data input into the ML model, a second timing for the objects to pass the roadway intersection. The instructions, when executed by at least one processor, can cause the at least one processor to adjust, based on the second timing, the setting for signaling at the roadway intersection to reduce congestion at the roadway intersection.

An aspect of the technical solutions can be directed to a system. The system can include one or more processors, coupled with memory and configured (e.g., via instructions or data stored in the memory) to identify, for a signaling device at a roadway intersection, a schedule established by a setting for initiating one or more outputs of the signaling device, the setting comprising a plurality of phases for the one or more outputs to be provided by the signaling device in accordance with predetermined time intervals of the schedule. The one or more processors can be configured to receive sensor data indicative of a detected output provided by the signaling device at a time point. The one or more processors can be configured to compare, using a machine learning model trained on historical signaling data, the detected output from the signaling device at the time point with an expected output of the one or more outputs associated with a phase of the plurality of phases of the schedule, the phase corresponding to a time interval of the predetermined time intervals corresponding to the time point. The one or more processors can be configured to detect a discrepancy based on the comparison. The one or more processors can be configured to generate, responsive to the discrepancy, an alert including diagnostic data indicative of the discrepancy for transmission to a remote device.

The one or more processors can be configured to detect the discrepancy based on the comparison a difference between a time difference between a time of the detected output and a time of the expected output exceeding a predetermined threshold. The one or more processors can be configured to initiate, responsive to detecting the discrepancy, a corrective action comprising at least one of recalibrating the signaling device or adjusting the schedule to mitigate the discrepancy. The one or more processors can be configured to update the historical signaling data used to train the machine learning model based on real-time sensor data and detected output, and retrain the machine learning model to improve accuracy of discrepancy detection.

The one or more processors can be configured to identify, from a data repository, historical data for the roadway intersection indicative of signaling changes for one or more signaling devices at the roadway intersection. The one or more processors can be configured to determine, based on the historical data for the roadway intersection, the schedule for the setting for signaling. The detecting the discrepancy can comprise adjusting a predetermined threshold for the comparison based on environmental conditions including at least one of weather, visibility, or traffic density for use in comparison of the detected output with the expected output.

The alert can include a command to initiate an automated corrective workflow comprising transmitting diagnostic data to a remote maintenance device and requesting a recalibration of the signaling device. The one or more processors can be configured to receive, from a camera device directed at the signaling device, the sensor data comprising a video comprising a plurality of frames. The one or more processors can be configured to identify the time point at which the detected output is initiated by the signaling device based on one or more timestamps of one or more frames of the plurality of frames of the video captured by the camera device.

The one or more processors can be configured to update historical signaling data for the roadway intersection using the sensor data and the detected output. The one or more processors can be configured to determine, based on the updated historical data, the schedule for the setting for signaling. The one or more processors can be configured to determine, based on the historical data input into one or more machine learning (ML) models trained on a plurality of settings for signaling for a plurality of roadway intersections displaying signals in accordance with a plurality of schedules, the setting for signaling at the roadway intersection.

An aspect of the technical solutions can be directed to a method. The method can include identifying, by one or more processors coupled with memory, for a signaling device at a roadway intersection, a schedule established by a setting for initiating one or more outputs of the signaling device. The setting can include a plurality of phases for the one or more outputs to be provided by the signaling device in accordance with predetermined time intervals of the schedule. The method can include receiving, by the one or more processors, sensor data indicative of a detected output provided by the signaling device at a time point. The method can include comparing, by the one or more processors, using a machine learning model trained on historical signaling data, the detected output from the signaling device at the time point with an expected output of the one or more outputs associated with a phase of the plurality of phases of the schedule. The phase can correspond to a time interval of the predetermined time intervals corresponding to the time point. The method can include detecting, by the one or more processors, a discrepancy based on the comparison. The method can include generating, by the one or more processors, responsive to the discrepancy, an alert including diagnostic data indicative of the discrepancy for transmission to a remote device.

The method can include detecting, by the one or more processors, the discrepancy based on the comparison a difference between a time difference between a time of the detected output and a time of the expected output exceeding a predetermined threshold. The method can include initiating, by the one or more processors, responsive to detecting the discrepancy, a corrective action comprising at least one of recalibrating the signaling device or adjusting the schedule to mitigate the discrepancy.

The method can include updating, by the one or more processors, the historical signaling data used to train the machine learning model based on real-time sensor data and detected output. The method can include retraining, by the one or more processors, the machine learning model to improve accuracy of discrepancy detection. The method can include identifying, by the one or more processors, from a data repository, historical data for the roadway intersection indicative of signaling changes for one or more signaling devices at the roadway intersection. The method can include determining, by the one or more processors, based on the historical data for the roadway intersection, the schedule for the setting for signaling.

The detecting of the discrepancy can include adjusting a predetermined threshold for the comparison based on environmental conditions including at least one of weather, visibility, or traffic density for use in comparison of the detected output with the expected output. The alert can include a command to initiate an automated corrective workflow comprising transmitting diagnostic data to a remote maintenance device and requesting a recalibration of the signaling device.

The method can include receiving, by the one or more processors, from a camera device directed at the signaling device, the sensor data comprising a video comprising a plurality of frames. The method can include identifying, by the one or more processors, the time point at which the detected output is initiated by the signaling device based on one or more timestamps of one or more frames of the plurality of frames of the video captured by the camera device.

The method can include updating, by the one or more processors, the historical data for the roadway intersection using the sensor data and the detected output. The method can include determining, by the one or more processors, based on the updated historical data, the schedule for the setting for signaling. The method can include determining, by the one or more processors, based on the historical data input into one or more machine learning (ML) models trained on a plurality of settings for signaling for a plurality of roadway intersections displaying signals in accordance with a plurality of schedules, the setting for signaling at the roadway intersection.

An aspect of the technical solutions can be directed to a non-transitory computer-readable medium storing instructions. The instructions, when executed by at least one processor, can cause the at least one processor to identify, for a signaling device at a roadway intersection, a schedule established by a setting for initiating one or more outputs of the signaling device, the setting comprising a plurality of phases for the one or more outputs to be provided by the signaling device in accordance with predetermined time intervals of the schedule. The instructions, when executed by at least one processor, can cause the at least one processor to receive sensor data indicative of a detected output provided by the signaling device at a time point. The instructions, when executed by at least one processor, can cause the at least one processor to compare, using a machine learning model trained on historical signaling data, the detected output from the signaling device at the time point with an expected output of the one or more outputs associated with a phase of the plurality of phases of the schedule, the phase corresponding to a time interval of the predetermined time intervals corresponding to the time point. The instructions, when executed by at least one processor, can cause the at least one processor to detect a discrepancy based on the comparison. The instructions, when executed by at least one processor, can cause the at least one processor to generate, responsive to the discrepancy, an alert including diagnostic data indicative of the discrepancy for transmission to a remote device.

The instructions, when executed by at least one processor, can cause the at least one processor to detect the discrepancy based on the comparison a difference between a time difference between a time of the detected output and a time of the expected output exceeding a predetermined threshold. The instructions, when executed by at least one processor, can cause the at least one processor to initiate, responsive to detecting the discrepancy, a corrective action comprising at least one of recalibrating the signaling device or adjusting the schedule to mitigate the discrepancy.

An aspect of the technical solutions can be directed to a system. The system can include one or more processors, coupled with memory and configured (e.g., via instructions or data stored in the memory) to receive, from a sensor device, sensor data on a roadway intersection comprising a signaling device to display output to traffic, the sensor data comprising one or more two-dimensional frames of at least a portion of the roadway intersection. The one or more processors can be configured to identify, within the one or more two-dimensional frames, one or more objects in motion at the roadway intersection. The one or more processors can be configured to track, using one or more object identifiers associated with the one or more objects, the one or more objects within the one or more two-dimensional frames to determine one or more object trajectories and one or more relative positions of the one or more objects. The one or more processors can be configured to detect, using the one or more object trajectories and the one or more relative positions, an incident corresponding to the one or more objects. The one or more processors can be configured to generate, responsive to detecting the incident, an instruction comprising data indicative of the incident and a control command to modify an operational state of the signaling device. The one or more processors can be configured to transmit the instruction to the signaling device to display an output comprising the data indicative of the incident.

The incident can include at least one of: a collision between two moving objects or a collision of a moving object with a stationary object within an area comprising the roadway intersection. The detecting of the incident can include inputting the one or more object trajectories and the one or more relative positions into a machine learning model trained on historical roadway incident data to classify the incident. The detecting of the incident can include inputting the one or more two-dimensional frames into a machine learning model to determine the one or more object trajectories and the one or more relative positions to detect the incident.

The incident can be detected based at least on the one or more object trajectories approaching at least one of a stationary object or a trajectory of another object to a distance that is less than a predetermined threshold distance. The incident can be detected based on the one or more relative positions of the one or more objects with respect to at least one of a stationary object or another object is less than a predetermined threshold distance.

For example, tracking the one or more objects across the one or more two-dimensional frames further can comprise using the one or more object trajectories to predict one or more locations of the one or more objects in a future time interval following a time of the two-dimensional frames to determine a probability of a collision in the future time interval. The sensor device can comprise at least one of: a video camera, a lidar sensor, or a radar sensor, and the one or more two-dimensional frames include image frames or point cloud frames captured at a frame rate of between at least 10 frames per second and 120 frames per second.

The control command to modify the operational state of the signaling device can comprise initiating a dynamic signaling response including at least one of: activating an emergency flashing pattern, displaying a warning message to approaching traffic, or transmitting an alert to a remote operator device. The one or more processors can be configured to generate a second instruction to provide a notification indicative of the incident to a remote device. The one or more processors can be configured to transmit the notification to the remote device to initiate a response by an emergency service to attend to the incident.

The notification to the remote device can include data of location of the incident and a map of a route for the emergency service to arrive at the location of the incident. The system can include a machine learning model that is configured to identify sensor data associated with the incident and train one or more machine learning models model using the identified sensor data to adjust performance of the machine learning model for detecting incidents at the roadway intersection.

An aspect of the technical solutions can be directed to a method. The method can include receiving, by one or more processors, from a sensor device, sensor data on a roadway intersection comprising a signaling device to display output to traffic, the sensor data comprising one or more two-dimensional frames of at least a portion of the roadway intersection. The method can include identifying, by one or more processors, within the one or more two-dimensional frames, one or more objects in motion at the roadway intersection. The method can include tracking, by one or more processors, using one or more object identifiers associated with the one or more objects, the one or more objects within the one or more two-dimensional frames to determine one or more object trajectories and one or more relative positions of the one or more objects. The method can include detecting, by one or more processors, using the one or more object trajectories and the one or more relative positions, an incident corresponding to the one or more objects. The method can include generating, by one or more processors, responsive to detecting the incident, an instruction comprising data indicative of the incident and a control command to modify an operational state of the signaling device. The method can include transmitting, by one or more processors, the instruction to the signaling device to display an output comprising the data indicative of the incident.

The incident can include at least one of: a collision between two moving objects or a collision of a moving object with a stationary object within an area comprising the roadway intersection. The method can include detecting, by the one or more processors, the incident by inputting the one or more object trajectories and the one or more relative positions into a machine learning model trained on historical roadway incident data to classify the incident. The method can include detecting, by the one or more processors, the incident by inputting the one or more two-dimensional frames into a machine learning model to determine the one or more object trajectories and the one or more relative positions to detect the incident. The method can include detecting, by the one or more processors, the incident based at least on the one or more object trajectories approaching at least one of a stationary object or a trajectory of another object to a distance that is less than a predetermined threshold distance. The method can include detecting, by the one or more processors, the incident based on the one or more relative positions of the one or more objects with respect to at least one of a stationary object or another object is less than a predetermined threshold distance.

An aspect of the technical solutions can be directed to a non-transitory computer-readable medium storing instructions. The instructions, when executed by at least one processor, can cause the at least one processor to receive, from a sensor device, sensor data on a roadway intersection comprising a signaling device to display output to traffic, the sensor data comprising one or more two-dimensional frames of at least a portion of the roadway intersection. The instructions, when executed by at least one processor, can cause the at least one processor to identify, within the one or more two-dimensional frames, one or more objects in motion at the roadway intersection. The instructions, when executed by at least one processor, can cause the at least one processor to track, using one or more object identifiers associated with the one or more objects, the one or more objects within the one or more two-dimensional frames to determine one or more object trajectories and one or more relative positions of the one or more objects. The instructions, when executed by at least one processor, can cause the at least one processor to detect, using the one or more object trajectories and the one or more relative positions, an incident corresponding to the one or more objects. The instructions, when executed by at least one processor, can cause the at least one processor to generate, responsive to detecting the incident, an instruction comprising data indicative of the incident and a control command to modify an operational state of the signaling device. The instructions, when executed by at least one processor, can cause the at least one processor to transmit the instruction to the signaling device to display an output comprising the data indicative of the incident. The incident can include at least one of: a collision between two moving objects or a collision of a moving object with a stationary object within an area comprising the roadway intersection.

An aspect of the technical solutions can be directed to a system. The system can include one or more processors, coupled with memory and configured (e.g., via instructions or data stored in the memory) to identify a setting for signaling at a roadway intersection, the setting comprising multiple predetermined phases applied according to predetermined time intervals to control movement of objects across the roadway intersection. The one or more processors can be configured to identify data from one or more sensors on one or more objects and one or more environmental conditions at the roadway intersection. The one or more processors can be configured to identify a regulation indicative of a range of acceptable predetermined time intervals for the roadway intersection. The one or more processors can be configured to determine, based on the one or more objects, the one or more environmental conditions and the regulation input into a machine learning (ML) model trained on a plurality of data on objects and environmental conditions at a plurality of roadway intersections and a plurality of regulations for roadway intersections, a reduced transition interval for timing for an object to pass the roadway intersection in accordance with the regulation. The one or more processors can be configured to adjust the setting to conform the predetermined time intervals of the setting according to the reduced transition interval. The one or more processors can be configured to generate an instruction to a signaling device of the roadway intersection to operate the signaling device according to the adjusted setting.

The one or more processors can be configured to establish, based on the regulation, a threshold distance to be maintained between a plurality of objects at the roadway intersection and validate the setting based on the threshold distance. The ML model can be trained on historical data specific to the roadway intersection to train the ML model according to traffic patterns and environmental conditions at the roadway intersection.

The system can include a user interface to provide an indication on traffic condition on the roadway intersection and provide access to the adjusted setting responsive to an input received at the user interface. The signaling device can include a dynamic signage feature configured to visually communicate a change in a signaling phase to an object approaching the roadway intersection. The object can include at least one of a vehicle or a pedestrian.

The one or more processors can be configured to receive an updated regulation indicative of an updated range of acceptable predetermined time intervals for the roadway intersection. The one or more processors can be configured to determine, based on the updated regulation input into the machine learning (ML) model, an updated reduced transition interval for timing for an object to pass the roadway intersection in accordance with the regulation. The one or more processors can be configured to adjust the setting to conform the predetermined time intervals of the setting according to the updated reduced transition interval.

An aspect of the technical solutions can be directed to a method. The method can include identifying, by one or more processors coupled with memory, a setting for signaling at a roadway intersection, the setting comprising multiple predetermined phases applied according to predetermined time intervals to control movement of objects across the roadway intersection. The method can include identifying, by the one or more processors, data from one or more sensors on one or more objects and one or more environmental conditions at the roadway intersection. The method can include identifying, by the one or more processors, a regulation indicative of a range of acceptable predetermined time intervals for the roadway intersection. The method can include determining, by the one or more processors, based on the one or more objects, the one or more environmental conditions and the regulation input into a machine learning (ML) model trained on a plurality of data on objects and environmental conditions at a plurality of roadway intersections and a plurality of regulations for roadway intersections, a reduced transition interval for timing for an object to pass the roadway intersection in accordance with the regulation. The method can include adjusting, by the one or more processors, the setting to conform the predetermined time intervals of the setting according to the reduced transition interval. The method can include generating, by the one or more processors, an instruction to a signaling device of the roadway intersection to operate the signaling device according to the adjusted setting.

The method can include establishing, by the one or more processors, based on the regulation, a threshold distance to be maintained between a plurality of objects at the roadway intersection. The method can include validating, by the one or more processors, the setting based on the threshold distance. The method can include training, by the one or more processors, the ML model on historical data specific to the roadway intersection to train the ML model according to traffic patterns and environmental conditions at the roadway intersection.

The method can include receiving, by the one or more processors, an indication on traffic condition on the roadway intersection. The method can include providing, by the one or more processors, access to the adjusted setting responsive to an input received at the user interface. The signaling device can include a dynamic signage feature configured to visually communicate a change in a signaling phase to an object approaching the roadway intersection. The object can include at least one of a vehicle or a pedestrians.

The method can include receiving, by the one or more processors, an updated regulation indicative of an updated range of acceptable predetermined time intervals for the roadway intersection. The method can include determining, by the one or more processors, based on the updated regulation input into the machine learning (ML) model, an updated reduced transition interval for timing for an object to pass the roadway intersection in accordance with the regulation. The method can include adjusting, by the one or more processors, the setting to conform the predetermined time intervals of the setting according to the updated reduced transition interval.

An aspect of the technical solutions can be directed to a non-transitory computer-readable medium storing instructions. The instructions, when executed by at least one processor, can cause the at least one processor to identify a setting for signaling at a roadway intersection, the setting comprising multiple predetermined phases applied according to predetermined time intervals to control movement of objects across the roadway intersection. The instructions, when executed by at least one processor, can cause the at least one processor to identify data from one or more sensors on one or more objects and one or more environmental conditions at the roadway intersection. The instructions, when executed by at least one processor, can cause the at least one processor to identify a regulation indicative of a range of acceptable predetermined time intervals for the roadway intersection. The instructions, when executed by at least one processor, can cause the at least one processor to determine, based on the one or more objects, the one or more environmental conditions and the regulation input into a machine learning (ML) model trained on a plurality of data on objects and environmental conditions at a plurality of roadway intersections and a plurality of regulations for roadway intersections, a reduced transition interval for timing for an object to pass the roadway intersection in accordance with the regulation. The instructions, when executed by at least one processor, can cause the at least one processor to adjust the setting to conform the predetermined time intervals of the setting according to the reduced transition interval. The instructions, when executed by at least one processor, can cause the at least one processor to generate an instruction to a signaling device of the roadway intersection to operate the signaling device according to the adjusted setting.

The instructions, when executed by at least one processor, can cause the at least one processor to establish, based on the regulation, a threshold distance to be maintained between a plurality of objects at the roadway intersection. The instructions, when executed by at least one processor, can cause the at least one processor to validate the setting based on the threshold distance. The instructions, when executed by at least one processor, can cause the at least one processor to utilize the ML model that is trained on historical data specific to the roadway intersection to train the ML model according to traffic patterns and environmental conditions at the roadway intersection.

The instructions, when executed by at least one processor, can cause the at least one processor to provide a user interface, the user interface configured to provide an indication on traffic condition on the roadway intersection. The instructions, when executed by at least one processor, can cause the at least one processor to provide access to the adjusted setting responsive to an input received at the user interface. The data from one or more signaling devices, can include data from a dynamic signage feature configured to visually communicate a change in a signaling phase to an object approaching the roadway intersection. The data from one or more objects can include data from at least one of a vehicle or a pedestrian.

The instructions, when executed by at least one processor, can cause the at least one processor to receive an updated regulation indicative of an updated range of acceptable predetermined time intervals for the roadway intersection. The instructions, when executed by at least one processor, can cause the at least one processor to determine, based on the updated regulation input into the machine learning (ML) model, an updated reduced transition interval for timing for an object to pass the roadway intersection in accordance with the regulation. The instructions, when executed by at least one processor, can cause the at least one processor to adjust the setting to conform the predetermined time intervals of the setting according to the updated reduced transition interval.

An aspect of the technical solutions is directed to a system. The system can include one or more processors, coupled with memory and configured (e.g., via instructions or data stored in the memory) to identify data from one or more sensors associated with a roadway intersection. The one or more processors can be configured to determine, based on the data, a velocity of an object approaching the roadway intersection. The one or more processors can be configured to determine, based on the velocity of the object and a predefined speed limit, that the object exceeds the predefined speed limit. The one or more processors can be configured to generate, responsive to the determination that the object exceeds the predefined speed limit, a signal for the object to prompt adjustment of the velocity of the object prior to approaching the roadway intersection. The one or more processors can be configured to initiate, via a controller, responsive to the signal, actuation of a first signaling device of one or more signaling devices of the roadway intersection to signal the object that the predefined speed limit is exceeded. The one or more processors can be configured to verify, based on data from the one or more sensors following the initiation of the actuation of the one or more signaling devices, whether the velocity of the object is reduced below a predetermined velocity threshold at a predetermined distance from the roadway intersection.

In some implementations, the determining the velocity of the object can include analyzing a sequence of data frames captured at a frame rate of at least 10 frames per second, identifying the object within the sequence of data frames, and determining the velocity based on a number of frames in which the object appears and a known distance. The one or more processors can be configured to track the object across a sequence of frames of the data by associating the object with an identifier derived from at least one of a license plate or an object feature. The one or more processors can be configured to identify timestamps for the sequence of frames. The one or more processors can be configured to determine the velocity of the object based on the sequence of frames and the timestamps input into a machine learning model trained to determine object velocity based on timestamps and data frames indicative of moving objects.

The one or more processors can be configured to interrupt, responsive to the determination that the velocity of the object is not reduced below the predetermined velocity threshold at the predetermined distance, a signaling phase of a second signaling device of the plurality of signaling devices with a second signal for the second signaling device to alert traffic along a second route of the roadway intersection that is different from a route of the roadway intersection of the object. The second signal can alert traffic along the second route to at least one of: reduce velocity along the second route or stop movement along the second route, responsive to the velocity of the object not being reduced below the predetermined velocity thresholds at the predetermined distance from the roadway intersection. The signal can include at least one of: a visual alert, an audio notification, or a vehicle-to-everything (V2X) communication, the V2X communication to be transmitted to the object to prompt adjustment of the velocity of the object.

The signal can include a visual alert displayed on a signaling device is configured to indicate the velocity of the object relative to the predefined speed limit. The one or more processors can be configured to identify, from the data, one or more indications of environmental conditions. The one or more processors can be configured to generate the predefined speed limit based on a posted speed limit for a route on which the object is moving that is adjusted according to the one or more indications of environmental conditions. The data on the environmental conditions can correspond to at least one of: weather conditions, road surface conditions, visibility level, density of traffic, or presence of obstacles on a road associated with the roadway intersection. The signal can be customized based on a type of the object, wherein the type of the object includes at least one of: a vehicle, a bicycle or a pedestrian.

The one or more processors can be configured to identify, from the data, a type of the object approaching the roadway intersection. The one or more processors can be configured to generate the signal for the object to include an alert that is selected based on a type of the object, the alert comprising at least one of: a visual alert directed to a route of the roadway intersection, a vehicle-to-everything (V2X) communication addressed to the object comprising a vehicle, or an audio notification directed to one or more objects.

The one or more processors can be configured to determine, based on data from the one or more sensors, at least one of a remaining time or a recommended velocity for the object to arrive at the roadway intersection during a green signal phase. The one or more processors can be configured to generate the signal for the object to include an indication of the recommended velocity to signal for the object arrival at the intersection prior to ending of the green signal phase. The one or more processors can be configured to utilize data from a plurality of sensor types to determine the velocity of the object prior to generating the signal for the object, plurality of sensor types including at least two of: radar, lidar, and camera sensors.

An aspect of the technical solutions can be directed to a method. The method can include identifying, by one or more processors coupled with memory, data from one or more sensors associated with a roadway intersection. The method can include determining, by the one or more processors, based on the data, a velocity of an object approaching the roadway intersection. The method can include determining, by the one or more processors, based on the velocity of the object and a predefined speed limit, that the object exceeds the predefined speed limit. The method can include generating, by the one or more processors, responsive to the determination that the object exceeds the predefined speed limit, a signal for the object to prompt adjustment of the velocity of the object prior to approaching the roadway intersection. The method can include initiating, by the one or more processors, via a controller, responsive to the signal, actuation of a first signaling device of one or more signaling devices of the roadway intersection to signal the object that the predefined speed limit is exceeded. The method can include verifying, by the one or more processors, based on data from the one or more sensors following the initiation of the actuation of the one or more signaling devices, whether the velocity of the object is reduced below a predetermined velocity threshold at a predetermined distance from the roadway intersection.

The method can include analyzing, by the one or more processors, a sequence of data frames captured at a frame rate of at least 10 frames per second. The method can include identifying, by the one or more processors, the object within the sequence of data frames. The method can include determining, by the one or more processors, the velocity of the object based on a number of frames in which the object appears and a known distance.

The method can include tracking, by the one or more processors, the object across a sequence of frames of the data by associating the object with an identifier derived from at least one of a license plate or an object feature. The method can include identifying, by the one or more processors, timestamps for the sequence of frames. The method can include determining, by the one or more processors, the velocity of the object based on the sequence of frames and the timestamps input into a machine learning model trained to determine object velocity based on timestamps and data frames indicative of moving objects.

The method can include interrupting, by the one or more processors, responsive to the determination that the velocity of the object is not reduced below the predetermined velocity threshold at the predetermined distance, a signaling phase of a second signaling device of the plurality of signaling devices with a second signal for the second signaling device to alert traffic along a second route of the roadway intersection that is different from a route of the roadway intersection of the object.

The second signal can alert traffic along the second route to at least one of: reduce velocity along the second route or stop movement along the second route, responsive to the velocity of the object not being reduced below the predetermined velocity thresholds at the predetermined distance from the roadway intersection. The method can include identifying, by the one or more processors, from the data, data on environmental conditions. The method can include generating, by the one or more processors, the predefined speed limit based on the environmental conditions.

An aspect of the technical solutions can be directed to a non-transitory computer-readable medium storing instructions. The instructions, when executed by at least one processor, can cause the at least one processor to identify data from one or more sensors associated with a roadway intersection. The instructions, when executed by at least one processor, can cause the at least one processor to determine, based on the data, a velocity of an object approaching the roadway intersection. The instructions, when executed by at least one processor, can cause the at least one processor to determine, based on the velocity of the object and a predefined speed limit, that the object exceeds the predefined speed limit. The instructions, when executed by at least one processor, can cause the at least one processor to generate, responsive to the determination that the object exceeds the predefined speed limit, a signal for the object to prompt adjustment of the velocity of the object prior to approaching the roadway intersection. The instructions, when executed by at least one processor, can cause the at least one processor to initiate, via a controller, responsive to the signal, actuation of a first signaling device of one or more signaling devices of the roadway intersection to signal the object that the predefined speed limit is exceeded. The instructions, when executed by at least one processor, can cause the at least one processor to verify, based on data from the one or more sensors following the initiation of the actuation of the one or more signaling devices, whether the velocity of the object is reduced below a predetermined velocity threshold at a predetermined distance from the roadway intersection.

An aspect of the technical solutions can be directed to a system. The system can include one or more processors, coupled with memory and configured (e.g., via instructions or data stored in the memory) to identify sensor data from one or more sensors associated with a roadway intersection, the sensor data corresponding to one or more objects moving at the roadway intersection. The one or more processors can be configured to provide, based on the sensor data input into one or more machine learning (ML) models trained on a plurality of objects moving at a plurality of roadway intersections in a plurality of directions and a plurality of velocities, one or more predicted directions and velocities for the one or more objects. The one or more processors can be configured to determine, based on the one or more predicted directions and velocities, that a risk of a collision involving at least an object of the one or more objects exceeds a confidence threshold. The one or more processors can be configured to initiate, responsive to the determination, actuation of at least one signaling device of the roadway intersection to provide a collision warning, the actuation comprising at least one of: activating a visual alert, an audio alert, or a vehicle-to-everything (V2X) communication directed to the object. The one or more processors can be configured to verify, based on subsequent sensor data, whether the object or a second object alters its trajectory or velocity in response to the collision warning.

The one or more processors can be configured to generate, based on the determination, the visual alert to be displayed on the at least one signaling device of the roadway intersection directed at one or more objects of roadway traffic. The one or more processors can be configured to generate, based on the one or more predicted directions and velocities, a confidence curve representing a probability distribution of collision risk over time. The one or more processors can be configured to determine that the risk of the collision exceeds the confidence threshold by computing a confidence metric from the confidence curve and comparing the confidence metric to the confidence threshold.

The one or more processors can be configured to codify the risk of collision as a confidence value derived from the confidence curve and compare the confidence value to the confidence threshold to determine whether to initiate the collision warning. The one or more processors can be configured to initiate, prior to the predicted collision, a preemptive signaling action comprising adjusting a traffic light phase or activating a lane-specific indicator to reduce the likelihood of the collision. For instance, adjusting the traffic light phase can comprise at least one of extending a red-light duration for a lane associated with the object or adjusting a green-light transition for a lane of traffic intersecting with the lane associated with the object, and wherein activating the lane-specific indicator comprises illuminating a directional arrow or a warning sign oriented toward a path of approach of the object.

The one or more processors can be configured to retrain the one or more ML models using data on prior incidents of one or more roadway intersections to improve identification of predicted directions and velocities associated with collisions. The one or more processors can be configured to generate, responsive to the determination, a transmission for one or more systems associated with one or more remote roadway intersections to adjust operation of one or more signaling devices at the one or more remote roadway intersections.

The one or more processors can be configured to determine, based on the one or more predicted directions and velocities, that the risk of the collision exceeding the confidence threshold includes a second object on a collision course with the object. The one or more processors can be configured to generate, based on the determination, a second alert to be displayed on a second signaling device of the roadway intersection directed toward the second object. The sensor data can include data on environmental conditions, the environmental conditions corresponding to at least one of: weather conditions, road surface conditions, visibility level, density of traffic, or the presence of an obstacle on a road associated with the roadway intersection, and wherein the one or more processors are configured to determine the risk of the collision based at least on the environmental conditions.

An aspect of technical solutions can be directed to a method. The method can include identifying, by one or more processors, sensor data from one or more sensors associated with a roadway intersection, the sensor data corresponding to one or more objects moving at the roadway intersection. The method can include providing, by the one or more processors, based on the sensor data input into one or more machine learning (ML) models trained on a plurality of objects moving at a plurality of roadway intersections in a plurality of directions and a plurality of velocities, one or more predicted directions and velocities for the one or more objects. The method can include determining, by the one or more processors, based on the one or more predicted directions and velocities, that a risk of a collision involving at least an object of the one or more objects exceeds a confidence threshold. The method can include initiating, by the one or more processors, responsive to the determination, actuation of at least one signaling device of the roadway intersection to provide a collision warning, the actuation comprising at least one of: activating a visual alert, an audio alert, or a vehicle-to-everything (V2X) communication directed to the object. The method can include verifying, by the one or more processors, based on subsequent sensor data, whether the object or a second object alters its trajectory or velocity in response to the collision warning.

The method can include generating, by the one or more processors, based on the determination, the visual alert to be displayed on the at least one signaling device of the roadway intersection directed at one or more objects of roadway traffic. The method can include generating, by the one or more processors, based on the one or more predicted directions and velocities, a confidence curve representing a probability distribution of collision risk over time. The method can include determining, by the one or more processors, that the risk of the collision exceeds the confidence threshold by computing a confidence metric from the confidence curve and comparing the confidence metric to the confidence threshold.

The method can include codifying, by the one or more processors, the risk of collision as a confidence value derived from the confidence curve and compare the confidence value to the confidence threshold to determine whether to initiate the collision warning. The method can include initiating, by the one or more processors, prior to the predicted collision, a preemptive signaling action comprising adjusting a traffic light phase or activating a lane-specific indicator to reduce the likelihood of the collision. For instance, adjusting the traffic light phase can include at least one of extending, by the one or more processors a red-light duration for a lane associated with the object or adjusting, by the one or more processors, a green-light transition for a lane of traffic intersecting with the lane associated with the object, and wherein activating the lane-specific indicator comprises illuminating a directional arrow or a warning sign oriented toward a path of approach of the object.

The method can include retraining, by the one or more processors, the one or more ML models using data on prior incidents of one or more roadway intersections to improve identification of predicted directions and velocities associated with collisions. The method can include generating, by the one or more processors, responsive to the determination, a transmission for one or more systems associated with one or more remote roadway intersections to adjust operation of one or more signaling devices at the one or more remote roadway intersections.

The method can include determining, by the one or more processors, based on the one or more predicted directions and velocities, that the risk of the collision exceeding the confidence threshold includes a second object on a collision course with the object. The method can include generating, by the one or more processors, based on the determination, a second alert to be displayed on a second signaling device of the roadway intersection directed toward the second object.

An aspect of the technical solutions can be directed to a non-transitory computer-readable medium storing instructions. The instructions, when executed by at least one processor, can cause the at least one processor to identify sensor data from one or more sensors associated with a roadway intersection, the sensor data corresponding to one or more objects moving at the roadway intersection. The instructions, when executed by at least one processor, can cause the at least one processor to provide, based on the sensor data input into one or more machine learning (ML) models trained on a plurality of objects moving at a plurality of roadway intersections in a plurality of directions and a plurality of velocities, one or more predicted directions and velocities for the one or more objects. The instructions, when executed by at least one processor, can cause the at least one processor to determine, based on the one or more predicted directions and velocities, that a risk of a collision involving at least an object of the one or more objects exceeds a confidence threshold. The instructions, when executed by at least one processor, can cause the at least one processor to initiate, responsive to the determination, actuation of at least one signaling device of the roadway intersection to provide a collision warning, the actuation comprising at least one of: activating a visual alert, an audio alert, or a vehicle-to-everything (V2X) communication directed to the object. The instructions, when executed by at least one processor, can cause the at least one processor to verify, based on subsequent sensor data, whether the object or a second object alters its trajectory or velocity in response to the collision warning.

An aspect of the technical solutions can be directed to a system. The system can include one or more processors, coupled with memory and configured (e.g., via instructions or data stored in the memory) to identify, from one or more sensors associated with a roadway intersection, historical data corresponding to objects associated with traffic at the roadway intersection and acquired over a plurality of traffic conditions and a plurality of weather conditions. The one or more processors can be configured to generate, based on the sensor data input into one or more machine learning (ML) models trained on a plurality of historical data for a plurality of roadway intersections captured over various traffic conditions and weather conditions, a schedule of phase transitions for one or more signaling devices at the roadway intersection. The one or more processors can be configured to receive, from a sensor of the one or more sensors, real-time data on movement of an object approaching the roadway intersection at a time point. The one or more processors can be configured to determine, based on real-time data on movement and a phase transition of the phase transitions identified according to the schedule for the time point, that the movement of the object via the roadway intersection is to be adjusted. The one or more processors can be configured to initiate, responsive to the determination, actuation of at least one signaling device of the one or more signaling devices to prompt adjustment to the movement of the object.

The one or more processors can be configured to generate, responsive to the determination that the movement of the object is to be adjusted, an alert to be displayed by the one signaling device to prompt adjustment to the movement of the object. The one or more processors can be configured to receive, from the one or more sensors, real-time data on at least one of an updated weather condition or an updated traffic condition at the roadway intersection. The one or more processors can be configured to update, based on the at least one of the updated weather condition or the updated traffic condition, the schedule of phase transitions for the one or more signaling devices. The one or more processors can be configured to initiate, based on the updated schedule, actuation of the at least one signaling device.

The one or more processors can be configured to determine, based on the historical data, a pattern in traffic flow of the roadway intersection over a periodic time interval. The one or more processors can be configured to determine, based on the pattern, that a route of a plurality of routes intersecting at the roadway intersection has an increased traffic flow during a portion of the periodic time interval. The one or more processors can be configured to update the schedule to adjust duration of one or more phase transitions of the phase transitions of the one or more signaling devices to address the increased traffic flow of the route during the portion of the time interval. The one or more processors can be configured to initiate actuation of the one or more signaling devices during the portion of the time interval according to the updated schedule.

The one or more processors can be configured to classify the object approaching the roadway intersection into an object type comprising at least one of a pedestrian, a bicycle, or a vehicle. The one or more processors can be configured to identify priority of one or more objects based on classified object type. The one or more processors can be configured to adjust the schedule of phase transitions to prioritize according to the priority of the one or more objects. For example, generating the schedule of phase transitions can include incorporating external data sources including at least one of real-time public transit schedules, emergency vehicle routing data, or regional traffic advisories to optimize signaling device actuation.

The one or more processors can be configured to predict, based on historical data and real-time traffic flow, an upcoming congestion event at the roadway intersection at a future time interval. The one or more processors can be configured to update the schedule of phase transitions to mitigate the upcoming congestion event. The one or more processors can be configured to initiate, at the future time interval, actuation of the at least one signaling device according to the updated schedule.

The one or more processors can be configured to retrain the machine learning model periodically using updated historical data of the roadway intersection to improve accuracy of the schedule of phase transitions for the one or more signaling devices. For instance, generating the schedule of phase transitions can include dynamically updating the schedule to adjust phase durations based on environmental conditions including at least one of precipitation level, roadway surface condition, or ambient light level to enhance safety at the roadway intersection.

An aspect of the technical solutions can be directed to a method. The method can include identifying, by one or more processors, from one or more sensors associated with a roadway intersection, historical data corresponding to objects associated with traffic at the roadway intersection and acquired over a plurality of traffic conditions and a plurality of weather conditions. The method can include generating, by the one or more processors, based on the sensor data input into one or more machine learning (ML) models trained on a plurality of historical data for a plurality of roadway intersections captured over various traffic conditions and weather conditions, a schedule of phase transitions for one or more signaling devices at the roadway intersection. The method can include receiving, by the one or more processors, from a sensor of the one or more sensors, real-time data on movement of an object approaching the roadway intersection at a time point. The method can include determining, by the one or more processors, based on real-time data on movement and a phase transition of the phase transitions identified according to the schedule for the time point, that the movement of the object via the roadway intersection is to be adjusted. The method can include initiating, by the one or more processors, responsive to the determination, actuation of at least one signaling device of the one or more signaling devices to prompt adjustment to the movement of the object.

The method can include generating, by the one or more processors, responsive to the determination that the movement of the object is to be adjusted, an alert to be displayed by the one signaling device to prompt adjustment to the movement of the object. The method can include receiving, by the one or more processors, from the one or more sensors, real-time data on at least one of an at least one of an updated weather condition or an updated traffic condition at the roadway intersection. The method can include updating, by the one or more processors, based on the at least one of the updated weather condition or the updated traffic condition, the schedule of phase transitions for the one or more signaling devices. The method can include initiating, by the one or more processors, based on the updated schedule, actuation of the at least one signaling device.

The method can include determining, by the one or more processors, based on the historical data, a pattern in traffic flow of the roadway intersection over a periodic time interval. The method can include determining, by the one or more processors, based on the pattern, that a route of a plurality of routes intersecting at the roadway intersection has an increased traffic flow during a portion of the periodic time interval. The method can include updating, by the one or more processors, the schedule to adjust duration of one or more phase transitions of the phase transitions of the one or more signaling devices to address the increased traffic flow of the route during the portion of the time interval. The method can include initiating, by the one or more processors, actuation of the one or more signaling devices during the portion of the time interval according to the updated schedule.

The method can include classifying, by the one or more processors, the object approaching the roadway intersection into an object type comprising at least one of a pedestrian, a bicycle, or a vehicle. The method can include identifying, by the one or more processors, priority of one or more objects based on classified object type. The method can include adjusting, by the one or more processors, the schedule of phase transitions to prioritize according to the priority of the one or more objects. For instance, generating the schedule of phase transitions can include incorporating external data sources including at least one of real-time public transit schedules, emergency vehicle routing data, or regional traffic advisories to optimize signaling device actuation.

The method can include predicting, by the one or more processors, based on historical data and real-time traffic flow, an upcoming congestion event at the roadway intersection at a future time interval. The method can include updating, by the one or more processors, the schedule of phase transitions to mitigate the upcoming congestion event. The method can include initiating, by the one or more processors, at the future time interval, actuation of the at least one signaling device according to the updated schedule. The method can include retraining, by the one or more processors, the machine learning model periodically using updated historical data of the roadway intersection to improve accuracy of the schedule of phase transitions for the one or more signaling devices. For instance, generating the schedule of phase transitions can include dynamically updating, by the one or more processors, the schedule to adjust phase durations based on environmental conditions including at least one of precipitation level, roadway surface condition, or ambient light level to enhance safety at the roadway intersection.

An aspect of the technical solutions can be directed to a non-transitory computer-readable medium storing instructions. The instructions, when executed by at least one processor, can cause the at least one processor to identify, from one or more sensors associated with a roadway intersection, historical data corresponding to objects associated with traffic at the roadway intersection and acquired over a plurality of traffic conditions and a plurality of weather conditions. The instructions, when executed by at least one processor, can cause the at least one processor to generate, based on the sensor data input into one or more machine learning (ML) models trained on a plurality of historical data for a plurality of roadway intersections captured over various traffic conditions and weather conditions, a schedule of phase transitions for one or more signaling devices at the roadway intersection. The instructions, when executed by at least one processor, can cause the at least one processor to receive, from a sensor of the one or more sensors, real-time data on movement of an object approaching the roadway intersection at a time point. The instructions, when executed by at least one processor, can cause the at least one processor to determine, based on real-time data on movement and a phase transition of the phase transitions identified according to the schedule for the time point, that the movement of the object via the roadway intersection is to be adjusted. The instructions, when executed by at least one processor, can cause the at least one processor to initiate, responsive to the determination, actuation of at least one signaling device of the one or more signaling devices to prompt adjustment to the movement of the object.

The instructions, when executed by at least one processor, can cause the at least one processor to receive, from the one or more sensors, real-time data on at least one of an at least one of an updated weather condition or an updated traffic condition at the roadway intersection. The instructions, when executed by at least one processor, can cause the at least one processor to update, based on the at least one of the updated weather condition or the updated traffic condition, the schedule of phase transitions for the one or more signaling devices. The instructions, when executed by at least one processor, can cause the at least one processor to initiate, based on the updated schedule, actuation of the at least one signaling device.

An aspect of the technical solutions can be directed to a system. The system can include one or more processors, coupled with memory and configured (e.g., via instructions or data stored in the memory) to identify, from one or more sensors of a roadway intersection, sensor data corresponding to one or more objects moving within an area comprising the roadway intersection. The one or more processors can be configured to identify, based on the sensor data input into one or more machine learning (ML) models trained on a plurality of objects moving in a plurality of directions and according to a plurality of velocities within one or more areas comprising one or more roadway intersections, an object to be assisted in traversing the roadway intersection. The one or more processors can be configured to determine, from the sensor data, a predicted trajectory of the object and a predicted time duration for the object to traverse the roadway intersection. The one or more processors can be configured to determine, using a priority matrix mapping the predicted trajectory and the predicted time duration to one or more variations of control of one or more signals for the one or more signaling devices of the roadway intersection, one or more signals to apply to the one or more signaling devices. The one or more processors can be configured to generate one or more instructions for controlling the one or more signaling devices according to the one or more signals to assist the object in traversing the roadway intersection. The one or more processors can be configured to initiate, via a controller and responsive to the one or more instructions, actuation of one or more phases of the one or more signaling devices of the roadway intersection according to the time duration for the object to traverse the roadway intersection. The one or more processors can be configured to verify, upon initiation of the actuation of the one or more phases and based on sensor data from the one or more sensors, whether the object has traversed the roadway intersection within the predicted time duration.

The one or more processors can be configured to determine, based on the sensor data, that the object is present within a zone of approach to the roadway intersection. The one or more processors can be configured to determine, responsive to the object being present within the zone of approach, the one or more signals of the one or more signaling devices. The priority matrix can be stored in the memory and is updated dynamically based on traffic density and frequency of a type of the object detected by the one or more sensors.

The priority matrix stored in the memory can comprise one or more weighted parameters for at least one of the object, the predicted trajectory, or the predicted time duration. The one or more processors can be configured to determine the one or more weighted parameters based on data from the one or more sensors that indicates at least one of a type of the object, a velocity of the object, or an occupancy of objects within the area. The one or more processors can be configured to determine, using the priority matrix and the one or more weighted parameters, the one or more signals to apply to the one or more signaling devices.

The priority matrix can map the predicted trajectory and the predicted time duration of the object with a second predicted trajectory and a second predicted time duration of a second object of the one or more objects. The one or more processors can be configured to determine, based on the mapping of the predicted trajectory and the predicted time duration of the object with the second predicted trajectory and the second predicted time duration of the second object, the one or more signals to apply to the one or more signaling devices to assist the object and the second object in traversing the roadway intersection.

The one or more processors can be configured to determine a type of the object based on the sensor data, wherein the type of the object comprises at least one of: (i) a pedestrian, (ii) a bicycle, (iii) a motor vehicle, (iv) a bus, (v) a truck, (vi) a motorcycle, (vii) a scooter, (viii) a wheelchair, (ix) a stroller, (x) an animal, (xi) an emergency vehicle, (xii) an autonomous vehicle, (xiii) a trailer, or (xiv) a train. The one or more processors can be configured to determine the one or more signals for the one or more signaling devices based on a priority associated with a type of the object of a plurality of types of objects within the area.

For instance, upon determining that the object has not traversed the roadway intersection within the predicted time duration, the one or more processors can be configured to generate updated one or more instructions to adjust one or more phases of the one or more signaling devices to provide additional time for the object to traverse the roadway intersection. For instance, upon determining that the object has not traversed the roadway intersection within the predicted time duration, the one or more processors can be configured to generate an instruction to initiate one of an all-red light operation or a flashing light operation of the one or more signaling devices.

The one or more processors can be configured to generate the one or more signals to include at least one of: (i) signaling a head-start interval for the object when the object comprises a pedestrian or a bicycle, (ii) signaling a head-start interval for a second object detected by the one or more sensors, wherein the second object comprises a motor vehicle, to traverse the roadway intersection prior to arrival of the object comprising the pedestrian or the bicycle, (iii) signaling a no-turn movement on a first signaling device of the one or more signaling devices while signaling a straight-through movement on a second signaling device of the one or more signaling devices, (iv) displaying, via a dynamic signage device associated with the roadway intersection, a message indicating no additional vehicles are permitted to enter the roadway intersection, (v) transmitting, via a communication interface, a vehicle-to-everything (V2X) message identifying the one or more signals for the one or more signaling devices, or (vi) adjusting targeted street light illumination or sign contrast upon detecting low visibility or occlusion of the object based on the sensor data.

The one or more processors can be configured to analyze the sensor data to determine a velocity and a trajectory of the object to be assisted. The one or more processors can be configured to generate the one or more instructions for the one or more signaling devices based on the velocity and the trajectory. The one or more processors can be configured to communicate, via a network, with a system for managing roadway traffic, data from the one or more sensors regarding identified objects and the one or more signals to facilitate coordinated traffic control, by the system, across a plurality of roadway intersections comprising the roadway intersection. The one or more processors can be configured to generate an alert for a second object of the one or more objects, the alert to notify the second object to adjust movement across the roadway intersection responsive to the object traversing the roadway intersection.

An aspect of the technical solutions can be directed to a method. The method can include identifying, by one or more processors coupled with memory, from one or more sensors of a roadway intersection, sensor data corresponding to one or more objects moving within an area comprising the roadway intersection. The method can include identifying, by the one or more processors, based on the sensor data input into one or more machine learning (ML) models trained on a plurality of objects moving in a plurality of directions and according to a plurality of velocities within one or more areas comprising one or more roadway intersections, an object to be assisted in traversing the roadway intersection. The method can include determining, by the one or more processors, from the sensor data, a predicted trajectory of the object and a predicted time duration for the object to traverse the roadway intersection. The method can include determining, by the one or more processors, using a priority matrix mapping the predicted trajectory and the predicted time duration to one or more variations of control of one or more signals for the one or more signaling devices of the roadway intersection, one or more signals to apply to the one or more signaling devices. The method can include generating, by the one or more processors, one or more instructions for controlling the one or more signaling devices according to the one or more signals to assist the object in traversing the roadway intersection. The method can include initiating, by the one or more processors, via a controller and responsive to the one or more instructions, actuation of one or more phases of the one or more signaling devices of the roadway intersection according to the time duration for the object to traverse the roadway intersection. The method can include verifying, by the one or more processors, upon initiation of the actuation of the one or more phases and based on sensor data from the one or more sensors, whether the object has traversed the roadway intersection within the predicted time duration.

The method can include determining, by the one or more processors, based on the sensor data, that the object is present within a zone of approach to the roadway intersection. The method can include determining, by the one or more processors, responsive to the object being present within the zone of approach, the one or more signals of the one or more signaling devices. The priority matrix can be stored in the memory and is updated dynamically based on traffic density and frequency of a type of the object detected by the one or more sensors.

The priority matrix stored in the memory can include one or more weighted parameters for at least one of the object, the predicted trajectory, or the predicted time duration. The method can include determining, by the one or more processors, the one or more weighted parameters based on data from the one or more sensors that indicates at least one of a type of the object, a velocity of the object, or an occupancy of objects within the area. The method can include determining, by the one or more processors, using the priority matrix and the one or more weighted parameters, the one or more signals to apply to the one or more signaling devices.

The priority matrix can map the predicted trajectory and the predicted time duration of the object with a second predicted trajectory and a second predicted time duration of a second object of the one or more objects. The method can include determining, by the one or more processors, based on the mapping of the predicted trajectory and the predicted time duration of the object with the second predicted trajectory and the second predicted time duration of the second object. The method can include applying, by the one or more processors, the one or more signals to the one or more signaling devices to assist the object and the second object in traversing the roadway intersection.

The method can include determining, by the one or more processors, a type of the object based on the sensor data, wherein the type of the object comprises at least one of: (i) a pedestrian, (ii) a bicycle, (iii) a motor vehicle, (iv) a bus, (v) a truck, (vi) a motorcycle, (vii) a scooter, (viii) a wheelchair, (ix) a stroller, (x) an animal, (xi) an emergency vehicle, (xii) an autonomous vehicle, (xiii) a trailer, or (xiv) a train.

An aspect of the technical solutions can be directed to a non-transitory computer-readable medium storing instructions. The instructions, when executed by at least one processor, can cause the at least one processor to identify, from one or more sensors of a roadway intersection, sensor data corresponding to one or more objects moving within an area comprising the roadway intersection. The instructions, when executed by at least one processor, can cause the at least one processor to identify, based on the sensor data input into one or more machine learning (ML) models trained on a plurality of objects moving in a plurality of directions and according to a plurality of velocities within one or more areas comprising one or more roadway intersections, an object to be assisted in traversing the roadway intersection. The instructions, when executed by at least one processor, can cause the at least one processor to determine, from the sensor data, a predicted trajectory of the object and a predicted time duration for the object to traverse the roadway intersection. The instructions, when executed by at least one processor, can cause the at least one processor to determine, using a priority matrix mapping the predicted trajectory and the predicted time duration to one or more variations of control of one or more signals for the one or more signaling devices of the roadway intersection, one or more signals to apply to the one or more signaling devices. The instructions, when executed by at least one processor, can cause the at least one processor to generate one or more instructions for controlling the one or more signaling devices according to the one or more signals to assist the object in traversing the roadway intersection. The instructions, when executed by at least one processor, can cause the at least one processor to initiate, via a controller and responsive to the one or more instructions, actuation of one or more phases of the one or more signaling devices of the roadway intersection according to the time duration for the object to traverse the roadway intersection. The instructions, when executed by at least one processor, can cause the at least one processor to verify, upon initiation of the actuation of the one or more phases and based on sensor data from the one or more sensors, whether the object has traversed the roadway intersection within the predicted time duration.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements.

FIGS. 4B-4L illustrate example features associated with the system and functionalities for roadway intersection signal phase setting adjustments, according to some embodiments.

FIGS. 8-18 illustrate examples of various system and flow diagram features or functionalities for providing incident detection based signaling, according to some embodiments.

FIGS. 20-25A illustrate examples of various system and flow diagram features or functionalities for providing reduced transition interval based on sensor data, according to some embodiments.

FIGS. 26-30A illustrate examples of various system and flow diagram features or functionalities for speed limit based signal generation, according to some embodiments.

FIGS. 31-32A illustrate examples of various system and flow diagram features or functionalities for entity response time reduction, according to some embodiments.

FIGS. 33-41A illustrate examples of various system and flow diagram features or functionalities for signal generation based on characteristics of object approaching roadway intersection, according to some embodiments.

FIGS. 42-50A illustrate examples of various system and flow diagram features or functionalities for signal generating to assist objects based on sensor data, according to some embodiments.

Figure 1:
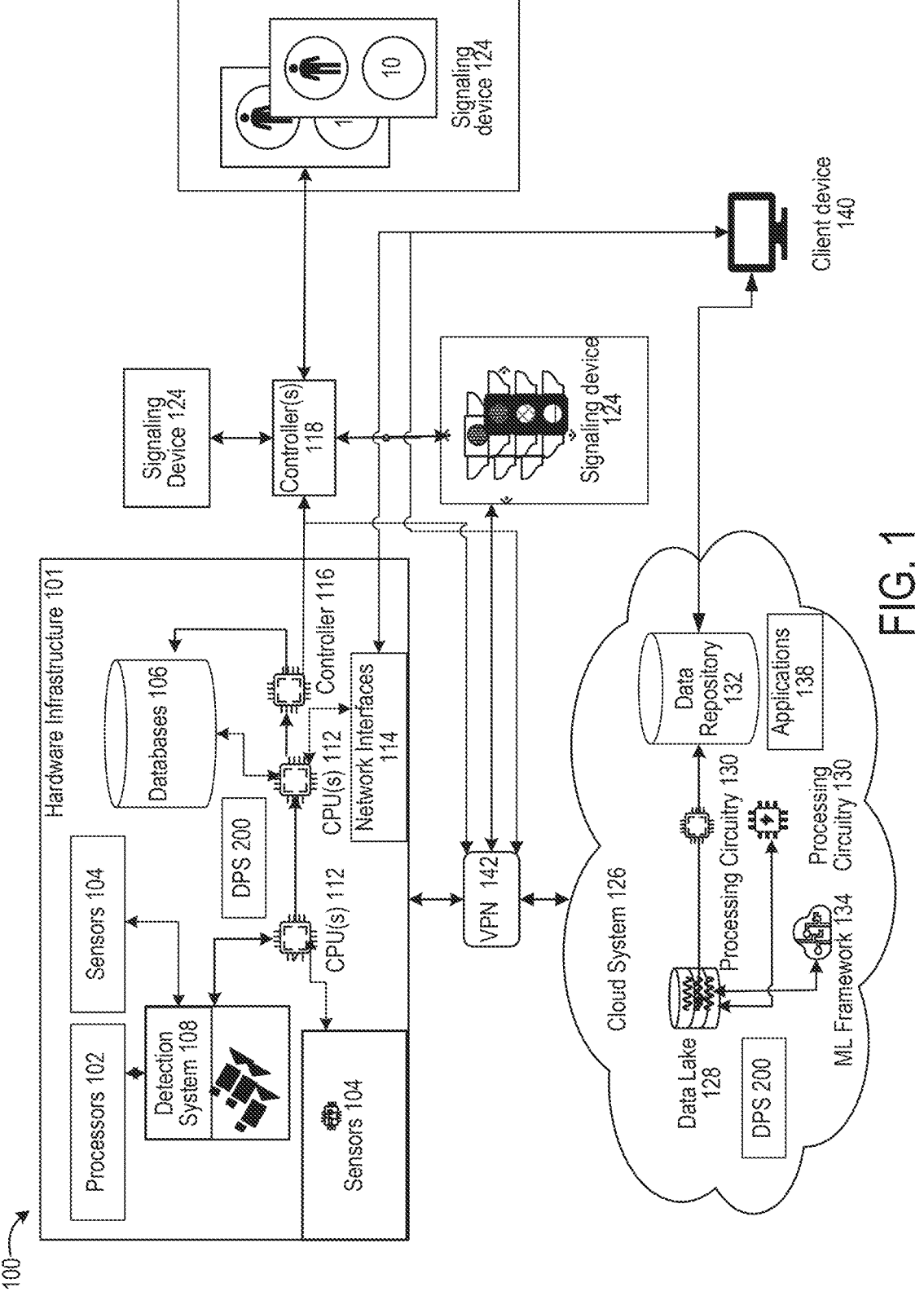
FIG. 1 is a diagram of an example system for providing or managing roadway traffic signaling.

The details of various embodiments of the methods and systems are set forth in the accompanying drawings and the description below.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, a first feature or a device in communication with or communicatively coupled to a second feature or a device in the description that follows may include embodiments in which the first feature is in direct communication with or directly coupled to the second feature and may also include embodiments in which additional features may intervene between the first and second features, such that the first feature is in indirect communication with or indirectly coupled to the second feature. In addition, the present disclosure may repeat reference numerals and/or letters in the various examples. This repetition is for the purpose of simplicity and clarity and does not in itself dictate a relationship between the various embodiments and/or configurations discussed.

For clarity, the following disclosure is organized into sections describing various features and embodiments. Any such features or embodiments from any of these sections (e.g., sections A-I) can be combined with any other features or embodiments of other sections described herein. It is understood that various functionalities across different sections, described herein separately for convenience, can be combined, utilized together or separately and can be rearranged across different sections. For instance, systems or actions described in one section (e.g., section F, C, or D) can be executed, used or combined with systems or actions of any other section (e.g., section I, H, or F) and vice versa, based on any determinations, actions, systems or data described in any one of the same or different sections.

Section A is directed to a signal management computing framework.

Section B is directed to a roadway intersection signaling phase setting adjustment based on sensor data.

Section C is directed to a signal scheduling discrepancy detection based on sensor data.

Section D is directed to an incident detection based signaling.

Section E is directed to a reduced transition interval based on sensor data.

Section F is directed to a speed limit based signal generation.

Section G is directed to a traffic object collision predictor based on sensor data.

Section H is directed to signal generation based on characteristics of object approaching a roadway intersection.

Section I is directed to roadway traffic signal generating to assist objects based on sensor data.

At a high level, the technical solutions described in Sections A-I are directed to roadway intersection signaling configurations that can utilize machine learning and sensor data to adaptively manage traffic flow, improve traffic throughput, and traffic safety. Roadway intersection signaling can encounter challenges, including static signaling phases that are not adjustable based on real-time traffic conditions, the inability of signaling systems to detect situations leading to traffic accidents, or missed opportunities to optimize traffic signaling in accordance with real-time events or regulations. These challenges can lead to inefficiencies, increased traffic congestion, longer waiting times for vehicles and pedestrians, and a heightened risk of preventable accidents. Furthermore, by the virtue of increasing traffic inefficiencies, these challenges also contribute to energy inefficiencies, resulting in higher gasoline consumption and increased greenhouse gas emissions by the vehicles in the traffic, thereby adversely impacting the climate change.

To overcome these challenges, the technical solutions of the present disclosure implement dynamic and adjustable traffic signaling using real-time data collection from various sensors, including cameras and lidar, to monitor traffic objects (e.g., vehicles, bicycles, scooters, pedestrians or people in wheelchairs) and environmental conditions (e.g., weather conditions, lighting conditions, road surface conditions, visibility conditions or traffic conditions). Utilizing machine learning models trained on historical traffic data, and various traffic object movements and environmental conditions, the solutions can take actions. The actions can include adjusting signaling phases responsive to real-time traffic patterns, providing alarms to draw attention of the traffic objects to issues occurring, providing notifications to third parties (e.g., emergency or maintenance services), timely detecting and addressing roadway incidents and taking advantage of opportunities to adjust signaling phases to improve traffic flow. These solutions enhance throughput and safety while reducing energy consumption by minimizing traffic idle times at intersections and roads. In doing so, these solutions also reduce greenhouse gas emissions associated with vehicle idling and stop-and-go traffic thereby helping mitigate the climate change.

Section A—Signal Management Computing Framework

Figure 2:
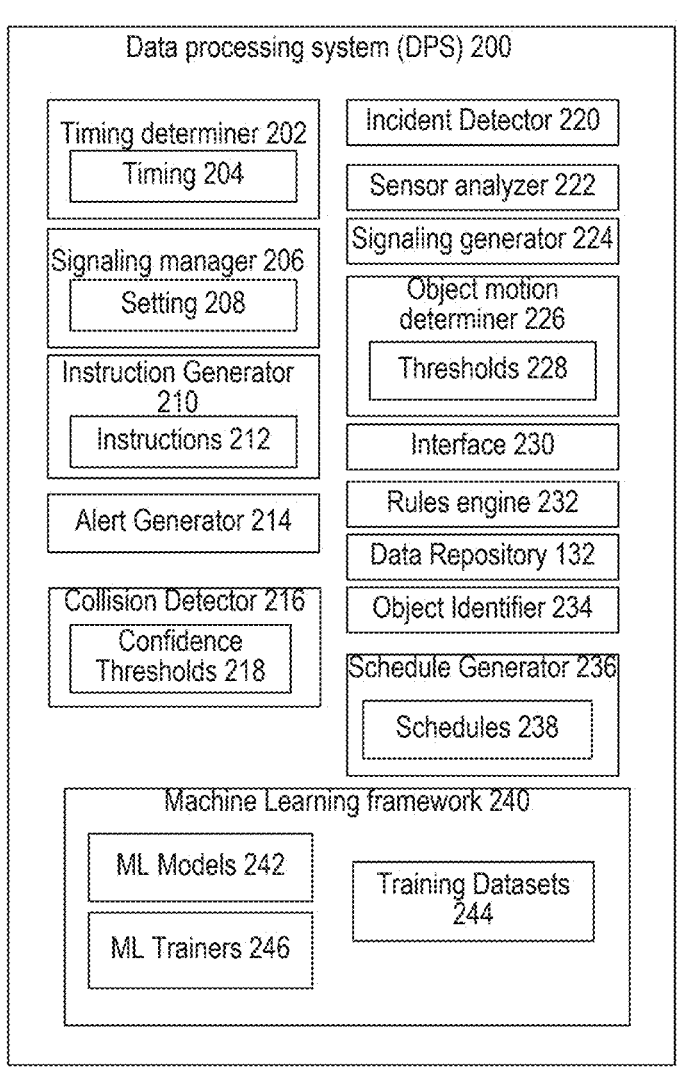
FIG. 2 is a schematic block diagram of a data processing system used for implementing the technical solutions, according to an embodiment.
Figure 3:
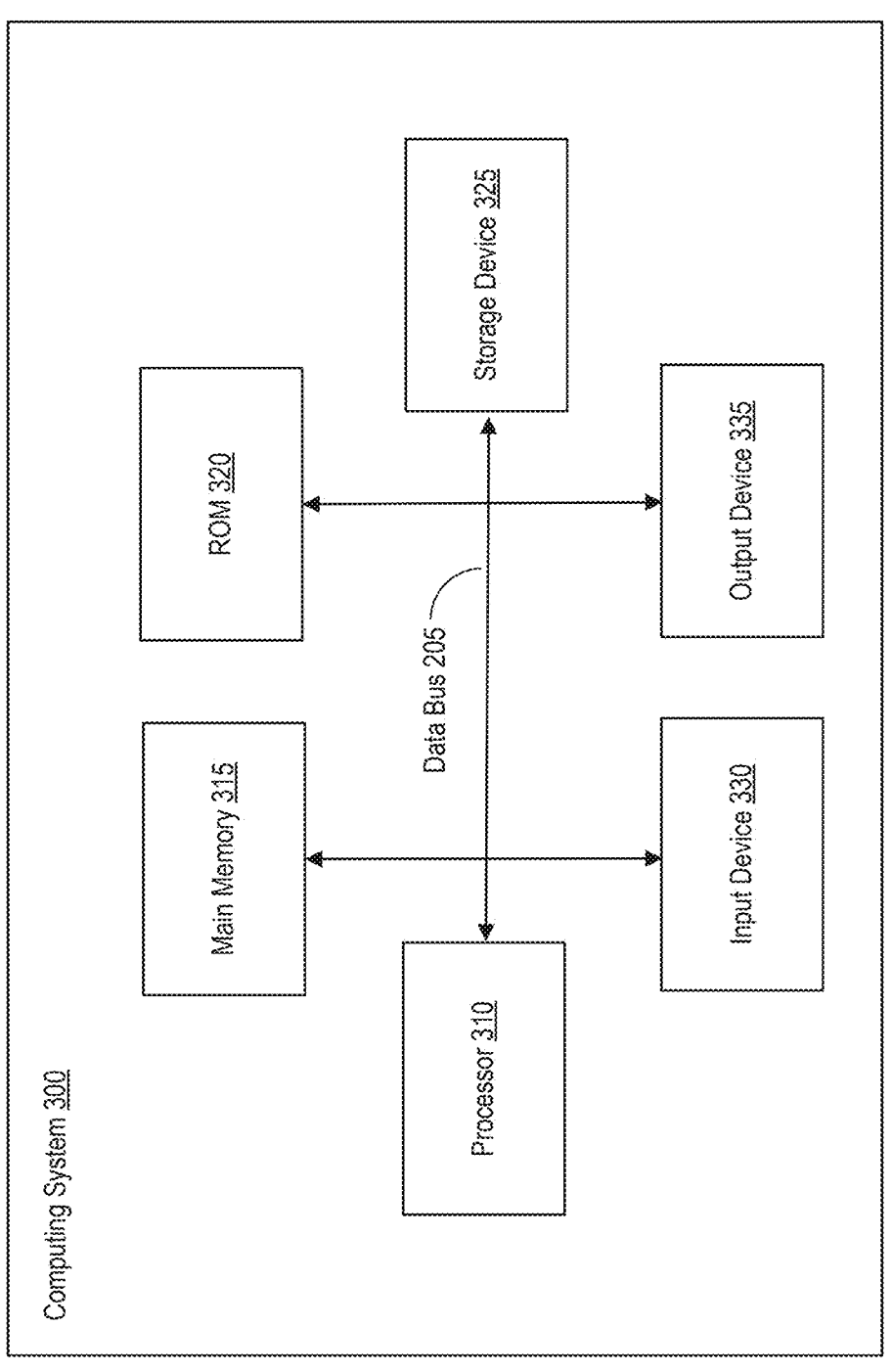
FIG. 3 is a schematic block diagram of a computing system (e.g., a computer) that can be used for implementing the data processing system functionalities, according to an embodiment.

Referring now to FIGS. 1-3, examples of hardware and software infrastructure for providing signal management functionalities of the technical solutions is provided. FIGS. 1-3 are directed to example systems or frameworks configured for implementation of features of the technical solutions with respect to roadway signal management, as described for example in sections B-I. The overall infrastructure can utilize various hardware and software combinations to implement, provide or utilize, for example, machine learning (ML) or artificial intelligence (AI), to implement various functionalities described herein. Example system configurations of FIGS. 1-3, although presented herein in a certain manner, can be varied based on specific implementations or configurations to provide any functionalities described herein.

FIG. 1 illustrates an example system 100 for providing or managing roadway traffic signaling. The example system 100 can be implemented using a combination of hardware infrastructure, a cloud system and a data processing system (DPS) 200 (e.g., shown and described in FIG. 2). The example system 100 can include one or more of hardware infrastructures 101 that can be communicatively coupled, via one or more virtual private networks (VPNs) 142, with one or more of: cloud systems 126, controllers 118, signaling devices 124 and client devices 140. The hardware infrastructure 101 can include one or more of processors 102, sensors 104, databases 106, detection systems 108, central processing units (CPUs) 112, network interfaces 114 for providing network connectivity and controllers 116 for controlling various signaling and other devices. The cloud systems 126 can include one or more of data lakes 128, processing circuitries 130, data repositories 132, machine learning (ML) framework 134 for providing ML or AI functionalities as well as applications 138 providing software controls or functionalities of the data processing system. Each of the hardware infrastructure 101 or cloud systems 126 can include a data processing system (DPS) 200 (e.g., shown in FIG. 2), which can be used to implement any of the functionalities described herein (e.g., including Sections A-I) allowing the system 100 to control or manage signaling devices 124 using controllers 116 or 118 and communicating data to and from client devices 140.

Hardware infrastructure 101 can include any combination of hardware and software for providing functionalities of an example system 100 for providing roadway signal signaling or signal management. The hardware infrastructure 101 can include various signal or data acquiring, processing and storing circuitry or devices that can be deployed at a location of the intersection being monitored or managed, or at any other location. The hardware infrastructure 101 can include processors 102 for processing data from various sensors 104 and detection system 108. The processors 102 can include, for example, processors 310 of FIG. 3, which can be configured with non-transitory computer-readable media (e.g., memory 315, ROM 320, or storage devices 325) storing instructions and data for implementing data processing system capabilities. The hardware infrastructure 101 can include various types of sensors 104 and detection systems 108. The hardware infrastructure 101 can include or utilize various databases 106, CPUs 112, as well as network interfaces 114, which can be used for network communication with external components, such as signaling devices 124, controllers 118 and cloud systems 126.

For example, hardware infrastructure 101 can include a local engine that can include, for example, near-real-time processing and sensor data, sensor identification, sensor classification using local and look ahead methods. For example, the local engine can process network-level cross local controller outbound and network-level cross local controller inbound. The local engine that can include, for example, network-level weighted flow preferences, time interval flow preferences and network-level vehicle specific prediction which can include google maps route info. The local engine can include local decisions, entity data passed back up to the network-level, infrastructure data are passed back up to the network-level, statistics, telemetry, logs, and sensor data are passed to the cloud.

For example, the hardware infrastructure 101 can provide an environment. For example, the hardware infrastructure 101 can include a network, a remote connection, sensors, computing capabilities, safety capabilities that can be used for calibration and state tracking. For example, the hardware infrastructure 101 can include one or more of sensors 104, sensor mounting, sensor computing, a main processor, a safety programmable logic circuit(s), wiring, external device connections, network connectivity, physical security.

Processor 102 can include any combination of hardware and software for processing instructions, such as instructions for providing functionalities of the data processing system 200 (e.g., of FIG. 2) or data, such as the data of various sensors 104 or detection system 108. Processor 102 can implement instructions or commands for implementing any functionalities corresponding to hardware infrastructure 101. The processor 102 can be a central processing unit (CPU) 112, or can include any functionalities of one or more CPUs 112, and vice versa. The processor 102 can include, for example, any combination of one or more of: graphics processing units (GPUs), tensor processing units (TPUs), digital signal processor (DSPs), field-programmable gate arrays (FPGAs), application-specific integrated circuit (ASICs), microcontrollers, neural processing units (NPUs), vision processing units (VPUs), or any other signal processing circuitries, devices or systems.

Sensor 104 can include any combination of hardware and software for sensing or measuring data used by the example system 100. Sensor 104 can include devices, systems, components or circuits for capturing or measuring signals indicative of presence, state, velocity, or any other characteristics of any traffic object (e.g., vehicles, bicycles or pedestrians) in a roadway intersection. An object or an element of traffic can be any controlled or uncontrolled person or a thing involved in the roadway traffic, such as a person (e.g., pedestrian), an animal, a vehicle (e.g., an automobile, bicycle, motorcycle, or a truck), as well as robots, drones, self-driving vehicles or any other devices or things that may be impact or participate in roadway traffic. Sensor 104 can include any combination of sensors or detector for capturing various analog or digital data. For instance, sensor 104 can include sensors (e.g., video or image cameras or optical sensors, as well as infrared sensors, near-infrared or NIR sensors, ultrasonic sensors, or multi-spectral sensing devices) any of which can be utilized or configured for monitoring roadway traffic to detect various traffic objects, such as vehicles, bicycles, and pedestrians. Sensor 104 can include a detection system 108, and vice versa.

For example, sensor 104 can include radar sensors for measuring vehicle speed and distance, and lidar sensors for creating 3D maps or detecting object shapes and distances. Sensor 104 can include ultrasonic sensors configured for detection of objects at various distances from the sensors. Sensor 104 can include infrared sensors to detect thermal signatures of various vehicles, pedestrians or animals. Sensor 104 can include induction loop sensors to detect metal vehicles on roads, or acoustic sensors to capture sound signatures to help classify traffic objects or events. Sensor 104 can include camera sensors to provide visual detection, including for example, thermal cameras to detect heat signatures for low-light conditions. Sensor 104 can include doppler radar sensors to measure object speeds, or piezoelectric sensors to detect weight and pressure from passing vehicles. Sensors 104 can include optical or fiber optic sensors for monitoring object movement, velocity or direction, as well as stress and strain on road surfaces. Sensor 104 can include laser rangefinders to measure distances and object positions. Sensor 104 can include vibration sensors to detect vehicle movement on structures, as well as accelerometers to track acceleration, deceleration, speed and orientation of traffic objects. Accelerometers can also track sway, orientation, and other mounted sensor motion, which can be leveraged to improve real-time calibration of the scene. In addition, accelerometer data may be used for detecting earth movement, assessing wind conditions, and estimating vehicle size as vibrations propagate through mounting surfaces.

Sensor 104 can include humidity sensors to monitor weather conditions affecting traffic, as well as temperature sensors to assess road surface temperatures. Sensor 104 can include pressure plate sensors to weigh vehicles, proximity sensors to detect objects at various distance ranges. Sensor 104 can include infrared beam sensors to detect moving, intervening or crossing objects, as well as optical flow sensors to capture speed and movement direction of various objects. Sensor 104 can include current sensors to detect electrical changes in traffic signals, and geo-magnetic sensors to identify metal objects. Sensor 104 can include microphone arrays to localize traffic sound sources, and time-of-flight sensors to provide distance measurements. Sensor 104 can include stereo vision sensors to allow depth perception, as well as multispectral cameras to detect objects across different wavelengths. Sensor 104 can include chemical sensors monitor pollutants near roadways, as well as wind speed sensors to track conditions that could affect safety. Sensor 104 can include automatic number plate recognition (ANPR) cameras to identify vehicles, and inertial measurement units track vehicle dynamics. Sensor 104 can include hydrocarbon sensors to detect fuel emissions, or photoelectric sensors to count traffic objects (e.g., vehicles) as well as monitor occupancy. Sensor 104 can include LiDAR-enhanced cameras to combine visual and distance data, which can be configured for object recognition.

For example, sensors 104 can include multi-modal sensors mounted such that all areas of infrastructure are covered in their collective fields of view. Sensors 104 can cover different regions which can be combined using processing to form a collective view of the sensor infrastructure. Individual sensors 104 may sometimes not be sufficient to view all data (e.g., all fields of view, weather or environmental conditions or certain information type). Multi-modal sensors 104 can be formed to improve the visibility by combining multiple sensors to collectively process the data. Various safety areas can be covered across each sensor spectrum, overlapping fields of view (FoV) across sensor types, or via redundant sensors of the same type and overlapping FoV. Sensors of the same type (e.g., cameras) may also be pointed in the same direction to expand or enhance the field of view within the same spectrum (near vs far or stitched sensors to achieve wider FoVs). Sensors 104 can be mounted using any desired height/angular/directional offsets to achieve desired angles of view and avoid obstructions.

Sensors 104 can be mounted in any enclosures to provide continuous operation against weather & other elements and may include active or passive dampening for vibration reduction for reliability, longevity, & stable operation. The sensors 104 can have enclosures, lenses, windows, or other sensor housing subcomponents with passive or active means of mitigating the risk of sensor occlusions such as dust, ice, water, dirt, or other debris, such as thermal resistors/coils, infrared, ultrasonics, electrostatic, refillable fluids (flush), physical wipers, hydrophobic coatings, housing hoods, etc.

For instance, a roadway intersection can include sensors 104, such as two-dimensional (2D) cameras, lidar (rotational or solid state), and radar, as well as other spectral imaging such as infrared, ultrasonics, 3D (stereoscopic) cameras, projected light, other radio wave (ex: microwave) sensing devices. Sensors 104 can include non-spectral sensors, such as temperature, pressure (barometric), audio (microphone(s)), IMUs (Gyroscopic/Accelerometers), light-level, GNSS/GPS, or roadway sensors (induction, magnetometer or pressure plates) or other sensing devices. Sensors can be connected to a locally housed computing system (either directly or via pass through computers) and powered by the local system.

Database 106 can include any combination of hardware and software for storing data or information. Database 106 can include or utilize, for example, a storage device, such as, storage device 325 of FIG. 3, which can be configured for providing access to various features of the system 100. Database 106 can include, for example, various data structures for storing and relating various types and form of data utilized by the system 100. Database 106 can include and store, for example, data on various objects, data from sensors 104 as well as images and videos from various detection systems 108. Database 106 can, for example, store data locally such logs, telemetry, metrics, KPIs, images, and sensor data (e.g. video data). Database 106 can transport, for example, data by batch to the cloud system 126. Database 106 can transport, for example, stream data to the cloud system 126.

Detection system 108 can include, for example, any type and form of a system for detecting traffic objects. Detection system 108 can include, for example, one or more cameras, including for example, image cameras to capture images of traffic objects and traffic conditions. Detection system 108, for example, can include video cameras to capture videos of traffic objects and traffic conditions and detect various traffic conditions. Detection system 108 can include, for example, night vision cameras to detect traffic objects in low light conditions as well as time of flight cameras to detect traffic object's speed. Detection system 108 can include LiDAR enhanced cameras to detect traffic objects and their various distances as well as motion detection cameras to detect which traffic objects are in motion. Detection system 108 can include, for example, AI-enhanced cameras to detect traffic conditions and classify traffic objects. Detection system 108 can include, for example, 2 cameras, the first camera tracking a first object and the second camera tracking a second object, both sending data of the objects to the data processing system 200, such data being processed to determine if the two objects are to collide. Detection system 108 can include, for example, a video camera that records objects at 60 frames per second and can track the speed of an object based on the time the object enters one frame and a first location and the time it takes for an object to enter another frame and a second location.

Central processing unit(s) (CPU(s)) 112 can include any combination of hardware and software for processing instructions, such as instructions for providing functionalities of the data processing system 200 (e.g., of FIG. 2) or data, such as the data of various sensors 104, databases 106, network interfaces 114, controller 116, or detection system 108. CPU 112 can implement instructions or commands for implementing any functionalities corresponding to hardware infrastructure 101. The CPU 112 can be a processor 102, or can include any functionalities of one or more processor 102, and vice versa. CPU 112 can include mobile CPUs, server CPUs, embedded CPUs (such as microcontrollers), multi-core CPUs (including both single-core and multi-core variants), high-performance CPUs, ARM CPUs, x86 CPUs, quantum CPUs, FPGA-based CPUs, graphics processing units (GPUs), digital signal processors (DSPs), artificial intelligence (AI) processors (such as neural processing units (NPUs) and tensor processing units (TPUs)), superscalar CPUs, 64-bit CPUs, hyper-threaded CPUs, system-on-chip (SoC) CPUs, hybrid CPUs (including heterogeneous CPUs combining different types of cores).

Controller 116 can include any combination of hardware and software for processing instructions, such as instructions for providing functionalities of the data processing system 200 (e.g., of FIG. 2) or data, such as the data of signaling device 124, databases 106, or CPU(s) 112. Controller 116 can implement instructions or commands for implementing any functionalities corresponding to hardware infrastructure 101. Controller 116 can include, for example, microcontrollers, programmable logic controllers (PLCs), traffic signal controllers, supervisory control and data acquisition (SCADA) controllers, network controllers, input/output (I/O) controllers, database controllers, proportional-integral-derivative (PID) controllers to control traffic control flow rates and signal timings. Controller 116 can include, for example, field-programmable gate array (FPGA) controllers, application-specific integrated circuit (ASIC) controllers, digital signal controllers (DSCs), and intelligent transportation system (ITS) controllers. Controller 116 can also control the features of cloud system 126.

Network interface 114 can include any combination of hardware and software for enabling communication between devices, such as interfacing between the client device and CPUs 112. Network interface 114 can include, for example, ethernet interface, Wi-Fi interface, Bluetooth interface, cellular interface. Network interface 114 can include, for example, ZigBee interface to detect low power wireless communication, Near field communication (NFC), satellite communication interface, USB interface, serial interface, and controller area network (CAN) interfaces. For example, network interface 114 can include tools, such as web reporting application or functions providing dashboards and data access, network on chip (NOC) interfaces providing alarms and remote intersection control, cloud analysis, remote application triggers or network view functions providing map views of traffic entities and infrastructure.

Controller 118 can include any combination of hardware and software for processing instructions, such as instructions for providing functionalities of the data processing system 200 (e.g., of FIG. 2) or data, such as the data of signaling device 124, databases 106, or CPU(s) 112. Controller 118 can include, for example, traffic signal controllers, programmable logic controllers (PLCs), field-programmable gate array (FPGA) controllers, application-specific integrated circuit (ASIC) controllers, digital signal controllers (DSCs). Controller 118 can include, for example, network controllers, input/output (I/O) controllers, device controllers. Controller 118 can include, or include any functionality of, a controller 116, and vice versa. Controllers 118 can be adapted to take local actions such as alarms that can be used for tracking and attributes, signal control which can be adaptive, and manual control which can include remote access.

Signaling device 124 can include any combination of hardware and software for signaling pedestrians, vehicles, bicyclists, and animals. Signaling device 124 can include, for example, traffic signals, a pedestrian crossing signals, bike lane signals, roadwork signals, message sign signals. Signaling device 124 can also include work zone signals, dynamic speed sign signals, high occupancy vehicle (HOV) lane indicator signals, in roadway signals, flashing beacon signals, in-roadway warning light signals, sound signals.

Virtual private network (VPN) 142 can include any type or form of a network for data communication. VPN 142 can include, for example, any combination of one or more network types, including wireless local area network (WLAN), such as a Wi-Fi, or cellular networks, such as 4G or 5G cellular network, Bluetooth or any other wired or wireless technology. VPN 142 can include, for example, any combination of one or more encryption protocols, including IPSec, SSL/TLS, OpenVPN, IKEv2, and WireGuard. VPN 142 can include, for example, any combination of one or more tunneling protocols, including point-to-point tunneling protocol (PPTP), layer 2 tunneling protocol (L2TP), and secure socket tunneling protocol (SSTP) to create secure tunnels for data. VPN 142 can include, for example, remote access capabilities, virtual LAN support, and a VPN server.

Cloud system 126 can include any combination of hardware and software for providing functionalities of the example system 100 via a network-based infrastructure. The cloud system 126 can include, for example, any network-based functionalities, such as software as a service (SaaS) configured to process various signal or data for generating and managing signals at roadways (e.g., streets, roads or paths) and intersections of two or more such roadways. The cloud system 126 can include or utilize various data repositories 106 which can be used for data storage, accessing or exchange by components, such as client devices 140, processing circuitry or CPU 112, ML framework 134, data lake 128, and applications 138. The cloud system 126 can include, for example, any combination of one or more various service models including Infrastructure as a Service (IaaS), Platform as a Service (PaaS), and Software as a Service (SaaS). The cloud system 126 can include, for example, any combination of one or more virtualization technologies and containerization platforms like Docker and Kubernetes. The cloud system 126 can include virtual private clouds (VPCs), cloud storage solutions, cloud-based databases, content delivery networks (CDNs), and cloud-based machine learning platforms. For example, cloud system 126 can include a cloud services engine that can include, for example, near-real-time processing and data aggregation, alarming, intersection management and data and data stream sensor access.

Cloud system 126 can include, for example, a network engine that can operate, for example, in second or multi-second interval scale. The network engine can include, for example, one to many traffic lights, network predictive engine and historical flows. The network engine can include, for example, external sources such as understanding vehicle intentions and routes. The network engine can include, for example, desired flow preferences to maximize network efficiency, cross-light communications to pass outbound entity information between lights, cross-light communications to pass inbound entity information between lights. The network engine can include, for example, preferences that are passed back down to local lights as time-intervals and weight factors for local controllers to act on. For example, cloud system 126 can include one or more data warehouses that store curated metrics, a key performance indicator, and telemetry.

Cloud system 126 can include or support a network system to provide cloud connectivity for storage and processing of data remotely via databases and storage, cloud processing and compute. The cloud system 126 can be configured to provide connection to client systems, emergency systems, or other intersections. These connections can allow for remote automated data transfers, state updates, sensor and data streaming, alarming, processing, control, storage, security and redundancy and monitoring.

For example, cloud system 126 can include a data processing system 200 that can provide one or more AI network models for determining intersection patterns or computing AI models for determining entity behavior tracking in accordance with AI model training. For example, cloud system 126 can include data lake 128 which can include raw storage. For example, cloud system 126 can include external data sources such as an open data transportation network that promotes equity in pedestrian routes, or public transit schedules for public transit or transportation vehicles (e.g., public buses or light rail system schedules for light rail vehicles). For example, cloud systems 126 can include core software functionalities for processing data, such as sensor streams, simulation data, or public transit schedules which can store logs or aggregate and process data, such as schedule or sensor data which can be stored locally or on the cloud or perform data compression. This data can then be used to determine and establish signal device schedules at roadway intersections.

Data lake 128 can include any combination of hardware and software for storing, processing, and analyzing data. Data lake 128 can include or utilize a storage device, such as, storage device 325 of FIG. 3. Data lake 128 can include and store data on various objects, data from processing circuitry 130 as well as data from ML framework 134. Data lake 128 can include various data structures for storing and relating various types and form of data utilized by cloud system 126. Data lake 128 can include raw storage utilized by cloud system 126.

Data repository 132 include any combination of hardware and software for storing, processing, and analyzing data. Data repository 132 can include or utilize, for example, a storage device, such as, storage device 325 of FIG. 3. Data lake 128 can include, for example, various data structures for storing and relating various types and form of data utilized by cloud system 126 and client device 140. Data repository 132 can include, or include any functionality of, a data lake 128, and vice versa.

Machine learning (ML) framework 134 can include any combination of hardware and software for providing or utilizing ML or artificial intelligence (AI) functionalities associated with the technical solutions described herein. ML framework 134 can include, for example, any combination of one or more supervised or unsupervised ML or artificial intelligence (AI) models 242, including, for example, deep learning models, reinforcement learning model, ensemble models, decision tree models, linear models, non-linear models, generative models, discriminative models or embedding models. ML framework 134 can include one or more ML trainers 246 for training, configuring or otherwise managing ML models 242 using one or more training datasets 244, which can include various data for labeled or unlabeled, supervised or unsupervised training of ML models 242.

For example, ML framework 134 can include various AI or ML features, such as AI environments that can provide an open-source library for developing ML applications, such as Tensorflow. For example, ML framework 134 can include various AI or ML features, such as entity detection using a variety of sensors such RGB sensors, radar sensors, and lidar sensors. For example, ML framework 134 can include various AI or ML features, such as adaptive learning using reinforcement models.

ML framework 134 can include any ML models 242, which can include one or more of: neural networks, decision-making models, linear regression models, natural language models, random forests, classification models, generative AI models, reinforcement learning models, clustering models, neighbor models, decision trees, probabilistic models, classifier models, or any other type and form of models. ML models 242, can include, for example, models include natural language processing (e.g., support vector machine (SVM), Bag of Words, Counter Vector, Word2Vec, k-nearest neighbors (KNN) classification, long short erm memory (LSTM)), object detection and image identification models (e.g., mask region-based convolutional neural network (R-CNN), CNN, single shot detector (SSD), deep learning CNN with Modified National Institute of Standards and Technology (MNIST), RNN based long short term memory (LSTM), Hidden Markov Models, You Only Look Once (YOLO), LayoutLM) (classification ad clustering models (e.g., random forest, XGBBoost, k-means clustering, DBScan, isolation forests, segmented regression, sum of subsets 0/1 Knapsack, Backtracking, Time series, transferable contextual bandit) or other models such as named entity recognition, term frequency-inverse document frequency (TF-IDF), stochastic gradient descent, Naïve Bayes Classifier, cosine similarity, multi-layer perceptron, sentence transformer, data parser, conditional random field model, Bidirectional Encoder Representations from Transformers (BERT), among others.

The ML framework 134 can include any number of ML models 242 such as generative AI models, which can include ML systems configured to create new content, such as text, images, or audio, by learning patterns from the data repository 132 or data lake 128. The ML models 242 can be trained using techniques, such as supervised learning, unsupervised learning, and reinforcement learning. The ML models 242 can utilize data set from data repository 132 or data lake 128 to create logical inferences between various complex structures in the data set to generate data for the ML models 242.

ML models 242 can include any machine learning (ML) or artificial intelligence (AI) model designed to generate content or new content, such as text, images, or code, by learning patterns and structures from existing data. ML models 242 can be any model, a computational system or an algorithm that can learn patterns from data (e.g., chunks of data from various input documents, computer code, templates, forms, etc.) and make predictions or perform tasks without being explicitly programmed to perform such tasks. ML models 242 can refer to or include a large language model (LLM). The Machine learning (ML) framework 134 can be trained using a dataset of data (e.g., text, images, videos, audio or other data). ML models 242 can be designed to understand and extract relevant information from the dataset. ML models 242 can leverage image processing techniques and pattern recognition to comprehend the context and meaning of data it is being fed.

ML models 242 can be trained using deep learning techniques, such as neural networks that are trained on large amounts of data (e.g., training datasets 244 of images, videos or sensor data). ML models 242 can be designed, constructed or include a transformer architecture with one or more of a self-attention mechanism (e.g., allowing the model to weigh the importance of different tokens, embeddings or values when encoding a sensor data, image or a video frame), positional encoding, encoder and decoder (multiple layers containing multi-head self-attention mechanisms and feedforward neural networks). For example, each layer in the encoder and decoder can include a fully connected feed-forward network, applied independently to each position. The data processing system 200 can apply layer normalization to the output of the attention and feed-forward sub-layers to stabilize and improve the speed with which the ML model 242 is trained. The data processing system 200 can leverage any residual connections to facilitate preserving gradients during backpropagation, thereby aiding in the training of the deep networks. Transformer architecture can include, for example, a generative pre-trained transformer, a bidirectional encoder representations from transformers, transformer-XL (e.g., using recurrence to capture longer-term dependencies beyond a fixed-length context window), text-to-text transfer transformer, image-to-image transformer or similar.

The ML models 242 can be trained (e.g., by a model training function) using any combination of one or more object-based, and environmental condition-based dataset by converting the data from the input dataset into numerical representations (e.g., embeddings) of the chunks of the data. These embeddings can capture the semantic meaning of sensor values, image or video clips, words, paragraphs, pages or sentences, depending on the size and type of chunks being parsed. Embeddings can be used to represent and organize the dataset within a high-dimensional space (e.g., embedding space), where similar concepts are located closer together. Embedding space can include a multi-dimensional vector space where each data point is represented by an embedding. The ML model 242 can be trained to determine timings for objects to pass a roadway intersection. The ML model 242 can be trained to determine the setting for signaling at the roadway intersection. The ML model can be trained to detect, based on sensor data, an incident involving an object. The ML model 242 can be trained to determine, based on the one or more objects, a reduced transition interval for timing for an object to pass the roadway intersection in accordance with the regulation. The ML model 242 can be trained to provide one or more predicted direction and velocities for the one or more objects. The ML model 242 can be trained to generate a schedule of phase transitions for a signaling device of one or more signaling devices of one or more signaling devices at the roadway intersection.

Through training, by a ML trainer 246, the ML model 242 can learn, or adjust its understanding of mapping the embeddings to particular issues (e.g., images or videos of traffic objects heading towards a collision, or a location and velocity of an object in the context of a signal phase or signal timing), by adjusting its internal parameters. Internal parameters can include numerical values of the ML model 242 that the model learns and adjusts during training to optimize its performance and make more accurate predictions. Such training by the ML trainer 246 can include iteratively presenting the various data chunks or documents of the dataset (e.g., or their chunks, embeddings) to the ML model 242, comparing its predictions with the known correct answers, and updating the model's parameters to minimize the prediction errors. By learning from the embeddings of the dataset data chunks, the ML model 242 242 can gain the ability to generalize its knowledge and make accurate predictions or provide relevant insights when presented with prompts (e.g., instruction or data used as inputs to ML model).

The ML models 242 can include any ML or AI model or a system that can learn from a dataset to generate new content (e.g., timings, schedules, direction and velocities, or images) that resembles a distribution of the training dataset. A distribution of a dataset can include an underlying probability distribution representing the patterns and characteristics of the data used to train an ML model. 242. For example, a training data distribution can represent statistical properties of an image, video or sensor data, such as the frequency of objects or their locations or velocities, the co-occurrence of positions of traffic objects relative to each other or relative to the signal phases, and the overall structure of the data used in the training dataset. The 242 generative AI model 242 can include the functionality to utilize such a probability distribution of patterns and characteristics to generate new responses (e.g., predictions) that were not present in the dataset.

Processing circuitry 130, can include any combination of hardware and software for processing instructions, such as instructions for providing functionalities of the data processing system 200 (e.g., of FIG. 2) or data, such as data of data lake 128 or data repository 132. Processing circuitry 130 can implement instructions or commands for implementing any functionalities corresponding to cloud system 126. The processing circuitry 130 can be a central processing unit (CPU) 112, or can include any functionalities of one or more CPUs 112, and vice versa. The processing circuitry 130 can be a processor 102, or can include any functionalities of one or more processor 102, and vice versa. The processing circuitry can include, for example, any combination of one or more of: memory units, data buses, logic gates, arithmetic circuits, I/O controllers, clock generator, power management circuits, interrupt controller, graphics processing units (GPUs), tensor processing units (TPUs), digital signal processor (DSPs), field-programmable gate arrays (FPGAs), application-specific integrated circuit (ASICs), microcontrollers, neural processing units (NPUs), vision processing units (VPUs), or any other signal processing circuitries, devices or systems.

Applications 138 can include any combination of hardware and software for implementing functionalities of the data processing system 200. Application 138 can include a computer code or a program executing on a device (e.g., a server or a cloud) and implementing functionalities associated with managing of the signals at a signaling device, generating instructions 212 or alerts, detecting collisions, analyzing sensor data or movement of objects at a roadway intersection. For instance, application 138 can include the functionalities for monitoring sensor data and identifying incidents (e.g., using ML models 242), or functionalities for identifying types of objects, their locations, velocities or directions, such as applications for optimizing the timing of signal phase changes, adjusting timing of signals shifts (e.g., shifting between red, yellow and green for vehicles, or shifting between walk to stop for pedestrians).

Applications 138 can include functionalities for managing signals, such as a signaling manager 206 generating, managing or controlling settings 208. For example, applications 138 can include an application or a function for generating instructions, such as an instruction generator 210 generating, creating or managing instructions 212. For example, applications 138 can include an application or a function for generating alerts, such as an alert generator 214 generating, creating or managing alerts. For example, applications 138 can include an application or function for detecting collisions, such as a collision detector 216 measuring, determining, or detecting confidence thresholds 218. For example, applications can include an application or a function for detecting incidents, such as an incident detector 220 detecting incidents, or monitoring data for incidents. For example, applications 138 can include an application or function for generating signals, such as signaling generator 224 generating, creating, or managing signals. For example, applications 138 can include an application or function for determining if an object is in motion, such as an object motion determiner 226 measuring, determining, or detecting thresholds 228. For example, applications 138 can include an application or function for interacting with data processing system 200, such as an interface 230 providing indications, receiving input or transmitting signals. For example, applications 138 can include an application or function for identifying regulations and updating rules, such as a rules engine 232 identifying, updating, managing rules or regulations. For example, applications 138 can include an application or function for managing data, such as data repository 132 storing, managing, and transferring data. For example, applications 138 can include an application or function for identifying objects, such as object identifier 234 identifying, or detecting objects.

For example, applications 138 can include non-safe applications or functions such as maintenance for road wear (e.g. potholes), paint condition, obstruction in pathway, and accessibility evaluation. For example, applications 138 can include safety-rated applications or functions such fast phase, speeding with three levels, warning/feedback, crash detection (e.g. crash imminent, opposing direction, speeding), and on-deck. For example, applications 138 can include safety and security applications or functions such as decision rectification (e.g. safety), action communication (e.g. external devices) and digital security which can include encryption, port controls, hashing and code checks. For example, applications 138 can include an application or function for calibration, sensor fusion, record, stream, sensor processing.

For example, applications 138 can include a decision engine that can aggregate inputs into application specific actions. The decision engine can include, for example, entity prediction for pathing and reactions, traffic planning for signal optimization, incident detection for crashes and near misses, obstructions for detecting if something blocking an entities way, environmental for measuring weather and roadway conditions, entity detection for tracking and attributes, infrastructure for state tracking and mapping (e.g., maintenance and evaluation), and classification for classifying entity types.

The system can include a positional gating subsystem (e.g., within a sensor analyzer 222) that can define virtual checkpoints at predetermined distances from a stop line or intersection entry point. These checkpoints can be monitored in real-time using positional data from one or more sensors to measure and log an object's velocity after passage of a selected point in time following signal actuation. The gating subsystem can be configured with multiple distance thresholds per approach lane and can trigger verification modules to determine whether post-actuation velocity is below configured limits.

The data processing system 200 can include a speed module (e.g., within a sensor analyzer 222) that can integrate measurements from diverse sensor types including radar, lidar, and camera systems, performing timestamp alignment, latency compensation, and geometric correction to reconcile positional data streams. The module can output unified estimates of object speed, direction, and acceleration with confidence scores, for use by enforcement, warning generation, and predictive arrival-time modules.

The data processing system 200 can include or operate with a controller layer that can include an override logic engine capable of interrupting or modifying signal phases for approaches other than the one currently containing the detected object. The data processing system can utilize the instruction generator 210 to control the controllers utilizing, for example, logic that can be invoked when a monitored object fails to reduce speed below a configured limit by a defined checkpoint, allowing for, for example, red-arrow or "stop" activation on a crossing approach to mitigate conflict risk.

The data processing system 200 can include an environmental modeling module (e.g., within a sensor analyzer 222) that can receive data from weather sensors, surface condition detectors, and light-level monitors to derive an adjusted operational speed limit for each approach. This adjustment can be based on configured hazard profiles, such as lowering the permissible speed by a fixed or computed delta in rain, snow, or low-friction conditions. Adjusted limits can be passed to signage rendering processes, V2X messaging, or audible-alert generators.

The data processing system 200 can include alert-rendering logic (e.g., within an alert generator 214) that formats visual, audible, or transmitted warnings according to the detected object type. For example, a pedestrian approaching too quickly may trigger a flashing crosswalk symbol, while a vehicle may receive a "Slow Down" message on dynamic signage and a V2X advisory.

The data processing system 200 can include a target-velocity computation module (e.g., within an object motion determiner 226) to determine the recommended approach speed for an object to reach the intersection in synchrony with a planned phase change. Inputs can include current object distance from the stop line, its present velocity, the duration until phase change, and acceleration/deceleration limits. The computed target velocity can be output to dynamic signs or V2X messaging to improve traffic flow and reduce unnecessary stops. The object motion determiner 226 can also include the functionality for analyzing two-dimensional frames of data (e.g., sequences of camera images or lidar readings) and functionality to identify and label an object within a plurality of objects in the sequence of frames. The object motion determiner 226 can include the functionality for tracking the object across the frames of data to determine changes in object location as a function of time-stamps of the frames, thereby allowing the object motion determiner 226 to determine the speed or velocity of the object from the two-dimensional sensor frames.

The data processing system 200 can include (e.g., as a part of a sensor analyzer 222) hardware and software for positioning and gating logic to allow for measurement, verification, and analysis of object movement at specified positional reference points. These reference points can include distance-based checkpoints (e.g., 15 m or 50 m from a predetermined threshold line) and polygonal "zones of approach" defined relative to the roadway intersection geometry. The system can tag sensor data with zone membership and trigger execution of specific verification routines, such as computing velocity change or confirming traversal completion, upon an object's entry into, or exit from, a defined zone. The zone mapping layer can operate concurrently on multiple objects, updating zone occupancy status in near-real-time for use by decision-making modules.

The data processing system 200 can include a sensor module (e.g., within the sensor analyzer 222) that can be configured to integrate or combine object motion data from multiple sensor types, including radar, lidar, and optical cameras. The sensor module can apply timestamp normalization, positional alignment, and cross-calibration coefficients to reconcile differences in range, resolution, and latency, producing a unified velocity and trajectory estimate with associated confidence scores. This combined kinematic data can be stored in memory and passed to application modules responsible for determining speed limit compliance, collision risks, or assistance priority.

The data processing system 200 can include, provide or execute a priority-matrix execution engine (e.g., within signaling generator 224 or incident detector 220) that generates and maintains priority matrices. The priority-matrix generated by the engine can map detected object types, predicted trajectories, and time-to-intersection values to weighted control priorities. The priority matrix can be stored in storage or in non-volatile memory and updated dynamically in RAM during operation. The arbitration engine can resolve conflicts between two or more objects requiring concurrent assistance by generating compatible or non-conflicting signal control instructions, including independent control of multiple signaling devices within the same intersection or at networked intersections.

The data processing system 200 can include or operate with controllers that can interface with standard traffic signal heads and dynamic signage panels, as well as with specialized hardware including directional "no-turn" arrow indicators, pedestrian/bicycle head-start countdowns, lane-specific rotary or strobe lights, and streetlight luminaires with variable brightness or contrast. These outputs can be selectively activated based on object classification, assistance priority, detected environmental conditions, or external coordination instructions from other intersections.

The data processing system 200 can implement environmental awareness modules (e.g., within sensor analyzer 222) that can acquire real-time data from weather, road-surface, and light-level sensors. This data can be compared against hazard profiles to calculate an adjusted speed threshold for each approach, differing from the posted speed limit where conditions such as rain, snow, low friction, or reduced visibility are detected. Adjusted thresholds can be communicated to drivers via dynamic signage, in-lane signals, or V2X messages, and can trigger specific enforcement or warning modes.

The data processing system 200 can include a communication subsystem (e.g., within interface 230) that can transmit and receive object-tracking messages in standardized formats across networked intersections. Each message can include object identifiers, location, classification, trajectory projections, and assistance requirements. Receiving intersections can pre-configure their signaling plans to accommodate the assisted object as it approaches, ensuring continuity of assistance along its route.

Client device 140 can include any combination of hardware and software for receiving inputs and outputting indication. The client device 140 can include, for example, a computer monitor, a tv screen, a mobile device, a computer, a tablet, a laptop, or a projector. Client device 140 can be connected to and utilize the features of the hardware infrastructure 101 or cloud system 126, including any instances of the data processing systems 200. The client device 140 can monitor operation of signaling devices 124 over any number of roadway intersections and execute one or more user interfaces allowing the user of the client device 140 to receive feedback information and make inputs and selections or operating or controlling the functionalities described herein.

Referring now to FIG. 2, example data processing system 200 can include any system for providing traffic management of roadways and roadway intersections. The data processing system 200 can include a combination of hardware and software that utilizes sensors, data, processors, and/or machine learning to control different roadway intersection signaling devices and the timing and type of their output signals in order to manage roadway traffic based on sensor data. Data processing system 200 can be deployed on one or more computing devices, such as servers or virtual servers, on a cloud system or any combination thereof. The data processing system 200 can be implemented, for example, using one or more processors (e.g., processors 310) and instructions or data stored in a non-transitory computer-readable medium, such as a memory 315, which the processors 310 can access and execute to implement functionalities of the data processing system 200. The data processing system 200 can be configured (e.g., via instructions and data stored in non-transitory computer-readable medium for access by processors) to implement any functionalities described herein, including functionalities directed to a roadway intersection signaling phase setting adjustment based on sensor data (e.g., Section B), signal scheduling discrepancy detection based on sensor data (Section C), incident detection based signaling (Section D), reduced transition interval based on sensor data (Section E), speed limit based signal generation (Section F), traffic object collision predictor based on sensor data (Section G), signal generation based on characteristics of object approaching a roadway intersection (Section H), and roadway traffic signal generating to assist objects based on sensor data (Section I).

Data processing system 200 can include one or more of: a timing determiner 202, a signaling manager 206, an instruction generator 210, an alert generator 214, a signaling detector 216, a sensor analyzer 222, a signaling generator 224, an object motion determiner 226, an interface 230, a rule engine 232, a machine learning framework 240, an object identifier 234, a collision detector 216, a schedule generator 236, and a data repository 132. The timing determiner 202 can include or generate one or more timings 204. The signaling manager 206 can include or generate one or more settings 208. The instruction generator 210 can include or generate one or more instructions 212. The object motion determiner 226 can include or generate one or more thresholds 228. The collision detector 216 can include or generate one or more confidence thresholds 218. The schedule generator 236 can include or generate one or more schedules 238. The machine learning (ML) framework 240 can include or generate one or more ML models 242, one or more ML trainers 246, and one or more training datasets.

Data processing system 200 can include any combination of hardware and software designed or configured for processing data roadway signaling or roadway intersection traffic management The data processing system 200 can include computer code, instruction or data to implement the functionalities described herein on any platform such as one or more servers, physical or virtual machines or the cloud. The data processing system 200 can utilize any one or more of timing determiners 202, signaling managers 206, instruction generators 210, alert generators 214, collision detectors 216, incident detector 220, sensor analyzers 222, signaling generators 224, object motion determiners 226, interfaces 230, data repositories 132, rules engines 232, object identifiers 234, schedule generators 236, machine learning framework 240, and along with any one or more machine learning (ML) models that can be trained to facilitate their respective functionalities.

Data processing system 200 can include or utilize computing systems, such as those of FIG. 3, which can be connected to, control, manage and process data from various sensors. The data processing system 200 can include multiple connected local computer systems, likely with a master, with scaled capabilities such that sensor clusters are controlled by pre-processors that all feed into a single central computer. Computers implementing the data processing system 200 can include one or more CPUs, memories and storage devices, such as those discussed in connection with FIG. 3. For instance, the data processing system 200 can include file systems or formalized database systems, network connectivity (Router/Switches, Wi-Fi/5G/LTE, Fiber/Coax, Microwave, laser, V2X tech, or future generational technologies), and expansion & interconnections. Data processing system 200 can include accelerator(s) (such as GPUs, NPUs, VPUs, TPUs, AMPs, ASICs), adaptive processors (FPGAs), and safety programmable logic circuit(s) (SPLCs). Data processing system 200 can include circuitry or devices for controlling power delivery. The power can be delivered as specified to operate all systems across the range of min & max system conditions. The power can be cleaned for consistent and reliable operation and may include failsafes such as redundancies, surge protection, & or battery backups in case of errant delivery or other foreseeable failure modes.

Data processing system 200 can include computers that are configured to connect directly to and communicate with signaling devices 124 of the existing standards (e.g., MUTCD) defining signals and signage or via intermediary/alternative controllers (e.g., 116 or 118). The system can be connected to an array of signaling devices 124, such as speakers, colored lights (directional, rotating, or static), strobes, or other alerting devices. Computers implementing the data processing system 200 can connect to or include V2X systems or sub-systems to communicate with external entities. Signaling devices can include dynamic signage devices that can include non-static display units (such as LCDs, LEDs, OLEDs, CRTs, Plasma, Projectors, lasers, E-Ink . . . etc.) to allow non-standard & future signaling capabilities. These displays can be configured to display custom content, including emulating existing roadway signs.

The timing determiner 202 can include any combination of hardware and software for determining timing (e.g., timing schedules) of signaling devices 124. The timing determiner 202 can include a system that is configured to determine timing of various signals and components utilized for a system for roadway intersection traffic signaling management. For example, the timing determiner can be a device (e.g., a computing device) or implemented by a device (e.g., the data processing system 200). In some examples, the timing determiner 202 can determine a schedule. For example, the timing determiner 202 can determine a schedule based on one or more historical timing events. In another example, the timing determiner can determine a timing for an object to pass a roadway intersection based on data received from the machine learning framework 240. In another example, the timing determiner 202 can determine, based on the real-time data input into the machine learning model 242, a second timing 204 for objects to pass the roadway intersection. For example, the timing determiner can determine a reduced transition interval for the timing 204 of an object to pass the roadway intersection in accordance with the regulations. For example, the timing determiner 202 can change timings of schedules 238. In another example, the timing determiner 202 can determine a time to arrival of an object to a specific point such as a roadway intersection, another entity or a specific point on a roadway.

The signaling manager 206 can include any combination of hardware and software for creating, generating, modifying, updating, or otherwise managing signals, such as signals of signaling devices 124. The signaling manager 206 can include a system that is configured to adjust the setting of various signals and components utilized for a system for roadway intersection traffic signaling management. For example, the signaling manager can be a device (e.g., a computing device) or implemented by a device (e.g., the data processing system 200). In some examples, the signaling manager 206 can adjust the setting for signaling at the roadway intersection. For example, the signaling manager 206 can adjust the setting for signaling at a roadway intersection based on information received from the timing determiner 202 to reduce congestion at the roadway intersection. For example, the signaling manager 206 can change the signaling based on instructions received from the ML models 242.

The instruction generator 210 can include any combination of hardware and software for generating instructions or commands, such as instructions or commands to operate signaling devices 124, update phases or schedules of the signaling devices, provide alerts, or provide outputs, such as to client devices. The instruction generator 210 can include a system that is configured to generate instructions for various signals and components utilized for a system for roadway intersection traffic signaling management. For example, the instruction generator 210 can generate an instruction to a signaling device at the roadway intersection based on the adjusted setting received. For example, the instruction generator 210 can generate an instruction, based on detection of an incident, identifying a signal indicative of the incident involving the object. For example, the instruction generator can generate an instruction indicative of an incident to a remote device. For example, the instruction generator 210 can generate a second instruction to override a first instruction to cause the signaling device to not display the signal indicative of the incident. For example, the instruction generator 210 can generate an instruction to a signaling device of the roadway intersection to operate the signaling device according to the adjusted setting. For example, the instruction generator 210 can generate one or more instructions for the one or more signaling devices to display one or more adjusted signals to assist an object in traversing the roadway intersection based on the one or more signal adjustments. For example, the instruction generator 210 can generate one or more instructions for one or more signaling devices to display one or more adjusted signals to halt all objects on a roadway.

The alert generator 214 can include any combination of hardware and software for generating alerts or indications. The alert generator 214 can include a system that is configured to generate alerts for various signals and components utilized for a system for roadway intersection traffic signaling management. For example, the alert generator 214 can generate one or more alerts to provide to a remote device that indicates a discrepancy. For example, the alert generator 214 can generate one or more alerts to provide to a local system that indicates a discrepancy. For example, the alert generator 214 can generate one or more alerts, based on a determination provided by one or more devices, to be displayed on a signaling device of a roadway intersections directed at an object. For example, the alert generator 214 can generate one or more alerts, responsive to a determination provided by one or more devices, to be displayed by at least one signaling device of the one or more signaling devices to prompt adjustment to the movement of an object. For example, the alert generator 214 can generate one or more alerts, responsive to information provided by one or more third party systems, to be displayed by at least one signaling device of the one or more signaling devices to prompt clearance of a roadway. For example, the alert generator 214 can generate one or more alerts, responsive to a determination provided by one or more devices, to be displayed by at least one signaling device of the one or more signaling devices to direct traffic on a roadway.

The incident detector 220 can include any combination of hardware and software for identifying, detecting or determining incidents. The incidents can include any events, occurrence or a thing affecting or impacting traffic or traffic safety, such as vehicle collisions, pedestrian accidents, formation or presence of potholes or presence of objects obstructing the road, or occurrences of high risk traffic events (e.g., a large number of bicycles near a large truck). The incident detector 220 can include system that is configured to determine an incident involving an object using various signals and components utilized for a system for roadway intersection traffic signaling management. For example, the incident detector 220 can detect, based on the sensor data input into a machine learning (ML) model trained on a plurality of sensor data on a plurality of roadway intersections, an incident involving an object. For example, the incident detector 220 can detect, based on sensor data input, an incident involving an object. For example, the incident detector 220 can detect, based on the sensor data input into a machine learning (ML) model trained on a plurality of sensor data on a plurality of roadway intersections.

The collision detector 216 can include any combination of hardware and software to predict a collision or a likelihood of a collision prior to its occurrence based on a confidence threshold 218. The collision detector 216 can include a system that is configured to monitor object velocities and directions and determine that a potential for collision occurring has exceeded a confidence thresholds 218 (e.g., a particular predetermined collision likelihood threshold triggering various outputs or signals). For example, the collision detector 216 can determine, based on the one or more predicted directions and velocities provided, that a risk of collision involving at least an object of the one or more objects exceeds a confidence threshold. For example, the collision detector 216 can determine, based on a determination provided by one or more devices, that a risk of collision involving at least an object of the one or more objects exceeds a confidence threshold. For example, the collision detector 216 can determine, based on historical data, that a risk of collision involving at least an object of the one or more objects has a high probability.

The sensor analyzer 222 can include any combination of hardware and software for analyzing data from any sensor 104 to make any determinations described herein. For instance, the sensor analyzer 222 can include a system that is configured to analyze and process sensor data using various signals and components utilized for roadway intersection traffic signaling management. For example, the sensor analyzer 222 analyze sensor data for timing and send such data to the timing determiner 202. For example, the sensor analyzer 222 can process sensor data and send such data to the timing determiner 202. For example, the sensor analyzer 222 can identify sensor data. For example, the sensor analyzer 222 can classify sensor data. For example, the sensor analyzer 222 can scale sensor data. In some implementations, the sensor analyzer 222 can also perform safety-rated monitoring of display and signal states using the sensor suite. This may include, for example, detecting defects such as cracked screens, flickering lights, or dead pixels/LEDs, as well as verifying that observed states align with target system signal states to provide redundancy, and assessing operational parameters such as signal transition times to ensure compliance and reliability.

The object motion determiner 226 can include any combination of hardware and software for determining motion of objects based on sensor data. The object motion determiner 226 can include a system that is configured to determine thresholds 228 involving objects using various signals and components utilized for a system for roadway intersection traffic signaling management. For example, the object motion determiner 226 can determine, based on data, both velocity and direction determinations. For example, the object motion determiner 226, based on data, can determine the velocity direction of an object approaching the roadway intersection. For example, the object motion determiner 226 can determine the velocity and direction of one or more objects on a roadway. For example, the object motion determiner 226 can determine, based on data, whether one or more objects on the roadway has surpassed a thresholds 228 regarding its velocity and direction. For example, the object motion determiner 226 can determine, based on data, whether one or more objects is present on a roadway. For example, the object motion determiner 226 can send data to the collision detector 216 regarding the velocity and direction of multiple objects on the roadway. For example, the object motion determiner 226 can determine, based on the sensor data input into one or more machine learning (ML) models trained on a plurality of objects moving at a plurality of roadway intersections in a plurality of directions and a plurality of velocities, one or more predicted directions and velocities for one or more objects. For example, the object motion determiner can determine, based on the data on the movement and a phase transition according to the schedule at the signaling device, that the movement of the object is to be adjusted.

The interface 230 can include a system that is configured to transmit signals using various components utilized for a system for roadway intersection traffic signaling management. For example, the interface 230 can have a transceiver. For example, the interface 230 can have transmitter circuitry. For example, the interface 230 can have receiver circuitry. For example, the interface 230 can function wirelessly. For example, the interface 230 can function using a wired connection. For example, the interface 230 can transmit a signal for an object to prompt adjustment of the velocity of the object prior to approaching the roadway intersection.

The rules engine 232 can include a system that is configured to identify regulations and rules using various signals and components utilized for a system for roadway intersection traffic signaling management. For example, the rules engine 232 can identify a regulation indicative of a range of acceptable predetermined time intervals for roadway intersections. For example, the rules engine 232 can identify a regulation of a threshold distance needed to be maintained between a plurality of objects at the roadway intersection. For example, the rules engine 232 can identify updated regulations indicative of an updated range of acceptable predetermined time intervals for the roadway intersection. For example, the rules engine 232 can identify updated regulations of a threshold distance needed to be maintained between a plurality of objects at the roadway intersection. For example, the rules engine 232 can identify updated regulations regarding objects usage of certain areas of a roadway. For example, the rules engine 232 can identify updated regulations of a weight limit of an object on the roadway. For example, the rules engine 232 can identify updated regulations of a speed limit imposed on the roadway. For example, the rules engine 232 can identify updated regulations of a speed limit imposed on the certain sections of the roadway.

The data repository 132 can include a system that identifies data received from various components and signals utilized for roadway intersection traffic signaling management. The data repository 132 can identify data from one or more sensors on one or more objects and one or more environmental conditions at the roadway intersection. The data repository 132 can identify historical data for the roadway intersection indicative of signaling changes for one or more signaling devices at the roadway intersection. The data repository 132 can update the historical data for the roadway intersection using the sensor data and the signal output. The data repository 132 can identify sensor data indicative of a signal output by the signaling device at a time point. The data repository 132 can identify sensor data associated with an incident. The data repository 132 can identify data from one or more sensors associated with a roadway intersection. The data repository 132 can identify, based on data received, data on environmental conditions. The data repository 132 can identify sensor data from one or more sensors associated with a roadway intersection, the sensor data corresponding to one or more objects moving at the roadway intersection.

The object identifier 234 can include a system that identifies a traffic object (e.g., vehicle, bicycle or a pedestrian) using various components and signals utilized for roadway intersection traffic signaling management. The object identifier 234 can identify traffic objects in any type of situations or determinations described herein. For example, the object identifier 234 can identify an object to be assisted in traversing the road intersection. The object identifier 234 can implement such object identification based on sensor data input into one or more machine learning (ML) models 242. The ML models 242 can be trained on a plurality of objects moving at a plurality of roadway intersections in a plurality of roadway intersections in a plurality of directions and a plurality of velocities. The object identifier 234 can identify an object on the roadway violating a regulation provided by the rules engine 232. This identification can be determined based on sensor data input into one or more machine learning (ML) models trained on a plurality of objects moving at a plurality of roadway intersections in a plurality of roadway intersections in a plurality of directions and a plurality of velocities. The object identifier 234 can identify an unauthorized object on the roadway. This identification can be implemented based on sensor data input into one or more machine learning (ML) models trained on a plurality of objects moving at a plurality of roadway intersections in a plurality of roadway intersections in a plurality of directions and a plurality of velocities. The object identifier 234 can identify, based on sensor data input into one or more machine learning (ML) models trained on a plurality of objects moving at a plurality of roadway intersections in a plurality of roadway intersections in a plurality of directions and a plurality of velocities, an unauthorized object on a section of the roadway.

The schedule generator 236 can include a system that generates schedules using various components and signals utilized for roadway intersection traffic signaling management. A schedule 238 for a signaling device can include a set of instructions and time intervals for providing particular signals at a particular time or during a particular time period (e.g., predetermined timing for red, yellow and green lights at the intersection). The schedule generator 236 can identify schedules 238 using various components and signals utilized for roadway intersection traffic signaling management. For example, the schedule generator 236 can identify, using one or more sensors associated with a roadway intersection, historical data corresponding to objects associated with traffic at the roadway intersection, the historical data associated with traffic at the roadway intersection over a plurality of time intervals, traffic conditions and weather conditions. The schedule generator 236 can generate, based on the sensor data input into one or more machine learning (ML) models trained one a plurality of historical data for a plurality of roadway intersections and their corresponding time intervals, traffic conditions and weather conditions, schedules 238 of phase transitions for a signaling device of one or more signaling devices at the roadway intersection. The schedule generator 236 can determine, based on the updated historical data, the schedules 238 for the setting for signaling. The schedule generator 236 can determine based on the historical data for the roadway intersection, the schedules 238 for the setting for signaling.

FIG. 3 illustrates a block diagram of an example computing system 300, also referred to as a computer system 300 or a computing device 300. The computing system 300 can include, included by, or be used to implement a data processing system 200, or any components of the system 100, such as a client device 140, a signaling device 124, a detection system 108 or a cloud system 126. The computing system 300 includes at least one bus 305 or other communication component for communicating information and at least one processor 310 or processing circuit coupled to the bus 305 for processing information. The computing system 300 can also include one or more processors 310 or processing circuits coupled to the bus for processing information. The computing system 300 also includes at least one main memory 315, such as a random access memory (RAM) or other dynamic storage device, coupled to the bus 305 for storing information, and instructions to be executed by the processor 310. The main memory 315 can be used for storing information during execution of instructions by the processor 310. The computing system 300 may further include at least one read only memory (ROM) 320 or other static storage device coupled to the bus 305 for storing static information and instructions for the processor 310. A storage device 325, such as a solid state device, magnetic disk or optical disk, can be coupled to the bus 305 to persistently store information and instructions.

The computing system 300 may be coupled via the bus 305 to a display 335, such as a liquid crystal display, or active matrix display, for displaying information to a user. An input device 330, such as a keyboard or voice interface may be coupled to the bus 305 for communicating information and commands to the processor 310. The input device 330 can include a touch screen display 335. The input device 330 can also include a cursor control, such as a mouse, a trackball, or cursor direction keys, for communicating direction information and command selections to the processor 310 and for controlling cursor movement on the output device 335, such as a display.

The processes, systems and methods described herein can be implemented by the computing system 300 in response to the processor 310 executing an arrangement of instructions contained in main memory 315. Such instructions can be read into main memory 315 from another computer-readable medium, such as the storage device 325. Execution of the arrangement of instructions contained in main memory 315 causes the computing system 300 to perform the illustrative processes described herein. One or more processors in a multi-processing arrangement may also be employed to execute the instructions contained in main memory 315. Hard-wired circuitry can be used in place of or in combination with software instructions together with the systems and methods described herein. Systems and methods described herein are not limited to any specific combination of hardware circuitry and software.

Although an example computing system has been described in FIG. 3, the subject matter including the operations described in this specification can be implemented in other types of digital electronic circuitry, or in computer software, firmware, or hardware, including the structures disclosed in this specification and their structural equivalents, or in combinations of one or more of them. Computing system 300 of FIG. 3 can be utilized along with functionalities of the data processing system 200 of FIG. 2 to execute, implement or otherwise provide any functionalities of any system, method, device or apparatus described in any of the sections B-I. Implementations can further include safety redundancy features to improve reliability of operation under fault conditions. Such features may involve cross-verification of signal states against expected system outputs, redundant monitoring of components, and overlapping devices (e.g., overlapping sensors), fail-safe mechanisms to maintain safe traffic signaling and replacement control even in the event of sensor or hardware failures.

Section B—Roadway Intersection Signaling Phase Setting Based on Sensor Data

Roadway intersection signaling systems can face challenges due to their static settings for signaling phases, which can lead to inefficiencies in terms of energy consumption of vehicles engaged in traffic and an increased chance of safety hazards. These traditional systems often rely on predetermined phases that do not adapt to real-time traffic conditions, which can result in in longer wait times for vehicles and pedestrians. This lack of adaptability can contribute to increased fuel consumption as vehicles idle at traffic signals, adversely impacting greenhouse gas emissions by these vehicles and exacerbating environmental concerns. Moreover, the inability to detect and respond to dynamic traffic situations can heighten the risk of accidents at intersections, further complicating traffic management.

To address these challenges, the proposed system utilizes one or more processors coupled with memory to identify a setting for signaling at a roadway intersection. This setting comprises multiple predetermined phases applied according to specific time intervals to control the movement of objects crossing the intersection. The system identifies data from various sensors monitoring objects and environmental conditions at the intersection, inputting this information into a machine learning (ML) model trained on a wide range of data from multiple intersections. Based on this analysis, the system determines an optimal timing for objects to pass through the intersection and adjusts the signaling settings accordingly. By generating instructions for signaling devices based on these adjustments, the system enhances traffic flow and safety while reducing energy inefficiencies and greenhouse gas emissions associated with prolonged idling and congestion. This proactive approach not only improves overall traffic management but also fosters a more sustainable environment.

Figure 4A:
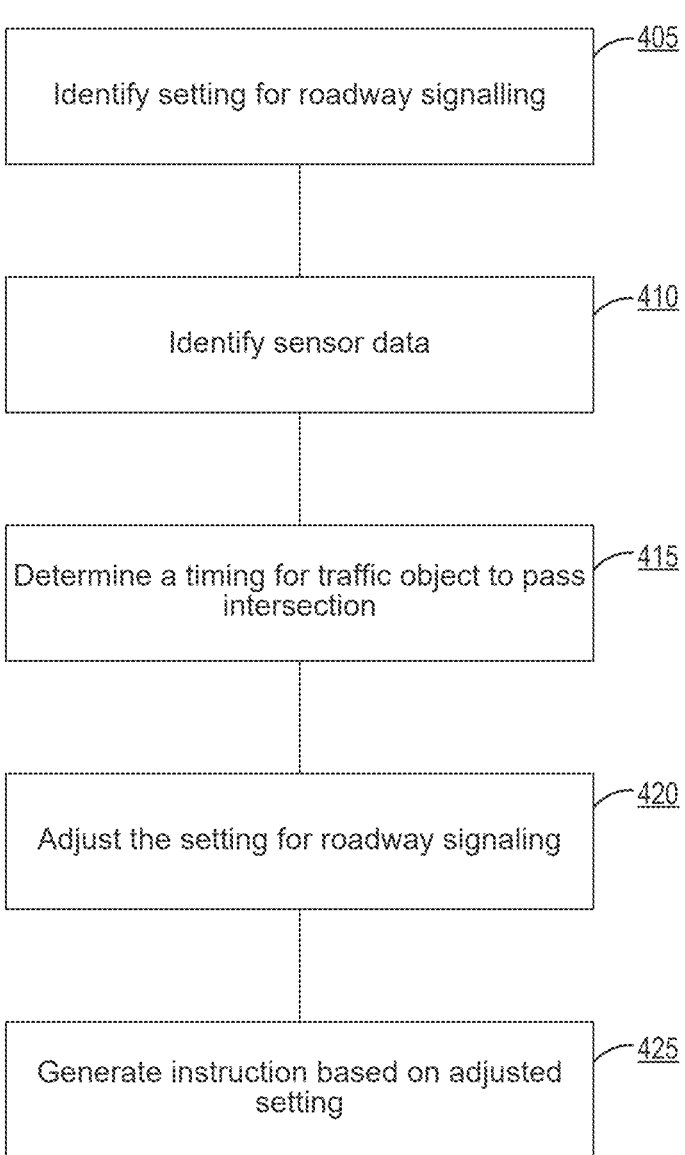
FIG. 4A illustrates a flow diagram of an example method for providing roadway intersection signaling phase setting adjustments based on sensor data.

FIG. 4A illustrates a flow diagram of an example method 400 for providing roadway intersection signaling phase setting adjustments based on sensor data. The example method 400 can be implemented using example systems 100 and 200, which can be executed via one or more processors (e.g., 310) coupled with memory (e.g., 315) that can store instructions and data to implement various functionalities of the method 400. The example method 400 can include acts 405-425. At 405, the method can include identify setting for roadway signaling. At 410, the method can identify sensor data pertaining to an intersection. At 415, the method can determine a timing for a traffic object to pass the intersection. At 420, the method can adjust the setting for the roadway signaling. At 425, the method can generate an instruction based on the adjusted setting.

At 405, the method can include identify setting for roadway signaling. The method can include a processor coupled with memory, identifying a setting for one or more signaling devices at a roadway intersection. The setting can be configured to control multiple predetermined phases to be applied according to predetermined time intervals to control movement of objects moving via the roadway intersection. The method can include one or more processors coupled with memory and configured (e.g., via instructions and data stored in memory) to identify a setting. The setting can be a setting for signaling at a roadway intersection. The signaling can involve signaling via signaling devices, such as traffic lights, dynamic signage lights, strobe lights, rotary lights or speakers. The setting can include one or more predetermined phases to be applied according to predetermined time intervals to control movement of objects crossing the roadway intersection. The phases can correspond to time intervals for particular signaling lights to be turned on (e.g., green light being on for 20 seconds and yellow light being on for 2 seconds). The setting can be configured for a particular roadway intersection, controlling signaling devices of the roadway intersection, including vehicle paths, pedestrian paths (e.g., crosswalks), bicycle paths or any other sections of the traffic at a road, street, or an intersection.

At 410, the method can identify sensor data pertaining to an intersection. The method can include the processor identifying, from one or more sensors, data on one or more objects within an area comprising the roadway intersection and one or more environmental conditions within the area. The method can include one or more processors configured to identify data from one or more sensors. The data can capture, describe, identify or correspond to one or more objects of a traffic, such as vehicles, bicycles, pedestrians or animals. The data can capture or correspond to one or more environmental conditions at the roadway intersection. The environmental conditions can include rain, sleet, snow, ice, wind, or ambient temperature. The environmental conditions can also include traffic conditions, such as the traffic density, type of traffic involved or other traffic data.

The one or more sensors can include any type and form of a sensing or data capturing device, such as a camera (e.g., a video camera, an image camera or a night vision camera), a light detection and ranging device (lidar) or a radio detection and ranging device (radar) configured for detection or monitoring of the object of the traffic. The method can include the system receiving real-time data (e.g., from one or more sensors) on traffic of objects at the roadway intersection and then processing the data to make determinations on the traffic occurrences or conditions.

At 415, the method can determine a timing for a traffic object to pass the intersection. The method can include the one or more processors configured to determine a timing for an object to pass the roadway intersection. The determination can be made based on the one or more objects and one or more environmental conditions input into a machine learning (ML) model. The ML model can be trained on a plurality of data on objects and environmental conditions on a plurality of roadway intersections. For instance, the sensor data on the one or more objects and one or more environmental conditions can be input into an ML model trained to output a determination of the timing at which the object (e.g., a vehicle, a pedestrian or a bicycle) is going to pass through the intersection.

The method can include the processor determining a timing for initiating one or more outputs of the one or more signaling devices to indicate to an object of the one or more objects to proceed via the roadway intersection. The processor can determine this timing based on the data on one or more objects and one or more environmental conditions input into a machine learning (ML) or AI model. The ML or AI model can be trained on a plurality of data on a plurality of objects on a plurality of roadway intersections and environmental conditions on the plurality of roadway intersections.

The ML model can be trained on historical traffic data of the roadway intersection to adapt the ML model to the conditions of the roadway intersection. The one or more processors can be configured to determine, using the data from the one or more sensors, at least one of a velocity, direction, or a time to arrival of the object at the roadway intersection. For example, when real-time data on traffic of objects is received (e.g., updating the initial sensor data), the one or more processors can determine, based on the real-time data input into the ML model, a second timing for the objects to pass the roadway intersection. The second timing can be different than the first timing or can correct or update (e.g., replace) the prior determined timing.

At 420, the method can adjust the setting for the roadway signaling. The method can include the one or more processors adjusting, based on the timing for the object to pass the roadway intersection, the setting for signaling at the roadway intersection. The setting can be adjusted to correct or update the timing of the phase of the signaling (e.g., the timing when a first signal ends or a second signal begins). The setting can be adjusted responsive to the timing determined by the ML model.

The method can include receiving updated real-time data on traffic of objects at the roadway intersection and determining, based on the updated real-time data input into the ML model, a second timing for the object to pass the roadway intersection. The one or more processors can adjust, based on the second timing, the setting for signaling at the roadway intersection to reduce congestion at the roadway intersection.

At 425, the method can generate an instruction based on the adjusted setting. The method can generate an instruction to a signaling device at the roadway intersection based on the adjusted setting. The method can generate an instruction to update any portion of the setting, such as the timing of a signal, a color of a signal, the rate at which a signal is displayed or provided or an arrangement or order in which the signal is provided. The instruction can reflect the adjusted setting describing the new or updated phases or timings of signaling for one or more signaling devices at the intersection. The method can include a user interface at a remote client device receiving a notification of a modified setting. For instance, the user interface can be provided an indication corresponding to the adjusted setting to a user monitoring traffic at the roadway intersection.

The method can include the processor receiving, from the one or more sensors, updated data comprising at least one of updated data on environmental conditions at the roadway intersection or updated data on the one or more objects moving at the roadway intersection. The processor can determine, based on the updated data, an updated timing for initiating the one or more outputs of the one or more signaling devices to indicate to an object of the one or more objects to proceed via the roadway intersection. The processor can adjust, based on the updated timing, the setting for signaling at the roadway intersection. The processor can generate a second instruction to a signaling device at the roadway intersection based on the setting adjusted based on the updated timing.

Figure 4B:
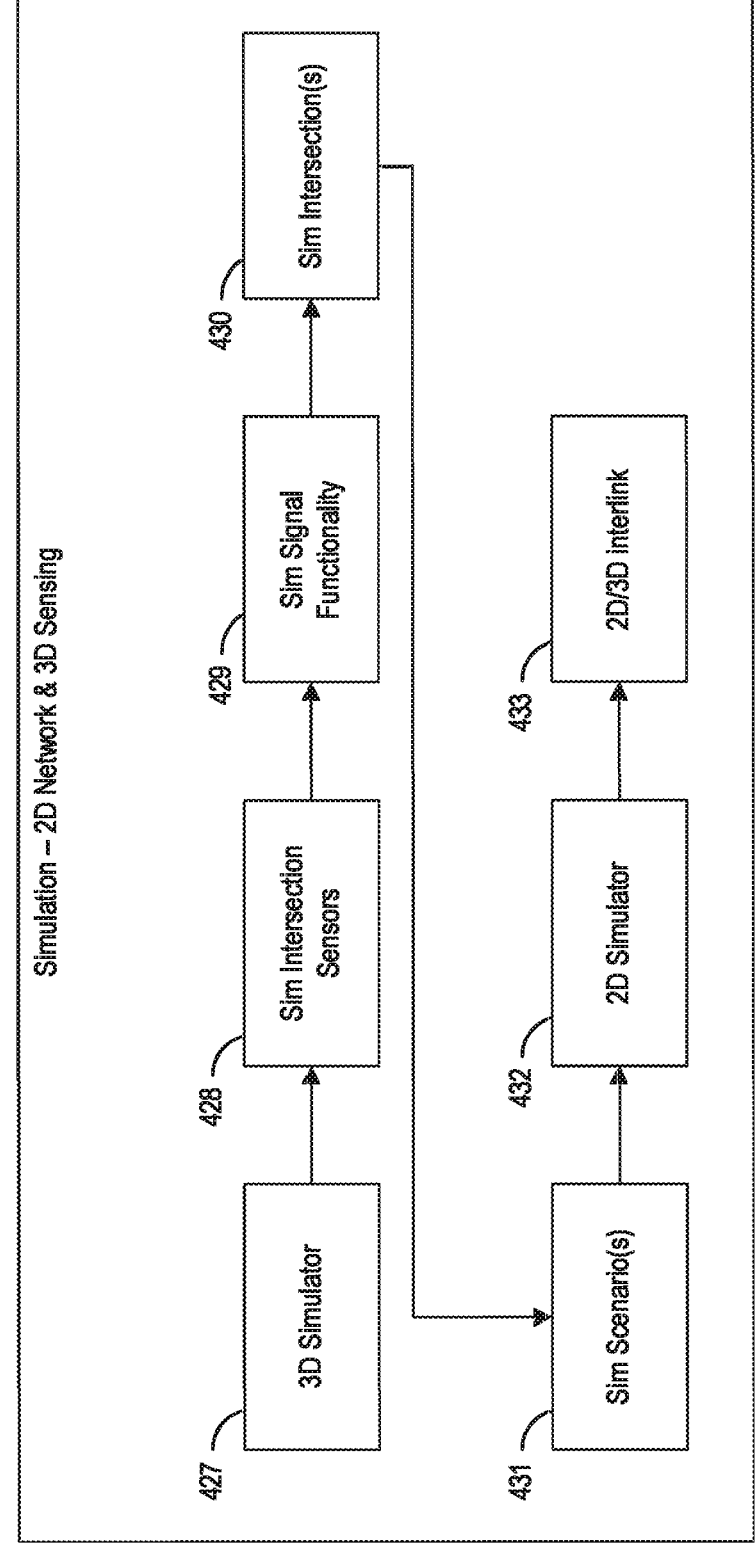

FIG. 4B is directed to a flow diagram of an example method 426 for providing simulation. The example method 426 can include actions 427-433. At 427, the method can initiate a 3D simulator for simulating conditions of traffic on one or more roads or roadway intersections. At 428, simulation intersection sensors can be accessed to form models, locations and fields of view of the intersections. The simulation intersection sensors can include representations of data from models, locations, field of view representations, including 360 degree field of view representations, lidar or radar data or signaling device outputs. At 429, simulation signal functionality can be verified to establish desired signal rotations or ranges (e.g., proper signal rotations). At 430, simulation interconnections can be established by providing a standard or a format for the simulation (e.g., match standard design). At 431, the simulations of the intersection can be performed based on sensor data. At 432, 2D simulator can be executed to identify locations, velocities or other characteristics of the objects with respect to the intersections and their existing signals. At 433, 2D/3D interlink can be utilized to provide data to the data processing system 200 for processing and determinations.

In some implementations, the simulation can ingest sensor data and pre-recorded datasets (e.g., GIS information) to create digital representations (e.g., digital twins) of intersections or roadway environments. The digital twins can include simulated digital representations of the roadway intersections showing historical conditions and real-time updated conditions. The digital twins can represent signaling device outputs, object traffic movement and locations, object types and speeds, thereby covering and representing the state of the roadway intersection in digital domain at different time points. By incorporating historical traffic patterns and environmental data, the system can recreate real-world scenarios for enhanced testing, validation, and predictive analysis.

FIG. 4C is directed to an example system configuration for providing overlapping or redundant sensor functionalities. The system configuration can include a redundant subsystem 433 with sensors of the same type (e.g., 434, 435) and computers (e.g., 436, 437) which can be coupled with safety PLC 438 for a destination system 439. The system configuration can include multi-modal sensor infrastructure 440 combining sensors 441 and 442 of a different type, whose data is to be processed by computers 443 and 444 to output to safety PLC 445 for a destination system 446. The overlapping infrastructure allows for more reliable operation in the event of failure.

In FIG. 4C, the sensors A and B can overlap target subset field of view (e.g., their entire field of views may or may not overlap), while their field of view angles may be same or different (e.g., opposing). Computers A and B can be same or different in their hardware or software. SPLCs can rectify outputs from each computer stream against expected contents or each other. The SPLCs may verify sensor state (power, response, alarms, calibration, etc.), verify computer states, verify signal states and/or verify stream conclusions match or align in excess of a specified confidence threshold.

FIG. 4D is directed to an example of multi-modal system configuration 447 with multiple different sensor configurations. The multi-modal configuration 447 can include various sensors 448, 449, 450 and 451, each one of which may be a sensor of a different type (e.g., a lidar, a radar, a camera or a retroreflective laser sensor) whose data can be processed by one or more computers (e.g., 452, 453 and 454) to be output to PLCs 455 and destination system 456 (e.g., the data processing system 200). These sensors can be included in, or provided by, a sensor configuration 457 that can include any plurality of single or multi modal sensors, such as 2D imaging sensors 458, depth sensors 459, non-light electromagnetic sensors 460, virtual sensors 461 (e.g., motion derived, such as based on simulation of vehicle velocity), audio sensors 462, motion or vibration sensors 463, weather sensors 464 or other sensors 465 (e.g., light sensors).

Figure 4E:
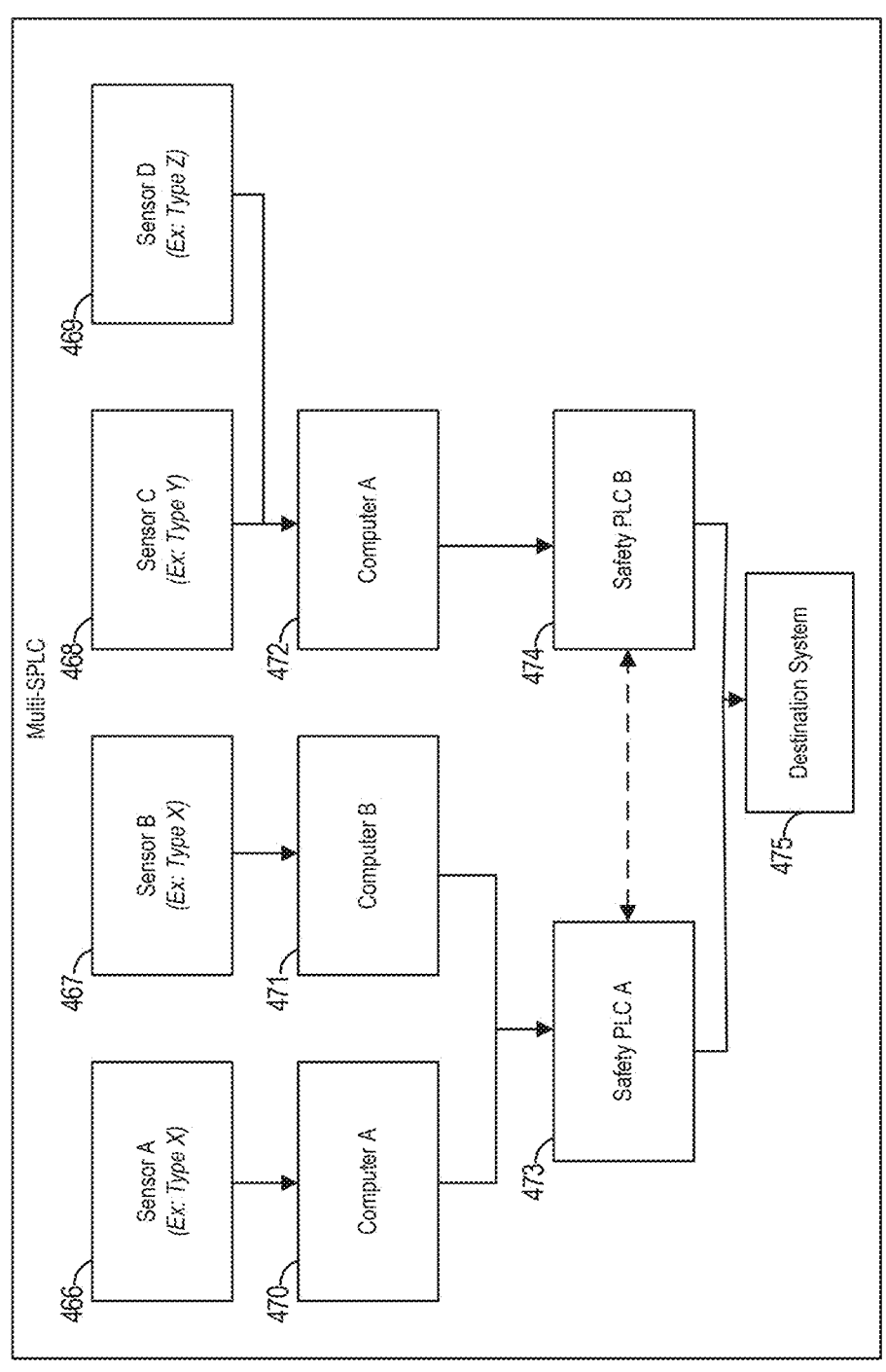

In FIG. 4D, the system can utilize multi-sensor data to achieve 2D image, and depth sensing capabilities. For instance, entire zone covered by sensors at the intersection (e.g., the safety zone) can have overlapping coverage from various sensors. For instance, the zone can be covered by two fisheye bell cameras and/or rotary lidar mounted on opposing corners of the intersection from an elevated mount, four directional 2D RGB Cameras mounted in an elevated fashion and facing towards the center of the intersection. Each camera may be configured to detect vehicles immediately below, up to, or exceeding 100 m, 200 m, 400 m, 600 m, 800 m, 1 km or more than 1 km away from the location of the sensor (e.g., at the roadway intersection). For instance, the zone can be covered by two or more 100 m or 500 m rotational lidar mounted from an elevated position on opposing corners of the intersection. These two rotational lidars may be replaced with a set number (e.g., four) directional lidar mounted similarly to the camera and radar systems. The zone can be covered by four 100 m or 400 m radar mounted facing towards the center of the intersection. To achieve such coverage, the system can use multiple sensors of each type, not considering overlapping views from the same sensor type for redundancy. FIG. 4E depicts an example of a safety programmable logic controller (SPLC) that can include sensors 466, 467, 468 and 469 fed into computers 470, 471 and 472, the output of which can be input into safety PLCs 473 and 474 (e.g., PLC A and PLC B) for output to a destination system 475 (e.g., data processing system 200). Rather than rectification occurring at destination, the system may have master-slave PLC to PLC communication configuration.

Figure 4F:
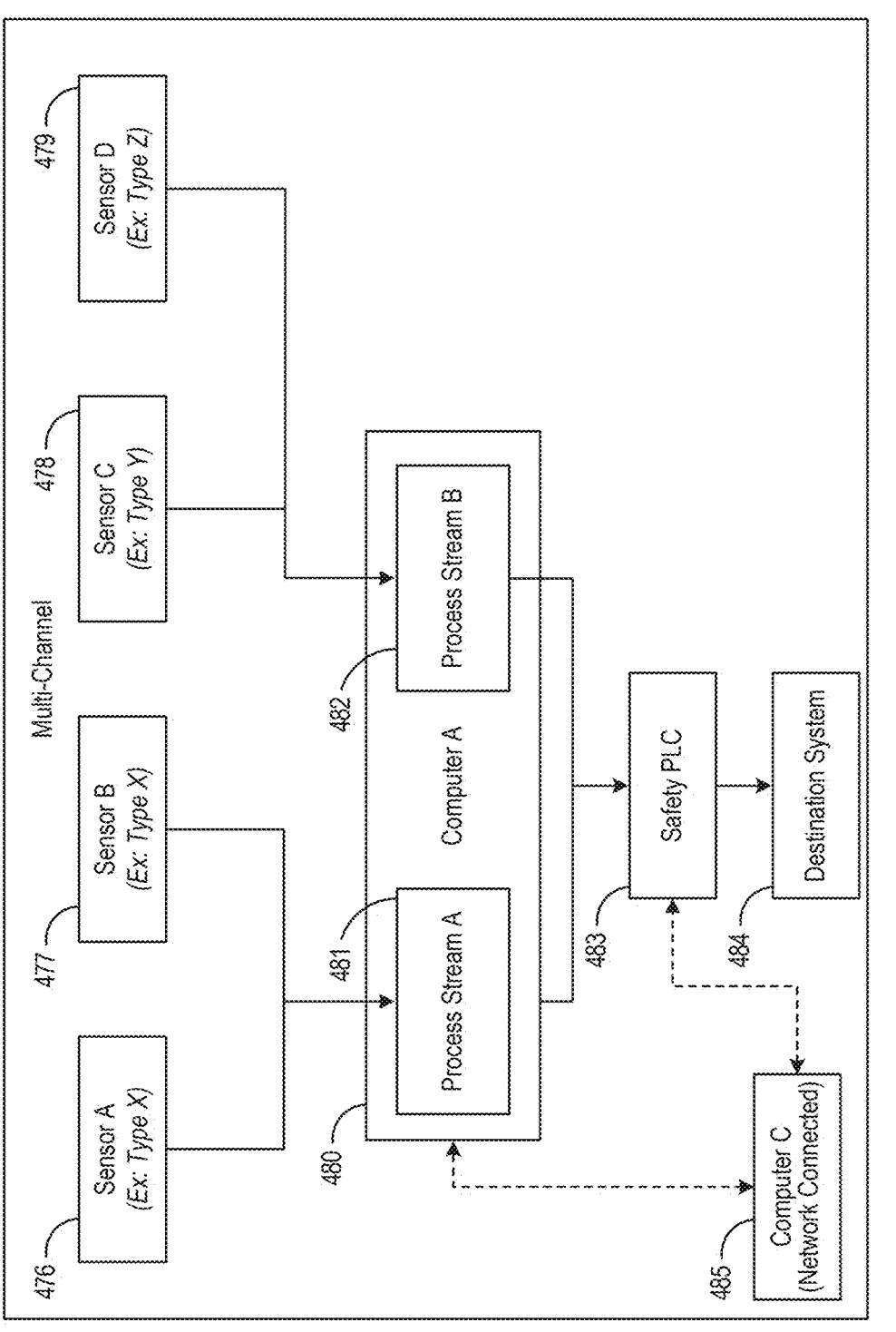

FIG. 4F depicts an example of a multi-channel configuration having sensors 476, 477, 478 and 479 fed into computer system 480 having computers 481 and 482 which can be connected, via a network, to a computer 485. From the computer system 480, the output can be served as input into safety PLC 483 for output to a destination system 484 (e.g., data processing system 200). Singular or multiple processors may be used. Process streams may be split by virtualization dedicated cores, threading, or multiple processing passes.

Figure 4G:
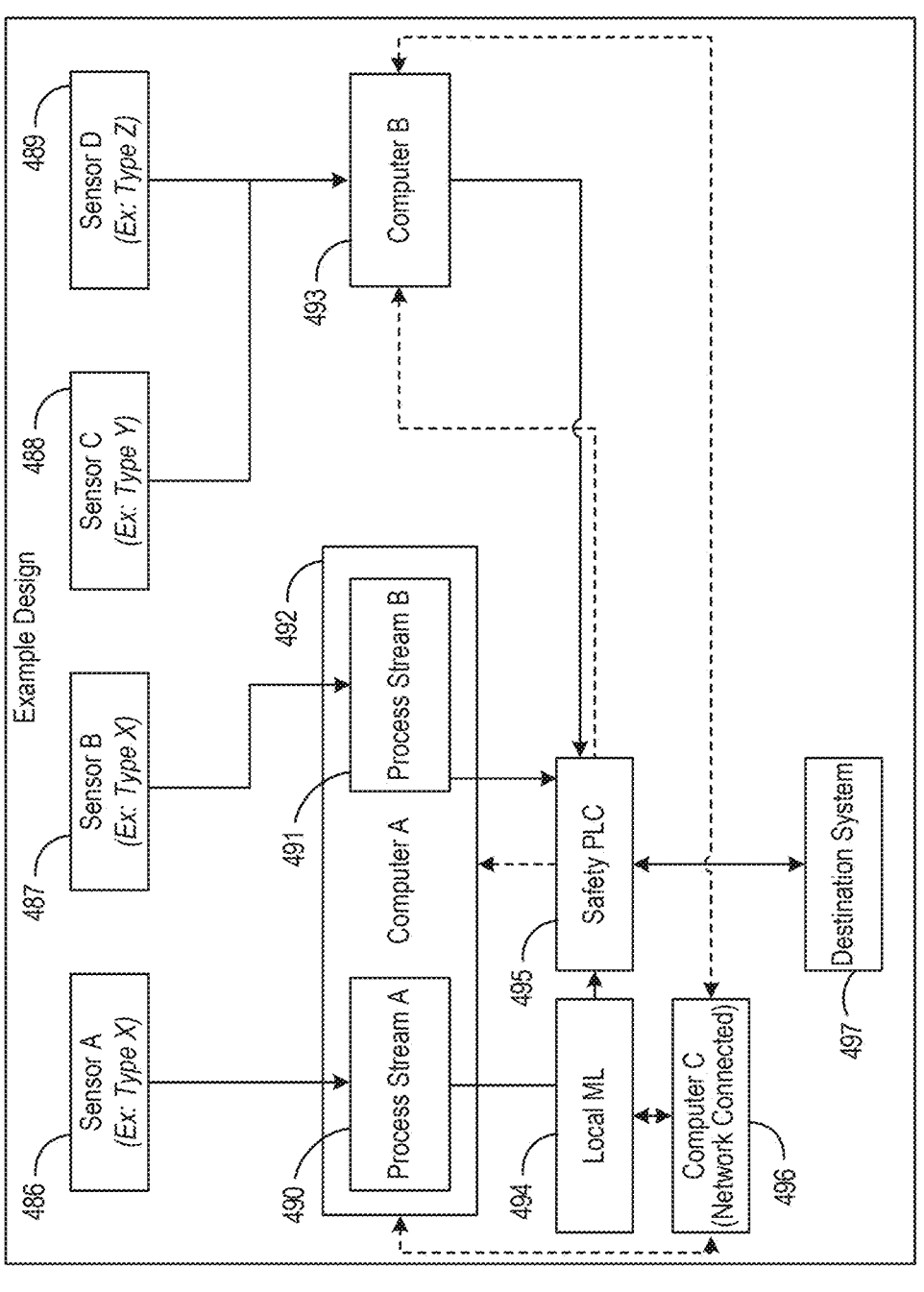

FIG. 4G depicts an example of an example system having sensors 486, 487, 488 and 489 fed into computer system 492 to process streams, such as 491. Computer 493 can receive output from sensors 488 and 489 to provide output to safety PLC 495. A local ML model 494 can be utilized, via for example, computer 496 (e.g., computer C) to process the data and provide output to destination system 497 (e.g., data processing system 200). The computer C can make requests to other computers via SPLC. The requested computers can respond either directly or via SPLC. For instance, one of the 3 computers may be configured to operate non-safety rated functions, for example, in a virtual machine with dedicated resources so as not to undermine safety functionality.

Figure 4H:
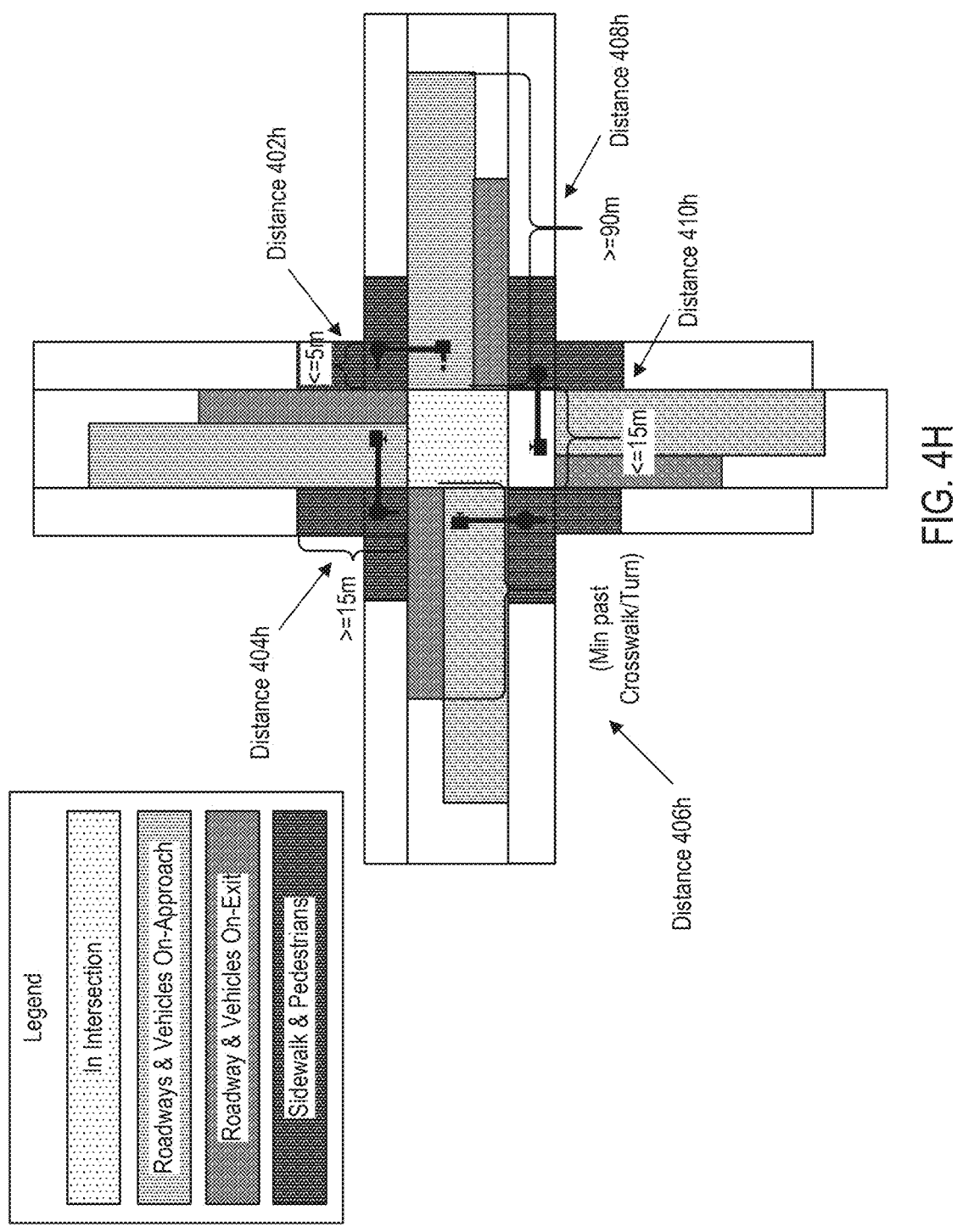

FIGS. 4H-4K provide examples of roadway intersection sensor coverage in various configurations. In FIG. 4H an intersection can be identified by the data processing system having designated sidewalks for pedestrians, roadways for vehicle traffic, crosswalk locations and set distances between various mounting poles and traffic objects. For example, distance 404h can correspond to the distance sidewalk detection from roadway may be greater than or equal to a threshold distance (e.g., 15 m). For instance, distance 402h can correspond to distance from the mounting pole to the intersection end or on-approach location, may be less than or equal to another distance threshold (e.g., 5 m). For instance, distance 408h can correspond to distance roadway on approach may be greater or equal to a particular distance threshold (e.g., 90 m). The distance 410h can correspond to distance intersection width may be less than or equal to 15 m. The distance 406h can correspond to distance on exit which can be set to any predetermined distance amount.

Figure 4I:
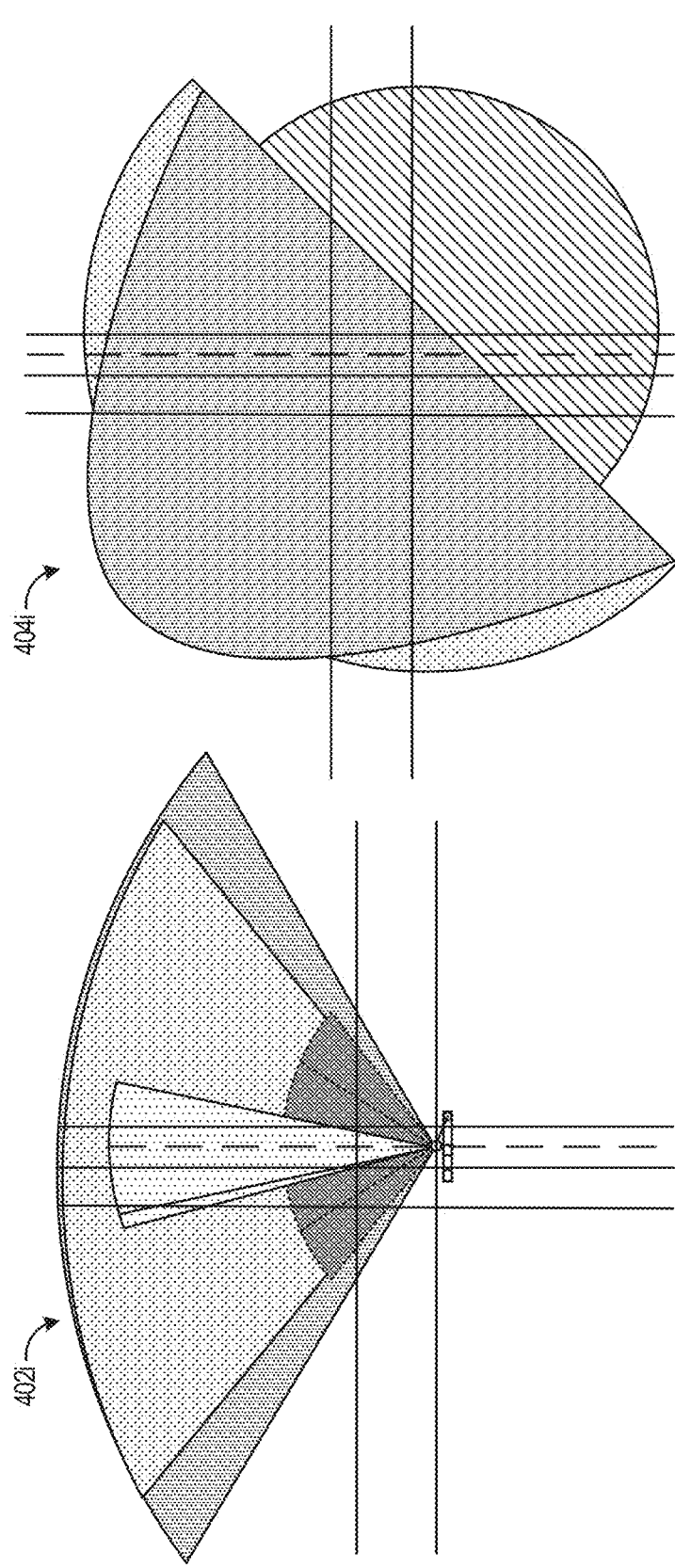
Figure 4J:
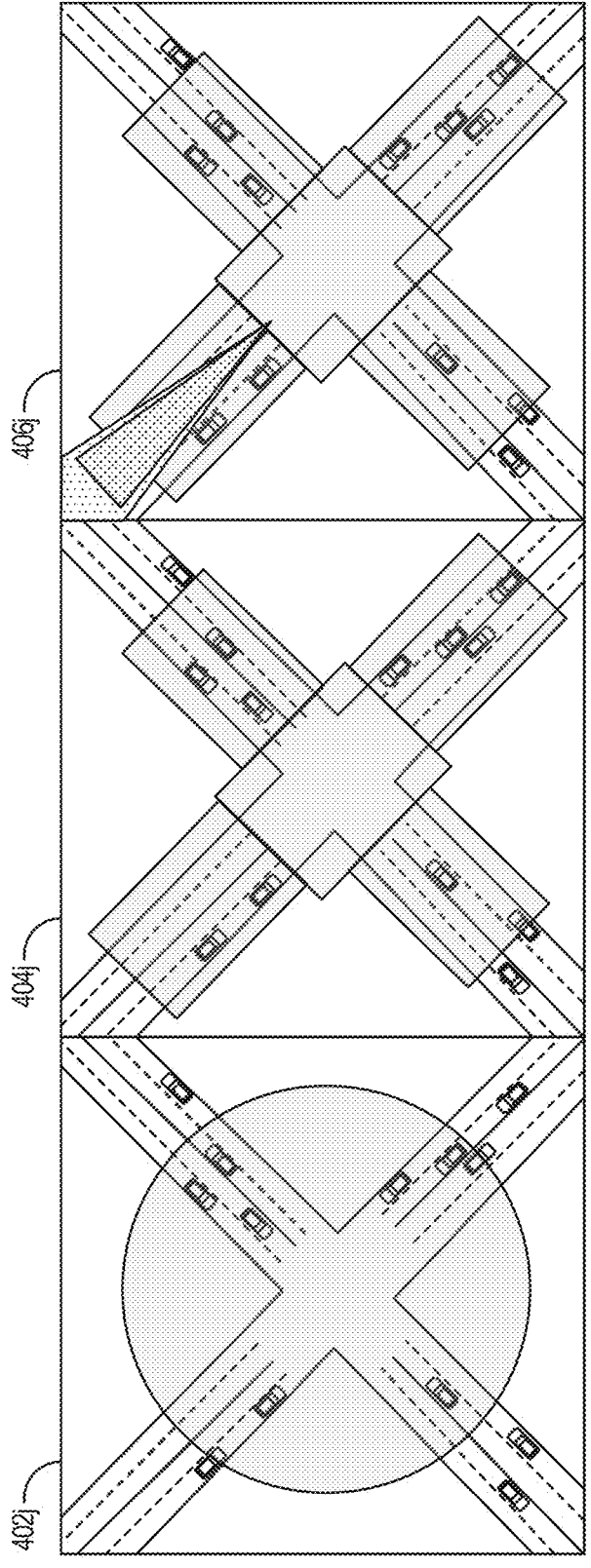
Figure 4K:
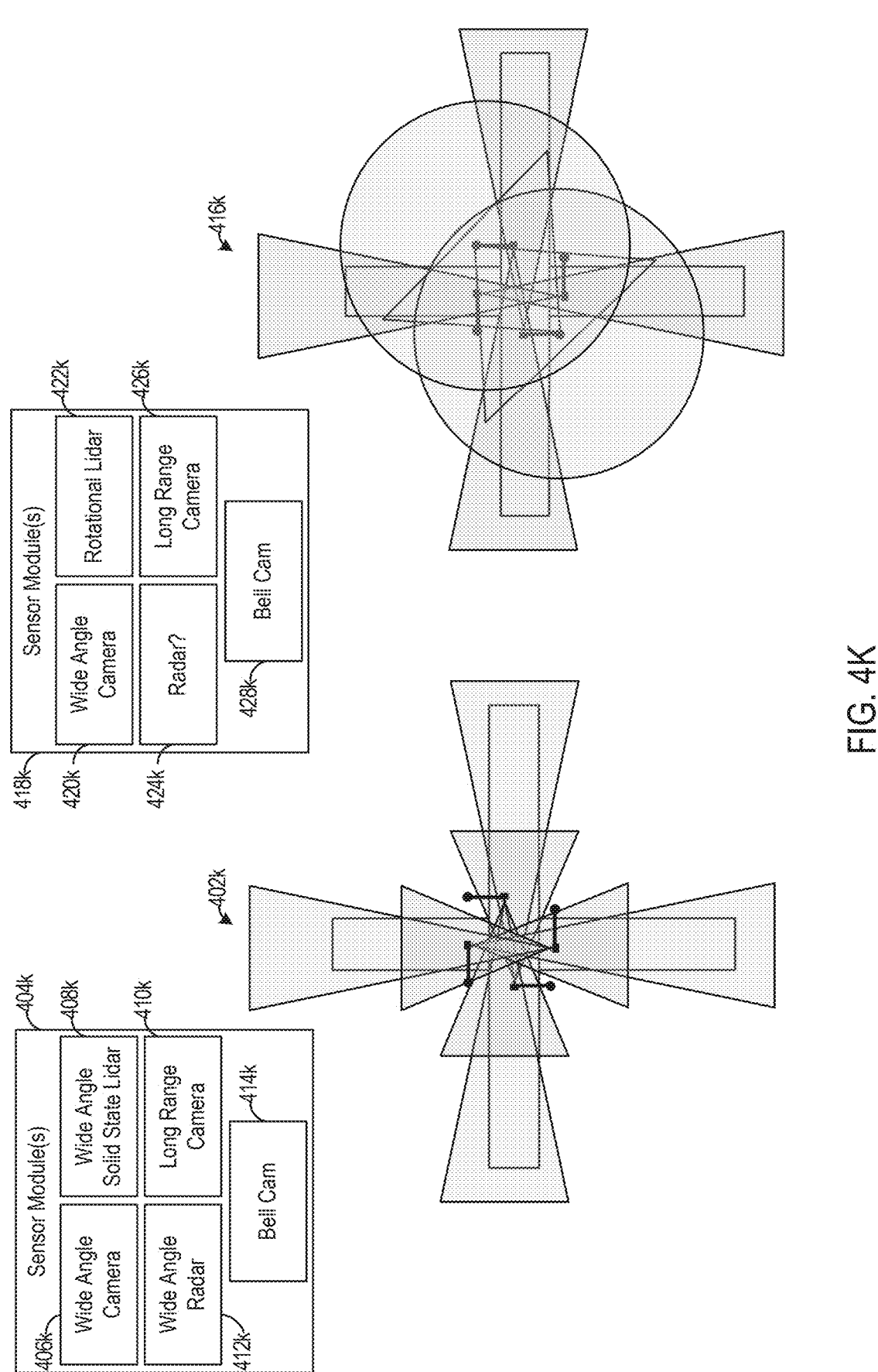

In FIG. 4I, example coverage 402i illustrates multi-modal sensor coverage from different sensors across a combined fields of view (FoV), which may include overlapping fields of views by different sensor types (e.g., RGB camera, lidar or radar), providing multiple reads of the same area. Coverage 404i similarly provides multi-modal sensor coverage across another area. In FIG. 4J, examples 402j, 404j and 406j each show different sensor coverage using one or more sensors of same or different type. In FIG. 4K, 402k and 404k each depict different and overlapping sensor coverage of a roadway intersection using various sensor types.

Figure 4L:
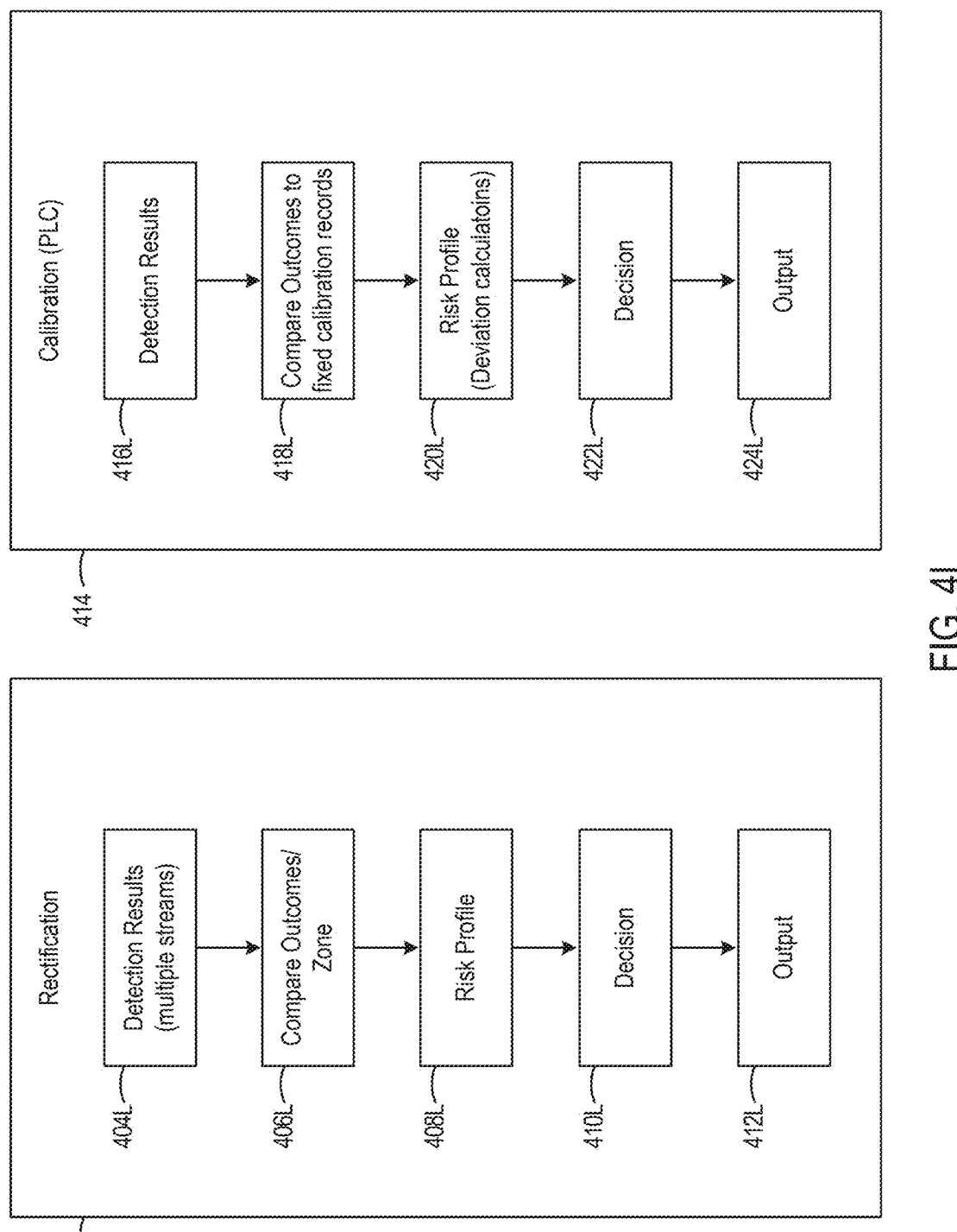

FIG. 4L illustrates an example of a configuration with 402L rectification system and a calibration (PLC) system 414L. The rectification system 402L and the calibration system 414L can be included in data processing system 200 and can utilize any functionalities of the data processing system. The rectification system 402L can include combination of hardware and software to perform actions 404L-412L. At 404L, the rectification system can detect results from multiple streams. At 406L, the rectification system can compare outcomes from various zones. At 408L, the rectification system can generate or determine risk profiles (e.g., potential for collisions, presence of incidents, timing of passage of objects with respect to timing of phase signals, etc.). At 410L, the rectification system can make the determination or decision, such as a decision that a phase of a signaling device is to be adjusted, that an alert is to be generated or that a collision is to occur or has occurred. At 412L, the rectification system can provide or generate an output, such as an instruction, indication or an alert.

At a calibration PLC system 414L can include the combination of hardware and software for implementing actions 416L-424L. At 416L, detection results 416L can be acquired or received. At 418L, outcomes can be compared to fixed calibration records, such as signaling schedules. At 420L, risk profiles can be determined. Risk profiles can include deviation calculations, such as determinations with respect to differences between timing of vehicle passing through an intersection and a phase signal remaining duration time interval to determine if a phase is to be changed or updated. At 422, decisions are to be made, such as a decision whether to modify a phase, timing or schedule of a signaling device, or not, depending on whether the deviation (e.g., risk profile) exceeds a predetermined threshold. At 424, the output 424L is to be provided. The output can include an instruction to modify the timing, schedule or signaling phase, based on the determination.

Section C—Signal Scheduling Discrepancy Detection Based on Sensor Data

Roadway intersections can encounter various challenges involving traffic congestion that can lead to various safety hazards and environmental issues. Traditional traffic signaling systems can fail to detect incidents, such as failure or errors with the signaling systems, in real-time, resulting in increased traffic delays, delayed responses to potential collisions or hazardous situations increasing not only the wait times for vehicles and pedestrians, but also greenhouse gas emissions due to vehicles idling in traffic. When incidents or signaling device errors go undetected, the subsequent disruptions can exacerbate fuel consumption and air pollution, posing risks not only to road users but also to the broader environment.

To address these challenges, the technical solutions can utilize machine learning and real-time sensor data to enhance incident detection at roadway intersections. The solutions can have one or more processors coupled with memory that receive sensor data from various devices monitoring the intersection. By inputting this data into a machine learning (ML) model trained on a diverse range of sensor information from multiple intersections, the system can detect discrepancies between how a signaling system is meant to operate and how it operates in practice. Upon detecting such discrepancies, the system can generate alerts, messages or indications indicating the presence of discrepancies at the intersection. This proactive approach allows for timely corrective actions, improving safety, reducing the likelihood of accidents and reducing traffic congestion and associated greenhouse gas emissions.

Technical solutions can be directed to systems and methods for signal scheduling discrepancy detection based on sensor data. Referring now to FIGS. 5A-7 present a signal scheduling discrepancy detection based on sensor data, including for example hardware and software infrastructure for providing technical solutions for roadway intersection signaling display technologies. FIGS. 5A-7 present system infrastructure examples that can be varied based on implementations to provide any configurations or functionalities described herein.

Figure 5A:
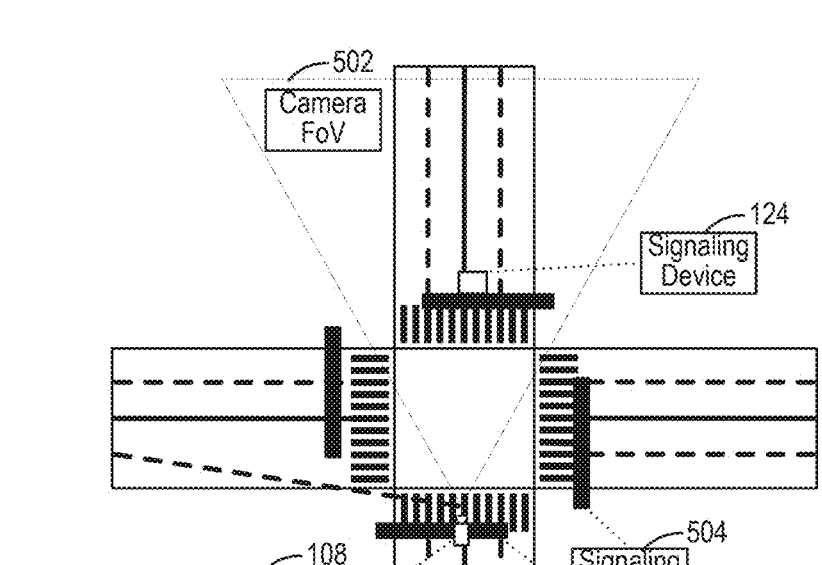
FIG. 5A illustrates an example of an intersection with a system of signaling devices for detecting traffic.

FIG. 5A illustrates an example of an intersection 500 with a system of signaling devices for detecting traffic. The example intersection 500 include signaling devices and one or more detection systems 108 that can be coupled to signaling device support 504 (e.g., a pole structure carrying or supporting signaling lights or other devices). Detection system 108 can include one or more camera FoVs that can encompass one or more signaling devices 124. One or more detection system 108 can monitor one or more signaling device 124.

The example intersection 500 can include, for example, a detection system 108 which can monitor frame/sensor signal on signaling device 124 continuously, extract the sensors and signals from the frame/sensor signal and break down the sensors and signals into subparts. The example can include a system that system can, for example, remove non-signage when multiple signs exist in a camera frame and then split the multiple detected signs into one or more process streams to compare the perceived signal with the intended signal. The example system may identify and determine the intended signal using historical data. The example system can calculate the signaling device 124 intrinsics. The signaling device 124 intrinsics can include input latency, draw latency, audio latency, or distance to detection system 108. The example system can calculate the detection system intrinsics 108 which can include, for example, one or more of the detection system's 108 input latency, draw latency, audio latency, or distance to one or more signaling devices 124. The detection system 108 can, for example, detect that the signaling device 124 is turned on. The detection system 108 can, for example, detect that the signaling device 124 is refreshing at the right speed. The detection system 108 can, for example, detect that the signaling device 124 has no stuck or broken pixels on its display. The detection system 108 can, for example, detect that the signaling device 124 has no physical damage.

The example system may, for example, use AI or traditional comparison techniques to determine the risk factor and detect a discrepancy based on the comparison. The system may then generate an alert to local or remote systems and users indicating the discrepancy. The example system may enter a signal error state where the one or more signaling device 124 receives an instruction to display one or more custom displays. The example system may enter a signal error state where the one or more signaling device 124 receives an instruction to flash yellow lights. The example system may, for example, calculate the risk factor based on the signaling device's 124 specific display error and pending workflows. Display errors that may not generate an alert can include, for example, damaged pixels and a green-light modulation workflow. Display errors that may generate an alert can include, for example, one or more stuck or off signaling devices. Camera FoV 502 can include, for example, a field of view of the camera, including any range of angles of visibility for the detection system 108. Camera FoV 502 can include the visual range within which objects can be sensed, captured or recorded.

Figure 5B:
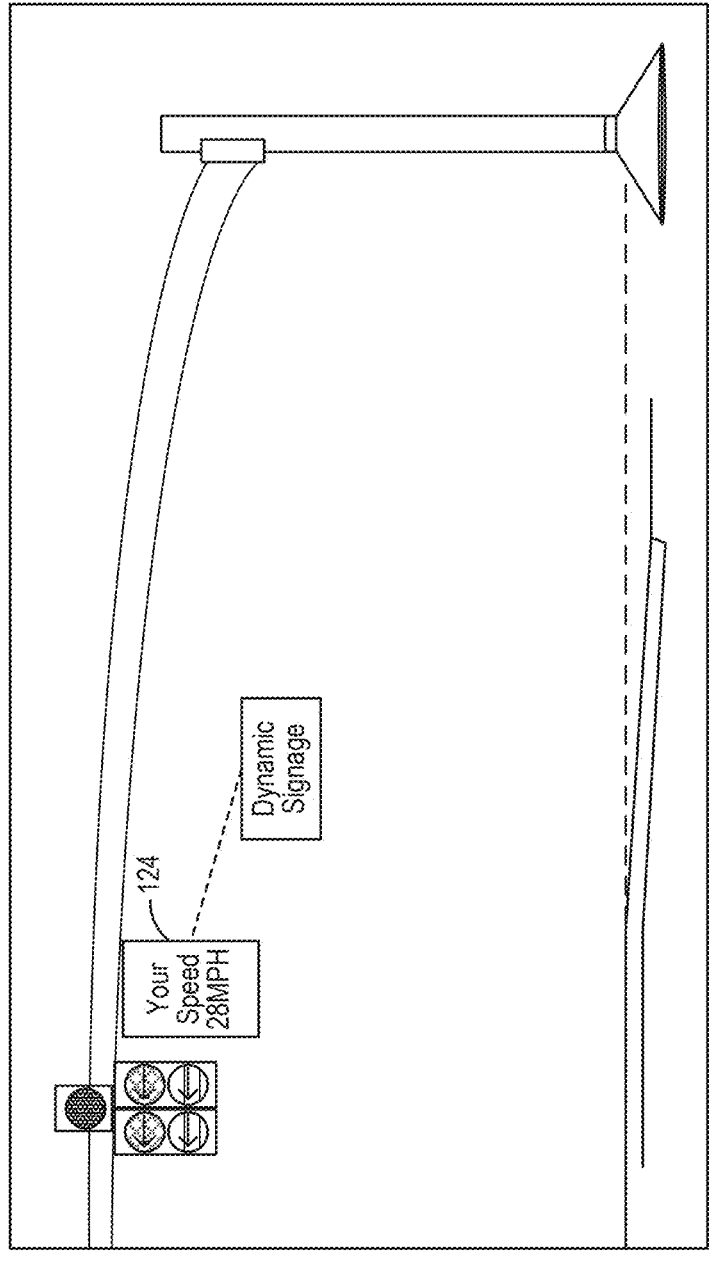
FIG. 5B illustrates an example system for providing signaling at an intersection via one or more signaling devices.
Figure 5C:
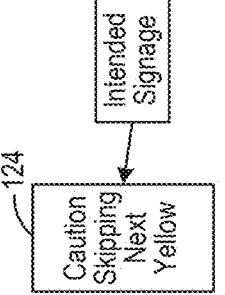
FIG. 5C illustrates an example system of the signaling device.

FIG. 5B illustrates an example system 510 for providing signaling at an intersection via one or more signaling devices 124. The signaling device 124, can include, for example, displaying a signal that does not match the setting for signaling at the roadway intersection. Signaling device 124 can include a digital signage device that can display indication, such as specific measured speed of the object passing. FIG. 5C illustrates an example system 520 of the intended signal displayed on the signaling device 124. The signaling device 124, can include, for example, displaying a signaling that is in accordance with the setting for signaling at the roadway intersection.

Figure 6:
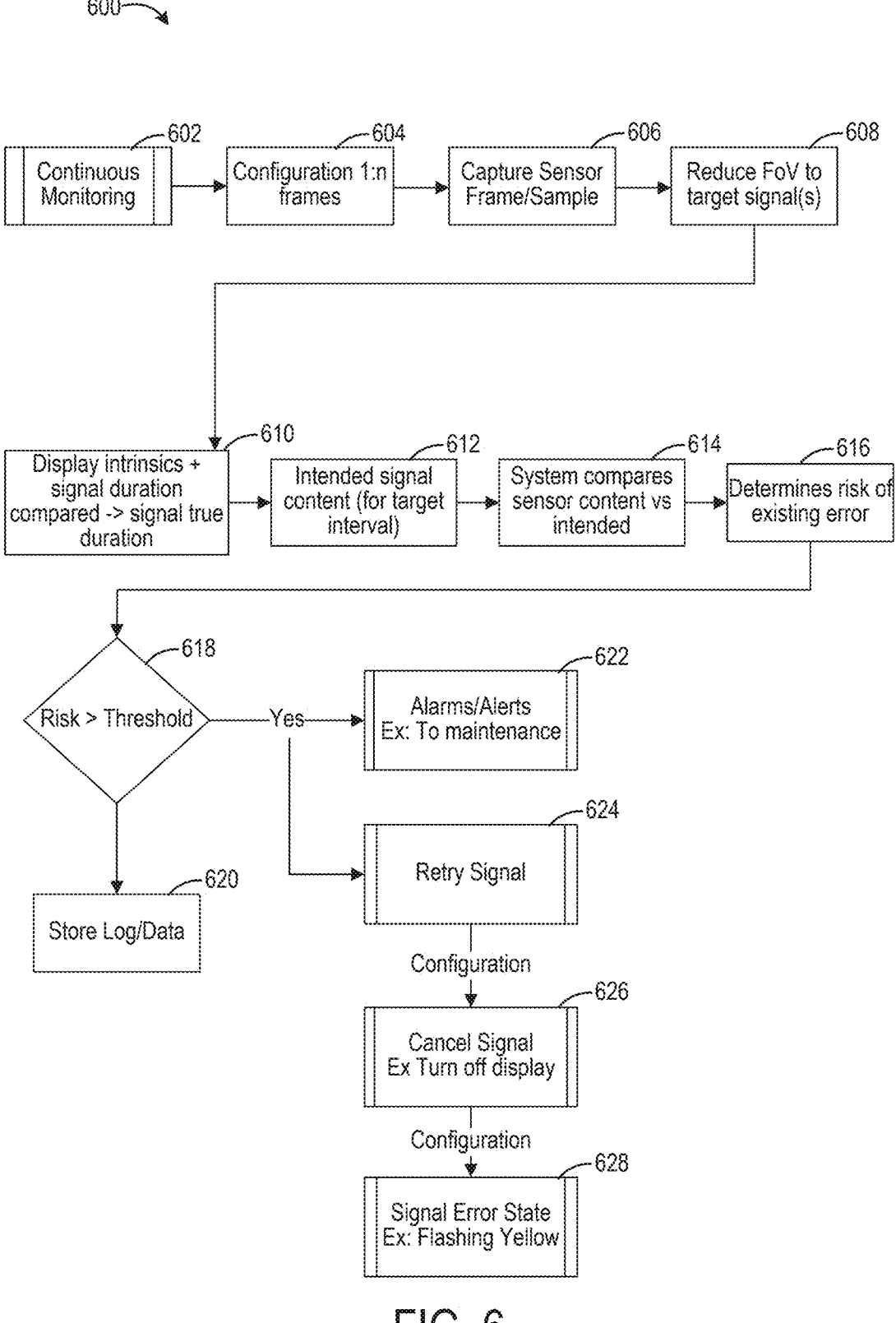
FIG. 6 illustrates an example of a flow diagram of a method for determining signal scheduling discrepancy based on sensor data.

FIG. 6 illustrates an example of a flow diagram of a method 600 for determining signal scheduling discrepancy based on sensor data. The example method 600 can be implemented using a data processing system 200 of FIG. 2, which can be deployed on any combination of one or more of physical or virtual servers or machines or cloud-based services. The method 600 can include acts 602-628 which can be implemented using any functionalities of the data processing system.

At 602, method can include sensors continuously monitoring a roadway intersection. For instance, various sensors (e.g., cameras, presence sensors, lidars or radars) can be deployed in one or more directions within, towards or around the intersection area for data monitoring. At 604, the method can implement a configuration on the sensors, such as a configuration for 1:n frames of a video camera. The configuration can involve time synchronization of all the different types of sensors, using for example timestamped data (e.g., time stamped or synchronized frames from cameras and lidars).

At 606, the method can capture sensor frame or samples, such as capturing video frames of a traffic object. The frame can include one or more objects captured within the frame at the respective time intervals of the frame. For example, the method can extract signals from the sensors, including any audio, video, radio waves, microwaves, infrared radiation or visual light. The method can identify or label, within each frame, each particular object or entity engaged in traffic. At 608, the method can reduce FoV to target signal(s) to focus on relevant signal range. In some instances, to reduce FoV, the system may split data into multiple smaller frames and process separately, such as when processing data from multiple sensors.

At 610, the method can determine display intrinsics and signal duration compared to the signal intended or true duration. For example, the method can determine display delays such as input and draw latencies or lamp warm-up. The signaling device's 124 intrinsics can include, for example, one or more: input latencies, draw latencies, audio latencies or distances to sensor. For example, the display intrinsics and signal duration compared can be asserted as the signal true duration 610 and can include functionalities to detect the detection system 108's intrinsics. The detection system 108's intrinsics can include, for example, one or more: input latencies, draw latencies, audio latencies or distances to sensor. For example, configuration 1:n frames 604 can include functionalities to use the signaling device 124's intrinsics and the detection system 108's intrinsics to calculate the true signal timing and the intended signal timing, compare the true signal timing and intended signal timing and determine a risk factor.

At 612, the method can determine intended signal content, such as intended time duration. At 614, the method can compare the sensor content with the intended content to determine the discrepancies between the two. At 616, the method can determine risk of existing error (e.g., existing discrepancy time duration). At 618, the method can compare the risk with a threshold (e.g., predetermined value) to determine if the risk exceeds the threshold. At 620, the method can store or log the data captured or determined. This may also be used for safety fallback where the system can adjust (e.g., decrease) the active safety level and restrict system functionality accordingly.

At 622, if at 618 the method has determined that the risk exceeds the threshold value, the method can generate or trigger alarms or alerts (e.g., notifications or instructions). The alarms or alerts can be directed to trigger maintenance or establish and determine that the signaling device does not operate according to predetermined standard (e.g., presence of error). At 624, if at 618 the determination is that the risk does not exceed the threshold, the method can retry the signal or proceed to a configuration stage. At 626, the method can turn off or cancel the signal (e.g., turn off the display). At 628, the method can generate a signal error state (e.g., flashing yellow light). The method can also implement periodic calibrations, such as to adjust or optimize the signal timing for processing. Calibration can involve custom reference images or other methods to precisely measure specific display features, functionality, and performance.

Figure 7A:
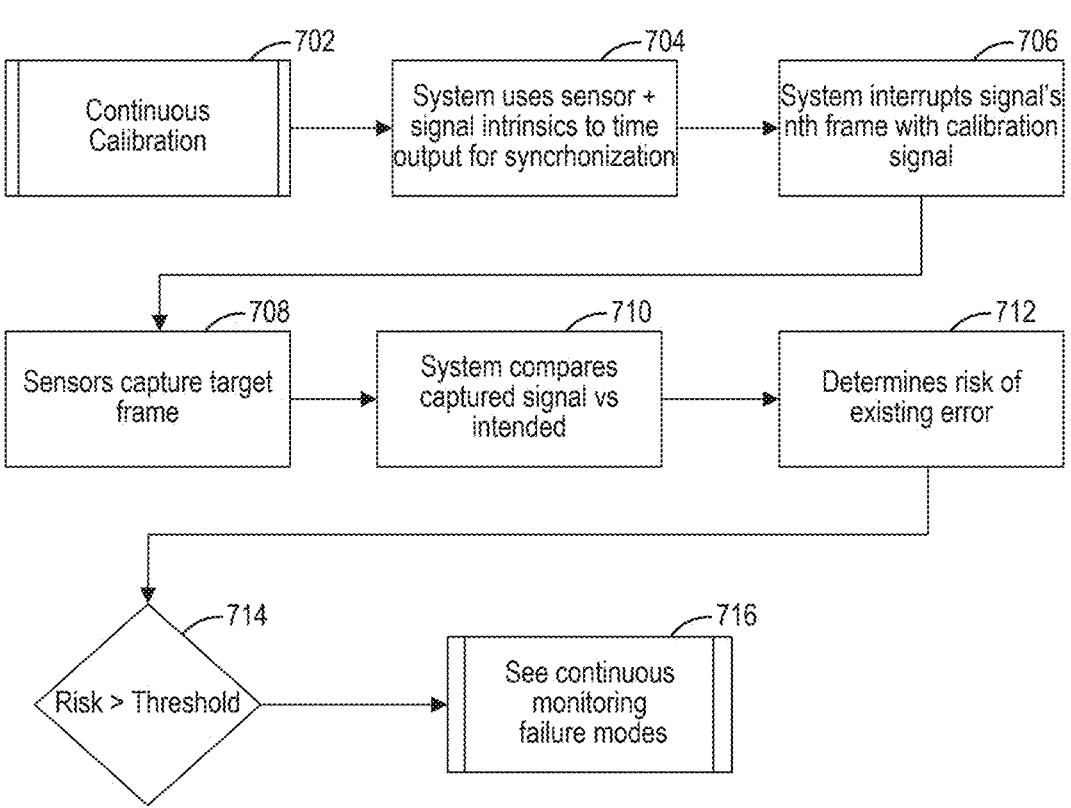
FIG. 7A illustrates a flow diagram of a method for continuous calibration of signaling devices.

FIG. 7A is directed to a flow diagram of a method 700 for continuous calibration of signaling devices. The method 700 can be implemented using a data processing system 200, including any functionality of the data processing system. The method 700 can be implemented using one or more processors 310 implementing instructions stored in a non-transient computer-readable media (e.g., memory 315) that causes or configures the one or more processors 310 to implement the data processing system functionalities. The method 700 can include acts 702-716 for utilizing calibration signals inserted in signal frames to measure the performance of or calibrate a signaling device.

At 702, the method can initiate the continuous calibration functionality for calibrating signaling devices. At 704, the method can use sensor or signal intrinsics to time output for synchronization. For example, the method can measure intended signaling timing and actual timing at which signals were provided and identify any delays or latencies. At 706, the method can interrupt signals frame (e.g., nth frame) with a calibration signal. The calibration signal can be inserted into the signal frame for the calibration. In some instances, the processor may add processing to existing signal patterns that are unable to be identified by humans (pixel shifting, audio/light levels, audio/visual spectrum, flickering sub-elements, distinct harmonies . . . etc.)

At 708, a sensor can capture the target frame. At 710, the method can compare the captured signal with the intended signal (e.g., expected signal) and determine the difference in timing. At 712, the method can determine if the risk of existing error (e.g., timing difference) exceeds a predetermined threshold (e.g., for causing an issue or lack of performance). At 714, the method can determine if the risk exceeds the threshold. At 716, the method can take action in the event that the risk exceeds the threshold, such as recalibrate the signaling device or lead to a different path, such as a continuous monitoring of failure modes.

Figure 7B:
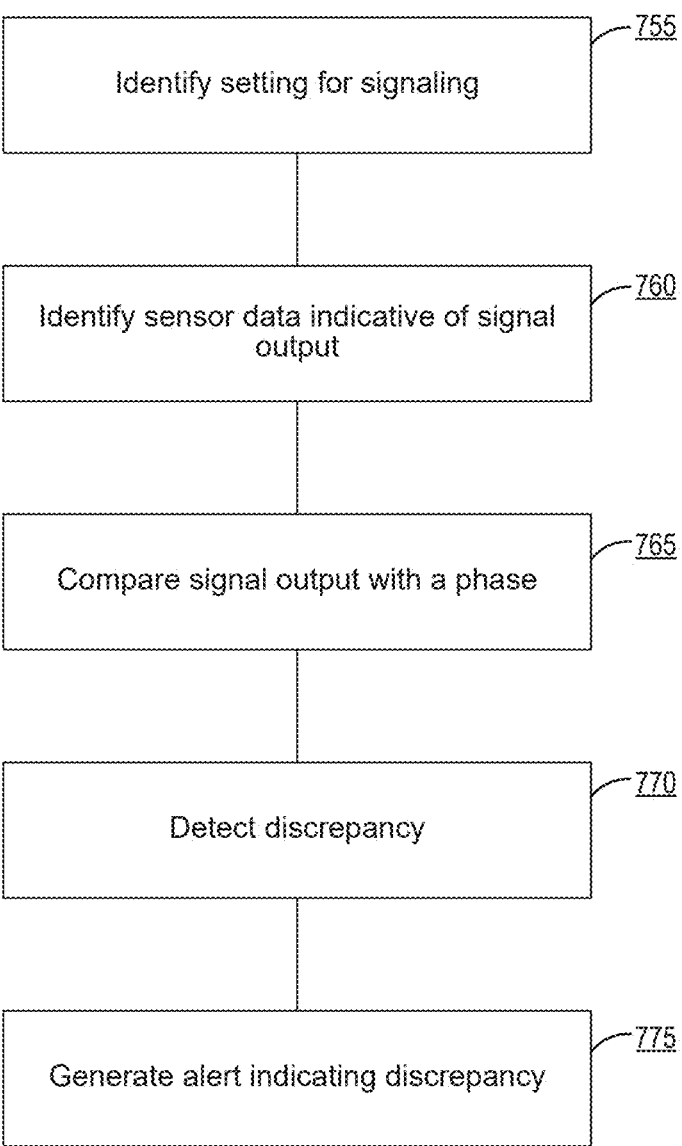
FIG. 7B illustrates a flow diagram of an example method for detecting a discrepancy of a signaling device.

Referring now to FIG. 7B, a flow diagram of an example method 750 for detecting a discrepancy of a signaling device is illustrated. The method 750 can be implemented using the data processing system 200 performing the acts 755-775. At 755, the method can identify a setting for signaling. At 760, the method can identify sensor data indicative of signal output. At 765, the method can compare signal output with a phase. At 770, the method can detect discrepancy. At 775, the method can generate alert indicating discrepancy.

At 755, the method can identify a setting for signaling. The method can include one or more processors coupled with memory and configured to identify a setting for signaling for a signaling device at a roadway intersection. The setting can include a plurality of phases associated with signals to be displayed in accordance with a schedule. The method can include a processor coupled with memory identifying, for a signaling device at a roadway intersection, a schedule. The schedule can identify or establish by a setting for initiating one or more outputs of the signaling device (e.g., a schedule indicating timing at which one or more light or other signal outputs are to be provided or engaged, duration of such engagement and/or order in which different signals from the signaling device are to be engaged one after another). The setting can include a plurality of phases for the one or more outputs to be provided by the signaling device in accordance with predetermined time intervals of the schedule. The phases can include, for a vehicle signage, for example a red light phase for a first duration of time, a yellow light phase for a second duration of time and a green light phase for a third duration of time. The phases can include walk signs and no crossing signs for pedestrians, which can be synchronized with signal phases for vehicle signs.

The method can identify, from a data repository, historical data for the roadway intersection indicative of signaling changes for one or more signaling devices at the roadway intersection. The method can determine, based on the historical data for the roadway intersection, the schedule for the setting for signaling. The method can update the historical data for the roadway intersection using the sensor data and the signal output and determine, based on the updated historical data, the schedule for the setting for signaling. The method can determine, based on the historical data input into one or more machine learning (ML) models trained on a plurality of settings for signaling for a plurality of roadway intersections displaying signals in accordance with a plurality of schedules, the setting for signaling at the roadway intersection.

At 760, the method can identify sensor data indicative of signal output. The method can include the one or more processors identifying sensor data indicative of a signal output by the signaling device at a time point. The method can include the processor receiving sensor data indicative of a detected output provided by the signaling device at a time point. The sensor data can include camera images or frames capturing signaling at particular time intervals. For instance, sensor data can include video image frames associated with time stamps (e.g., 60 frames per seconds can correspond to 60 timestamps per second) identifying signals as a function of time.

At 765, the method can compare signal output with a phase. The method can include the one or more processors comparing the signal output for the time point with a phase of the plurality of phases of the schedule corresponding to the time point. The comparison can include comparing the timing of the scheduled signal change compared with the timestamp of the video frame of the signal change as measured. The comparison can include comparing the timing of the scheduled signal change or duration with the measured signal change or measured signal duration by one or more of: sensors, processing circuitry or processing devices computing and processing the signals. The processor can receive, from a camera device directed at the signaling device, the sensor data comprising a video comprising a plurality of frames. The processor can identify the time point at which the detected output is initiated by the signaling device based on one or more timestamps of one or more frames of the plurality of frames of the video captured by the camera device.

The method can include a processor comparing the detected output from the signaling device at the time point with an expected output of the one or more outputs associated with a phase of the plurality of phases of the schedule. The comparing can be implemented using a machine learning model trained on historical signaling data. The phase can correspond to a time interval of the predetermined time intervals corresponding to the time point. The ML model trained on historical data can be trained on signaling outputs over a period of time on one or more roadway intersections. The processor can be configured to update the historical signaling data used to train the machine learning model based on real-time sensor data and detected output, and retrain the machine learning model to improve accuracy of discrepancy detection. The processor can identify, from a data repository, historical data for the roadway intersection indicative of signaling changes for one or more signaling devices at the roadway intersection. The processor can determine, based on the historical data for the roadway intersection, the schedule for the setting for signaling.

At 770, the method can detect discrepancy. The method can include detecting a discrepancy based on the comparison between the signal output and the phase of the schedule. The discrepancy can be detected by comparing the difference between the two values (e.g., signal output and phase) and a predetermined threshold value. The predetermined threshold value can correspond to a risk value beyond which an action (e.g., calibration, reset or alert) is to be taken. For example, the processor can detect the discrepancy based on the comparison a difference between a time difference between a time of the detected output and a time of the expected output exceeding a predetermined threshold. The discrepancy can be detected in response to the time difference exceeding a predetermined tolerance threshold for acceptable discrepancy range. The processor can initiate, responsive to detecting the discrepancy, a corrective action comprising at least one of recalibrating the signaling device or adjusting the schedule to mitigate the discrepancy.

For example, a processor can detect the discrepancy based on the comparison a difference between a time difference between a time of the detected output and a time of the expected output exceeding a predetermined threshold. The processor can initiate, responsive to detecting the discrepancy, a corrective action comprising at least one of recalibrating the signaling device or adjusting the schedule to mitigate the discrepancy. For example, when detecting the discrepancy, the method can include the processor adjusting a predetermined threshold for the comparison based on environmental conditions including at least one of weather, visibility, or traffic density for use in comparison of the detected output with the expected output. For example, when detecting the discrepancy, the processor can adjust a predetermined threshold for the comparison based on environmental conditions including at least one of weather, visibility, or traffic density for use in comparison of the detected output with the expected output.

At 775, the method can generate alert indicating the discrepancy. The method can generate an alert indicating the discrepancy to provide to a remote device. The method can generate an alert to indicate to a remote device or a data processing system that the signaling device operates beyond a predetermined standard or range. The method can generate the alert to initiate a calibration or a recalibration of the signaling device or signaling devices at the intersection. The method can generate an instruction for a data processing system to take action (e.g., initiate recalibration or control the signaling device to show an error, such as a blinking red or yellow light). The method can generate an indication to a maintenance service to initiate a corrective action (e.g., to request that the signaling device be repaired).

The method can include the processor generating the alert that includes, or is generated together with, a command to initiate an automated corrective workflow comprising transmitting diagnostic data to a remote maintenance device and requesting a recalibration of the signaling device. The corrective actions can include recalibrating the signaling device or updating or adjusting the schedule for the signaling device to mitigate the discrepancy. The updated schedule can then be uploaded to the system and the signaling device can operate at the corrected schedule without discrepancies.

In some implementations, the system can incorporate fail-safe mechanisms that dynamically adjust operational safety levels based on real-time assessments of system integrity and environmental conditions. For example, the system may implement a tiered safety model comprising multiple levels (e.g., Levels 0-5) analogous to autonomous vehicle safety classifications, where Level 0 represents minimal safety implications and Level 5 represents severe safety implications requiring the highest degree of confidence, controls, and mitigations. During each process path, the system can evaluate sensor states (including electrical, software, and visual alignments, occlusions, and anomalies), hardware states (e.g., CPU, memory, storage), power states, signal alignment, human behavior indicators, and environmental factors. Based on these evaluations, the system can selectively disable or degrade safety-rated features when conditions fail to meet predefined thresholds, thereby ensuring a controlled transition to a lower safety level while maintaining overall system integrity and compliance with safety objectives.

Section D—Incident Detection Based Signaling

The technical solutions of the present disclosure provide an incident detection and response system utilizing machine learning and sensor data for improved management of roadway intersections. Roadway intersections can sometimes face challenges such as delayed incident detection, inadequate signaling responses to emergencies, and insufficient communication with emergency services. These challenges can result in prolonged response times during such situations, increasing the risk of accidents, hindering overall traffic flow as well as contributing to emission of greenhouse gasses due to vehicles idling in traffic.

To overcome these challenges, the technical solutions of the present disclosure implement advanced features such as real-time sensor data collection from various devices, including cameras and radar systems, to monitor traffic conditions and detect incidents. By employing machine learning models trained on extensive datasets from multiple intersections, the system can accurately identify incidents involving vehicles or pedestrians and generate timely alerts. Additionally, these solutions facilitate immediate signaling adjustments to inform approaching traffic of potential hazards, ensuring safer navigation through intersections and reducing greenhouse gas emissions.

The technical solutions can be directed to systems and method for detecting incidents (e.g., traffic accidents) and providing signaling responsive to such detections. When detecting an incident, the technical solutions can determine the type or severity of the incident to determine if it warrants an emergency alarm, a call to an emergency response center (e.g., ambulance, police or fire fighters) or any other action. Locally deployed systems (e.g., cameras and sensors) can provide data to identify or detect the incidents via a data processing system using time-frames or information that can precede or follow the event. Time intervals, such as those preceding, including and following an incident, can be utilized to ascertain and compile all related sensor and system data, encompassing full system tracking, which may be packaged and saved locally. This process can be performed at the network level.

Alarm communications can be initiated, for example, at the network level. Communications can be authenticated, abstracted via VPN as configured, traced, logged, and confirmed through network handshakes as messages are sent, received, and states change. This process can be bypassed through direct communication to applications for emergency response which can be operated at the local system (e.g., hardware framework at the roadway intersection) or on the cloud. The technical solution can provide a network alarms management service that can determine the appropriate communication method (e.g., alarm or a request for emergency response service to arrive) as well as the location for contacting the relevant personnel.

For older systems or emergency services that do not employ custom applications, the call management service can be engaged. This service can manage emergency number lookups and auto-dials. Upon initiation of the call, an application implementing an AI voice communicator can convert a script into a human voice, conveying the relevant system and incident information (e.g., vehicle details, severity level or other data). The remainder of the communication can be managed by the AI voice service.

The system can provide an application management service that can communicate with target emergency services applications, passing along any relevant system and incident details. If the custom application includes direct methods to access further system information and control, this may facilitate enhanced interactions. The service may also include notification indicators and prioritization based on type and severity through an interface.

Incident and system information can be transmitted using text messages, emails, or pager services. Emergency personnel can receive training to navigate these systems effectively. Alarms can send out warnings to municipal maintenance or service support personnel. Emergency personnel can leverage applications to communicate directly with maintenance or support personnel.

Upon receipt of incident information, emergency personnel or support/maintenance personnel can begin to act upon the evaluated circumstances. Actions can include reviewing net system states, metrics, raw sensor data, incident data packages, curated sensor data such as detection information, network system control for optimal route planning and preemption for emergency personnel, local control for system emergency response signage, and personnel dispatching.

Referring now to FIG. 8, a flow diagram of an example method 800 for providing incident detection is provided. The method 800 can be implemented using the data processing system 200 performing the acts 802-836. At 802, an incident detection application can be initiated. At 804 an incident (e.g., a vehicle crash) can be detected by sensors. At 806, a local system can perform handshake via messages to the cloud system to initiate a session. In some configurations, the local system can directly communicate with a targeted emergency system. At 808, the cloud system can initiate an alarms management service at the cloud system. At 810, the method can select an action (e.g., an alarm method) based on the configurations, incident type or severity level of the incident. At 812, data and sensor interval recordings can be stored at the cloud system.

At 814, the method can initiate the preconfigured script and communications models on the cloud system. Based on the selection at 810, a call can be made to the call management service. At 818, the call management service can initiate dialing of the emergency service. At 820, the preconfigured script and communication models can be initiated to complete the call or provide any remaining information.

At 822, based on the selection at 810, the method can initiate an application management service. At 824, the method can connect to an internal or external application service. At 826, based on the selection at 810, the method can initiate alternative communication management services, such as email, text messages or pagers to send information or data on the incident.

At 828, the method can pass the system information to emergency services. At 830, the method can include the personnel or a system at the emergency service review the information sent. At 832, the method can include the system directly review, connect to, or control intersection or system. For example, the method can initiate and send alarms or signaling to signaling devices to indicate the incident or facilitate a prompt response by the emergency vehicles. At 834 the method can produce or provide a route that will take the emergency response vehicle the shortest amount of time to reach the location of the incident (e.g., the optimal route). At 836 the method can include triggering the emergency service to dispatch the emergency personnel, such as an ambulance, a police vehicle or a fire station.

Figure 9:
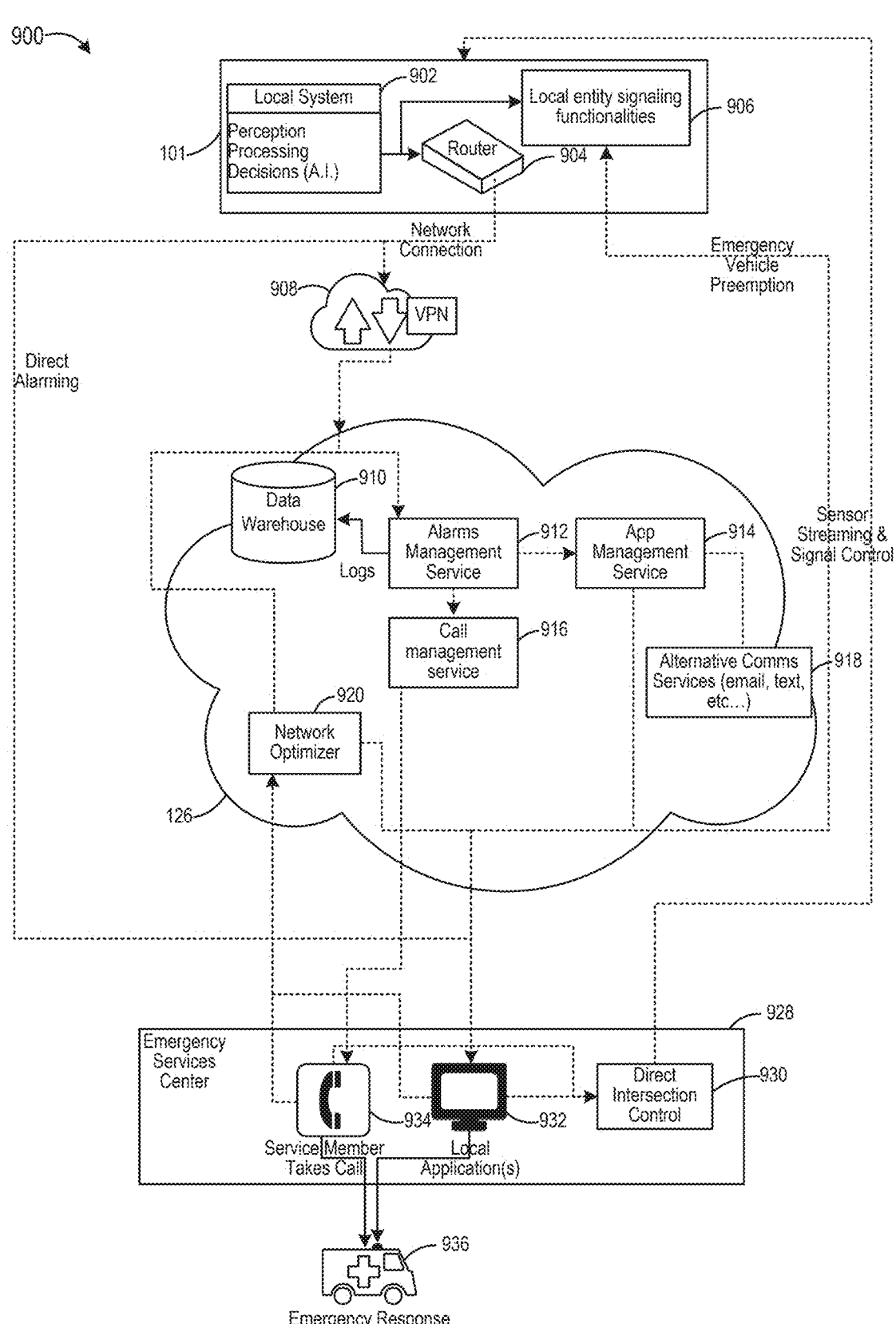

FIG. 9. illustrates an example system 900 for providing incident detection based signaling. The example system 900 can include any functionality of examples system 100 including a data processing system 200. A hardware infrastructure 101 can include a local system 902 deployed at, or near, a roadway intersection along with a router 904 and a local system 902 with local entity signaling functionalities (e.g., signaling devices). Router 904 can be used for connecting the hardware infrastructure 101 with a cloud system 126 (e.g., via a network, such as a VPN). The cloud system 126 can include a data warehouse 910 and an alarms management service 912, which can include an application for routing alarms or instructions to appropriate communication channels or technologies to provide incident information. An application management service 914 can provide application handshakes with emergency services applications to forward the incident data (e.g., via email or texts). Call management service 916 can manage emergency service dialing and communications via generative AI or other models. A network optimizer 920 can include a functionality for planning a shortest or quickest (e.g., optimal) emergency vehicle route to the location of the incident (e.g., to arrive at the destination in the least amount of time). The data processing system can operate via network optimizer 920 to manage or instruct signaling devices along the path (e.g., along one or more intervening roadway intersections) to override the local system signals and signaling device schedules to provide signaling for unimpeded or uninterrupted throughput or travel of the emergency vehicle via these intersections to expedite the emergency vehicle trip to the destination. Emergency services center 928 can include a system associated with an emergency service (e.g., police, firefighters or ambulance). The call management service 916 can include a service member call system 934 at which the service member can take the call and receive the data and local applications 932 for processing data and providing an instruction via a direct insertion control 930.

Figure 10:
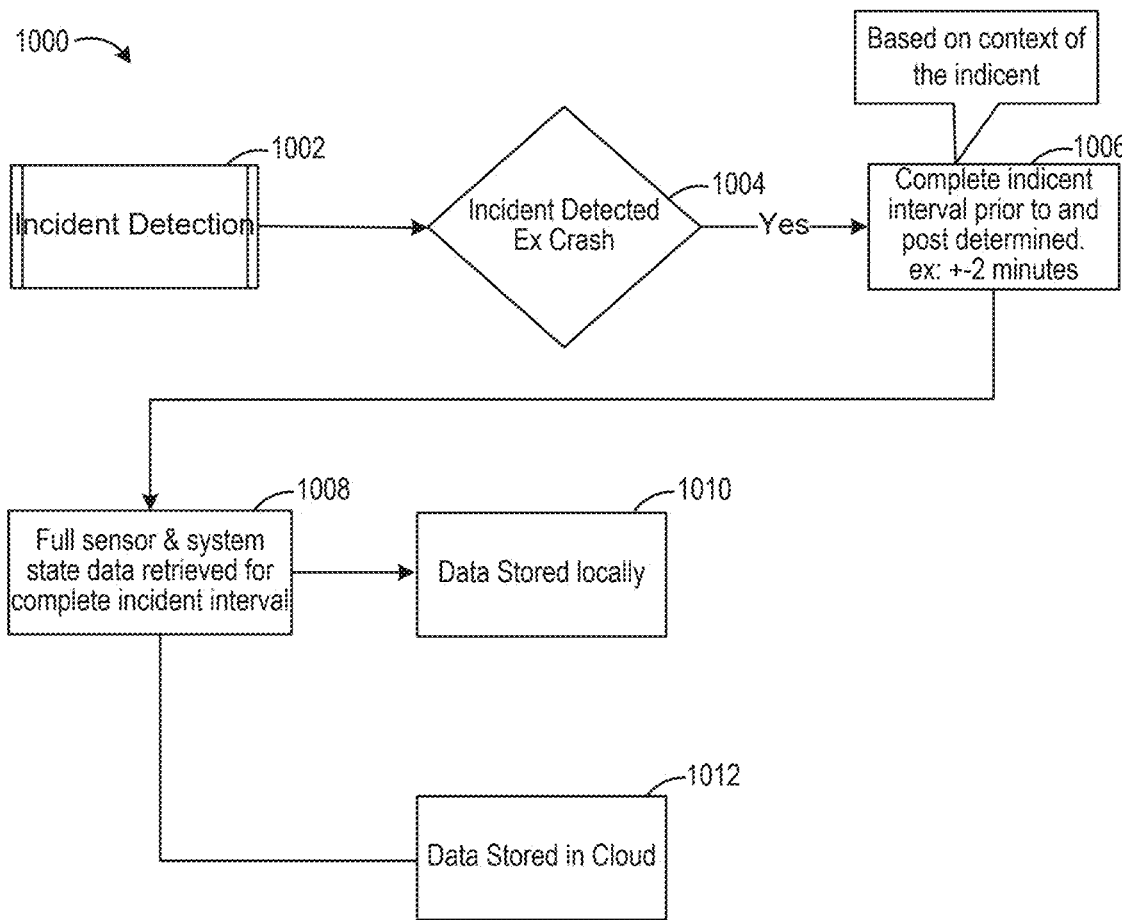

FIG. 10 illustrates a flow diagram of an example method 1000 for storing of data related to incident. The method 1000 can include acts 1002-1012. At 1002, the method can initiate the incident detection system. At 1004, the method can detect an incident, such as a car crash. At 1006, a stream of data (e.g., camera and sensor data) preceding and following the incident can be identified for analysis. For instance, data can be selected to include up to two minutes prior to the incident and up to two minutes following the incident, based on the context of the incident (e.g., severity of the crash, duration of incident, etc.). At 1008, the sensor and system state data can be retrieved for complete incident interval. At 1010, the data can be stored locally (e.g., on a storage device of the hardware infrastructure 101). At 1012, the data can be stored on the cloud (e.g., a storage device on a cloud system).

For example, when two traffic objects (e.g., vehicles) collide at an intersection, the intersection's sensors and hardware infrastructure can detect the collision automatically. The intersection signaling devices can change the modes to flashing red lights and warning signs. The local intersection can send a request to the cloud to contact emergency services. An emergency services application can receive a high priority that can provide the data on the incident in real-time. The information describing the incident can be generated by the data processing system 200 (e.g., using ML models) and can be included in summary and detailed click throughs such as at a glance info: Intersection location (e.g., names of roadways+maps), number of involved vehicles, estimated crash profile (e.g., head-on, T-bone, etc.), estimated crash severity (based on prior velocities and visual assessment), other detected crash attributes such as fire or roadway hazards.

In some configurations, the cloud system can dial an emergency response services number (e.g., 911) or otherwise initiate a session (e.g., a voice conversation or a chat communication) using ML models (e.g., generative AI). The cloud systems can describe the location, severity, and other details of the incident. Based on the information, which can be displayed on a client device or a workstation of a user (e.g., dispatcher), the dispatcher can review the scene and determine or validate if the crash was sufficiently severe to warrant a police call or an ambulance. Based on the reviewed information (e.g., generated and provided to the client device) the user can determine to dispatch the nearest free police or emergency response vehicles.

The vehicles can be assigned and the system can use live traffic conditions to select a fastest (e.g., optimal) route to the incident location, guiding the vehicles using a map that can be displayed on a user interface. In some implementations, a user (e.g., a dispatcher) may utilize a user interface showing a digital twin or video recordings of one or more intersections to adjust the route and signaling along the route via the user interface (e.g., on a discretionary basis, such as in emergency situations). As each vehicle approaches an intersection, the intersection can pre-empt their direction (e.g., using global positioning system or GPS signals) to identify the vehicle locations and to modify the signaling along the specific lanes and routes used by the vehicles to provide dynamic signage indicating emergency vehicles are passing through (e.g., to speed up the response). In some implementations, prior to approach of the vehicles, the intersection may be prepared by controlling the signaling devices. For instance, signage and alerts, including audio and V2X signals, can be used to indicate approach or presence of emergency vehicles to more rapidly clear the road. In some implementations, specific objects may be called out to move or clear the path. As the technical solutions of this disclosure allow for the emergency services to arrive to the scene of the incident earlier or faster than is the case with other solutions, the emergency personnel can provide the appropriate medical services to any injured persons in the incident improving the odds of survival and recovery. Similarly, as the response can arrive sooner, the police can more quickly resume controlled traffic flow and congestion, conserving the energy (e.g., gasoline in motor vehicles or electrical power in electric vehicles) thereby reducing pollution or greenhouse gas emissions by improving the efficiency of the traffic.

Figure 11:
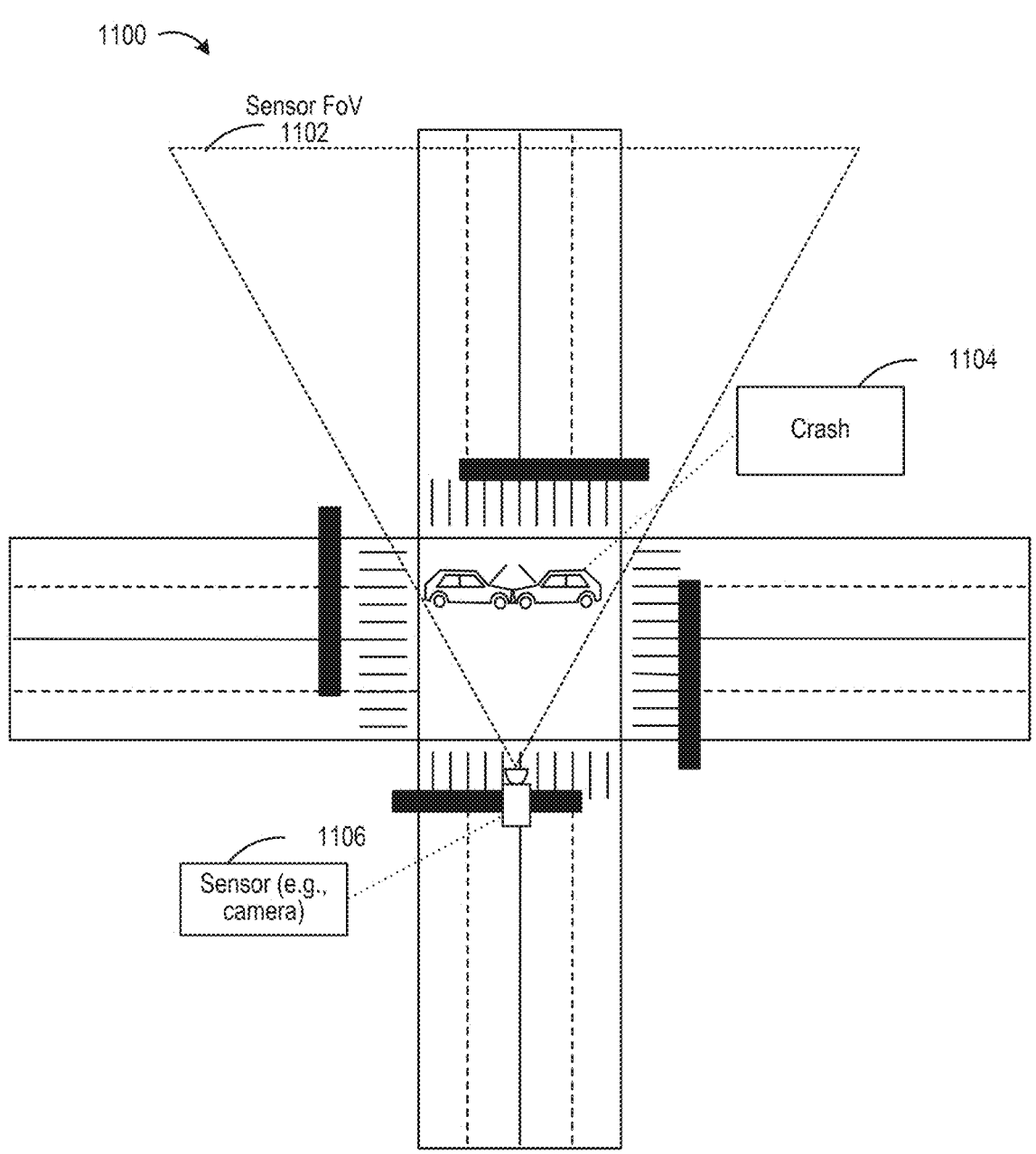

FIG. 11 illustrates an example of a roadway intersection 1100 that is monitored by a sensor 1106. The sensor 1106 can include a detection system 108, such as a camera with a field of view (FOV) 1102, which can span a range of angles about an axis of the sensor 1106. The FOV 1102 can cover a range of about 90, 120, 140, 180 or more than 180 degrees. The FoV 1102 can cover or capture a range of angles corresponding to an incident or a crash 1104 (e.g., a vehicle collision) that can occur at the intersection 1100 and can be detected by the sensor 1106.

Figure 12:
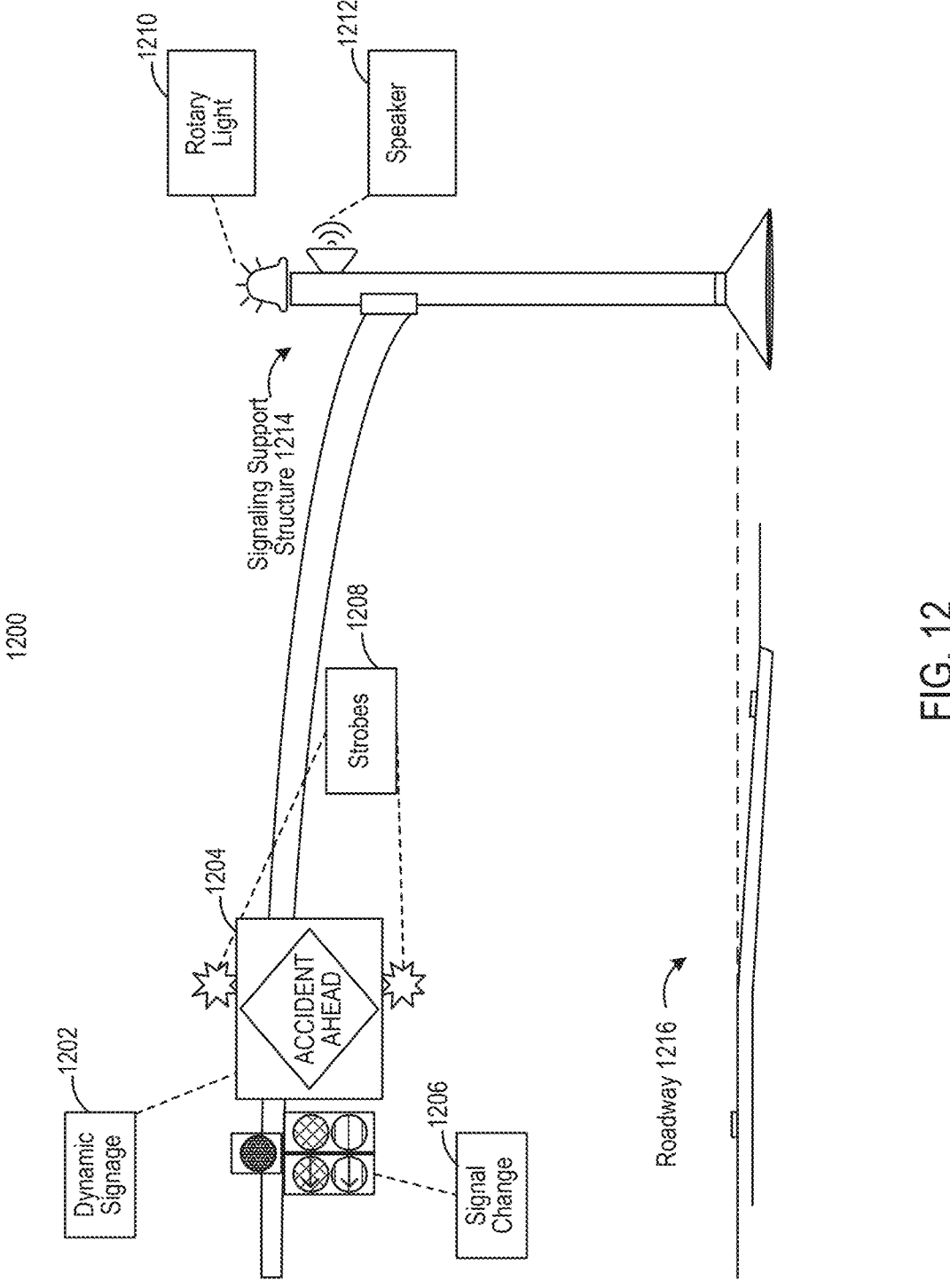

FIG. 12 illustrates an example of a signaling infrastructure 1200 that can be used for roadway signaling, such as a signaling along a path through which emergency vehicles are rushing to reach a location of an incident. The signaling infrastructure 1200 can include various signaling devices that can be configured (e.g., responsive to a detected incident) to prioritize certain route movement over others in order to speed up the path of the emergency vehicles. The example signaling framework 1200 can include a signaling support structure 1214 that can be deployed or mounted at, near, or adjacent to a roadway 1216 (e.g., such as a street or a road of an intersection). The signaling support structure 1214 can include support or be coupled with or attached to one or more signaling devices 124. Signaling devices 124 can include, for example, a dynamic signage 1202, a signage device 1204 or a signaling change 1206 which can include a signaling device that can be reconfigured to indicate an incident. The signaling support structure 1214 can include strobes 1208, one or more rotary lights 1210 and a speaker 1212 for providing audible alerts or signals.

Figure 13:
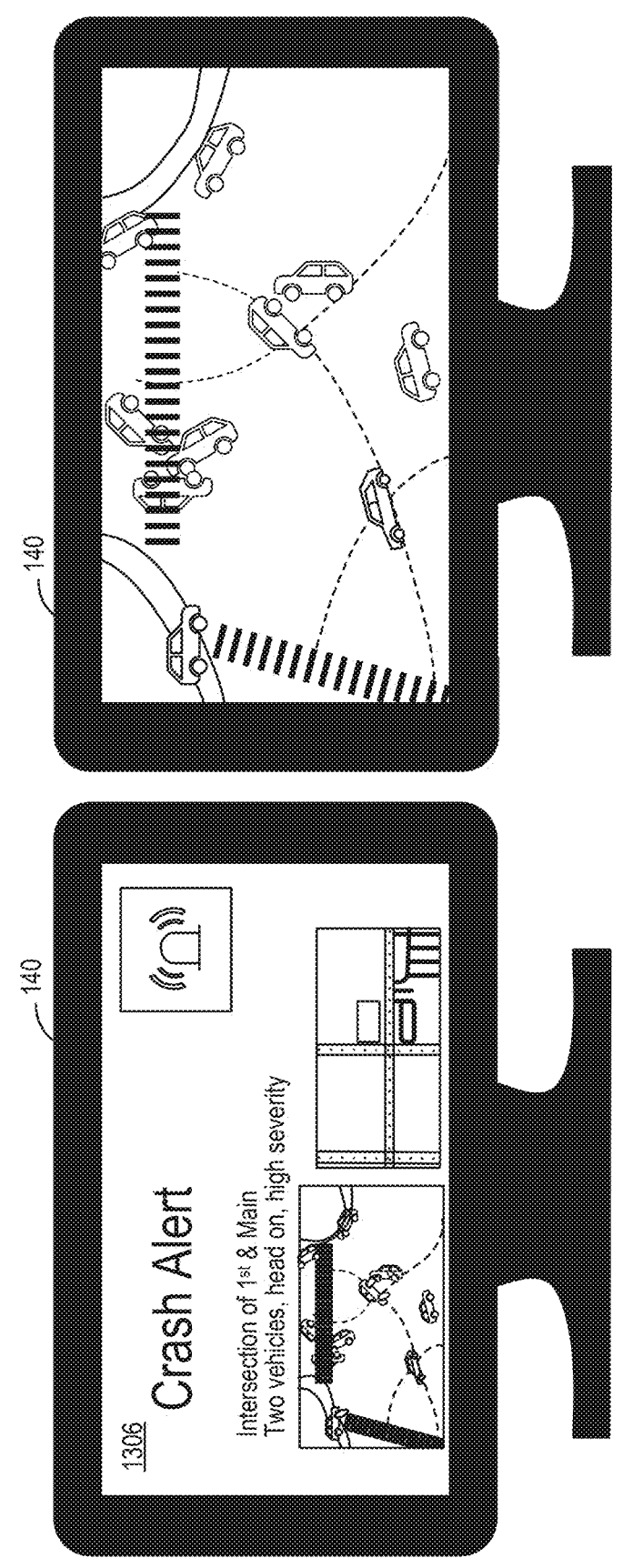

FIG. 13 illustrates an example of a workstation 1300 having client devices 140 providing or displaying a user interface 1306. The user interface 1306 can include any user interface of an application that can be accessed by, used by, or executed on a client device 140. The workstation 1300 can be used by one or more users to monitor the roadway intersection and traffic objects therein. The user interface 1306 can provide or display, on the client device 140, information about a crash (e.g., a crash alert) indicating the type of the incident and the severity.

Figure 14:
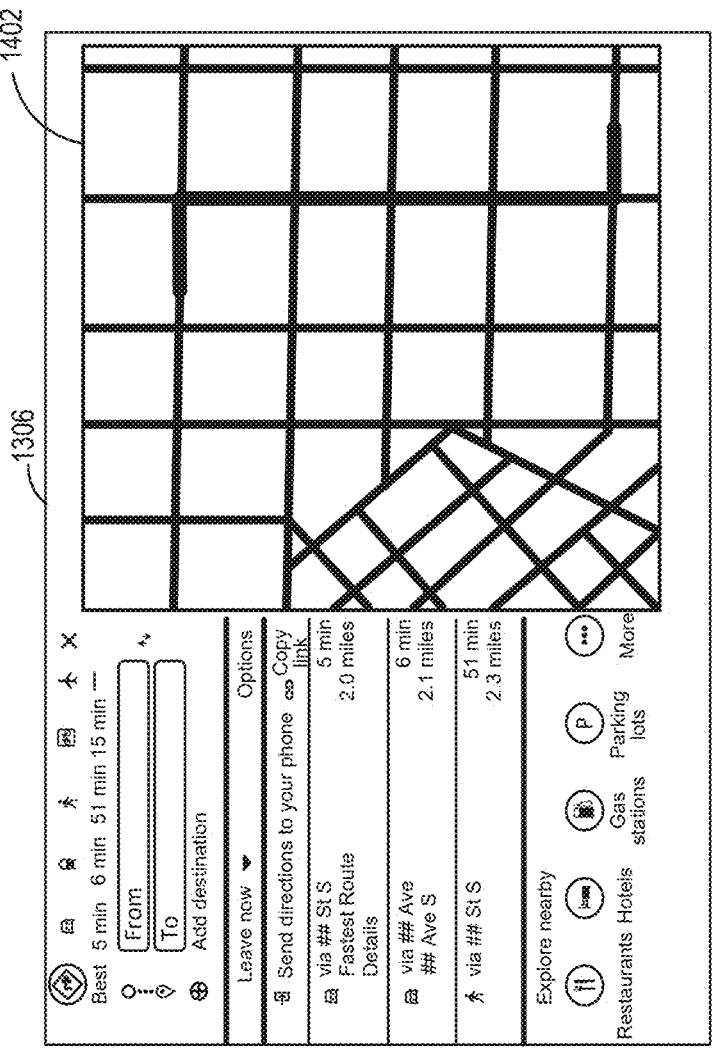

FIG. 14 illustrates an example of a user interface 1306 depicting a map 1402 of directions of a shortest or most optimal route to take from the emergency vehicle station to the location of the incident. The user interface 1306 can be provided on client devices 140 (e.g., smartphones, tablets or computers) of the emergency station personnel or monitoring station (e.g., workstation 1300).

Figure 15:
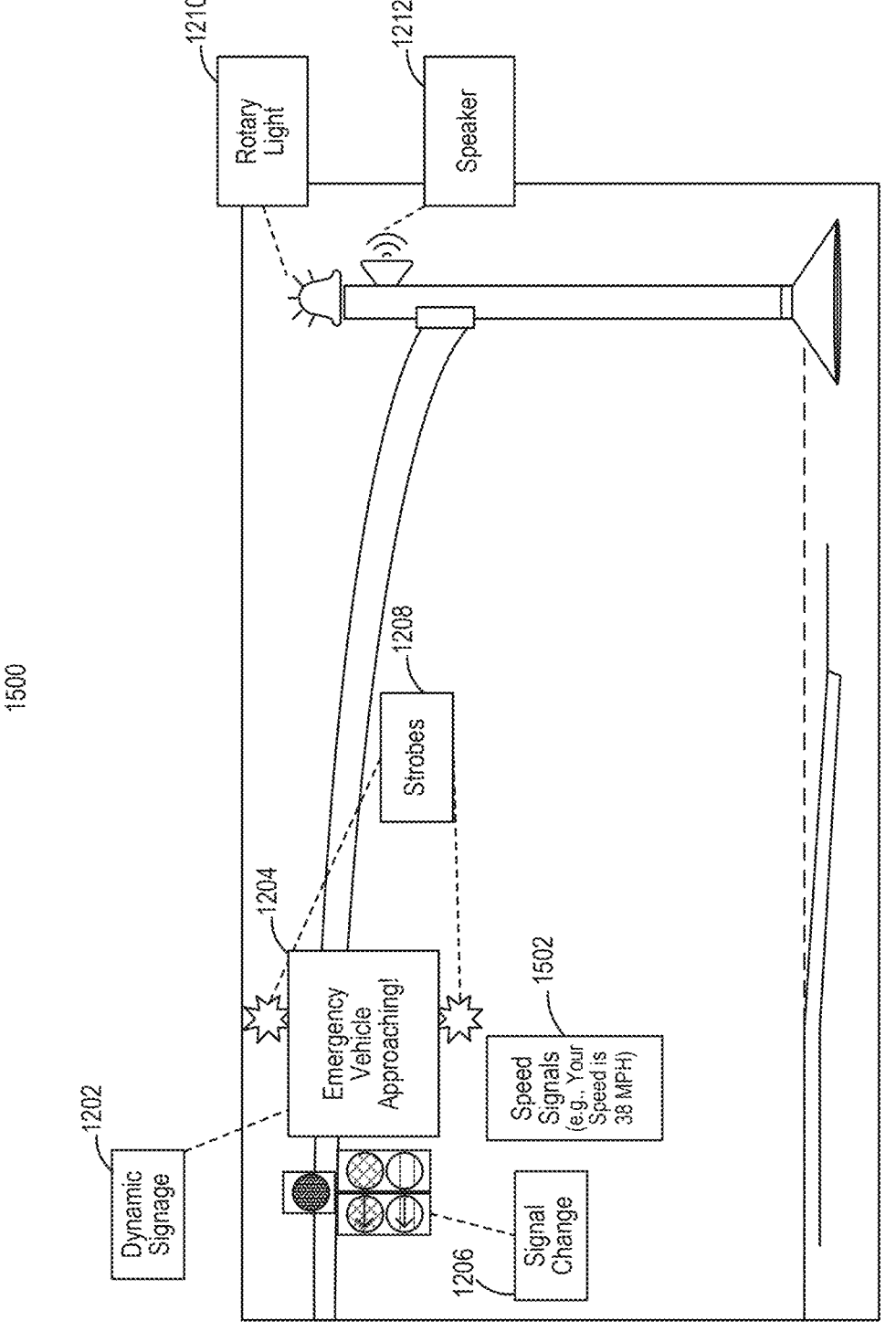

FIG. 15 illustrates an example of a signaling infrastructure 1500 that can include various functionalities or features of a signaling infrastructure 1200 of FIG. 12 and vice versa. The signaling infrastructure 1500 can include one or more dynamic signages 1202, signal change 1206 devices, signage devices 1204, strobes 1208, rotary lights 1210 and speakers 1212. The signaling infrastructure 1500 can include speed signals 1502 that can be configured to provide or display a value of a measured speed or velocity of the incoming vehicles in real-time.

Figure 16:
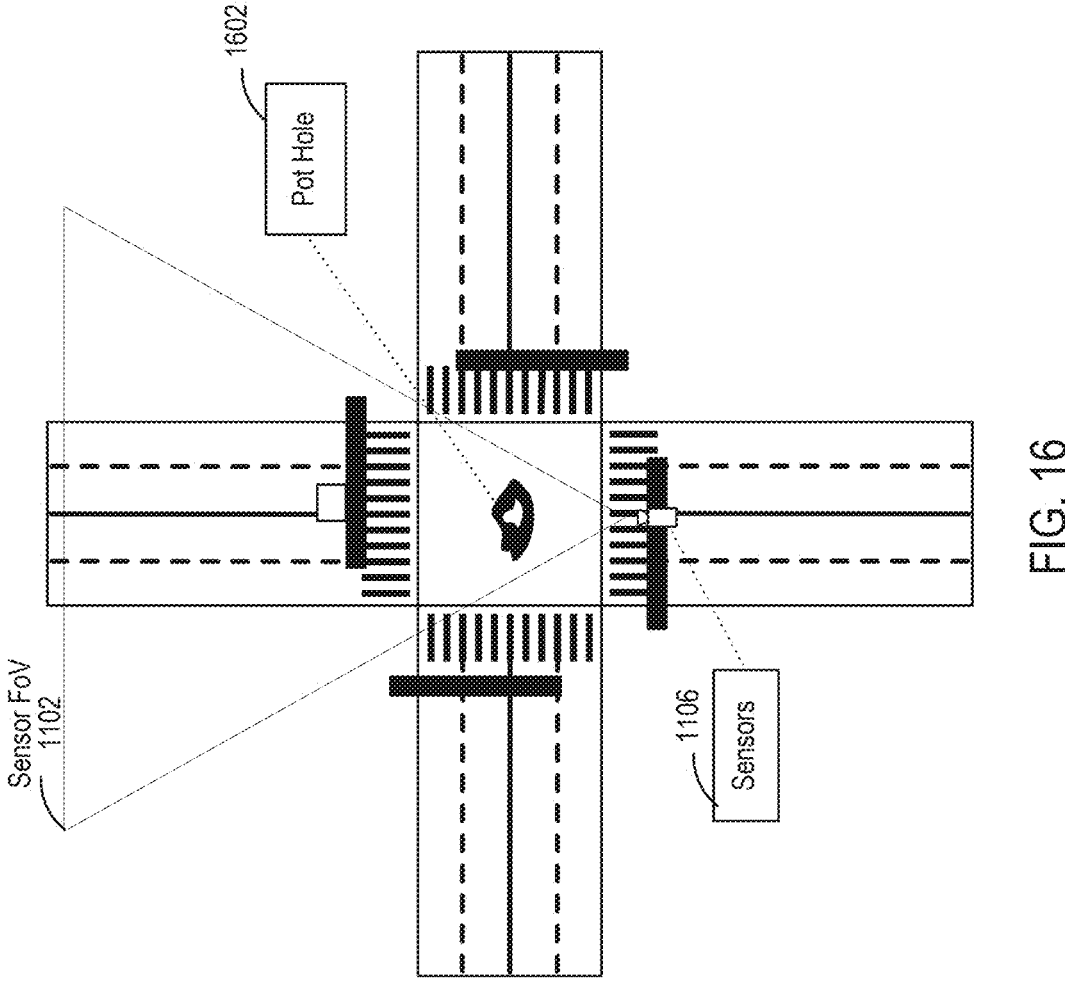

FIG. 16 illustrates an example of a roadway intersection 1600 similar to the one in FIG. 11. The roadway intersection 1600 can be monitored by a sensor 1106 which can include a detection system 108, such as a camera monitoring the intersection at a field of view (FOV) 1102 spanning a range of angles. The FOV 1102 of the camera can include a pothole 1602 at the intersection, allowing the sensor 1106 to capture data (e.g., images or video frames) of the pothole 1602, allowing the system to detect the presence of the pothole 1602 as an incident of a particular severity level (e.g. low severity or not as severe as a car crash).

For example, a pothole can develop on the roadway surface. The sensor suite can identify the pothole and determine (e.g., measure via image processing or machine learning) that it is large enough to flag or address. The local intersection can communicate this to the cloud which then passes along the message to the appropriate maintenance programs. Operations personnel can review the alert and remotely receive live sensor data, snapshots, and a summary of the alert's location and condition. Operations can then determine severity, schedule maintenance, and turn of or pause the alarm until after maintenance is completed. The intersection can mute the pot-hole alarms for that area of its FoV until after maintenance is completed. By addressing the incident, such as a pothole, the technical solutions can improve the traffic throughput and efficiency, thereby reducing greenhouse gases emitted by the traffic and improving energy efficiency of the vehicles involved in the traffic.

Figure 17:
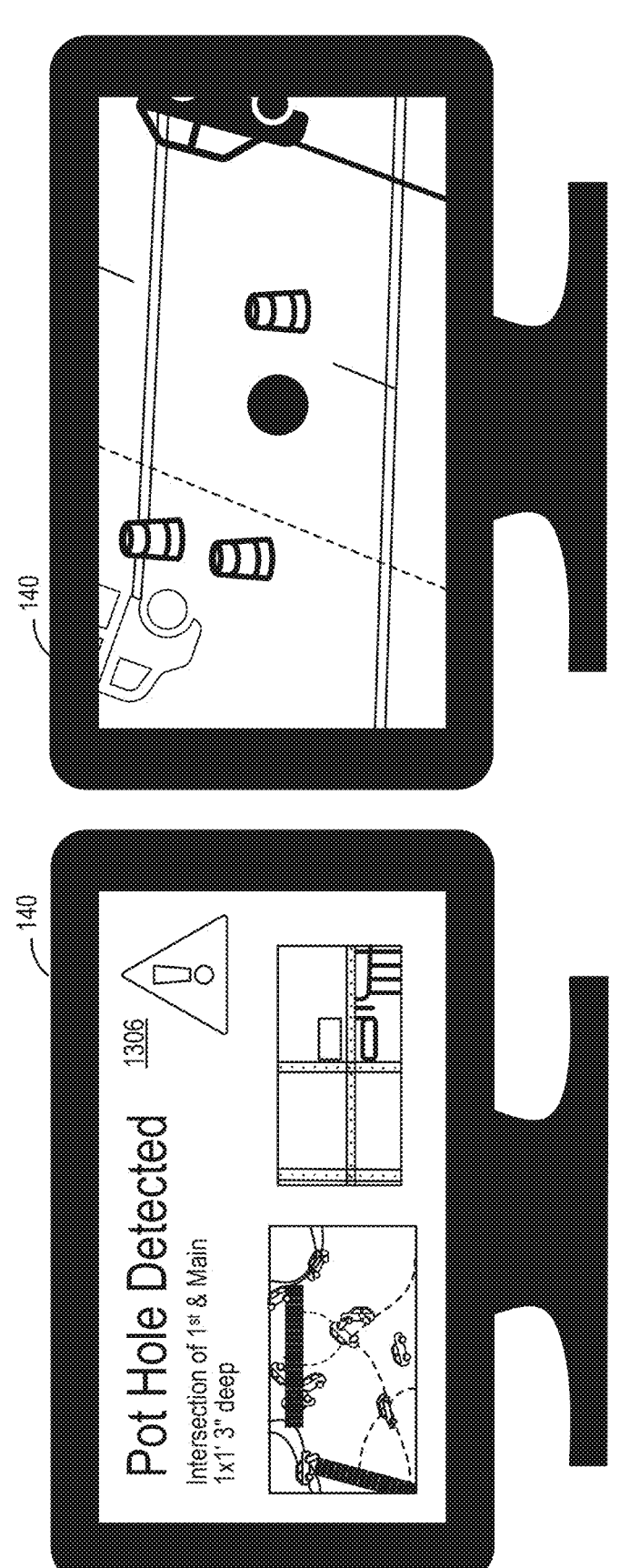
Figure 18:
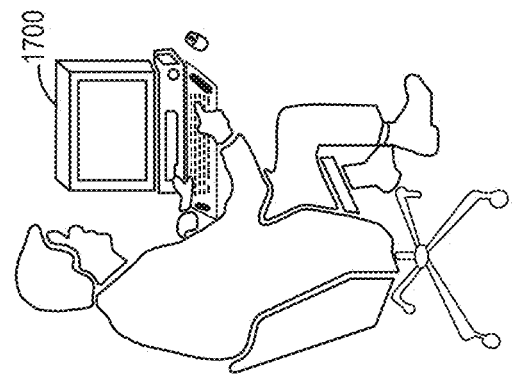

FIG. 17 illustrates an example of a workstation 1700 similar to the one shown in FIG. 13. The workstation 1700 can include client devices 140 displaying user interfaces 1306 that can provide to the user information on the incident from FIG. 16 (e.g., the pothole 1602) allowing for analysis and action to be taken by a user, such as the user illustrated in FIG. 18 utilizing the workstation 1700 (e.g., client device 140) to monitor the incident.

Figure 19:
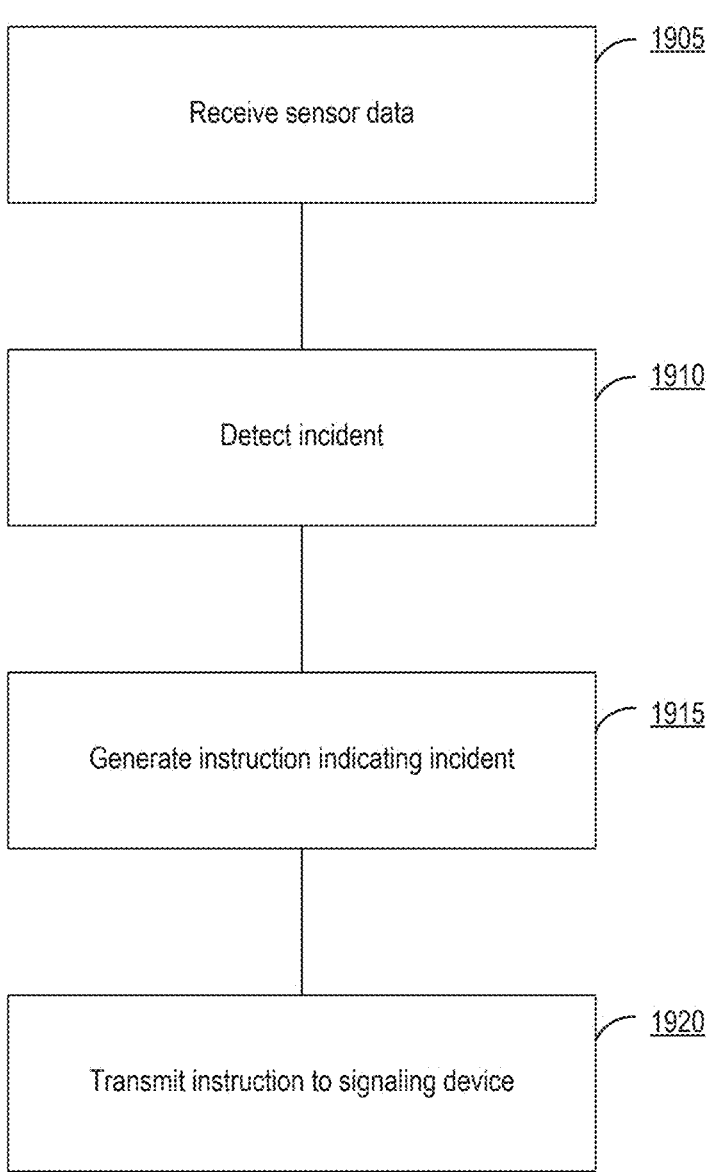
FIG. 19 illustrates a flow diagram of an example method for providing incident detection based signaling.

FIG. 19 illustrates a flow diagram of an example method 1900 for providing incident detection based signaling. The example method 1900 can be implemented using example systems 100 and 200, which can be executed via one or more processors (e.g., 310) coupled with memory (e.g., 315) that can store instructions and data to implement various functionalities of the method 1900. The example method 1900 can include acts 1905-1920. At 1905, the method can include receiving sensor data. At 1910, the method can include detecting an incident. At 1915, the method can include generating an instruction indicating the incident. At 1920, the method can include transmitting the instruction to the signaling device.

At 1905, the method can include receiving sensor data. The method can include one or more processors coupled with memory receiving, from a sensor device, sensor data. The sensor data can include data from sensors for or on a roadway intersection which can include one or more signaling devices to display signaling to traffic. The sensor data can include one or more two-dimensional frames of at least a portion of a roadway intersection. The two-dimensional frames can include rectangular arrays of digital data of a field of view of a portion at least a portion of the roadway intersection from a sensor (e.g., lidar, camera or a radar).

For example, a roadway intersection can be equipped with one or more sensors, such as cameras, lidars, radars, proximity sensors, seismic sensors, heat sensors or others devices, circuits or components for detecting traffic objects (e.g., motor vehicles, bicycles, pedestrians, animals or other objects). The sensors can be directed along one or more roadway paths or directions to monitor the traffic objects approaching the roadway intersection, crossing or traversing the roadway intersection or departing or moving away from the roadway intersection.

At 1910, the method can include detecting an incident. For example, the method can include a processor identify, within the one or more two-dimensional frames, one or more objects in motion at the roadway intersection. The method can include the processor tracking the one or more objects within the one or more two-dimensional frames to determine one or more object trajectories and one or more relative positions of the one or more objects. The processor can track the one or more objects using one or more object identifiers or labels associated with the one or more objects. Based on the identifiers or labels, the processor can monitor the movements of the objects across the frames and utilize timestamps of the frames and the distances between locations at which the object has moved to determine a path of movement for the object. The processor can detect, using the one or more object trajectories and the one or more relative positions, an incident corresponding to the one or more objects.

The method can include the one or more processors detecting, based on the sensor data input into a machine learning (ML) model trained on a plurality of sensor data on a plurality of roadway intersections, an incident involving an object. For example, the method can include a data processing system providing one or more ML models trained to detect incidents at, or near, the roadway intersection. The incidents can include, for example, collisions between two or more traffic objects (e.g., vehicles, bicycles or pedestrians) or accidents involving a traffic object and other objects (e.g., tree branches, animals, furniture or potholes).

The method can include the one or more processors identifying sensor data associated with the incident. The sensor data can be identified using, for example, an ML model trained to identify or detect sensor data indicative of an incident. The method can include the one or more processors training the ML model using the identified sensor data to adjust performance of the ML model for the roadway intersection.

The method can include the one or more processors providing to a user interface at a remote device, an input from a user monitoring the roadway intersection. The input can include, for example, a user selection or prompt with respect to the incident. The remote device can include a monitoring device for monitoring the roadway intersection or providing first response vehicles to address the incident.

At 1915, the method can include generating an instruction indicating the incident. The method can include the one or more processors generating an instruction. The instruction can identify a signal which can be indicative of the incident involving the object. The instruction can be generated based on the detection of the incident at act 1910. The instruction can include a command to signal, via a signaling device, that an incident has occurred and can be used to warn other traffic objects approaching the intersection. The instruction can be an instruction to provide or dispatch emergency vehicles to the scene of the accident (e.g., the roadway intersection). The instruction can include a request to send maintenance vehicles to the roadway intersection. The instruction can be generated, in response to determining that the incident is of a particular type or exceeds a particular threshold for severity.

The method can include the processor generating, responsive to detecting the incident, an instruction comprising data indicative of the incident and a control command to modify an operational state of the signaling device. The data indicative of the incident may include data that interrupts the signals for the signaling devices that are based on an ongoing schedule in order to display or provide a signal to address the incident.

The method can include the one or more processors generating a second instruction. The second instruction can be an instruction to provide a notification indicative of the incident to a remote device. The method can include the one or more processors generating a second instruction to override the prior or initial instruction. The second instruction can cause the signaling device to not display the signal indicative of the incident. The second instruction can be generated in response to a type of an incident or a determination that the incident has not exceeded a threshold severity sufficient to warrant the alarm.

At 1920, the method can include transmitting the instruction to the signaling device. The method can include the one or more processors transmitting the instruction. The instruction can be transmitted to the signaling device to display an output comprising the data indicative of the incident. The instruction can be transmitted to one or more signaling devices of the roadway intersection or one or more signaling devices of other roadway intersections in a geographical region. The instruction can cause the signaling device to display the signal indicative of the incident. The instruction can cause one or more signaling devices to route the traffic around the incident area.

For example, when generating a second instruction to provide a notification indicative of the incident to a remote device, the one or more processors can transmit the notification to the remote device. The transmitted notification can initiate a response by an emergency service to attend to the incident. The emergency service can include, for example, a fire engine, an ambulance, a police vehicle or any other service type. The notification to the remote device can include data of location of the incident and a map of most efficient route for the emergency service to arrive at the location of the incident.

In some implementations, when emergency services are requested the data processing system can identify one or more other sensor-deployed and controlled roadway intersections located between the emergency vehicle starting point and the destination, on the route between the starting point and the destination. The data processing system can identify one or more communicate and coordinate with controllers or data processing systems of such intervening roadway intersections to coordinate with signaling devices to prioritize the emergency vehicles over other traffic. For instance, the data processing system of a roadway intersection identifying an incident, may identify the origin of an emergency vehicle called to attend to the incident. The data processing system can identify, based on a map of a region comprising the destination roadway intersection and the origin of the emergency vehicle, one or more intervening roadway intersections between the origin of the emergency vehicle and the destination roadway intersection. The data processing system can then monitor the location of the emergency vehicle (e.g., via GPS signal or sensors (e.g., cameras) of intervening roadway intersections, and interrupt ongoing signaling schedules of signaling devices at such intervening roadway intersections in order to signal a green light to expedite and speed up the travel of the emergency vehicle via the one or more intervening roadway intersections and thereby reduce time it takes for the emergency vehicle to reach the destination roadway intersection.

For example, a data processing system can interrupt a signaling schedule of a first roadway intersection signaling device to force a green signal for the emergency vehicle in response to detecting or determining that the distance between the emergency vehicle and the first roadway intersection is less than a predetermined threshold (e.g., up to 50 m or 100 m). Once the emergency vehicle passes the first roadway intersection, the data processing system can monitor the progress of the emergency vehicle towards a second roadway intersection. In response to determining that the emergency vehicle distance to the second roadway intersection is now less than a predetermined threshold (e.g., 50 m or 100 m), the data processing system can interrupt or override the signaling device schedule at the second intersection to force a green light and thereby expedite the trip of the emergency vehicle towards the destination.

Section E—Reduced Transition Interval Based on Sensor Data

Roadway intersections frequently encounter challenges due to the limitations of traditional signaling systems, which often rely on static settings that do not adapt to real-time conditions. These systems may struggle to respond effectively to varying traffic patterns, environmental factors, and the presence of unexpected incidents. As a result, they can lead to increased congestion, longer wait times for vehicles and pedestrians, and a heightened risk of accidents. The inability to optimize signaling based on current data can also impede the optimal flow of traffic as well as emergency response efforts, delaying assistance when incidents occur, and contributing to greenhouse gas emissions.

To address these challenges, the proposed system utilizes advanced machine learning algorithms and real-time sensor data to dynamically manage traffic signaling at roadway intersections. This system can identify a setting for signaling that incorporates multiple predetermined phases applied according to specific time intervals. By analyzing data from various sensors—such as cameras and lidar—the system can assess the movement of objects and environmental conditions at the intersection. It then determines a reduced transition interval for timing based on this data and adjusts the signaling settings accordingly. Additionally, the system generates instructions for signaling devices to operate based on these adjustments, ensuring that traffic flow is optimized and safety is enhanced at all times. This proactive approach not only improves efficiency but also facilitates timely responses to incidents, ultimately fostering a safer roadway environment that reduces greenhouse emissions.

Figure 20:
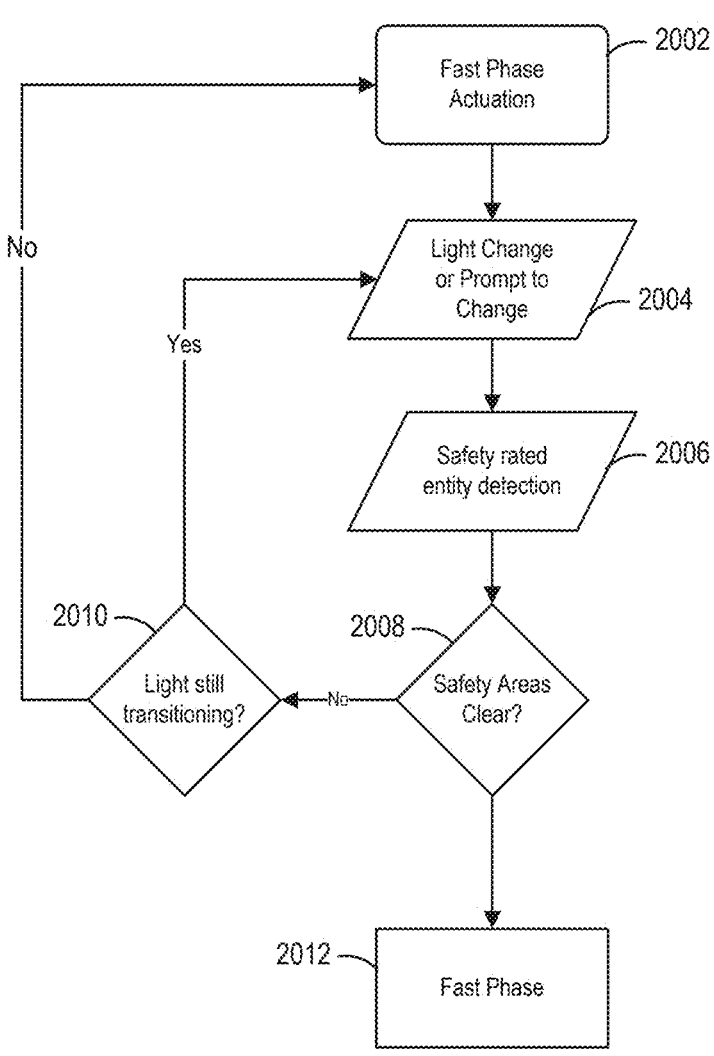

FIG. 20 illustrates an example flow diagram of a method 2000 for providing a reduced signaling transition interval based on sensor data. The method can be implemented using example systems 100 and 200, which can be executed via one or more processors (e.g., 310) coupled with memory (e.g., 315) that can store instructions and data. The method 2000 can include acts 2002-2012.

At 2002, the method can include initiating a fast phase actuation. The fast phase actuation can include a configuration to automate or adjust phasing of the signaling device during operation. The initiation can occur in response to the light not being transitioned (e.g., responsive to a negative output from 2010). At 2004, the method can identify or detect the light change or prompt to change the light. For instance, the method can utilize adaptive loop, for any type of signal change interval, or prompt to change can provide interval until the change. At 2006, the method can implement a safety rated entity detection (e.g., determine if there are safety rated areas, such as areas to be clear of objects for a particular traffic flow to commence).

At 2008, the method can determine if the areas (e.g., configured or safety areas) are clear. At 2010, the method can determine if the light is still transitioning. If the light is transitioning, the method can loop back to 2004 to change the light or prompt to change the light. If the light is not transitioning, the method can loop back to 2002. At 2012, the method can implement the fast change by immediately changing the signaling (e.g., changing the light) to the next phase, skipping any safety or delay transitions (e.g., responsive to determining that safety areas area clear of objects). The method can include changing light signaling to next phase, skipping any safety or delay transitions (e.g., yellow change interval, red clearance or walk interval)

FIG. 21 illustrates an example flow diagram of a method 2100 for providing an expedited signal adjustment or signal changing based on roadway traffic sensor data. The method can be implemented using example systems 100 and 200, which can be executed via one or more processors (e.g., 310) coupled with memory (e.g., 315) that can store instructions and data. The method 2000 can include acts 2102-2114.

At 2102, the method can initiate or start a change of a signaling interval. The start can trigger a change just before the right of way change to potentially skip any change interval signals (e.g., skip yellow light and go to green directly in response to object presence). In some instances, the signal can loop continually through each change interval signal. At 2104, the system can detect an object (e.g., a vehicle or a pedestrian) using sensor data and can detect object characteristics (e.g., bicycle of bicyclist, a type of a car, such as a truck, a pedestrian with a stroller, etc. . . . ). At 2106, the method can determine if any objects or entities are present at the intersection. At 2108, the method can determine if there are any objects or entities detected on the approach side an active direction.

At 2110, the method can determine the pull configuration for on-approach area. For instance, in a case in which the system is to reach and stop to a red base on the target stop point to avoid a collision, the method can take action to preserve safety. For instance, real input parameters can be used in a predictive method. For instance, there can be a configuration, according to a threshold scenario (e.g., worst case scenario), for a distance to react and stop to a red base on the target stop point (e.g., signal wait location for each lane or direction). The configuration can be based on an assumed largest size or smallest size entity (e.g., oversized loaded truck or a pedestrian), or an assumed maximum speed or an assumed maximum reaction time, thereby computing on-approach area timing based on these assumptions. At 2112, the method can determine if there are any entities in the on-approach areas. At 2114, the method can trigger the fast phase (e.g., triggering of the early signal phase to facilitate a more efficient traffic flow and take advantage of the opportunity to let the object pass through).

Figure 22:
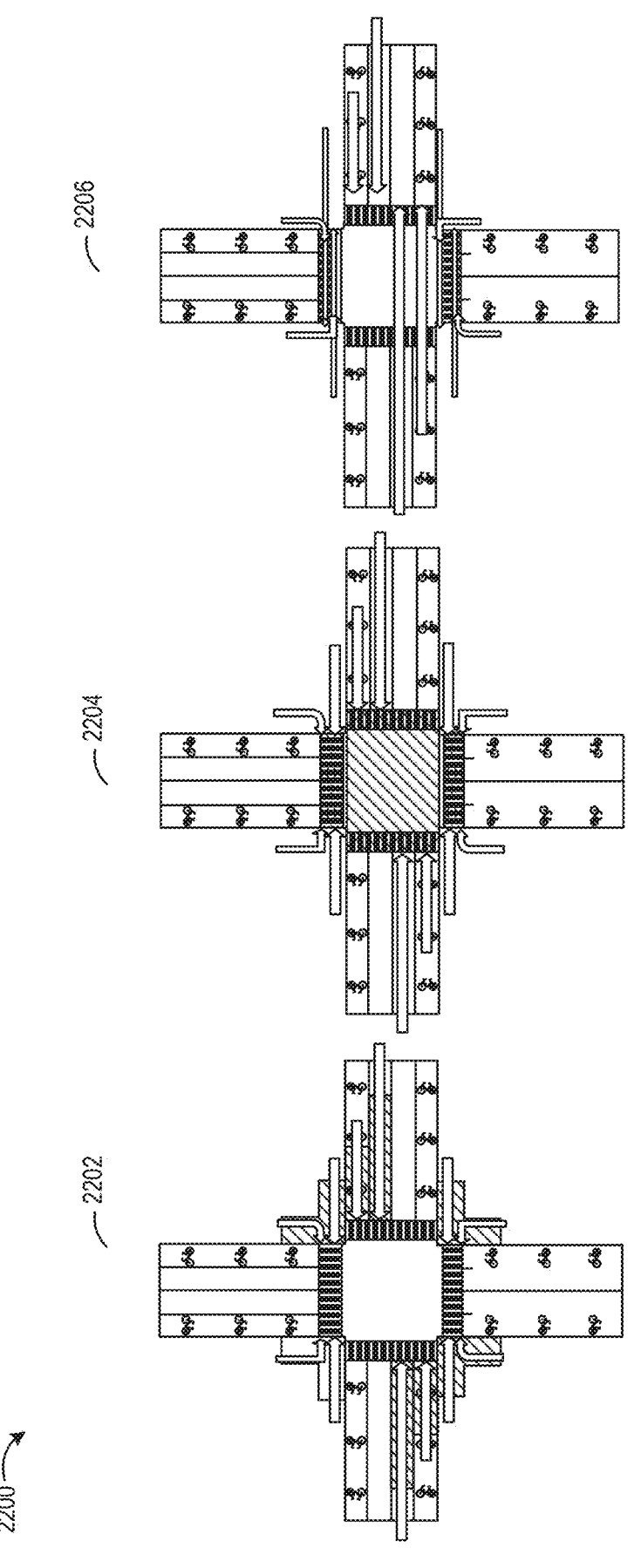
Figure 23:
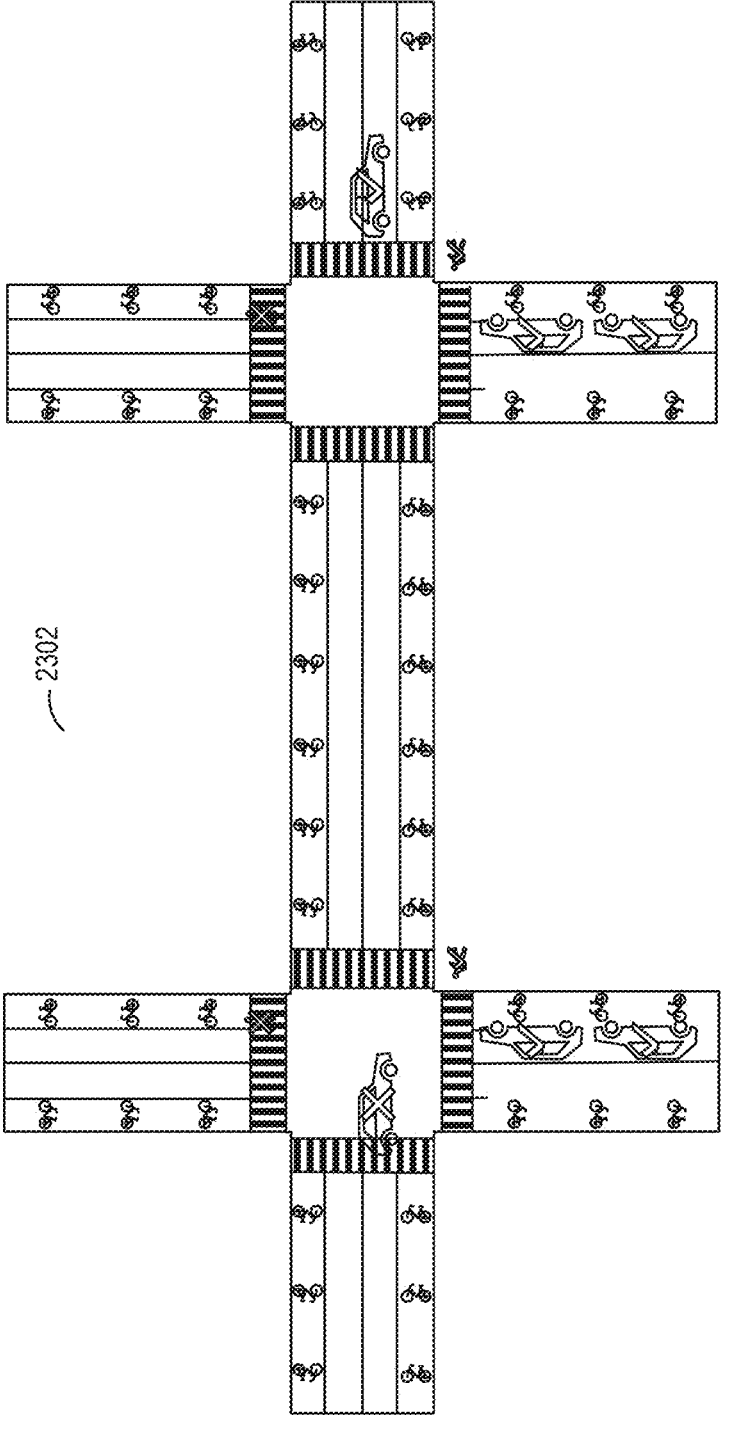
Figure 24:
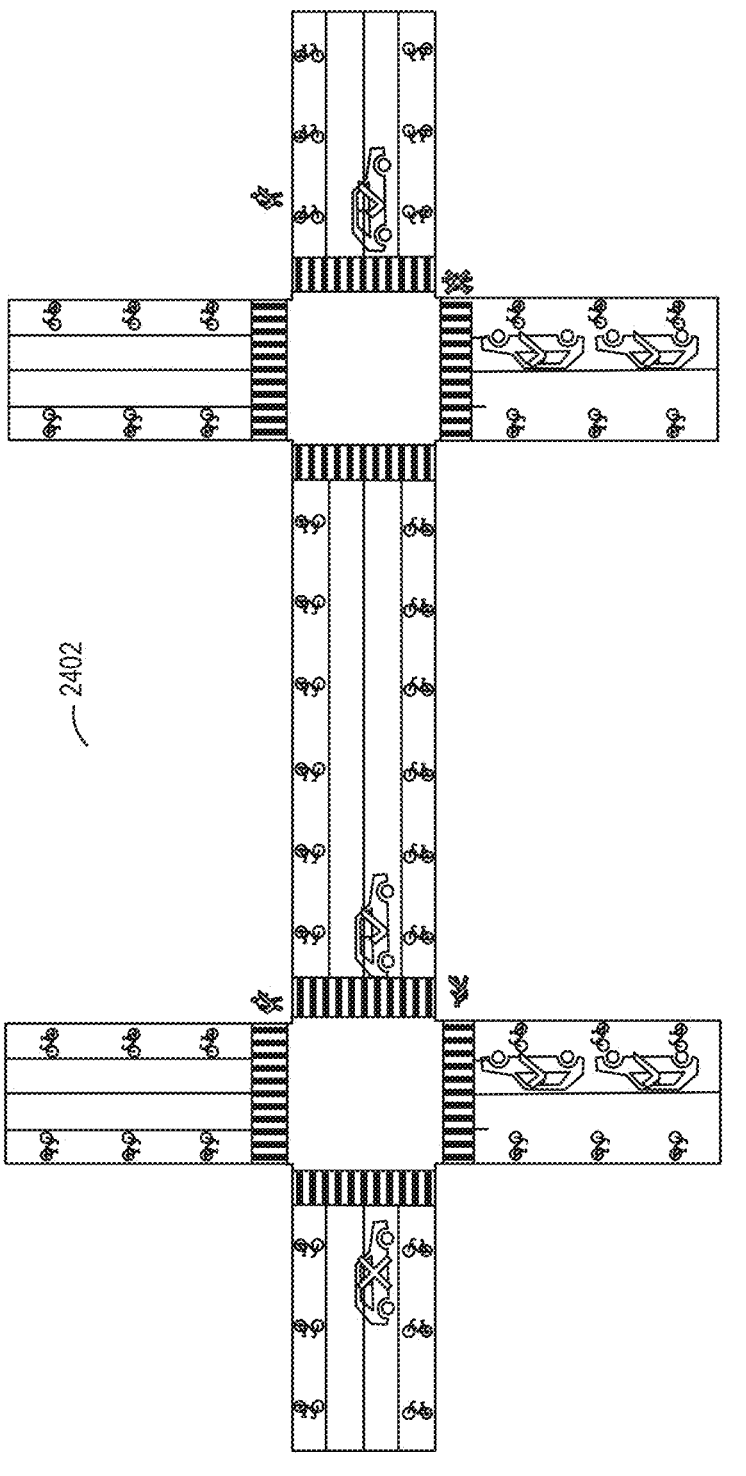
Figure 25A:
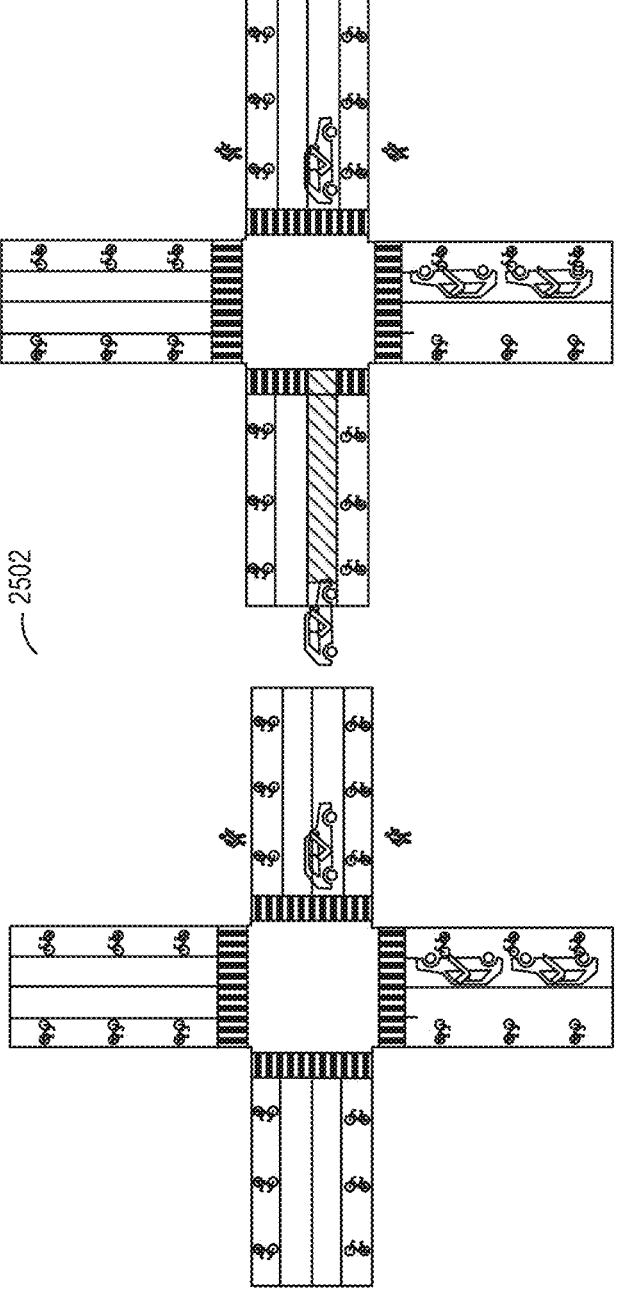

FIGS. 22-25A are directed to various examples of roadway intersections with objects (e.g., traffic entities) present. FIG. 22 illustrates examples of intersections 2202, 2204 and 2206 in which various types of traffic (e.g., pedestrians, vehicles, bicycles) can flow down their designated paths. FIG. 23 illustrates an example of two interconnected roadway intersections 2302 with their traffic paths and types of traffic, where some of the objects (e.g., vehicles) are marked as present in the intersection (e.g., marked with X), while others are outside of the intersections (e.g., marked with checkmarks). FIG. 24 illustrates an example of two interconnected roadway intersections 2402 with their traffic paths and types of traffic, where some of the objects (e.g., vehicles) are marked as present in the on-approach areas (e.g., marked with X), while others are outside of those areas (e.g., marked with checkmarks). FIG. 25A illustrates an example of two roadway intersections 2502 with the on-approach areas that are marked and traffic that is marked based on its presence of those areas.

Figure 25B:
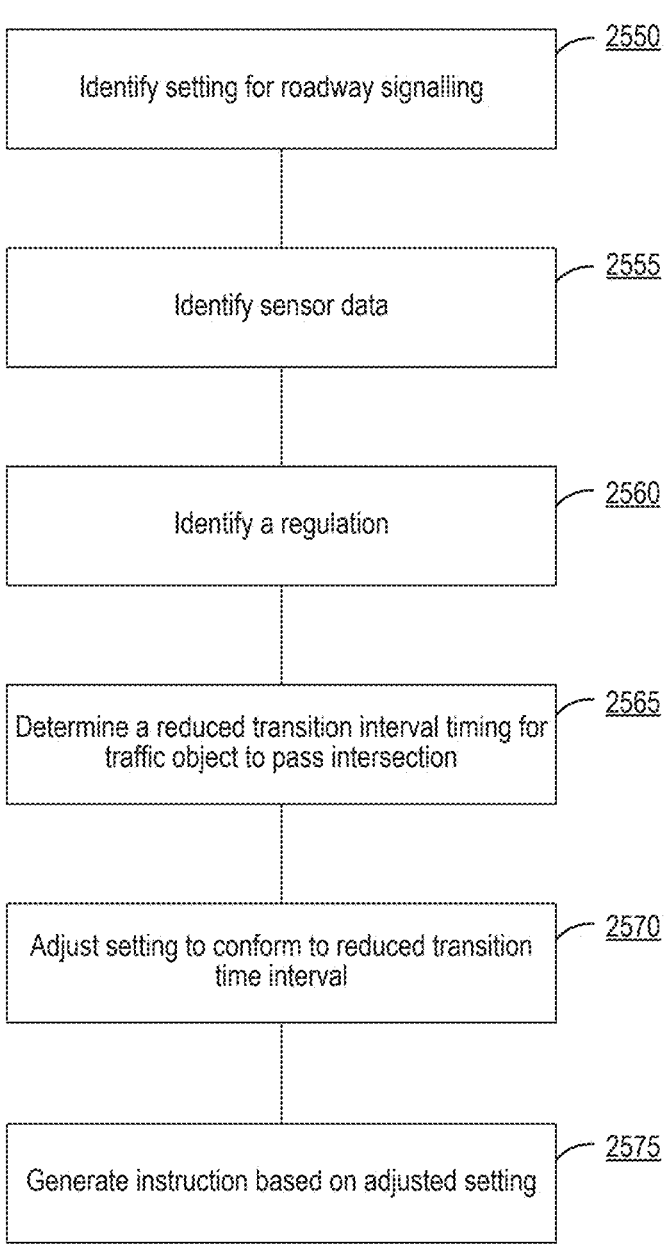
FIG. 25B illustrates a flow diagram of an example method for providing reduced transition interval based on sensor data.

FIG. 25B illustrates a flow diagram of an example method 2500 for providing reduced transition interval based on sensor data. The example method 2500 can be implemented using example systems 100 and 200, which can be executed via one or more processors (e.g., 310) coupled with memory (e.g., 315) that can store instructions and data to implement various functionalities of the method 2500. The example method 2500 can include acts 2550-2575. At 2550, the method can identify a setting for roadway signaling. At 2555, the method can identify sensor data. At 2560, the method can identify a regulation. At 2565, the method can determine a reduced transition interval timing for a traffic object to pass the intersection. At 2570, the method can include adjusting the setting to conform to the reduced transition time interval. At 2575, the method can include generating an instruction based on the adjusted setting.

At 2550, the method can identify a setting for roadway signaling. The method can include one or more processors coupled with memory identifying a setting for signaling at a roadway intersection. The setting can include one or more predetermined phases applied according to predetermined time intervals. The phases can be used to control movement of objects across the roadway intersection. The phases can correspond, dictate or indicate timing of signal shifts, signaling turn on and turn off times or signaling order. The object for which the signaling is used can include at least one of a vehicle, a bicycle, or a pedestrians.

At 2555, the method can identify sensor data. The method can include the one or more processors identifying data from one or more sensors on one or more objects and one or more environmental conditions at the roadway intersection. The sensor data can indicate presence, location, direction and speed of the objects (e.g., vehicles or pedestrians). The sensor data can indicate environmental conditions (e.g. weather, presence of snow or sleet, or values indicative of wind or temperature). The signaling device can include a dynamic signage feature configured to visually communicate a change in a signaling phase to an object approaching the roadway intersection.

At 2560, the method can identify a regulation. The method can include the one or more processors identifying a regulation indicative of a range of acceptable predetermined time intervals for the roadway intersection. The regulation can include settings, guidelines or threshold values for particular signaling parameters, signal phases or signaling schedule. The regulation can include maximum and minimum signaling values. The regulation can include or correspond to a document, a file or a setting, which can be utilized by the data processing system or the controllers to control the signaling.

The method can include the one or more processors receiving an updated regulation indicative of an updated range of acceptable predetermined time intervals for the roadway intersection. The method can include the one or more processors establishing, based on the regulation, a threshold distance to be maintained between a plurality of objects at the roadway intersection. The one or more processors can validate the setting based on the threshold distance.

At 2565, the method can determine a reduced transition interval timing for a traffic object to pass the intersection. The method can include the one or more processors determining a reduced transition interval for timing for an object to pass the roadway intersection in accordance with the regulation. The determination can be made based on the one or more objects, the one or more environmental conditions and the regulation input into a machine learning (ML) model. The ML model can be trained on a plurality of data on objects and environmental conditions at a plurality of roadway intersections and a plurality of regulations for roadway intersections. The ML model can be trained using historical data specific to the roadway intersection to train the ML model according to traffic patterns and environmental conditions at the roadway intersection.

The method can include the one or more processors receiving an updated regulation indicative of an updated range of acceptable predetermined time intervals for the roadway intersection. The method can include the one or more processors determining based on the updated regulation input into the machine learning (ML) model, an updated reduced transition interval for timing for an object to pass the roadway intersection in accordance with the regulation.

At 2570, the method can include adjusting the setting to conform to the reduced transition time interval. The method can include the one or more processors adjusting the setting to conform the predetermined time intervals of the setting according to the reduced transition interval. The method can include the one or more processors receiving an indication on traffic condition on the roadway intersection, and providing, by the one or more processors, access to the adjusted setting responsive to an input received at the user interface.

The method can include the one or more processors receiving an updated regulation indicative of an updated range of acceptable predetermined time intervals for the roadway intersection. The method can include determining, by the one or more processors, based on the updated regulation input into the machine learning (ML) model, an updated reduced transition interval for timing for an object to pass the roadway intersection in accordance with the regulation. The method can include adjusting, by the one or more processors, the setting to conform the predetermined time intervals of the setting according to the updated reduced transition interval.

At 2575, the method can include generating an instruction based on the adjusted setting. The method can include the one or more processors generating an instruction to a signaling device of the roadway intersection to operate the signaling device according to the adjusted setting. The method can generate an instruction to reconfigure, recalibrate or reset the signaling device. The method can generate an alert to a monitoring client device to indicate the state or condition of the signaling devices at the intersection.

Section F—Speed Limit Based Signal Generation

Traditional roadway intersection traffic management systems can struggle to detect situations with heightened probability of incidents or incidents themselves in real-time, resulting in delayed responses to potential collisions or hazardous situations. The inefficiencies associated with this can contribute to increased congestion and longer wait times for vehicles and pedestrians, leading to higher greenhouse gas emissions as vehicles idle in traffic. Undetected incidents or situations with heightened probability of incidents can lead to disruptions, exacerbate fuel consumption and air pollution, and pose risks not only to road users but also to the broader environment.

To overcome these challenges, the technical solutions use machine learning algorithms and real-time sensor data to enhance ability to analyze events or traffic scenarios and improve detection of incidents and situations or events with heightened probability of incidents at roadway intersections. The system comprises one or more processors coupled with memory that receive sensor data from various devices monitoring the intersection. By analyzing this data, the system can determine the velocity of approaching objects and identify or detect when such objects exceed predefined speed limits or head toward paths or locations that are also approached by other objects (e.g., leading to potential collisions in future time intervals). The system may also determine when such speed limits are situationally inappropriate and adjust the speed limits in real-time. Upon detecting such incidents, the system generates a signal prompting an adjustment in the object's velocity before it reaches the intersection. This proactive approach allows for timely interventions that improve safety and reduce the likelihood of accidents. Additionally, by facilitating quicker responses to incidents and emergent conditions, the system helps minimize traffic congestion and associated greenhouse gas emissions, contributing to a more sustainable urban environment.

In addition to standard speed and red-light violations, the system is configured to detect and analyze behavioral violations by tracking objects across multiple sensor frames and associating behavioral attributes with individual vehicles. Examples of such violations can include suspected drunk driving, failure to use indicators, illegal turns, and right-of-way disputes. The system utilizes multi-frame object tracking to build behavioral profiles, which are then associated with the vehicle's license plate number (LPN), vehicle/object characteristics (e.g., color, type of vehicle, shape, distinguishable add-ons), or driver/operator characteristics (e.g., facial recognition of a driver) and corresponding vehicle records. This can allow for the system to progressively build confidence in identifying risky or illegal behaviors, potentially contacting law enforcement or emergency services in real time, or adjusting signal phases (e.g., holding a suspected vehicle longer at a red light or sharing predicted travel direction for police intercept).

Speed safety sensors (SSSs), such as cameras, can be used for improving roadway safety. For instance, the systems can monitor vehicle speeds, using sensors, such as radar, cameras, lidar, or ultrasonics and provide feedback, either immediately via visual signals, such as 'Too Fast/Slow Down' light up, measured speed signage, via direct entity communication (e.g., roadway system to vehicle transmissions) or retroactively by triggering automated generating and sending email or mail shipped warnings or citations. The SSS can be ubiquitously deployed, involve faster feedback then mail shipped citations, improve safety by handling additional situations (e.g., weather and roadway conditions), and enable dynamic signage.

The system can include or integrate license plate recognition (LPR) with vehicle record databases, allowing for real-time lookup of registration, inspection, and mechanical features (e.g., taillight status). License plate numbers (LPNs) and vehicle descriptions (e.g., vehicle type, color or other features) can be posted to digital signage for in-situ feedback, citations, or micro-corrections (such as continuous driver education). The system may adjust signal priorities based on vehicle type, license type, or repeat offender status, and can accommodate special cases such as funeral processions or emergency vehicles. LPR can be further combined with V2X communications to create redundant verification channels, allowing intersections to authenticate vehicles and exchange intrinsic and extrinsic data (size, shape, position, sensor information, decisions). High-confidence V2X interactions enable advanced features, such as emergency intervention and auto-braking events.

To address these issues, leveraging safety rated perception & safety rated signage, via sufficient entity & environment detection, tracking, & comprehension, the accurate velocity, location, and classification of entities may be detected and relied upon in conjunction with weather (e.g., Rain, Snow, Fog, Sleet, Hail, among others), roadway conditions (e.g., Water, Ice, Pot Holes, Degraded Surface, Degraded Markings, Construction, Surface Type), and the net state of the intersection (e.g., Blocking Vehicles, Light States, Conflicting Traffic Patterns, Same Direction Traffic Types & Patterns). This information may be used to provide directed feedback in the form of dynamic signage, audio alerts, visual alerts (e.g., lights, strobes, colors, projections), V2X, among others. As entities are tracked on-approach to, in, or on exit of an intersection, each entity's speed can be compared against legal requirements or threshold guidelines, engineering best practices or recommendations, or presumed safe operating speeds based on conditions. Accordingly, the system may signal specific entities (e.g., V2X Directed Communication, text or media messages, or screens such as pointing Avatar (3D), or License plate number identification, or image of user), lead entities, or all vehicles to slow down/speed up, to target specific speeds, display entity speeds, or other custom feedback which may encourage more appropriate (e.g., safe and efficient) roadway behaviors. Multiple sensors can be used to cross-calibrate which may be in conjunction with roadway markings or other environmental/infrastructure conditions of known relative size.

The system can support aggregation and tracking of vehicle behaviors across a network of intersections, including municipal, regional, state, and national deployments. Behavioral data and violation records can be associated with LPNs and can be propagated across the network, enabling comprehensive analysis and intervention. Real-time feedback can be provided via digital signage, which may display violation notifications, warnings, or positive reinforcement messages to drivers. The system can also contact external services, such as law enforcement or emergency responders, based on aggregated risk assessments.

For efficient processing and storage, the system can extract license plate regions. This can be done by the data processing system (e.g., sensor analyzer 222) from high-fidelity full-frame images prior to down-sampling the remainder of the image. Identified camera distortion of license plates can be used to correct frame distortion, leveraging the standardized sizing specifications of plates. Frames where license plates are identified can reinforce tracking confidence over the sequence of frames and can serve as a feature for vehicle identification. The system can detect and track missing, damaged, or altered plates, associating these findings with vehicle fingerprinting and enabling proactive alerts to be communicated across the network of roadway intersection systems and, if desired, to alert law enforcement to trace vehicles across the network.

Figure 26:
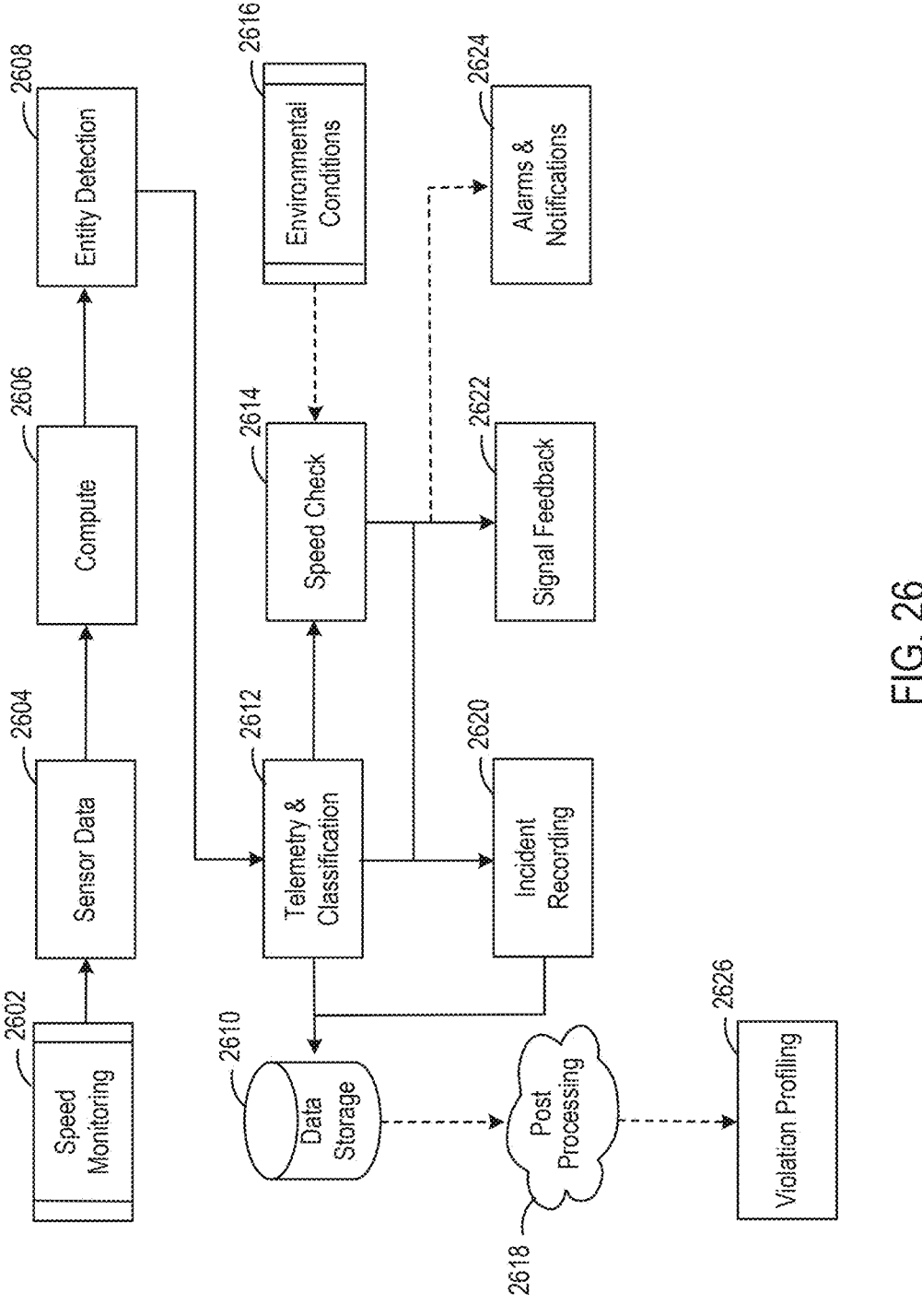

Referring now to FIG. 26, depicted is a process 2600 to implement advance speed feedback based on speed monitoring 2602. Under the process 2600, sensor data 2604 is processed via local compute 2606. Entities are detected and classified 2608. The entity velocities and locations are measured for telemetry classification 2610. From here, locations and velocities can be checked via a speed check 2614 against spatial speed configurations, environmental conditions 2616 (e.g., associated safety risk), traffic speeds, behaviors, and an associated hierarchy of action. The environmental conditions may include environment, infrastructure and roadway conditions. Actions can be determined based on any combination of the hierarchy of actions or objects involved or behaviors, as well as signal feedback, incident recording 2620, or alarms and notifications 2624

(described herein). Data can then recorded locally (e.g., at a local storage device) and/or shipped to the cloud within the data storage 2612. Further processing 2618 may be undertaken locally in the cloud in the future to improve risk models & or measure and notify of potential violations 2626.

In some instances, a first condition of the telemetry classification 2610 can be that the entities may not be traveling within an expected speed range. For example, an entity that is traveling above or below rated pathway speed limit (bi-direction binding is possible with min-max settings), can be a tracking specific entity (example leading vehicle) on a per path (ex: lane) basis, thereby, all visible entities may be tracked, or aggregate entity metrics such as mean velocity. Based on the telemetry classification 2610, the action can include at least one of slow down/speed up (e.g., signage is lit (dynamic or standard roadway signage) to indicate to entities to change speed behavior, typically in comparison to speed limit), indicate expected speed, indicated measured speed (e.g., Signage (dynamic or standard) indicates to entities their measured speed, typically in comparison to speed limit), target speed change (e.g., Signage (dynamic or standard) indicates to entities to increase/decrease speed by specific measure of speed + or − X MPH/KPH).

Figure 27:
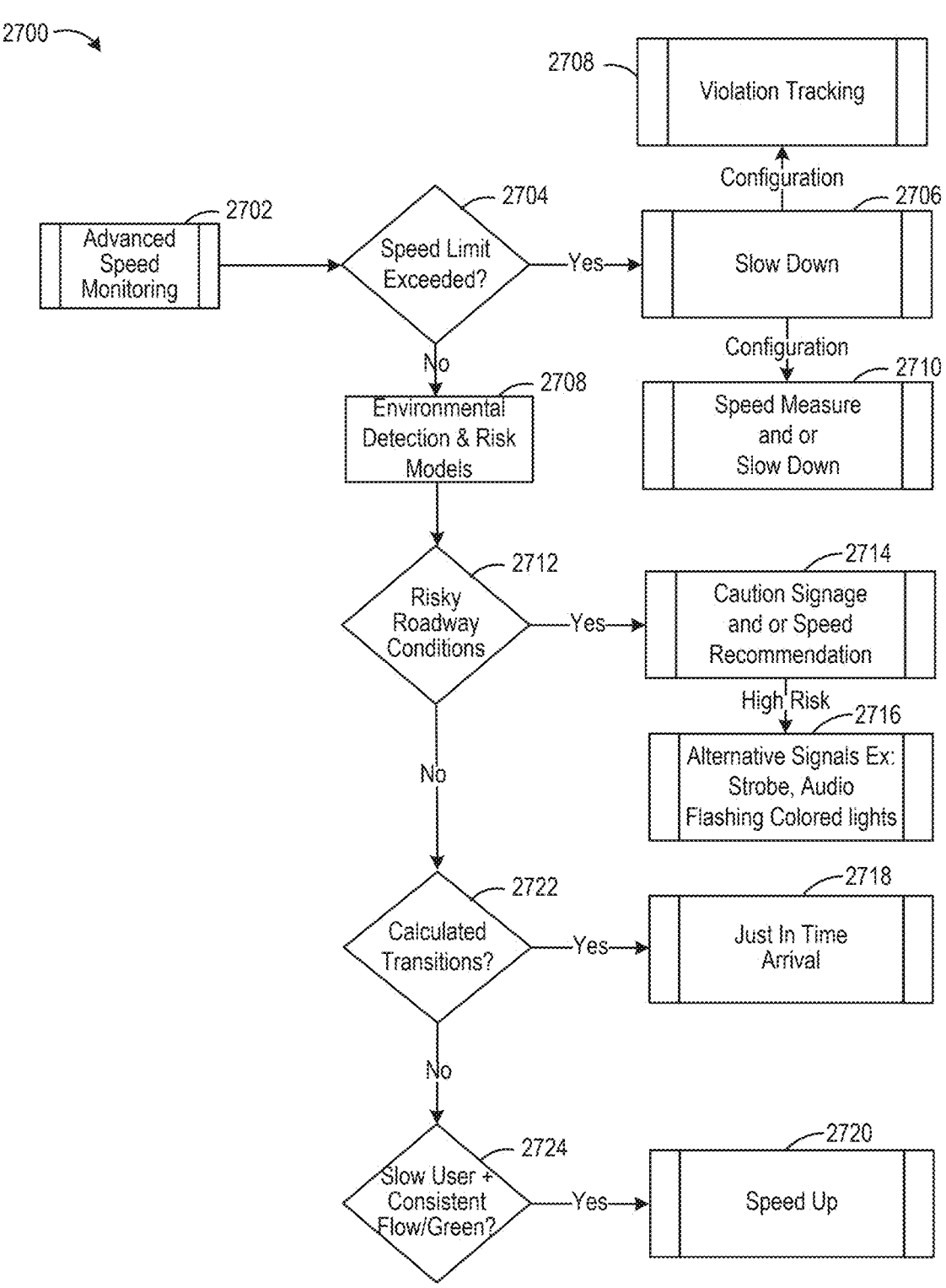
Figure 29:
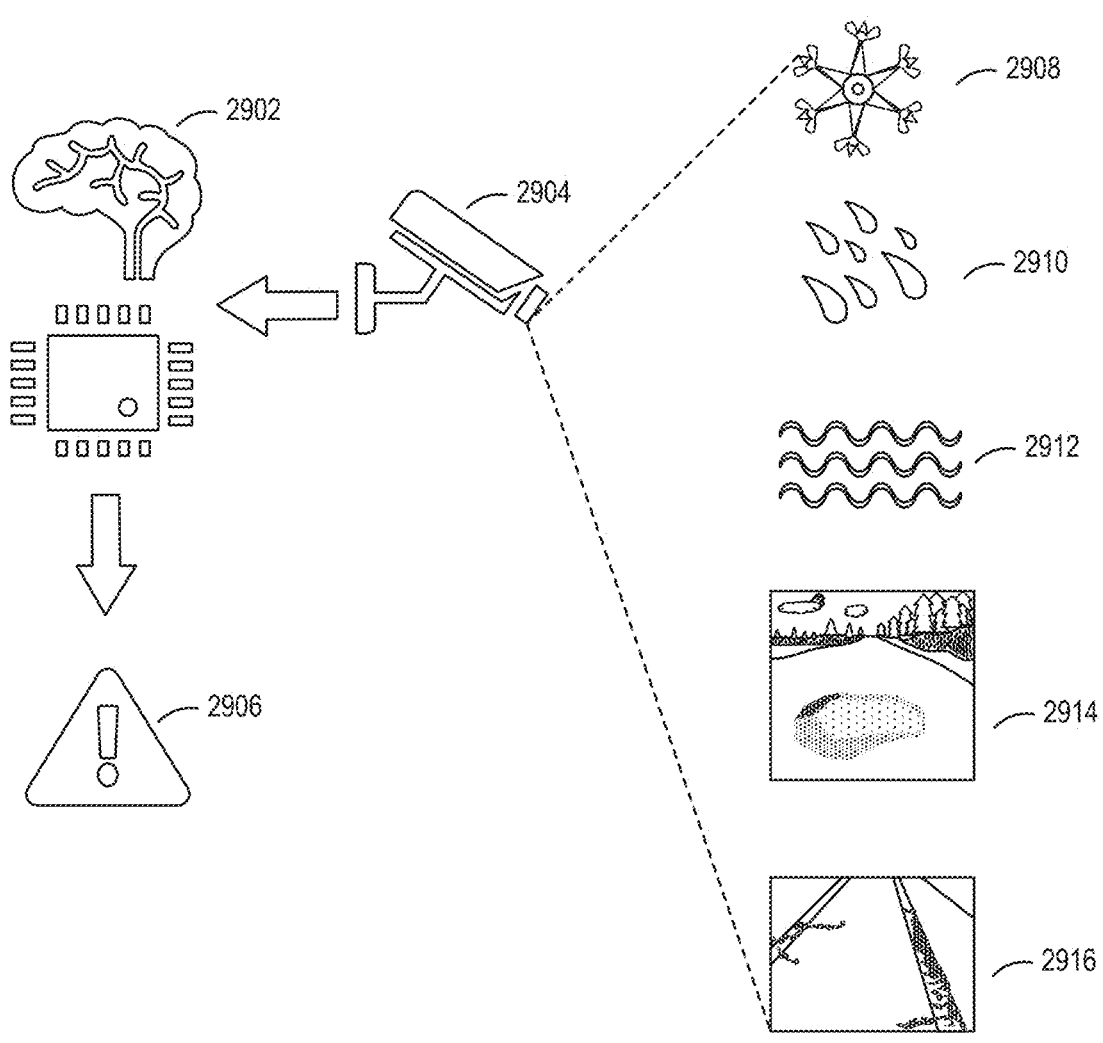

During target speed change, for example, Just In Time arrival via dynamic signage can be implemented as shown in FIG. 27 or 29. Just In Time arrival can measuring all vehicles on approach in all directions and suggesting a speed below the speed necessary (e.g., accounting for variance and reaction times) such that vehicles in that direction are likely to arrive to the intersection at the maximum possible speed when the light can phase change in their favor. This should minimize braking, minimize wait times, and maximize efficiency. It may also improve safety by indicating for vehicles to slow down at or below specific speeds and incentivizing them with preferred arrival timing. The action can further include violation tracking. In violation tracking, entities may be identified and tracked, and their respective identifying information saved (e.g., abstracted) to later notify said entity or authorities of potential violations in conjunction with sensor data and measures as evidence (e.g., possible tickets/warrants). Data may be stored, abstracted, and/or aggregated for statistical and A.I. training model use and emergency services may act on this information in real-time to dispatch emergency personnel and potentially pre-empt issue behaviors. For example, dispatchers check vehicle route and work to intercept the violating vehicle with a local enforcement vehicle who verifies continuance of issue behavior.

FIG. 27 depicts a process 2700 of advance speed monitoring 2702 based on a given condition. If the speed limit is exceeded at 2704, the process 2700 proceeds to the slow down operation at 2706 and begins violation tracking at 2708. If the speed limit is not exceeded at 2704, the process 2700 proceeds to evaluate environmental detection and risk models at 2712. From here the process 2700 proceeds to determine if there are risky roadway conditions at 2714. If there are risk roadway conditions, the process 2700 proceeds to caution signage and speed recommendations at 2716. If there are no risky roadways at 2714, the process 2700 proceeds to determine whether to calculate transitions at 2720. If the transition are calculated, the process 2700 proceeds execute the Just In Time Arrival at 2722. Otherwise, the process 2700 proceeds to determine whether the user is slow or consistent at 2724 to execute speed up at 2726.

In another example, FIG. 29 shows example 2900 of conditions, some of which having potential risk factors corresponding to environmental and roadway conditions. Conditions can include weather, environment, or other roadway conditions (such as rain, snow, ice, construction, pathway activities, debris, potholes, signage, infrastructure, & marking conditions) can be modeled to understand their risk profiles. Risks can be gauged against severity and likelihood of accidents and their respective influencing factors such as reaction times, stopping distances, acceleration times, follow distances, lane adherence/centering, among others. Modeled risks can be used to target specific speed recommendations, cautionary signals, or emergency/maintenance alarming. For instance, AI models can detect high risk conditions based on sensor readings and map them to a risk profile, identify risk behaviors and suggested actions based on AI model outputs.

For instance, an AI model 2902 (e.g., a neural network model trained on images or videos of various intersections) can utilize a sensor (e.g., a camera or other sensors) to capture data (e.g., images or videos) indicative of instances of snow conditions 2908, rain conditions 2910, water flood conditions 2912, ice on road conditions 2914 or cracks or pots on highway 2916. AI model 2902 can be operating on a system (e.g., processors with memory) to utilize input data to identify conditions, which can then be used for subsequent processing.

In another example, alternative signaling can include caution lights/signs, changing light colors, strobes, flashing lights, roadway projections, audible commands or alerts, etc. can be used to draw attention to errant roadway behaviors including for speed modulation. Cautionary signage or messages may be more specific and address particular conditions such as weather or roadway concerns (ex: 'Roadway is icy, use caution').

Figure 28:
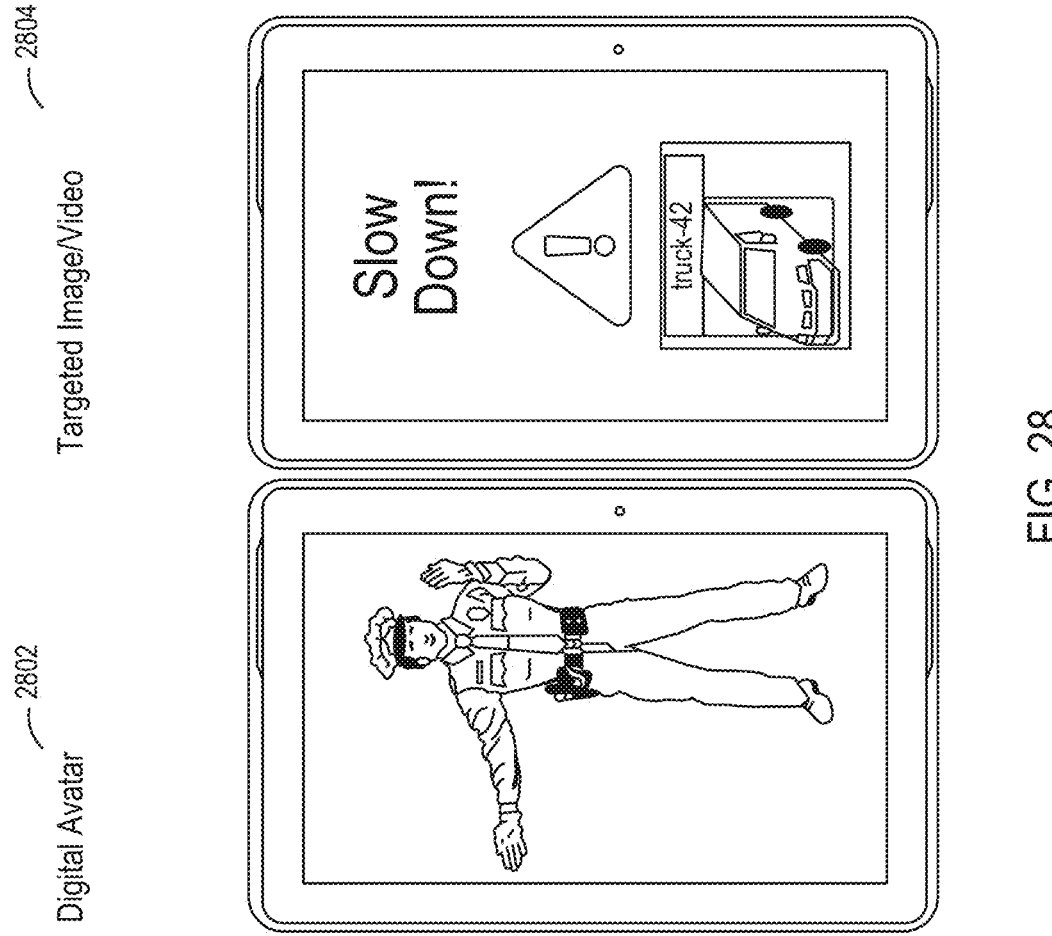
Figure 30A:
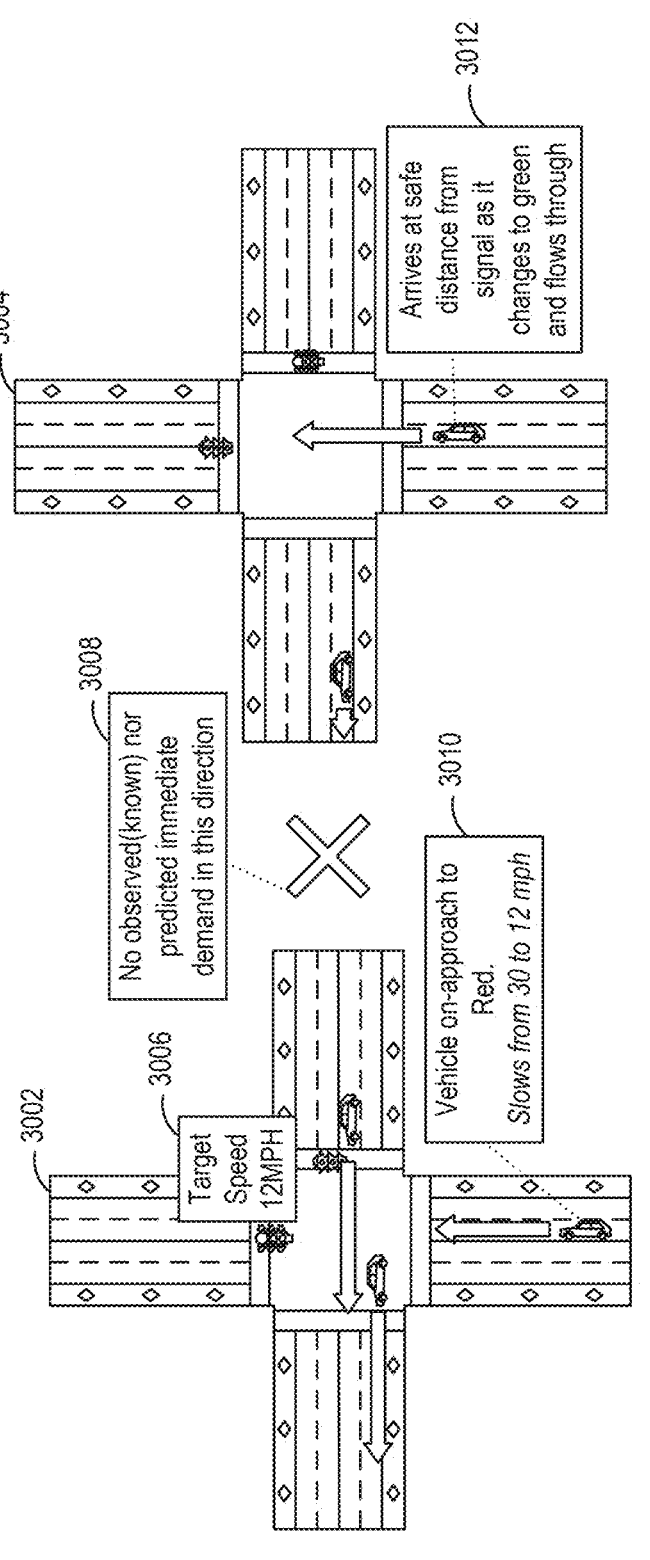

FIG. 28 and FIG. 30A depicts target signaling according to the traffic conditions. Entities may be specifically called out or targeted via dynamic signage with identifying factors (e.g., vehicle make/model/color, license plate or position in lane, image/video of the user), via pointing into space using targeted animations such as generative AI traffic cop to indicate to specific entities, or via V2X with direct connection to vehicle control systems/comms. For instance, at FIG. 28, digital avatar 2802 may be turned toward a 3D space and provide indications showing an illustration of a traffic police officer directing specific traffic objects. Also, a targeted image or video 2804 can be provided showing an image of a specific entity or labeling it (e.g., ex license plate number) to direct signage or signaling to a particular object.

At FIG. 30A, for example, as shown at 3002, the sensor data can indicate that two vehicles are moving into or through the intersection (e.g., East to West, or left to right) in the current green signal direction. At 3006, the last of the two vehicles is predicted to fully clear the intersection in 3 seconds, such by determining that its travelling at about 12 mph. At 3008, no additional demand (or insufficient demand to continue green) is predicted or known to be on-approach in the next 3 seconds. At 3010, the sensor data can indicate that a vehicle is approaching from the South (e.g., arrow pointing upward). The adaptive signal systems can determine a high confidence that the optimal decision (e.g., to minimize the chance of an undesirable event) is to change to green in the South to North direction next in 3 seconds. At 312, the system then can determine or compute the speed of the south to north bound vehicle needed based on its distance and assumed deceleration profile (plus a buffer) and signals that vehicle to target that speed (ex 12 mph instead of 35 mph) such that the south to north vehicle arrives to the intersection just as the light turns green. This can save energy and reduce shut-down and startup costs to signal changes.

In another example, auto calibration can leverage a network synchronized time-clock, known frame exposure time, frame-rate, and environment layout, 2D cameras may be used to calculate velocity via position estimation vs time (frame to frame). A similar technique may be used to verify lidar calibration, in addition, doppler effect may be observed and compared vs calculated velocity. Each system may be further compared against features with known (fixed) position & size and used to compare against raw sensor read-outs and moving entities. Camera systems may also be calibrated using dynamic signage with a calibration animation where specific markers of known size are fixed or move across a screen to precisely measure camera perception. Radar tuning fork calibration may be emulated by the use of on-site audio devices. Temporary fixed devices or mobile calibration systems (e.g. specially equipped vehicles that move through the intersection) may also be used. All 3 sensors types in a given direction will then be compared and normalized either considering one device to be 'ground truth' and normalizing the other two accordingly, via tracking each device's historical deviations and correcting accordingly, by averaging devices or otherwise rectifying perceived differences.

Figure 30B:
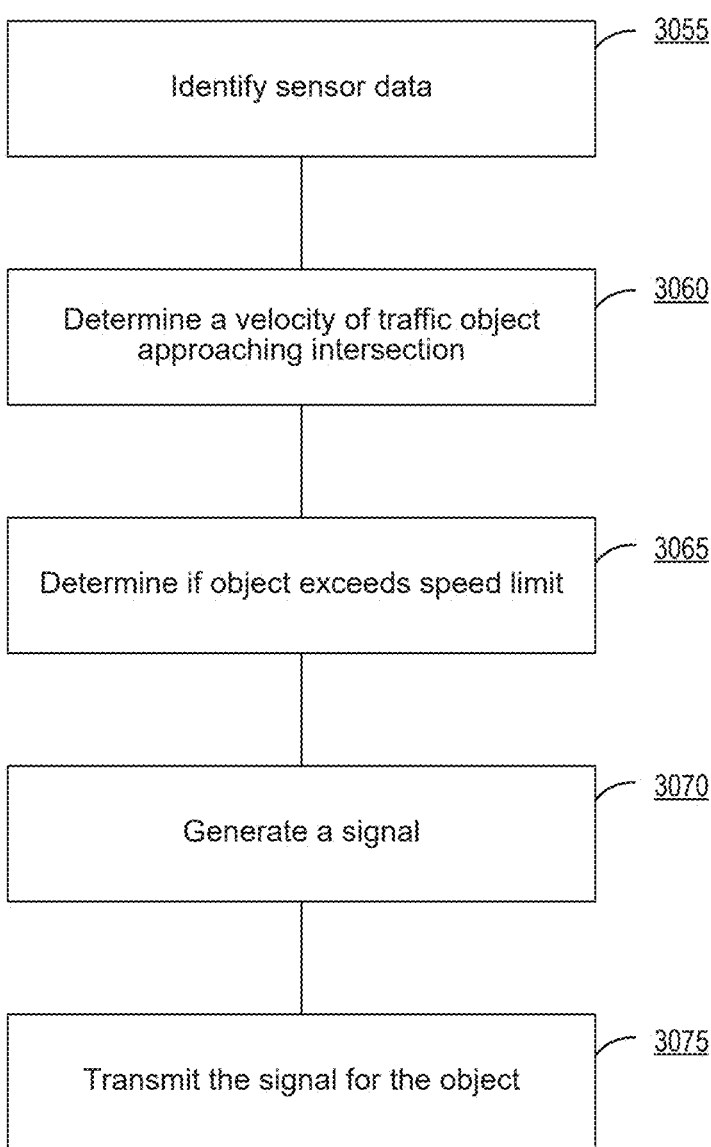
FIG. 30B illustrates a flow diagram of a method for speed limit based signal generation.

Referring now to FIG. 30B, depicted is a flow diagram of a method 3050 for advance speed feedback. The method 3050 may be implemented or performed using any of the component discussed herein, such as a processor executing instructions stored in a non-transitory computer-readable media, such as a memory, to implement the operations of a data processing system. In a brief overview, a data processing system or a computing system can identify data from one or more sensors associated with a roadway intersection at step 3055. The computing system can determine, based on the data, a velocity of the object approaching the roadway intersection, at step 3060. The computing system can determine, based on the velocity of the object and a predefined speed limit, that the object exceeds the predefined speed limit, at step 3065. The computing system can generate a signal for the object, at step 3070. The computing system can transmit the signal for the object to prompt adjustment of the velocity of the object prior to approaching the roadway intersection, at step 3075.

At 3055, the method can include the computing system identifying, determining, or receiving receive data from one or more sensors associated with, or deployed on, near or adjacent to, a roadway intersection. The data can include data associated with environmental conditions. The environmental conditions can correspond to at least one of: weather conditions, road surface conditions, visibility level, density of traffic, or the presence of obstacles on a road associated with the roadway intersection. Based on the environmental conditions, the computing system can identify data from the environmental condition. For example, the computing system can identify, or be notified via an external system, that environmental conditions (e.g., rain, snow, sleet, hail, fallen branches or other obstacles, leaves or animals) are present at the roadway intersection or that visibility is reduced (e.g., fog, smoke or nighttime and absence of sufficient lighting).

Upon the identification, the computing system can analyze, process, or otherwise scan the environmental conditions to generate a predefined speed limit. The predefined speed limit can be lower than a posted speed limit to improve the safety of the roadway intersection. During analysis, the computing system can generate a delta to reduce the speed limit to the predefined speed limit. The delta can enable the predefined speed limit to be proximal to the posted speed limit. The delta can enable the predefined speed limit to be distal to the posted speed limit. Once generated, the computing system can use the delta based on the environmental conditions to generate the predefined speed limit.

At 3060, the method can include the computing system determining, identifying or generating, based on the data, a velocity of the object approaching the roadway intersection. For instance, one or more processors can receive frames of sensor data (e.g., frames of video or lidar data) and determine, based on locations of the object through the frames, the speed or velocity of the object approaching the intersection. The computing system can use the data to generate the velocity of the object approaching the roadway intersection. The velocity of the object can correspond to the speed and the direction of the of object. For instance, the processor can identify or label the object across a sequence of two-dimensional frames of sensor data (e.g., lidar or camera frames) and utilize timestamps of the frames and locations of object at those timestamps to determine velocity of the object. In some instances, the velocity of the object can increase a risk of collision with another object at the roadway intersection. For example, when the velocity of the object is beyond the predefined speed limit, the risk of collision can increase.

The predefined speed limit can be a configurable value, such as a value defined by a local regulation or a law. The predefined speed limit can include a value adjusted for conditions. For instance, a process can identify from various sensor data, data on environmental conditions, such as data on weather (e.g., snow, ice, temperature, humidity, fog, visibility, or any other environmental characteristic). The processor can generate the predefined speed limit based on the environmental conditions, such as by reducing the speed limit by a predetermined amount or percentage for a given environmental condition, and then using such adjusted speed limit as the predefined speed limit. The predefined speed limit should be dynamically adjusted based on operational conditions such as terrain, load, and environmental factors. This ensures that the system maintains optimal performance and safety standards rather than relying solely on static thresholds.

For example, a processor can analyze a sequence of data frames captured at a frame rate. The frame rate can be at least 10 frames per second, 20 frames per second, 30 frames per second, 60 frames per second, 90 frames per second, 120 frames per second, or more than 120 frames per second. The processor can identify, label and track the object within the sequence of data frames. The processor can determine the velocity of the object based on a number of frames in which the object appears and a known distance between different locations at which the object is identified. Based on the time difference between the frames and the location of the object, the processor can determine the distance travelled over a time interval and can determine the speed of the object (e.g., vehicle).

The system can analyze frames of sensor data at rates ranging from 10 to 120 frames per second, tracking individual objects (including runners, bikers, and vehicles) across frames. Objects can be associated with license plates or image features, enabling precise calculation of velocity and behavioral analysis over time and distance. Tracked object association across frames can be supported for all sensor modalities, including video, radar, and lidar, and is used to enhance behavioral detection and risk assessment.

For example, a processor can track the object across a sequence of frames of the data by associating the object with an identifier derived from at least one of a license plate or an object feature. The processor can identify timestamps for the sequence of frames. The processor can determine the velocity of the object based on the sequence of frames and the timestamps input into a machine learning model trained to determine object velocity based on timestamps and data frames indicative of moving objects. In addition to determining speed or velocity of objects from data frames of cameras or lidars, the data processing system can utilize doppler effect sensors, as well. For instance, instant velocity measurements may be obtained directly via the doppler effect, for rapid detection of object speed. Alternatively, the system can calculate velocity by analyzing point cloud distance data over time, such as by statistically aggregating positional changes at a selected location within the object's mass, such as the front-most or center-most point. Furthermore, a fused approach may be employed, wherein the system compares or blends results from multiple velocity determination methods to achieve higher accuracy or to filter for only high-confidence data. For instance, the system can take an average or median value from multiple determinations of the object's speed. This multi-modal strategy can allow the system to adaptively select or combine measurement techniques based on sensor availability, environmental conditions, or required precision, thereby improving the reliability and robustness of velocity estimation for objects approaching or traversing the roadway intersection.

The computing system can utilize a plurality of sensors and image capture device proximal to the roadway intersection to generate the velocity of the object. The sensors can include GPS modules, doppler radar sensors, lidar sensors, optical flow sensors, wheel encoders, accelerometers, gyroscopes, ultrasonic sensors, among other sensors to detect velocity and other vehicle attributes or features. The image capture devices can include high-speed cameras, CCTV cameras, dash cameras, stereo cameras, infrared cameras, smartphone cameras, among other image capture devices. For example, the computing system can use data transmitted from a LIDAR sensors to generate the velocity of the object approaching the roadway intersection.

At 3065, the method can include the computing system determining that the object exceeds the predefined speed limit. The computing device can determine that the object exceeds the predefined speed limit based on the velocity of the object and a predefined speed limit. To make the determination, the computing system can compare the velocity of the object against the predefined speed limit. If the velocity of the object does not exceed the predefined speed limit, the computing system can disable or generate a signal to encourage safe habits of the object. Otherwise, the computing system can generate a signal for display to the object to reduce the velocity of the object.

At 3070, the method can include the computing system generating a signal for the object, in response to the velocity of the object exceeding the predefined speed limit. The method can include the processors generating a signal for the object to prompt adjustment of the velocity of the object prior to approaching the roadway intersection. The signal can include a strobe light signal, a dynamically generated or updated signal to slow down, or a signal transmitted to the vehicle, such as a V2X communication. The signal can be generated responsive to the determination that the object exceeds the predefined speed limit.

The method can include the processor generating a signal for the object to prompt adjustment of the velocity of the object prior to approaching the roadway intersection. The signal to prompt adjustment (e.g., reduction) of the velocity of the object can be generated responsive to the determination that the object exceeds the predefined speed limit. The prompt can indicate the velocity of the object and the speed limit. The prompt can indicate the velocity amount by which the object exceeds the speed limit.

For example, the signal can include at least one of visual alerts, audio notifications, or vehicle-to-everything (V2X) communications, among other signals. The signal can include a visual alert displayed on a signaling device configured to indicate the velocity of the object relative to the predefined speed limit. The signal and the visual alert can be customized based on the type of object. The type of object can be at least one of a vehicle, a bicycle, a pedestrian, among other moving objects. For example, the visual alert for a pedestrian can differ from the visual alert for a bicycle.

The method can include the processor generating a second signal following the initially generated signal in response to the object not reducing the velocity. For example, upon determining that an object velocity is not being reduced upon generating and displaying a first signal, the processor can generate one or more signals to send out one or more alerts that are more pronounced than the first alert. For instance, the processor can generate the one or more signals to initiate a strobe light, a directed high lumen light (e.g., light over 100, 200, 500 or 1000 lumens) focused at the object for a time duration (e.g., 1 second) in order to draw attention to the driver.

For instance, the processor can interrupt a signaling phase of a second signaling device of the plurality of signaling devices with a second signal for the second signaling device to alert traffic along a second route of the roadway intersection that is different from a route of the roadway intersection of the object. The signaling phase can be interrupted responsive to the determination that the velocity of the object is not reduced below the predetermined velocity threshold at the predetermined distance. The second signal can alert traffic along the second route to at least one of: reduce velocity along the second route or stop movement along the second route, responsive to the velocity of the object not being reduced below the predetermined velocity thresholds at the predetermined distance from the roadway intersection.

The threshold distance can be determined based on the velocity or speed of the object determined based on the sensor data. For instance, the threshold distance can be determined based on the speed at which the object is moving in order to provide the object (e.g., a vehicle) a sufficient threshold amount to respond (e.g., a response time). For instance, the data processing system can determine the velocity or speed of the object and can determine the threshold distance to the roadway intersection, such that the object is given a threshold response time duration (e.g., for example 3-5 seconds) to take action (e.g., to slow down), prior to taking a second action by the data processing system. In addition, the threshold distance can be determined based on estimated size or mass of the object, such that larger trucks are given longer threshold distance and longer response time than smaller vehicles. Moreover, threshold distances can be determined based on weather conditions, such that threshold distances in rain or snow are extended to provide drivers with longer response time periods to slow down. In some instances, historical data can be used to determine response times of vehicle types and based on the historical data (e.g., input into AI model) threshold distances for different object types can be determined. Therefore, the data processing system can determine a first threshold distance based on a speed and size of a first object and a second threshold distance for a second object based on the speed and size of the second object, either one of which can be adjusted based on weather conditions at the roadway intersection, thereby giving both objects at least a minimal threshold amount of response time for their respective object type, prior to taking further action. As a result, objects moving faster can be assigned a longer threshold distance than objects moving slower.

At 3075, the method can include the computing system transmitting the signal for the object to prompt adjustment of the velocity of the object prior to approaching the roadway intersection. The processor can include initiating, via a controller, responsive to the signal, actuation of a first signaling device of one or more signaling devices of the roadway intersection to signal the object that the predefined speed limit is exceeded. The method can include the processor verifying whether the velocity of the object is reduced below a predetermined velocity threshold at a predetermined distance from the roadway intersection. The verification can be implemented based on data from the one or more sensors and following the initiation of the actuation of the one or more signaling devices.

The method can include a processor initiating, via a controller, actuation of a first signaling device of one or more signaling devices of the roadway intersection to signal the object that the predefined speed limit is exceeded. The actuation can be initiated responsive to the signal for the object to prompt adjustment of the velocity. The method can include the processor verifying, based on data from the one or more sensors following the initiation of the actuation of the one or more signaling devices, whether the velocity of the object is reduced below a predetermined velocity threshold at a predetermined distance from the roadway intersection.

For example, a processor can determine, prior to initiating verification, a predetermined distance parameter for the roadway intersection. The parameter can be based on at least one of: lane geometry, stopping distance calculations for the detected object type, and visibility constraints identified via environmental condition sensors. The predetermined distance can be established dynamically by the system in response to real-time traffic flow and environmental conditions and stored in memory for use in the verification step. Upon initiating verification, the system can analyze subsequent sensor data corresponding to the object's motion profile, including velocity samples taken at timed intervals from a plurality of sensor types (for example, radar, lidar, and camera sensors) and reconcile these inputs via a cross-calibration process in which each sensor's latency and resolution is normalized against a reference timing source.

If the processor determines that the velocity has not been reduced below a predetermined velocity threshold by the time the object reaches a predetermined distance from the roadway intersection, the processor can generate a second signal to interrupt a signaling phase of a second signaling device controlling a different route of the intersection. The second signal can be configured to alert traffic along that route to either reduce velocity or stop movement, thereby allowing for the intersection control system to preemptively avoid potential collision scenarios. For objects exceeding the predefined speed limit and having a phase change pending for their route, the processor can calculate and present (e.g., via dynamic signage or V2X communications) a recommended velocity for arrival during the projected green signal phase. The signage or communication can indicate the recommended velocity being computed from the object's current distance from the intersection, current velocity, desired arrival time, and allowances for deceleration and reaction time.

The type of alert presented can be selected based on the classified object type; for example, a pedestrian may receive a flashing crosswalk sign and audible tone, a bicycle may receive a yellow bicycle icon with dynamic speed advisories, and a motor vehicle may be sent a V2X message and a digital speed feedback display. Environmental condition detection may be implemented through sensor fusion, in which data from precipitation sensors, road-surface monitors, and optical imaging is aggregated to determine a risk profile and adjust the posted speed limit downward by a computed delta (e.g., reducing a 45 mph posted limit to 35 mph in heavy rain), the adjusted limit being used as the predefined speed limit in subsequent velocity comparisons.

The computing system can transmit the signal to the signaling device. The signaling device can correspond to a liquid crystal display (LCD), a smart device, a tablet, a computing device, a server, among other devices with a display. The signal can be an alert that corresponds to a message, an image, a notification, a flashing light, an auxiliary sound, an Electronic Medical Service (EMS) notification, an image, among other representations of the signal. For example, the signaling device can display a hazard symbol when the velocity of the object exceeds the predefined speed limit. In this manner, the computing system can induce the object to reduce the velocity to be proximal to the predefined speed limit.

Section G—Traffic Object Collision Predictor Based on Sensor Data

Errant driver behaviors including but not limited to speeding, distracted drivers, lane deviations, erratic input control etc. frequently lead to preventable accidents at roadway intersections, on-ramps, roundabouts and other conflict zones. Today, the approach to minimize such behaviors most strongly rests on roadway design principles and best practices such as described by the 'Complete Streets' initiative. While such informed design approaches can influence behaviors, they do not eradicate such risks completely.

To address these challenges, roadway incident occurrence & severity may be reduced by employing behavior prediction models, monitoring risk, and responding as appropriate with clear attention-grabbing signals. A.I. and classical models first determine that a pathway collision may be likely to occur in a given projected time-interval. If a collision risk is determined to be sufficiently high, then the system actuates audio & visual signals and signage.

Figure 31:
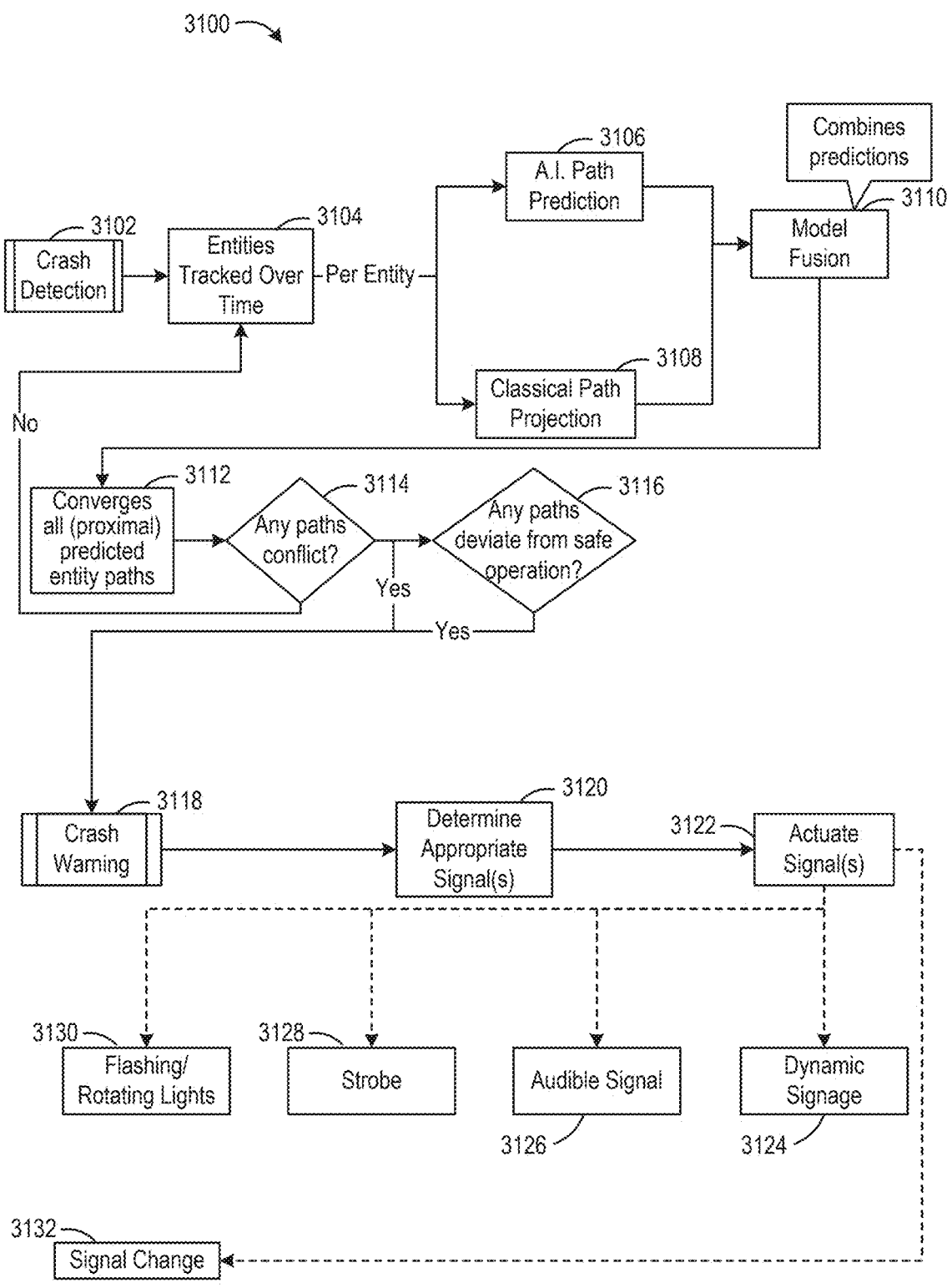

Referring now to FIG. 31, depicted is a flowchart of a process 3100 of crash detection. At 3102, the method can initiate a crash detection system or operation. For instance, starting with a system that leverages advanced perception and compute, at 3104 entities may be individually identified and tracked. For instance, by identifying and observing an object frame-to-frame over a sequence of phrase, the direction of travel, front and special position, velocity, acceleration and classification of object type entity or class, can each be determined.

For instance, for each entity being tracked, roadway behaviors and movement patterns may be monitored overtime. At 3106, the sensor data corresponding to object behavior can be fed into prediction models (e.g., deep neural networks, path averaging, best fit, max deviations, among others) to anticipate the respective risk of deviation of the object outside of expected or legal roadway conditions. At 3108, the sensor data can be input to a model determining a classical or a linear path projection, or to project path and probability of the object's location and/or speed over a next set time interval (e.g., over next n seconds). For instance, the AI path prediction model can predict paths and position of the object over a future predetermined time interval (e.g., over next one or more seconds) associating the object future position with associated probability.

For entities determined to be of sufficient deviation risk (e.g., Possible collision with another entity, collision with infrastructure, or illegal roadway behavior (wrong way, red light run, speeding, lane deviation etc.)) additional prediction models can determine potential future location and timing with a corresponding confidence level. For instance, at 3110 the method can fuse model predictions from the AI path prediction and classical path prediction to make a path determination. At 3112, all proximal predicted paths can be combined or converged to make a determination. At 3114, the method can determine if any of the paths determined conflict with any other paths of another object. For instance, as the system can determine probabilistic future paths for each object, the system can determine, based on AI model training and based on historical projections, the likelihood of a conflict or intersection between the two paths at the same time period (e.g., likelihood of a collision). The models or configurations utilized for these determinations can include, or account for, processing time, signal initiation time, object reaction curves (e.g., object reaction times) and predicted correction time to put object under safe operation (e.g., to stop the vehicle). The system can evaluate the risk using confidence curves, which can codify the likelihood of unsafe or illegal behavior as confidence values. These curves can be generated from multi-frame behavioral analysis and are used to trigger interventions, escalate warnings, or contact external services when risk thresholds are exceeded.

For paths that do conflict at 3114, at 3116 the method can determine any paths that deviate from the safe operation. This can include determining if the object will run a red light (or equivalent no-go signal), collide with another object in the traffic (e.g., rear-end or sideways), leave defined area of operation (e.g., step off the road and onto the pedestrian pathway), or enter a bike lane. In response to determining that the likelihood of a deviation from safe operation exceeds a predetermined threshold, at 3118 the method can generate a crash warning, which can be used to generate various actions. At 3120, the method can determine appropriate signals (e.g., based on object type, location, external conditions or other attributes). At 3122, the method can initiate actuating signals, including flashing or rotating lights (at 3130), strobe lighting (at 3128), audible signal, such as a horn or siren (at 3126) or a dynamic signage, such as a crash warning sign or symbol to display dynamically (at 3124). At 3132, the method can initiate a signal change (e.g., between any types of signals, or to turn signal off).

In some configurations, when the computed confidence metric exceeds a preemption threshold, the one or more processors can initiate a preemptive signaling action prior to the predicted collision event. This can include extending a red signal for the approaching conflict path beyond its scheduled termination, or shortening an opposing approach's green interval to clear a potential collision zone ahead of schedule. The system can implement lane-specific preemptive actions. The lane-specific preemptive actions can include illuminating a lane-control indicator or movement arrow (e.g., "no left turn" or "straight only") on approaches whose intended movement would intersect the predicted path of the at-risk object. When more than one object is involved in a potential collision, the system can generate multiple, coordinated alerts tailored to each object's type and approach lane. For example, a V2X braking advisory and in-vehicle display can be provided for a connected passenger car, combined with a high-intensity flashing cyclist icon and strobe for a bicycle approaching from the cross direction.

For instance, if a single entity can perform a deviation from an expected path range or a deviation from an expected velocity range and therefore perform a potentially illegal deviation or if two or more entities are determined to be at risk of colliding, corresponding cautionary signal(s) can engage to provide warning prior to a predicted possible collision. Signal engagement may be multi-modal, such as turning on an audio siren, chirp, or alert, engaging a flashing rotary light, strobing or other means intended to grab entity attention. They may then be used in conjunction with dynamic signage that clearly displays an appropriate message per the anticipated failure mode (e.g., Caution Lane Deviation, Caution Crash Warning, Caution—Stay On Sidewalk . . . ). Prior to taking signal actions, signal severity and risk can be evaluated as sudden flashing lights may cause rapid braking and potentially increase rear-ending collisions or other incidents. As such, all entity paths can have response-predictions gating signal engagement and/or intensity.

Referring now to FIG. 32A, depicted is an example 3200 of the crash detection described in FIG. 31. In a non-limiting example, at 3202, a vehicle is traveling towards an intersection and begins to deviate from their lane with no turn signal, swerving into and out of the lane. This deviation leads meaningfully into a bike lane. A cyclist in that adjacent bicycle lane, ahead of the vehicle, but proceeding at 2/3rds the vehicle's speed is being closed upon by the vehicle. Each frame, the platform's AI model predicts possible paths over the next predetermined time interval (e.g., 3 or 5 seconds) for the vehicle and the cyclist. During one of these frames, the prediction indicates a high likelihood that the cyclist and vehicles paths can overlap, suggesting that a crash may occur. For instance, multiple path predictions with associated probabilities can be produced and selected for each object and then projected n seconds into the future. In this scenario a conflict between two entities can be predicted over a predetermined probability threshold, so the system responds with an associated action. For example, prediction methods can range drastically and be layered. Examples can include best-fit models, outer-edge fitting, and pattern match projection.

At 3204, the system can respond in various ways, such as by using dynamic signage. For instance, the system can respond by changing light signal at 3206, emitting a siren (at 3214), easily audible from within the vehicle, while flashing cautionary lights (at 3208), turning on rotary lights 3212, enabling white strobes (at 3210), and changes the dynamic signage to a yellow screen with 'Caution! Crash Risk!' and a visual aid of a vehicle colliding with a bicycle. Because of this alert, the vehicle and cyclist slow down, align with their lanes, and review their surroundings. Across each of the next few frames, predictions gradually resume to normal expected (in-lane) behavior. Gradually, strobes and then yellow lights turn off, followed after a few seconds by the crash risk dynamic sign.

Figure 32B:
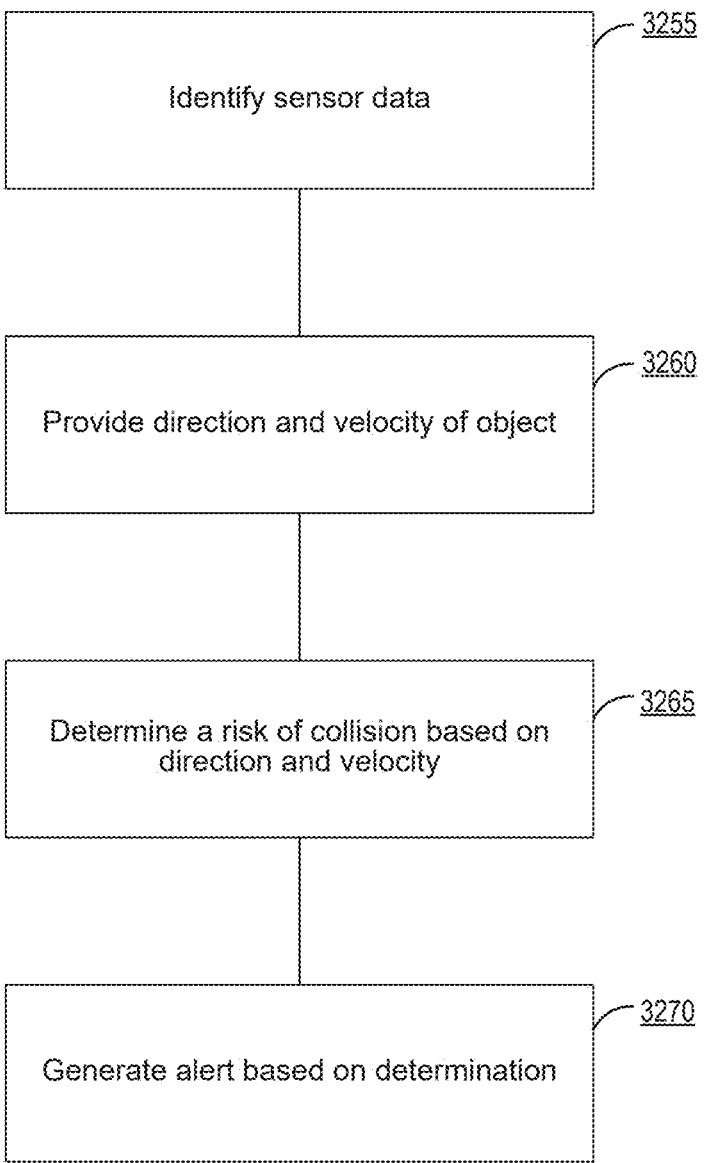
FIG. 32B illustrates a flow diagram of a method for entity response time reduction.

Referring now to FIG. 32B, depicted is a flow diagram of a method 3250 for entity response time reduction. The method 3250 may be implemented or performed using any of the component discussed above. In a brief overview, a computing system can identify sensor data from one or more sensors associated with a roadway intersection, the sensor data corresponding to one or more objects moving at the roadway intersection at step 3255. The computing system can provide, based on the sensor data input into one or more machine learning (ML) models trained on a plurality of objects moving at a plurality of roadway intersections in a plurality of directions and a plurality velocities, one or more predicted directions and velocities for the one or more objects, at step 3260. The computing system can determine, based on the one or more predicted directions and velocities, that a risk of a collision involving at least an object of the one or more objects exceeds a confidence threshold, at step 3265. The computing system can generate, based on the determination, an alert to be displayed on a signaling device of the roadway intersection directed at the object, at step 3270.

At step 3255, the computing system can identify, determine, or otherwise receive sensor data from one or more sensors associated with a roadway intersection. The sensor data can indicate one or more objects moving towards or at the roadway intersection. The sensor data can include environmental conditions, corresponding to at least one of: weather conditions, road surface conditions, visibility level, density of traffic, or the presence of obstacles on a road associated with the roadway intersection. The objects can be a vehicle, such as a car, a sports utility vehicle, a pickup truck, among other vehicles. The objects can be associated with traffic at the roadway intersection, such as in the vicinity of the intersection (e.g., within the field of view) or at the roadway intersection. The sensor data can be transmitted to the computing system from the one or more sensors at the roadway intersection. Upon identification of the sensor data, the computing system can process the sensor data for use by one or more machine learning (ML) models.

At step 3260, the computing system can provide, present, or otherwise identify one or more predicted directions and velocities for the one or more objects. The computing system can identify the one or more predicted directions and velocities based on the sensor data input into the one or more ML models trained on a plurality of objects moving at a plurality of roadway intersections in a plurality of directions and a plurality velocities. The ML models may include neural networks, decision-making models, linear regression models, natural language models, random forests, classification models, generative AI models, reinforcement learning models, clustering models, neighbor models, decision trees, probabilistic models, classifier models, among other ML models. The ML models may be trained using the sensor data in accordance with supervised or unsupervised learning. The one or more ML can be retrained using data from prior incidents of one or more roadway intersections to improve identification of patterns associated with collisions.

Once the one or ML models are trained to convergence, the computing system can input the sensor data not the one or more ML Models. In some instances, the computing system can select at least one ML model to input the sensor data according to the training. For example, the computing system can select at least one ML model based on supervised training. In another example, the computing system can select at least one ML model based on unsupervised learning. Once the sensor data is ingested by the one or more ML models, the one or more ML models can generate a plurality of predictions of direction and velocities.

At step 3265, the computing system can determine, identify, or otherwise indicate that a risk of a collision involving at least an object of the one or more objects exceeds a confidence threshold. The risk of collision can correspond to a probability that a projected future path of a first object (e.g., a vehicle) of the plurality of objects will interact, collide or touch a different object within a future time interval. The different object can be another entity of the traffic (e.g., another vehicle, a pedestrian or a bicyclist) or a curb, a pole, a tree, or any other stationary object with which the first object may collide. When the processor determines that the probability of the projected future path of the first object exceeds a predetermined confidence threshold (e.g., 95% or 99% threshold), the processor can determine that the collision is likely to occur within a future time interval (e.g., for which the projection of the path of the first object is determined).

For instance, the confidence threshold can correspond to indication that a collision can occur. For example, the risk of collision can exceed the confidence threshold. In another example, the risk of collision can fail to cross the confidence threshold. To make the determination, the computing system can use the predicted directions and velocities of the one or more objects at the roadway intersection to identify that the risk of collision involving the at least one object of the one or more objects exceeds the confidence threshold. The risk of collision can correspond to an indication that at least two of the one or more objects can collide at the roadway intersection.

The processor can generate, based on the one or more predicted directions and velocities, a confidence curve. The confidence curve can represent a probability distribution of collision risk for the object over time. The processor can determine that the risk of the collision exceeds the confidence threshold by computing a confidence metric from the confidence curve and comparing the confidence metric to the confidence threshold. The confidence metric can be a likelihood of collision of a range of the confidence curve. The confidence metric can be based on a determination that the velocity of the object exceeds the speed limit, or that it exceeds the speed limit by a predetermined threshold, given a predetermined distance between the object and one or more other objects at, or near or adjacent to the roadway intersection (e.g., within the field of view of the sensors of the roadway intersection).

The confidence metric can be a rate at which the likelihood of collision is increasing with the object approaching the intersection. The processor can be configured to codify the risk of collision as a confidence value derived from the confidence curve and compare the confidence value to the confidence threshold to determine whether to initiate the collision warning. For instance, the processor can determine, based on the confidence curve, that the likelihood of the object colliding exceeds a predetermined confidence threshold and can initiate the collision warning (e.g., generate alert) in response to this determination.

In some embodiments, upon deriving predicted directions and velocities for one or more objects, the system can generate a confidence curve representing a time series of predicted collision probabilities for each object pair over a defined prediction horizon (e.g., 0.5 s increments over the next 5 s). A confidence metric can be computed from the curve through statistical reduction, such as maximum probability, time-weighted average above a threshold, or derivative of the risk increase. The ML model can incorporate data on environmental conditions including measured precipitation, roadway friction coefficients, ambient light, or visibility to adjust braking and maneuver envelopes, thereby shifting the shape of the risk curve to account for longer stopping distance or reduced detection ranges. Following actuation of a collision warning, the system can collect subsequent sensor data on object trajectories and velocities at defined verification intervals (e.g., every 0.25 s) and compare against pre-actuation trajectories and velocities. An alteration satisfying pre-configured thresholds, such as reduction in speed greater than 20% or lateral displacement away from conflict zone, can be taken as a successful response, while lack of such change can trigger an escalation in warning intensity.

At step 3270, the computing system can generate, based on the determination, an alert to be displayed on a signaling device of the roadway intersection directed at the object. The computing system can generate the alert in response to the risk of collision exceeding the confidence threshold. In some instances, the computing system can generate a second alert to be displayed on a second signaling device of the roadway intersection directed at the second object. The computing system may not generate the alert in response to the risk of collision failing to exceed the confidence threshold. The signaling device can correspond to a liquid crystal display (LCD), a smart device, a tablet, a computing device, a server, among other devices with a display. The alert can correspond to a message, an image, a notification, a flashing light, an auxiliary sound, an Electronic Medical Service (EMS) notification, among other alerts. For example, the computing system can generate a hazard symbol for display on the signaling device, in response to the risk of collision exceeding the confidence threshold. Once the alert is generated, the computing system can generate a transmission for one or more systems associated with one or more remote roadway intersections to adjust signaling at the one or more remote roadway intersections responsive to the risk of collision exceeding the confidence threshold.

For example, the processor can be configured to initiate, prior to the predicted collision, a preemptive signaling action comprising adjusting a traffic light phase or activating a lane-specific indicator to reduce the likelihood of the collision. While adjusting the traffic light phase, the processor can at least one of: extend a red-light duration for a lane associated with the object or adjust a green-light transition for a lane of traffic intersecting with the lane associated with the object. The processor can activate the lane-specific indicator by illuminating a directional arrow or a warning sign oriented toward a path of approach of the object.

The processor can generate multiple alerts based on the single determination. For example, the processor can determine, based on the one or more predicted directions and velocities, that the risk of the collision exceeding the confidence threshold includes a second object on a collision course with the object. For example, the processor can generate, based on the determination, a second alert to be displayed on a second signaling device of the roadway intersection directed toward the second object.

Section H—Signaling based on Characteristics of Object Approaching Intersection

Pathway entities are notoriously unreliable in their attention and response times at signalized intersections and other pathway infrastructure signage and gates. Driven by slow reaction times, brief loss in attention, and fully distracted users, slow response times can meaningfully impact pathway efficiency and safety.

To address these and other technical problems, two approaches are taken to reduce entity response times. The first of which leverages prediction artificial intelligence (AI) to determine, ahead of time within a configured window, the optimal next phase transition timing and direction. From this information and timing, we may then inform the next-to go phase via a signal (audio, visual, V2X, etc.) that their direction is about to turn green. Additionally, respond or potentially distracted entities may be identified and alerted to respond to their changed light. Next up may be the determination of the next phase direction and timing. This timing and direction will be variable as we migrate towards late assignment optimization and out-of-order intersection operations. On Deck is the pre-warning/notification to entities that their direction will be active within some predetermined time interval. These two functions work hand-in hand where Next-Up informs the enabling of On Deck and phase signal transition completion (to the next up phase) completes the cycle and disables the On Deck signage.

Figure 33:
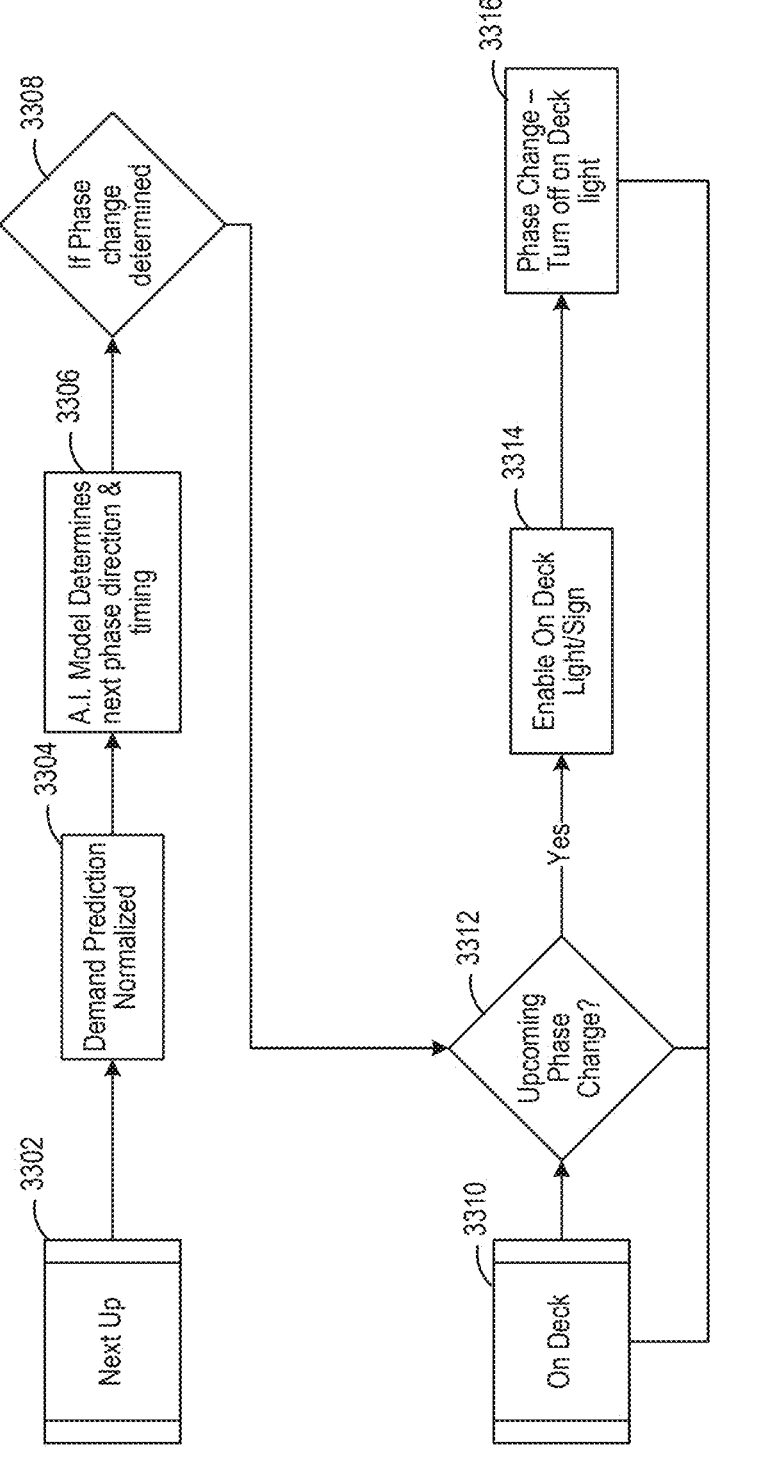

Referring now to FIGS. 33, an example flow diagram 3300 of signaling based on object characteristics is illustrated. At 3302, a Next up system can start with inputs from all demand (existing or expected entities) inputs. Demand can refer to the actual or expected usage of paths (roads & sidewalks) in the next time interval. For example, if cars are approaching an intersection from the Northeast direction, that would indicate an immediate demand of 5 vehicles in that direction. Further information may include their intended paths (directions of travel). Two of the cars turning right while 1 goes straight and the last turns left.

At 3304, demand prediction is implemented. For instance, starting with a local or a known demand (e.g., visible via sensors or other detection/reporting method) local to the intersection in question. These can be identified as objects or entities traveling towards the intersection in direct view of that intersection's sensors. Extending next to network demand, which can be known, but outside of the bounds of the local intersection. This can be the demand that is known to sensors on the broader network of intersections and supporting sensors or other input methods (e.g., map data), but may not be visible to the local intersection. The method can also then consider network predicted demand (e.g., using prediction models that consider secondary weight factors such as historical volumes and modifiers based on time of day, time of year, local weather, noteworthy events (e.g., accidents)) to estimate expected demand (particularly useful when a local intersection has visibility gaps such as no immediately adjacent intersection nor supporting tech). The method can utilize the network historical demand (e.g., historical traffic at the particular day of the week and time of day to predict likely traffic flow). At 3304, the method can combine any one or more of local known demand, network known demand, network predicted demand and historical demand to determine demand prediction, which can be normalized or adjusted for a particular time of the week, hour or minute of the day, particular weather conditions or other parameters that can be used for adjustment.

Sensor networks and demand methods may be imperfect. To best optimize signals when information is limited, prediction methods may be used try to get ahead of potential upcoming demand. After prediction, the model then may fall to static configurations, such as order or maximum wait-time thresholds/direction. When no entities are detected or expected, the intersection may resume standard timing intervals. This minimally helps in case of local detection issues.

At 3306, one or more AI models can be used to determine if in the next n-seconds (e.g., a configurable future time interval), a change in phase will be initiated and in how much time (milliseconds or seconds, may be less than the configuration) and to which phase configuration (direction). At 3308, if phase change is determined, the method can go to 3312 to determine upcoming phase change based on the state of the signal at the on deck 3310. At 3314, if the upcoming signal change is determined, the method can generate the update signal, such as an audible chirp signal, strobe or flashing light or countdown in a particular traffic direction, or a change in signal output (e.g., switch from green to yellow). At 3316, the method can include a phase change to turn off on deck light.

Depending on configuration, maximum signal gaps may be configured to bound signal change optimization. For example, this is intended to prevent two events: (1) the system from making mistakes and not changing to a specific signal direction and (2) impatient user behaviors that may result in incidents (waiting too long, rushes into intersection). Based on the demand profile and physics (speed limits and field of sensing views) the system may eventually be able to determine when it has sufficient confidence that a signal change will occur and to which (next) direction. This information may be used to inform the On Deck feature and be shared with the cloud/intersection network for network level prediction & optimization.

Figure 34:
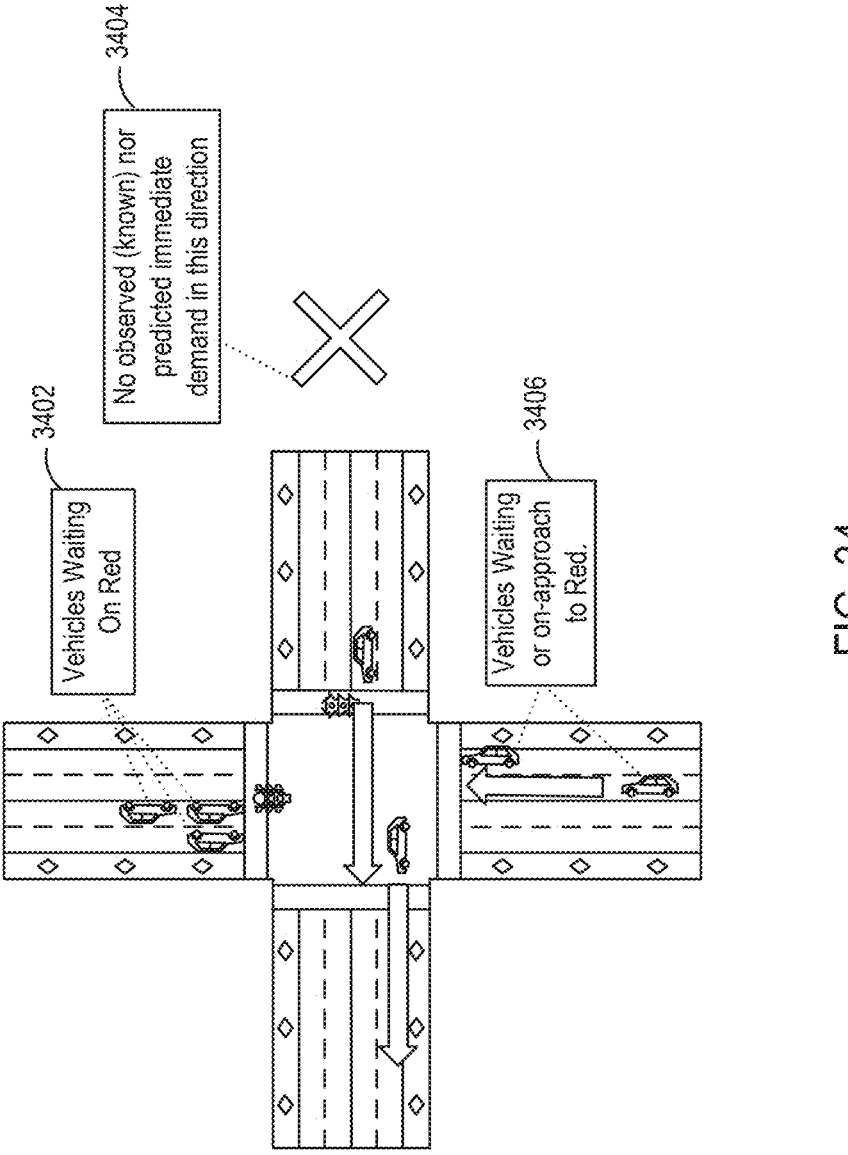

In view of the discussion at FIG. 33, at FIG. 34 an example 3400 of a top view of a roadway intersection illustrated in which, at 3402 and 3406, multiple vehicles wait in the opposing direction (North to South & South to North). In addition, two vehicles are shown moving into or through the intersection (East to West, or left to right) in the current green signal direction. The last vehicles is predicted to fully clear the intersection within a predetermined time interval (e.g., within 3 seconds). At 3404, no additional demand (or insufficient demand to continue green) is predicted or known to be on-approach in the next 3 seconds. The adaptive signal systems in this instance can have a high confidence (e.g., probability determination exceeding the probability threshold) that the desired or optimal decision is to change to green in the North to South direction next (e.g., rather than pick a different light selection, such as pedestrian traffic selection).

Figure 35:
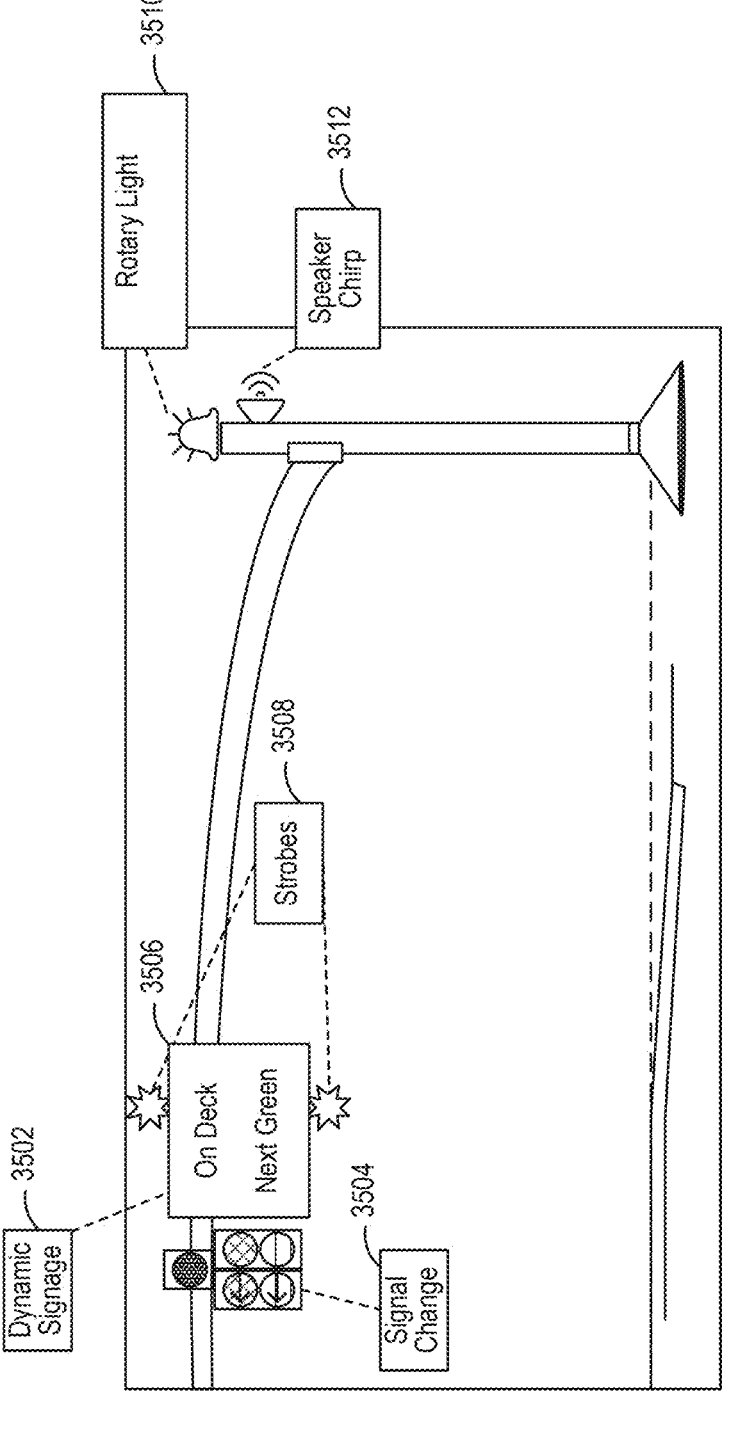

Referring now to FIGS. 33 and 35, if the AI model for Next Up signal prediction can trigger a future phase direction change, then the On Deck application may toggle appropriate signage (3502), signals (e.g., toggling from red to yellow) (at 3506), audio alerts (3512), static, flashing lights (3504, 3508), rotary lights (3510), count down, V2X communications or other method to notify entities of the appropriate type in that direction that their direction will soon change to have right-of-way. The appropriate signage may refer to signage clearly indicating that the signal will soon change to allow movement in this direction as appropriate (walk, green, etc.). In some embodiments, a countdown timer may be included. Upon completion of the phase change, and/or after a configurable amount of time, the on-deck signal(s) then disable. For instance, dynamic signage can indicate On Deck or phrasing/iconography of a next direction of travel (possible countdown timer). Other signals may also actuate such as a light/fast strobe and speaker chirp. In some countries, a signal change to yellow from red is appropriate.

Referring now to FIG. 35, Next Up and On Deck—Two vehicles are traveling East to West through the intersection during a green signal in their direction. A multitude of vehicles are on-approach or waiting at the red light in the opposing directions (North: South). The second (furthest) vehicle in the East to West direction is predicted to clear the intersection last, in 3 seconds based on its current velocity, projected acceleration profile, and no observed conflicts. Since there is no known roadway demand in the East nor West directions and no known network nor predicted demand sufficient to supersede the opposing direction, the system determines that it is optimal, with high enough confidence, to change green signal directions in 3 seconds. In the North to South and South to North directions of travel, the dynamic signage engages and indicates that the signal will soon turn green (example "On Deck—Next Green", possibly with a 3 second countdown timer). A light chirp emanates from the speakers in those roadway directions and the dynamic signage strobes quickly flash once at partial intensity. Upon signal change, the dynamic signage reverts to a default state and the signal being green, traffic begins to move in that direction. Not shown in the figure is the walk signal and walk dynamic signage on the side of the roadway.

Referring now to FIG. 36, a flow diagram of a method 3600 for signaling based on object characteristics is illustrated. At 3602, the method can initiate or utilize a response time configuration. At 3604, the method can track all entities that traverse each intersection. Tracking can be implemented on a frame-by-frame basis, indicating each individual object with an indicator flag and tracking the object through the frames to estimate the object's velocity and path. The method can track the object by either class type, features (such as vehicle make/mode/color/year, person predicted age, height, etc.) or by specific entities using personal identifiers such as facial recognition, license plate tracking, or V2X or other connection data.

At 3606, the method can store movement statistics or data in view of on signal changes. For instance, the method can determine the reaction time to first move, first to n-second acceleration or any other determinations about the object. At 3608, the method can utilize configuration set on how to call data per application function. For instance, statistical aggregate by all, by class, by PII entity or by sub-class can be utilized. At 3608 aggregation of data can be performed. At 3610, configuration available to functions can be implemented.

At 3612, slow entity response can be determined. At 3614, pull response time configuration can be implemented. For instance, objects or entities that start and then stop again may be re-signaled. Entities that are moving, but with insufficient velocity and acceleration may also be signaled. These different trigger points may warrant different trigger configurations. 3610, signal change can be determined. At 3612, roadway may be observed for entity motion. At 3616, a determination can be made on whether an object or entity can be detected to move at sufficient speed (e.g., speed exceeding a predetermined threshold). If the determination is "no", then the clock or counter can be initiated for an object or entity. At 3620, if the clock or counter exceeds configuration (e.g., based on a class or user), then at 3622 configurable signals to user can be sent. Signals can include, for example, dynamic signage or V2X message, audible chirp, strobe light or flashing light in the direction or even specifically targeting the vehicle via LPN, pointing using a digital avatar, or calling out a vehicle description such as a make, model, color. If, at 3616, the determination is made that the entity is detected moving at sufficient speed or direction, then at 3624 signaling can be stopped.

At 3626, the method can implement a distracted entity response for an object that is determined or detected to be distracted. For instance, at 3628, images of a driver operating a vehicle can be input into an AI model trained to detect distracted drivers. The images or videos can show a user looking away, looking at a phone, or otherwise not paying attention to the road. For instance, the data may include visible facial or body expression/direction such as through windshields, on motorbikes, cyclists, pedestrians, etc. At 3630, the AI model can determine, based on the images or videos input into the AI model trained to detect distracted drivers, whether the likelihood that the user is distracted exceeds a threshold. For instance, the AI model can determine that the user is not looking at or in direction of signal during or after signal change, or that the user is engaged in behavior classified as distracted (e.g., a phone raised within line of sight). At 3632, the method can signal the user, such as, to generate a signal to strobe a light, direct light toward the user, or output a sound identifying the vehicle and calling out the user.

Figure 37:
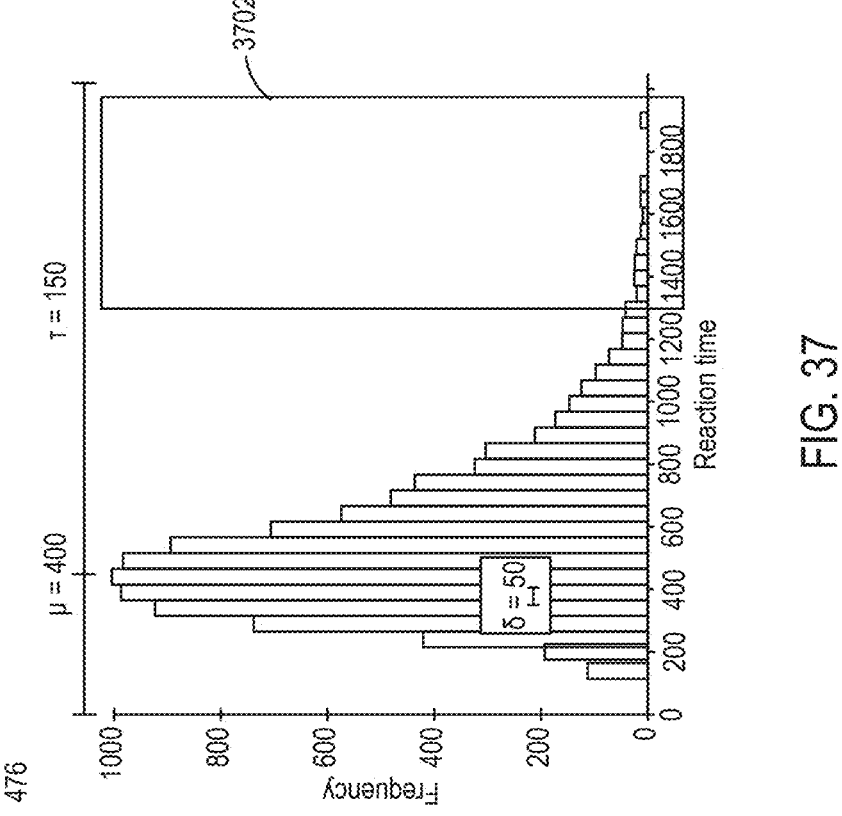
Figure 39:
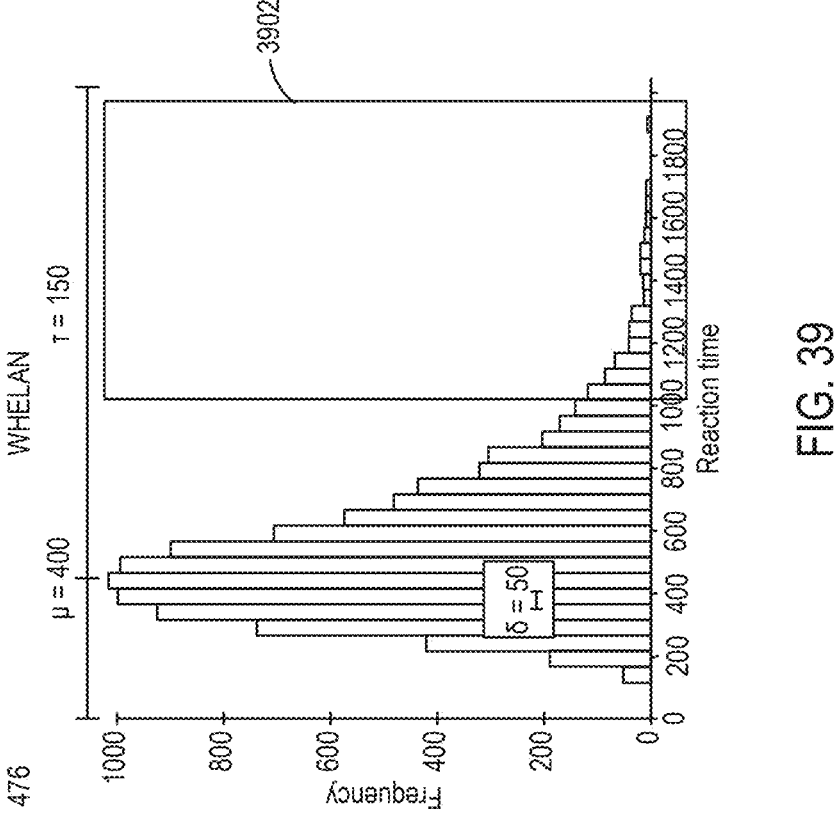

Referring now to FIGS. 36, 37, and 39, examples 3600, 3700 and 3900 of response time tracking and configuration is illustrated. For example, storing entity motion and response time data to later aggregate and use for system action triggers can be implemented. Profiling entity response times to signal changes for usage at different steps in other functions (slow entity response or distracted driving) to effectively learn user behaviors over time.

For example at example plot 3700 of FIG. 37, slow signal response is illustrated showing frequency of particular reaction times from 100 us to about 1800 us. A subset of slow reaction times (e.g., 3702) can be identified based on a threshold reaction time and can be selected for treatment of slow responding objects. Time from signal change to motion or other clear action. Tracking entities that traverse each intersection over time. On signal change, for each intersection and visible intersection, all entity data is tracked that may identify and/or classify that entity plus motion telemetry after signal change such as each movement interval (may start then stop), the time to each interval, the duration of each interval, acceleration & speed profiles. There may be common edge cases where people may start to move then stop due to being blocked or because they are not fully paying attention, and their car rolled. Differentiating these instances can include segmenting each continuous motion profile. This information is then stored locally and/or in the cloud. Such information is then aggregated based on configuration criteria, such as which dimensions to aggregate on or which statistical normalization to use (e.g., mean, median, mode, moving average, or nth percentile etc.).

Figure 38:
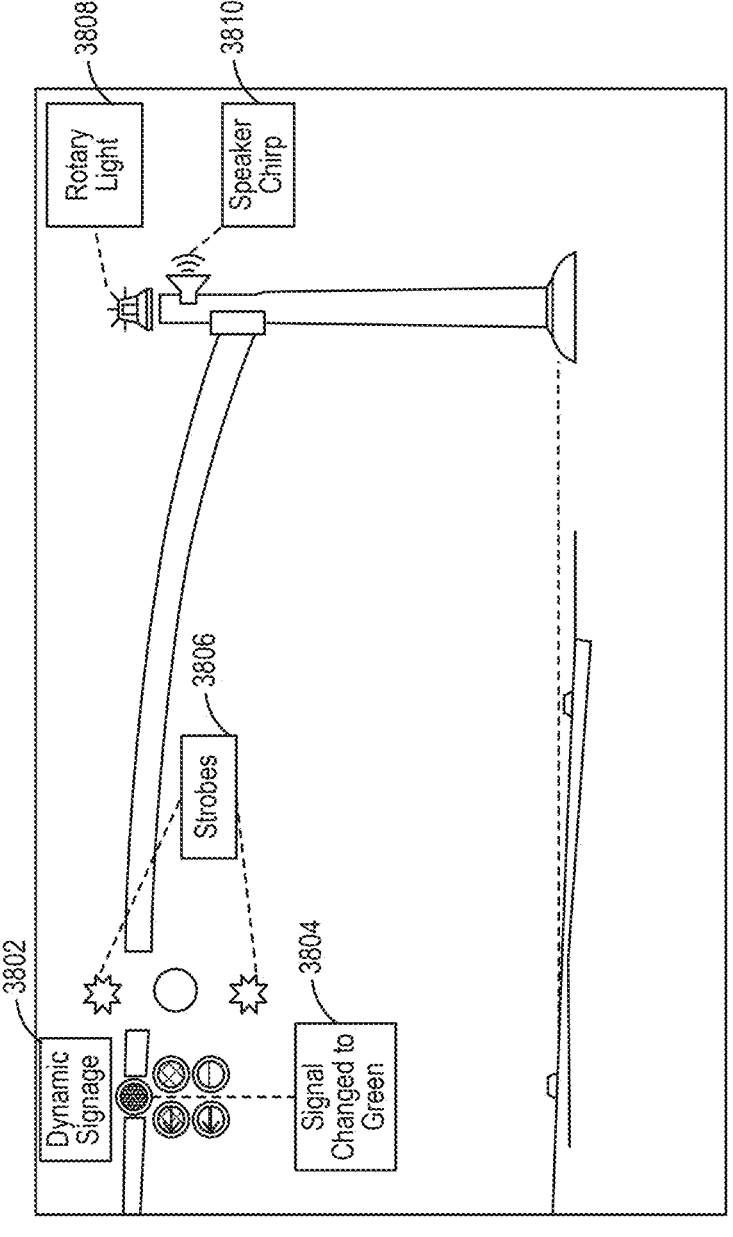
Figure 40:
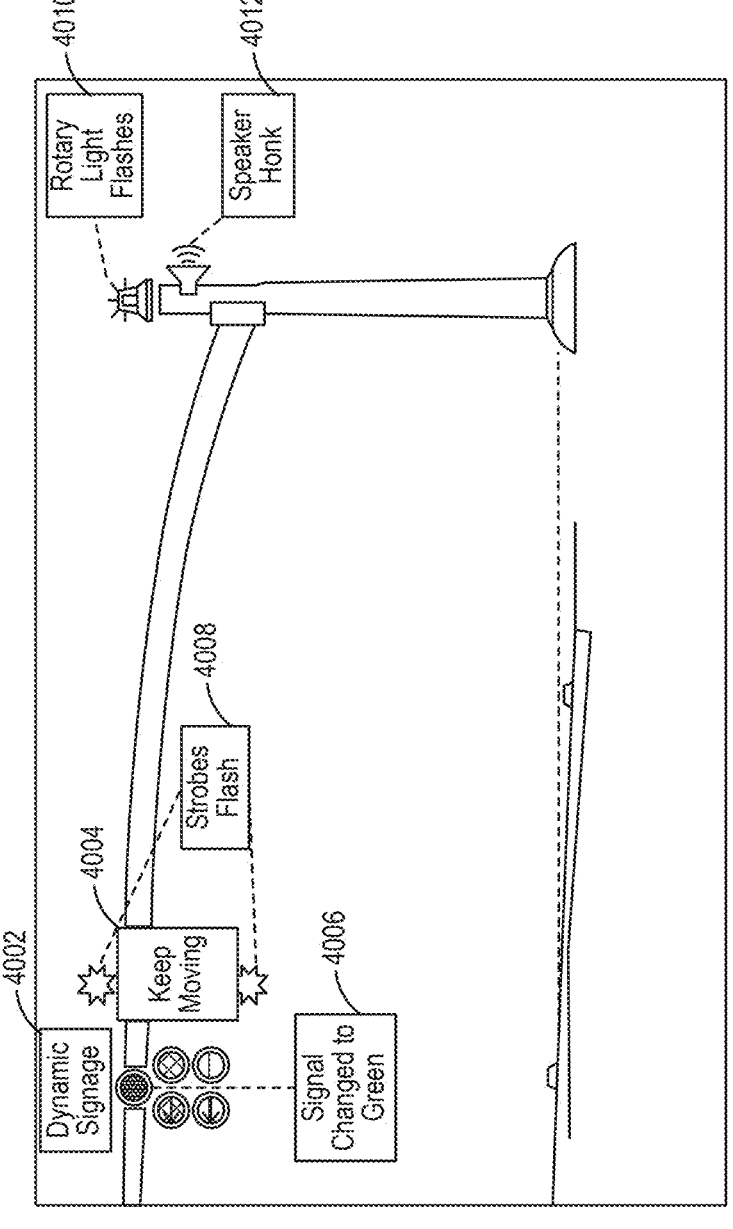

At FIG. 38, dynamic signage and other signals may be actuated. For instance, a lighter approach is taken for the first action event, such as a signal changed to green at 3804 or dynamic signage 3802. When users do not respond, even despite initial signal, a more pronounced signal can be utilized, such as strobes lighting briefly operating (3806), rotary light (3808), a speaker chirp (3810), any of which can be utilized in conjunction and together. At FIG. 39, example 3900 plot can show a separate response time profile (measured as a response to initial action). These readings can be compared against initial ones at FIG. 37 and if the entities still don't move, an additional, more visible, set of actions may be taken. At FIG. 40, example 4000 illustrates an action with a dynamic signage changing to more directed messaging such as (Keep Moving or Do not Block Traffic—at 4002). strobes lights 4008 may more aggressively flashing and/or continuously flash, rotary light 4010 which may actuate, and the speakers 4012 which may increase volume and/or change the audio (example honking noise).

Simple statistical aggregates may be used, or additional dimensions added such as classification, sub class, or personally identifiable information which will segment the dataset accordingly and make it call-able on such dimensions. Statistical aggregation may include but not be limited to averaging techniques (mean/median/mode), nth percentiles, quartiles, std deviations, or other regression/reductive techniques at the target dimension level. Personally identifiable information may be obtained via license plate recognition, personal identifiers (vehicle or personal markings & other characteristics), facial recognition, etc. Configurations may then be set to modify any dataset to derive acceptable movement and/or response time parameters by which features (such as slow entity response or distracted entity response) are used to trigger system action. Per the desired installation location and target outcome, which data to look at may be set. This may be in the form of certain dimension or aggregate filters, or specific motion intervals, among others. This then drives which responses the system is to trigger.

Referring now to FIGS. 36-40, Slow Entity Response— Identifying slow to respond, move, or unnecessarily slow/ stopped entities to trigger signaling meant to garner said entity's attention to correct their response behavior. Slow Entity Response may be used with time boxed cut-offs to warn users to react to light changes based on learned user behaviors. Signal changes to 'go' and users to move or do not move quickly enough then the system may notify them (e.g., using lights or dynamic signage etc.) to try to get them to respond and move more quickly. Appropriately grabbing entities attention may be used to garnering faster responses.

First, response time configurations are monitored actively (datasets change over time), likely on a timed cadence. When a signal changes, all roadway entities are observed, and their motion tracked. For each tracked entity, a clock is started and if the motion profile (speed, acceleration, direction etc.) are insufficient and response time (clock) is greater than the allowable config response for that dimension (class, entity type/sub-type, person etc.), then the signaling is activated. Users may react or move too slowly, such as below a threshold (e.g., in terms of time, velocity, or acceleration etc.). The profiles may be mapped against expected user behaviors or static configurations.

Signaling may be generalized to a lane or direction or may be specified to a user and is intended to garner attention & acceleration from said user. Typical signals will include a message via dynamic signage or v2x, flashing or colored lights, audible noises etc. Once an (if targeted or all if not) entity's motion meets expectations, then signaling to that entity may be eliminated. Motion may not always be continued. This may be due to blockages; and other times due to distracted or other errant entity behaviors. The clock or other measures may be re-started if a motion profile substantially changes. This may further be applied to entities in motion that then stop their motion. Additionally, AI prediction models may be injected to determine valid conflicts that might cause an entity to not move as expected. Lead entity/lane/surface may help to mitigate this but turns and other conflicts may also be appropriately considered and their potentially conflicting traffic flows. Tracking primarily just front-of-lane (lead) entities, at least for vehicles, may help to simplify occlusions and other motion dependency risks. Motion dependencies and path prediction AI may be utilized here to understand why an entity is not responding or reacting as standard and to not activating unnecessary signals. Initial response may be a mild set of actions such as a sign change, but continued delay may have a speaker honk a horn, lights flash, strobes flash, and the sign brightness, animation, or colors change. Layers of escalating or risk or severity determined actions may be taken.

Referring now to FIGS. 36-41A—examples of configurations identifying and signaling to pathway entities that are determined to be distracted to garner their attention to their direction's signal and/or get their motion to align with expectations, are illustrated. At example 4100 of FIG. 41, a 2D camera can monitor drivers and their vehicle's motion after the signal changes to green in their direction. One of the driver's vehicles may not move as expected and a cellphone may be spotted in the users hand with their eyes directed towards the phone. The system can determine that the driver is distracted and the system can trigger an appropriate (initial) response. For instance, a camera 4102 can take image of a driver in an object 4108 based on images or data 4104. An alert 4106 can be displayed toward the user.

For example a distraction AI model looks at facial and body posture (e.g., targeting drivers), eye tracking, and secondary indicators (e.g., cell phone position and orientation relative to face) to determine a confidence against likely distraction. This may then be used in conjunction with the previously discussed entity motion parameter tracking and thresholding to determine if signal response is justified. Signal response would be similar to slow entity response but may be customized for the context of distracted driving. AI and computer vision detection techniques for distracted entities via layering of methods may be used to recognize at body pose and other cues such as the presence and direction of a device (e.g., phone or book), other people (e.g., while talking), facing, eye tracking, etc.

Figure 41A:
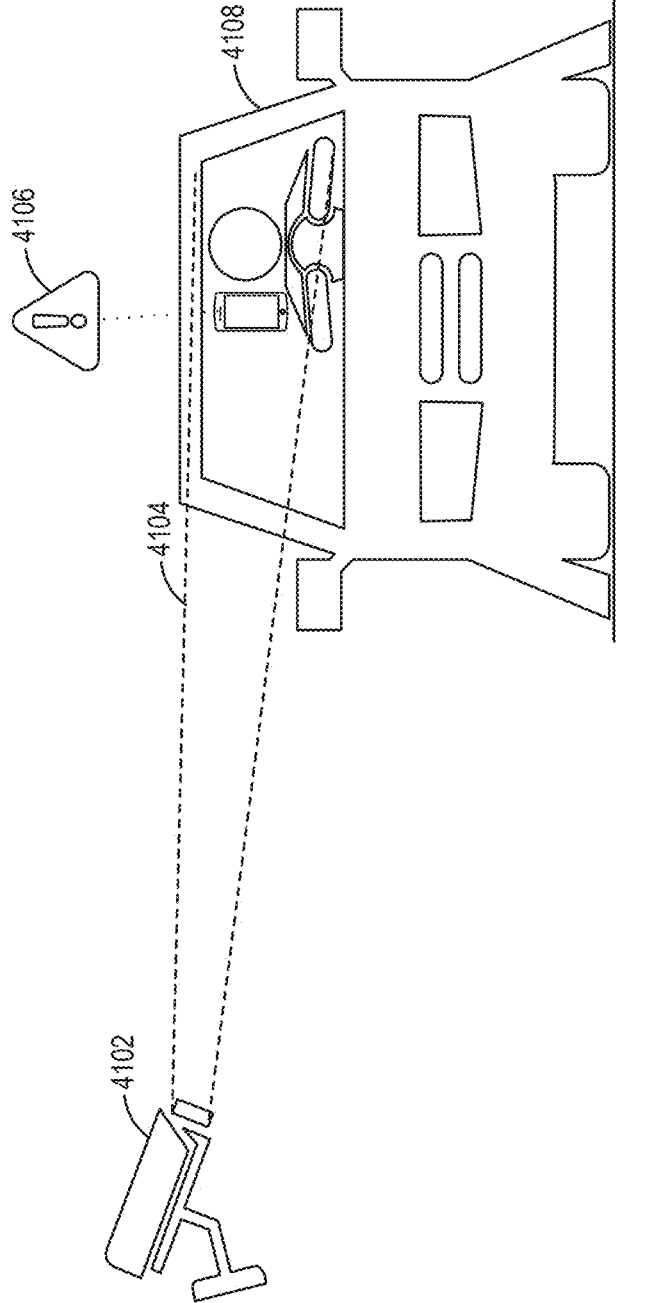
Figure 41B:
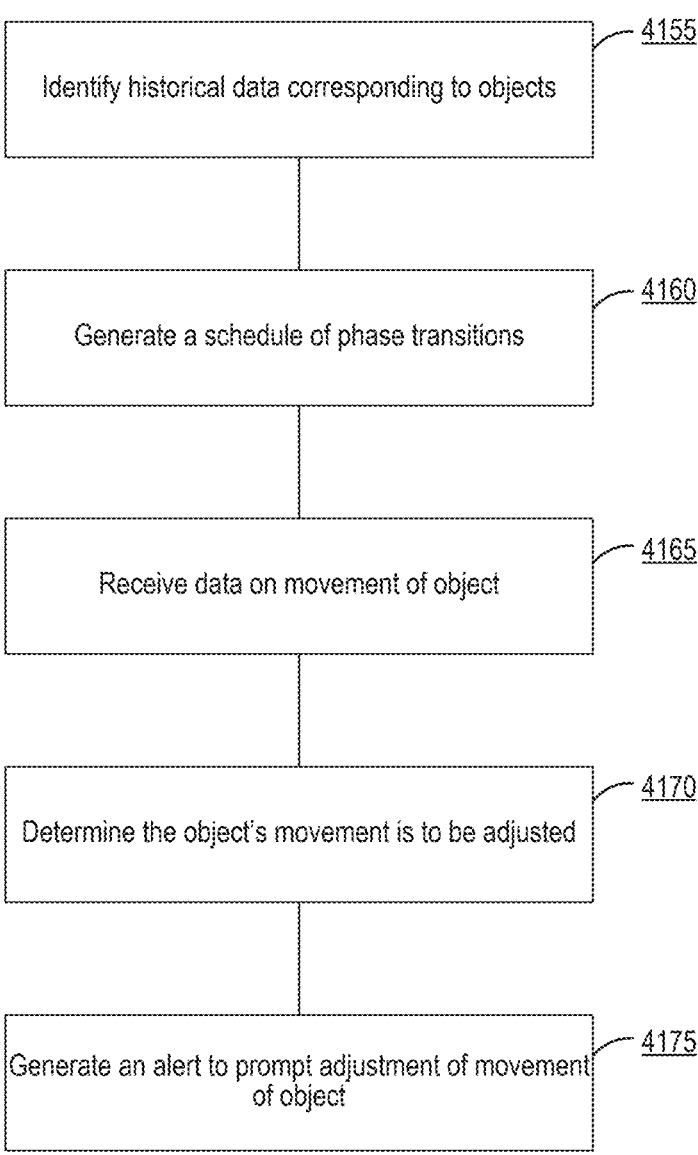
FIG. 41B illustrates a flow diagram of a method for signal generation based on characteristics of object approaching roadway intersection.

Referring now to FIG. 41B, depicted is a flow diagram of a method 4150 for signal generation based on characteristics of object approaching roadway intersection. The method 4150 may be implemented or performed using any of the component discussed above. In brief, a computing system may identify historical data corresponding to objects (4155). The computing system may generate a schedule of phase transitions (4160). The computing system may receive data on movement of an object (4165). The computing system may determine movement of an object to be adjusted (4170). The computing system may generate an alert to prompt adjustment of movement of the object (4175).

At 4155, the method can include the computing system (e.g., the schedule generator) retrieving, obtaining or identifying historical data corresponding to objects. The objects may be associated with traffic at the roadway intersection The historical data may be over a plurality of time intervals (e.g., defined in hours, minutes, seconds, milliseconds, and date), traffic conditions (e.g., free-flow, light congestion, moderate congestion, heavy congestion, traffic jam, and closure), and weather conditions (e.g., rain, wind, snow, fog, and clear), among others. With the identification of the historical data, the computing system may analyze the historical data to identify patterns in traffic flow.

Using the historical data, the computing system may initialize, train, and establish one or more machine learning (ML) models. The historical data may be obtained from over one or more roadway intersections. In some embodiments, the historical data may be labeled to identify or indicate an optimal schedule of phase transitions for signaling devices at the respective roadway intersection. The ML models may include neural networks, decision-making models, linear regression models, natural language models, random forests, classification models, generative AI models, reinforcement learning models, clustering models, neighbor models, decision trees, probabilistic models, classifier models, or any other type and form of models. The ML models may be trained using the historical data in accordance with supervised, weakly supervised, or unsupervised learning.

At 4160, the computing system may create, produce, or otherwise generate a schedule of phase transitions for one or more signaling devices at the roadway intersection. The computing system may retrieve, obtain, or otherwise receive sensor data for one or more signaling devices for a particular roadway intersection or for a plurality of roadway intersections. The sensor data may identify or include radar data, ultrasonic data, thermal signature data, acoustic sensor, induction, camera data, and vibration data, among others. The computing system may receive the sensor data about the road intersection. To generate, the computing system may provide, input, or otherwise apply the sensor data to the trained ML models. By applying, the computing system may process the input sensor data in accordance with the weights of the ML models. From processing, the computing system may generate the schedule of phase transitions for the one or more signaling devices for a particular roadway intersection. In some embodiments, the computing system may use the ML models to analyze the historical data for the roadway intersection to identify patterns in traffic flow. Based on the identified patterns, the computing system may determine or identify predicted peak traffic times and types of weather conditions. Based on the identification, the computing system may modify, change, or otherwise adjust the schedule of phase transitions.

The historical data can be structured into time-stamped records, each including traffic flow counts for all approaches and crosswalks, classification of objects observed, prevailing weather parameters, and signal phase state logs. The one or more processors can index and store this data with keys corresponding to periodic intervals (e.g., 5-minute segments) across days of the week and seasonal periods. When training the ML model, these indexed datasets permit association of specific traffic-and-weather patterns with phase timings recorded during prior operation. Upon generating a baseline schedule, the schedule entries can include configured minimum and maximum phase durations and defined phase-transition sequences. To determine that the movement of an object is "to be adjusted", the system can compare the object's detected vector, speed, and acceleration against the timing until scheduled phase change; for example, if a left-turning vehicle is 2 seconds away from entering the intersection and the remaining time to green is predicted to be 5 seconds or more, the schedule can be modified to provide an earlier green entry phase for that lane.

At 4165, the computing system may retrieve, obtain, or otherwise receive data on movement of an object. The data may be real-time data on movement of an object (e.g., a vehicle, bicycle, truck, or pedestrian) approaching the roadway intersection. The computing system may data obtained from the sensors about the roadway intersection. The data indicating movement may identify or include radar data, ultrasonic data, thermal signature data, acoustic sensor, induction, camera data, and vibration data, among others.

The processor can receive, from the one or more sensors, real-time data on at least one of an at least one of an updated weather condition or an updated traffic condition at the roadway intersection. The processor can update, based on the at least one of the updated weather condition or the updated traffic condition, the schedule of phase transitions for the one or more signaling devices. The processor can initiate, based on the updated schedule, actuation of the at least one signaling device. For instance, the updated schedule can include updates to time durations for which each of the signals is actuated, or the order in which the signals are actuated.

At 4170, based on the data and a phase transition according to the schedule of a signaling device at the roadway intersection, the computing system (e.g., the object motion determiner) may identify or determine movement of the object is to be adjusted. The method can include the processor initiating, responsive to the determination, actuation of at least one signaling device of the one or more signaling devices to prompt adjustment to the movement of the object. The determination may be based on the traffic conditions and weather conditions about the roadway intersection. For instance, the data may indicate that the object is approaching the roadway intersection, when the signaling for the lane in which the object is in is about to transition to indicate that the object should not pass the intersection. When the data indicates that the object is approaching the roadway intersection and the phase transition is to a particular value (e.g., indicating stop), the computing system may determine that the movement of the object is to be adjusted. In some embodiments, the computing system may adjust the schedule of phase transitions for the signaling devices at the roadway intersection. Otherwise, when the data indicates that the object is approaching the roadway intersection and the phase transition is not to a particular value (e.g., indicating stop), the computing system may determine that the movement of the object is not to be adjusted.

The computing system (e.g., the alert generator) may create, produce, or otherwise generate an alert to prompt adjustment of movement of the object (4175). The generation of the alert may be when the determination is that the movement of the object is to be adjusted. The alert may include, for example, a visual indicator, an auditory signal or a transmission to a device, the alert configured to capture attention of an operator associated with the object, among others. In some embodiments, the computing system may classify the movement of the object into a classification of a set of classifications for the movement, based on one or more thresholds. Each threshold may be associated with a speed, velocity, or acceleration of the movement of the object. Each classification may correspond to a different type of prompt. According to the classification, the computing system may generate the alert.

Section I—Signal Generating to Assist Objects Based on Sensor Data

Vulnerable roadway users such as pedestrians and bicyclists can be frequently exposed to dangerous roadway scenarios, even when granted priority to travel. These situations can lead to preventable fatalities and injuries. At signalized intersections, it can be challenging to address these scenarios where roadway users are often expected to navigate these risks on their own. Some cities have resorted to using long head-start intervals for pedestrians and/or dedicated bicycle lane phases. Outside of fully signalized intersections, push actuated pedestrian rectangular rapid flashing and hybrid beacons are sometimes leveraged for higher risk areas. Examples of pedestrian beacons, such as rectangular rapid flashing beacon, pedestrian hybrid beacon, intersection pedestrian buttons, and zebra crossings are shown on FIGS. 42-45.

Figure 42:
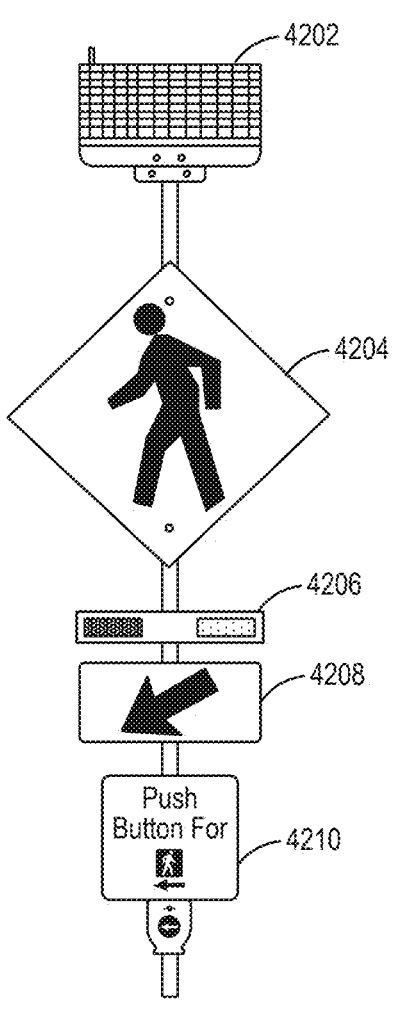
Figure 43:
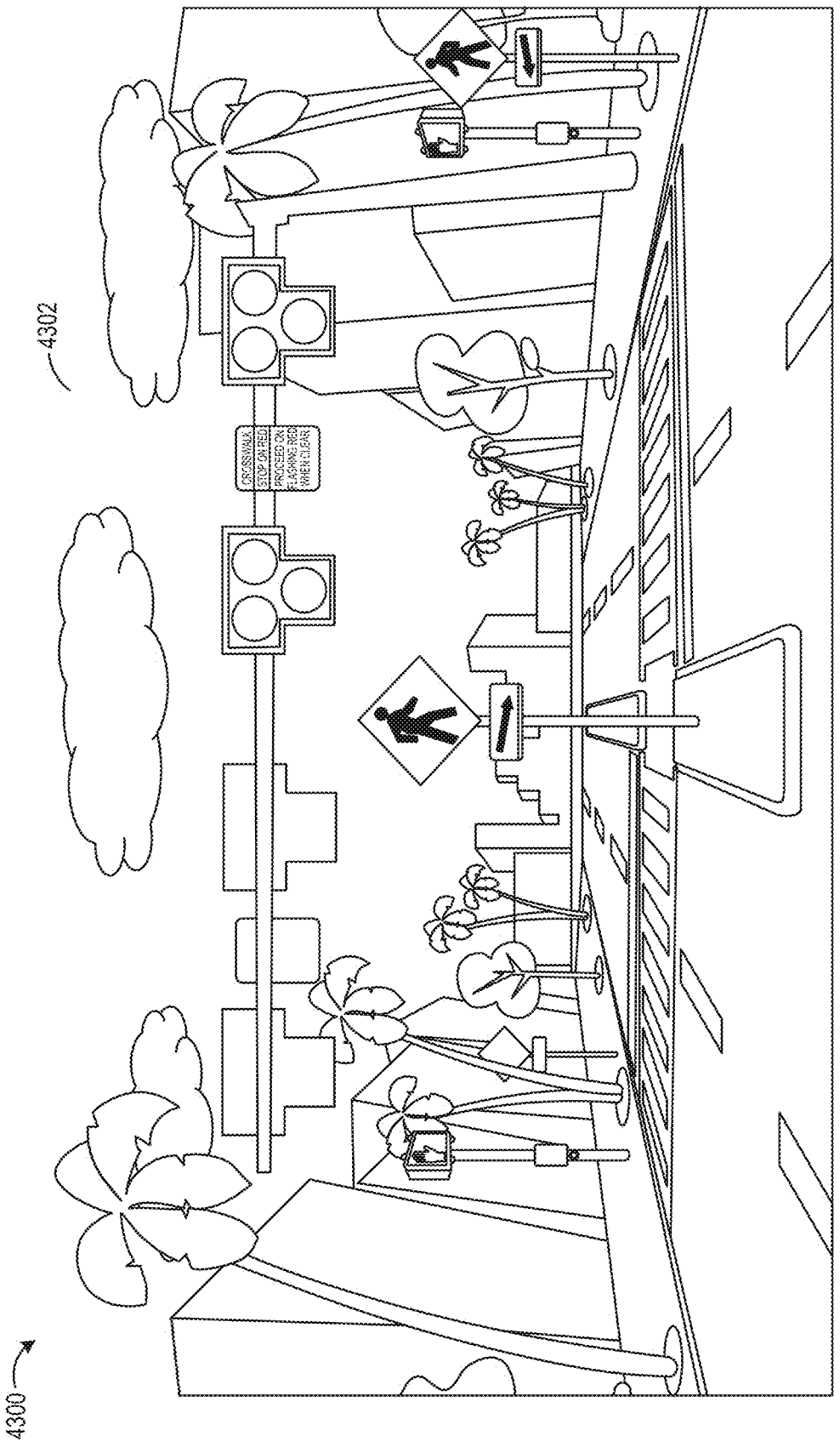
Figure 44:
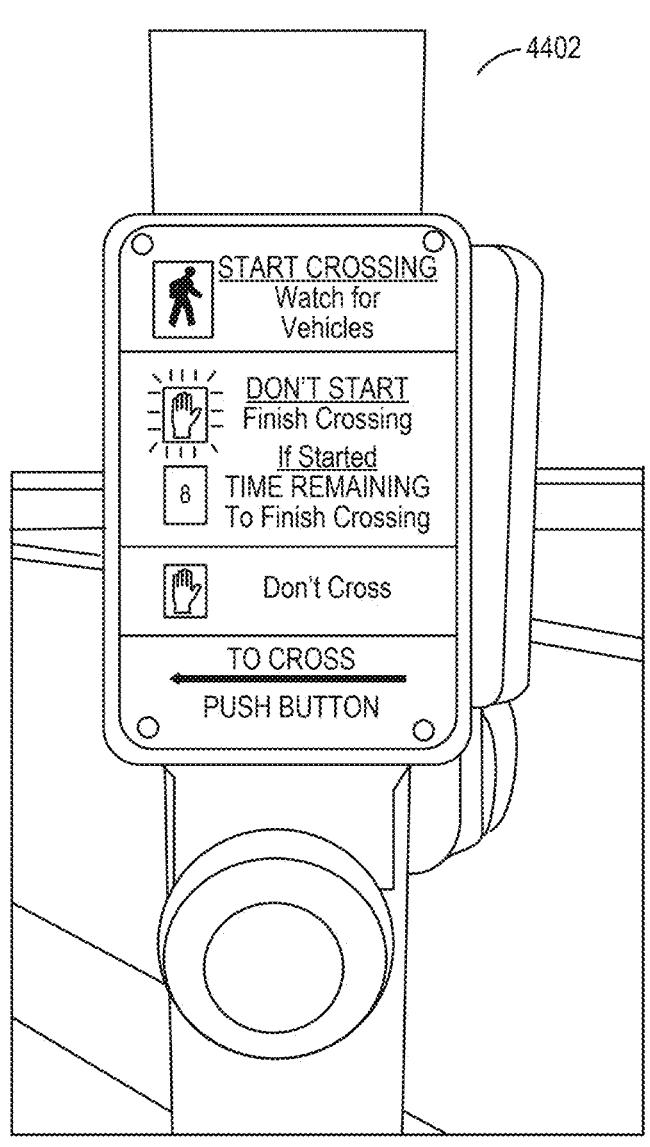
Figure 45:
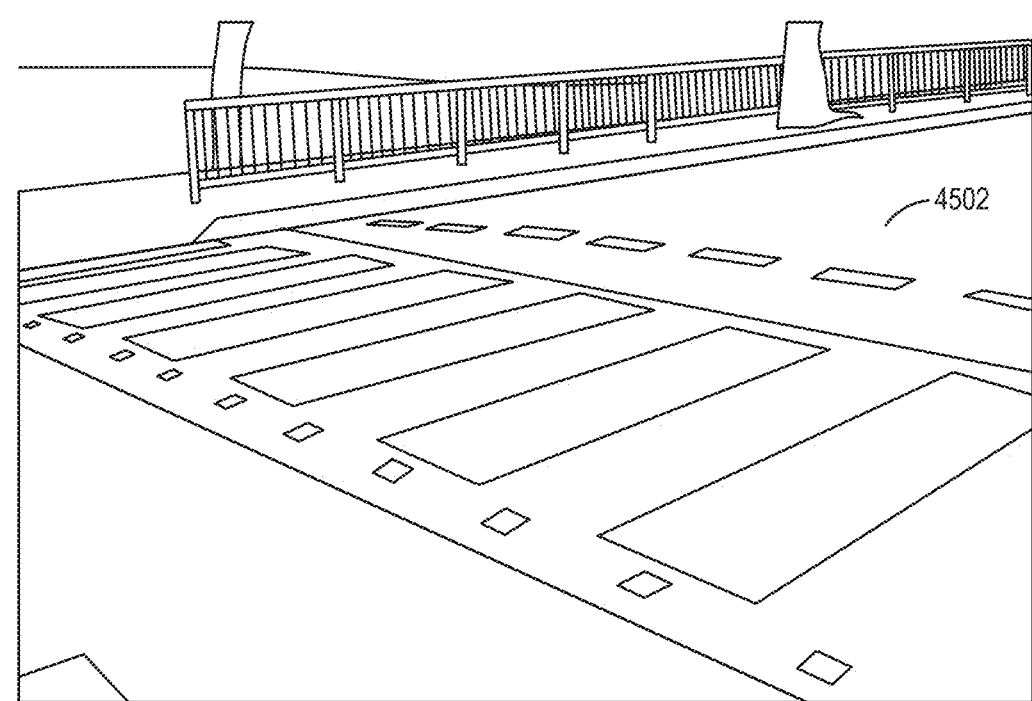

As shown in example 4200 of FIG. 42, pedestrian beacon can include a pole with a panel 4202 (e.g., a display panel), a signage indicating pedestrians at 4202, a signaling device at 4206, a signage for a path at 4208 and a sign to prompt push for crossing at 4210. As shown in example 4300 of FIG. 43, a signage layout 4302 can include any arrangement of vehicle traffic and pedestrian signals and signs. As illustrated in example 4400 of FIG. 44, a pedestrian panel can include a signage 4402 with instructions for pedestrians. As illustrated in example 4500 of FIG. 45, roadway can include pedestrian path crossing signs. With respect to pedestrians, there are two types of pedestrian signal phases at signalized intersections, concurrent, and non-concurrent. Concurrent phases may be extended with a leading or lagging pedestrian interval. In all of these cases there may bear a risk of conflicting (vehicular) traffic encountering the pedestrians, even during non-concurrent phases via inattentive or illegal behavior or passive right-on-red type turns into the walking space. Furthermore, crossing of any signalized, or otherwise guarded, intersection may be dangerous as pedestrians may be difficult to spot along with their intention and who has right-of-way. Jaywalking and other risky or erratic behaviors, while to be discouraged, further endangers pedestrians looking to cross or interact with the street.

Micro mobility roadway users, such as bicyclists, electric scooters, skateboarders, among others, may be considered as typically faster moving subsets of pedestrian class. These users may encounter many of the same risks as pedestrians under normal right-of-way scenarios and similarly are prone to unpreferred behaviors. There are situations in which micro-mobility users have a clear right of way, but directly conflict with vehicle intentions and yielding rights. When a 'bicycle' lane is adjacent to main traffic lanes (e.g., central or to the right of the direction of travel) and both the cycling lane and adjacent vehicle lanes have a green signal, turning vehicles often do not see nor give priority to adjacent cyclist(s) causing potential collisions.

With respect to errant behaviors, vulnerable road users (VRUs) tend to operate more erratically than vehicles, often entirely leaving their prescribed safe areas and performing illegal behaviors (such as jay walking). Acceleration, speeds, and directions are often highly variable. For example, bicyclists or electric Scooters going full speed from a local park across a sidewalk and across a crosswalk from outside of visible angles of roadway vehicles. In addition, pedestrians suddenly changing their minds while crossing the intersection, changing direction, accelerating quickly, and sprinting back across in the opposite direction.

To address these and other technical problems, a system can leveraging safety rated perception, dynamic signage and signals to track vulnerable roadway users and warn vehicles and VRUs of possible conflicts. Going further, some scenarios may even warrant the changing of signal phases or specific signal attributes (e.g., a green circle to a green straight arrow with a right red arrow).

Approaches to solve these challenges may be layered and range from deploying standard signage via dynamic signs, modifying signals, alerting roadway users with audio and signals, or sending warnings or alerts to external services such as operations or police. Addition of signage that cautions roadway users may be greatly impactful to VRU safety.

For instance, when a detected VRU is crossing an intersection (or a street within line of sight of an intersection's sensors), system can update dynamic signage and actuate signals to warn other roadway users of that VRU's presence. This may be used when concurrent go signals occur for VRUs and vehicles or other roadway users, especially when there is a likely conflict such as when vehicles may turn into a VRU (even when they are prompted to yield).

For instance, when a concurrent phase occurs, and a VRU is detected, either for an initial portion of the phase (configurable) or until complete clearance, or whenever there's a zoned, calculated, or predicted conflict, the system may enable red or yellow arrows (e.g., flashing or solid) or dynamic signage (e.g., no turn on red), audio warnings, or other signals to indicate to yield right of way to VRUs or that specific directions of travel are temporarily blocked. Context signals may be configured to be static or may adjust responses to context such as detected entities, their path, predictions, calculations and general risk. This may also be used to disable walk or bicycle signals once there is a sufficient gap in crossing VRUs, despite continued green signal in the otherwise same direction. This may further be used to preemptively warn VRUs of a soon-to-change light and contextually 'allow' new users into the intersection. For example, if a pedestrian is about two-thirds the way across an intersection as a new pedestrian is arriving and the 'count down' timer for that signal is low, we may change the signage to display the text "No New Entrants, Finish Xing". Entity intention may be used here via mapping inputs, V2X, or visual prediction such as pose estimation or indicator light identification.

For instance, when roadway users do not appropriately implement yielding to objects (e.g., pedestrians) having right of way, the system may increase the signage, signaling, audio or other alerting means to gain the attention of the offending roadway user. Escalation warnings may be considered a part of a system for detecting, signaling or otherwise addressing potential collisions (e.g., a Crash Warnings system). The system may be configured to not overstimulate roadway users, so different levels of scenario may utilize different (hence, escalating) responses. For example, mildly errant behavior may benefit from limited audio, signage, signal changes, or flashing lights, whereas high risk scenarios may benefit from loud audio, fully dynamic signage, major signal phase changes, and bright or flashing lights.

For instance, when pedestrians are likely to not be visible (occluded) to other roadway users in-motion, then appropriate signage and signals may be actuated to warn all roadway users. For example, an individual wearing all black clothing may be walking at night and decide to cross the street. An oncoming or turning vehicle may not see the individual until it is too late, so the intersection alerts vehicles dynamically appropriate signage and signals. This may also be applied for instance during dark-scenes or low-visibility VRUs otherwise operating normally but identified by the system. This may further extend to lighting or increasing the lighting on specifically targeted streetlights along the roadway where the VRU(s) are located.

For instance, when a VRU starts to enter a roadway segment that is not safe to enter, the system may detect and signal accordingly, or upgrade to a crash warning event. Automatic Actuation: Detecting entities, and leveraging actuation zones (e.g., if they stand in a specific area), prediction to determine intention, voice commands, hand signals, or mechanical Turk, among others, as opposed to manual actuation of pedestrian signals.

By leveraging a language model, pedestrians (in particular blind) may speak with the intersection to ask about current state of signals, where they are positioned in the intersection, where they should be (based on their intention) go, instructions to use the intersection, to actuate signals in a particular direction, or to call for help. Identification of potentially inhibited VRUs (e.g., wheel-chair, walker, elderly, cane, slow gait) may allow for contextualized actions such as longer crossing times, additional warnings, or engagement of intersection operations.

By not only observing and recording VRU pathing through the intersections, but also typical waiting positions and other usage data, the system may inform better roadway design such as lines, curbs, barriers, etc., to incentivize VRUs to operate within design parameters and/or most safely. Immediate feedback may be signaled to users (e.g., signage, voice etc.). For example, it can include a message, such as "Step back from the curb". Measurement tools may further be provided to operators to remotely measure objects, distances, and other special characteristics of live or recorded data streams to verify compliance, review an incident, plan, or otherwise observe an area with precision, remotely.

Example signals may include: dynamic signage (e.g., caution VRU Xing (for Pedestrian or Cyclist), No Turn on Right, Yield/Stop for VRUs, Crash Warning, or Pedestrian vs Vehicle vs Tram vs Bicycle or other lane specific signage); Signals (e.g., Red/Yellow Arrow (turn), flashing or solid, VRU Head Start, VRU Lag, and Sub Phasing (specific directions of travel allowed based on user intentions, positions, and possible conflicts); Lighting (e.g., strobes, rotary, flashing, or colored lights or screens (MUTCD limitations), Specific Street Lamps, or on, off, or brightness adjustments); or audio (e.g., chirps, honks, horns, alarms, audible language such as "Caution, Pedestrians Crossing"), among others.

Figure 46:
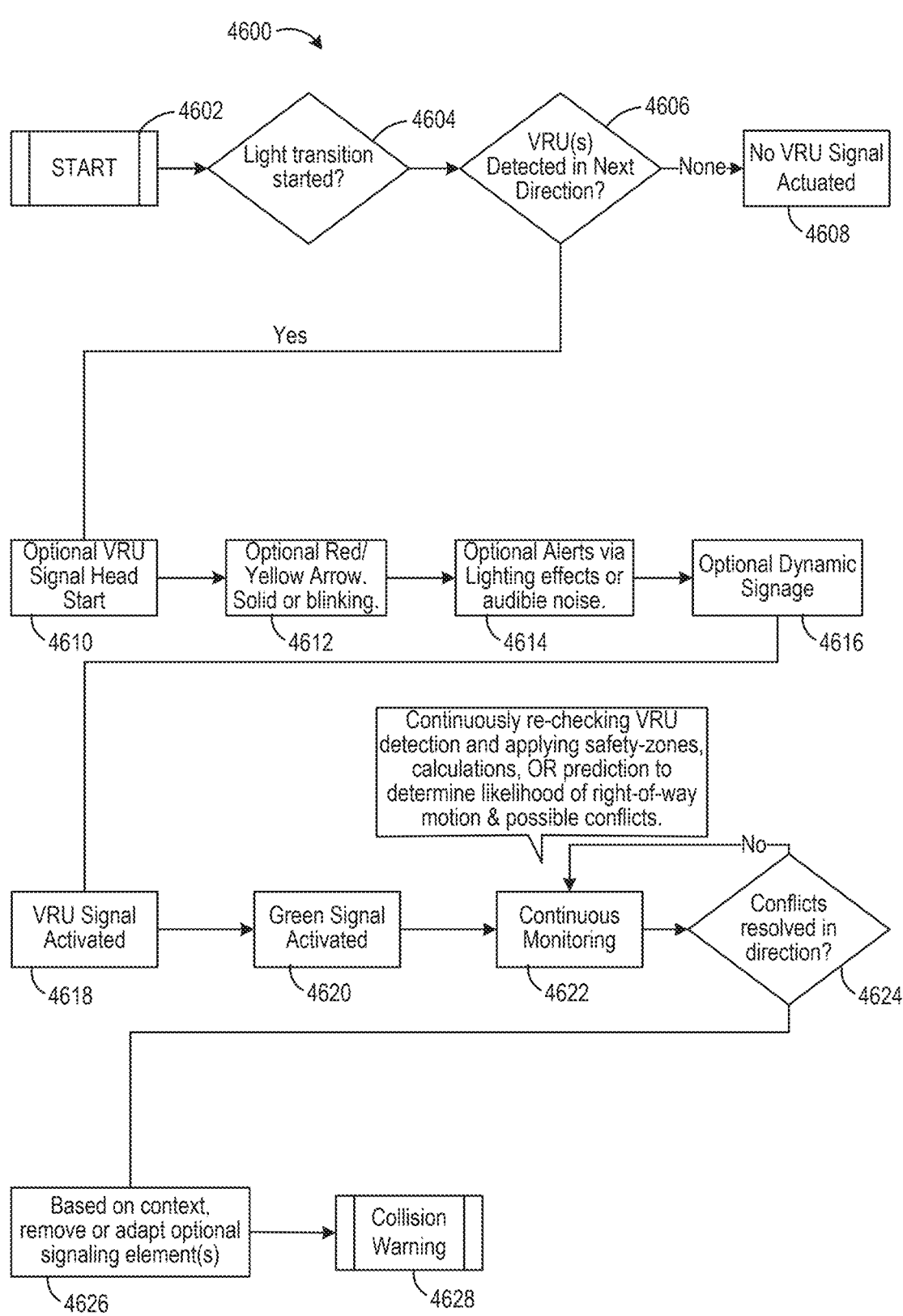

Referring now to FIG. 46, depicted is a flow diagram of a method 4600 for concurrent signaling. This flow focusses on concurrent signal scenarios and may not include all scenarios such as jay walking or non-concurrent signal phases or all possible contextualization where vulnerable roadway users (VRUs) are or are not detected at different points in a phase and where they may be seen, and how that may affect signage and/or signals. The VRUs can include micro mobility roadway users, for example pedestrians or bicyclists that have a "walk" or "green" signal that is concurrent with green signal to vehicles.

At 4602, the method can begin, starting light transition at 4604. At 4604, the light turning yellow or red and "no crossing" sign in a direction of pedestrians may be shifted towards green light and a "crossing" sign for pedestrians. At 4606, a determination can be made if VRUs are detected in the next direction. At 4608, if no VRUs are detected then no VRU signal is actuated. At 4610, if VRU is detected at 4606, then optional VRU signal head can begin. For instance, specific locations or sides (e.g., context oriented) determinations can be made.

At 4612, optional red or yellow arrow can be initiated as a solid or blinking signal, such as to prevent conflicting motion and allow straight travel. For each direction of detected vehicles that could potentially conflict with any right-of-way VRU if turning. At 4614, optional alerts via lighting effects or audible noise can be implemented. For instance, strobes, flashing or rotary lights, chips, honks, or voice signals of "pedestrians crossing" can be generated. At 4616, optional dynamic signage can be generated. For instance, signals warning traffic on potential conflict, such as for each direction of detected vehicle that could potentially conflict with any right-of-way VRU if turning, can be generated. In response, at 4618, VRU signal can be activated or displayed, such as a signal for a dynamic signage stating "Caution—Pedestrians". At 4620, green signal can be activated (e.g., for a vehicle, upon, or along with caution-pedestrians sign). At 4622, the method can continuously monitor and check VRU detection and apply safety zone determinations or predictions to determine likelihood of right-of-way motion and possible conflicts or collisions.

At 4624, the method can determine if conflicts are resolved. At 4626, based on the context, the method can remove or adapt optional signaling. At 4628, upon continuous monitoring for potential conflict, the method can issue a collision warning signal (e.g., for instance in response to a car approaching a bicycle).

Figure 47:
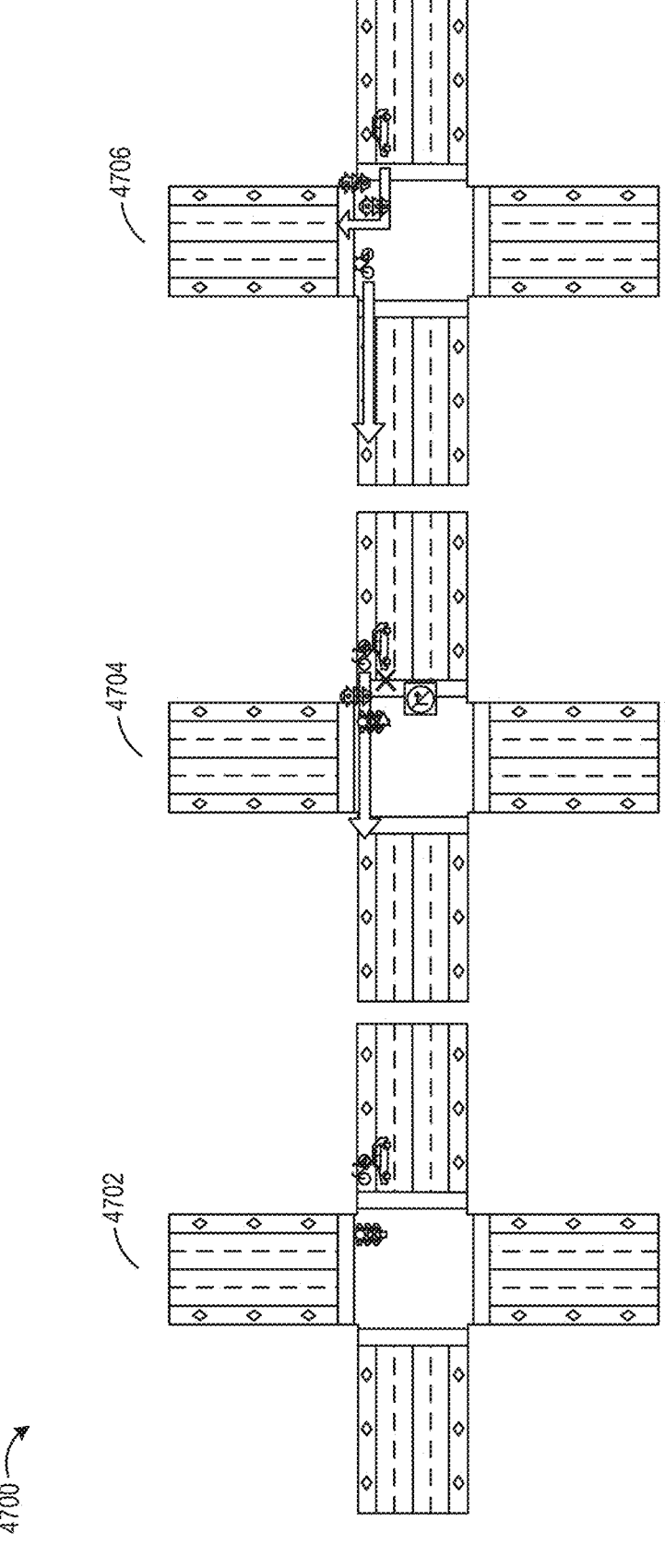

Referring now to FIG. 47, an example 4700 scenario is illustrated involving a bicycle object and a vehicle object at a roadway intersection. At 4702, both the vehicle and bicycle are waiting on the next light. The bicyclist can wait for an opportunity to move forward, while the vehicle may seek to turn right, across the dedicated bike lane along which the bicycle aims to pass across the intersection. At 4704, the system can detect the bicyclist and the vehicle. Based on AI model determining, from the sensor data, that a collision is possible unless the bicycle is given a head start, the system can provide a dynamic head start of up to a configurable amount of time, manually set or automated through machine learning, simulation, or heuristics (e.g., 6 seconds). At 4706, the cyclist may get a specific bike green light on the signaling device and can clear its lane within the predetermined amount of time, and then upon clearing the area, the vehicle gets its own green signal to proceed.

Figure 48:
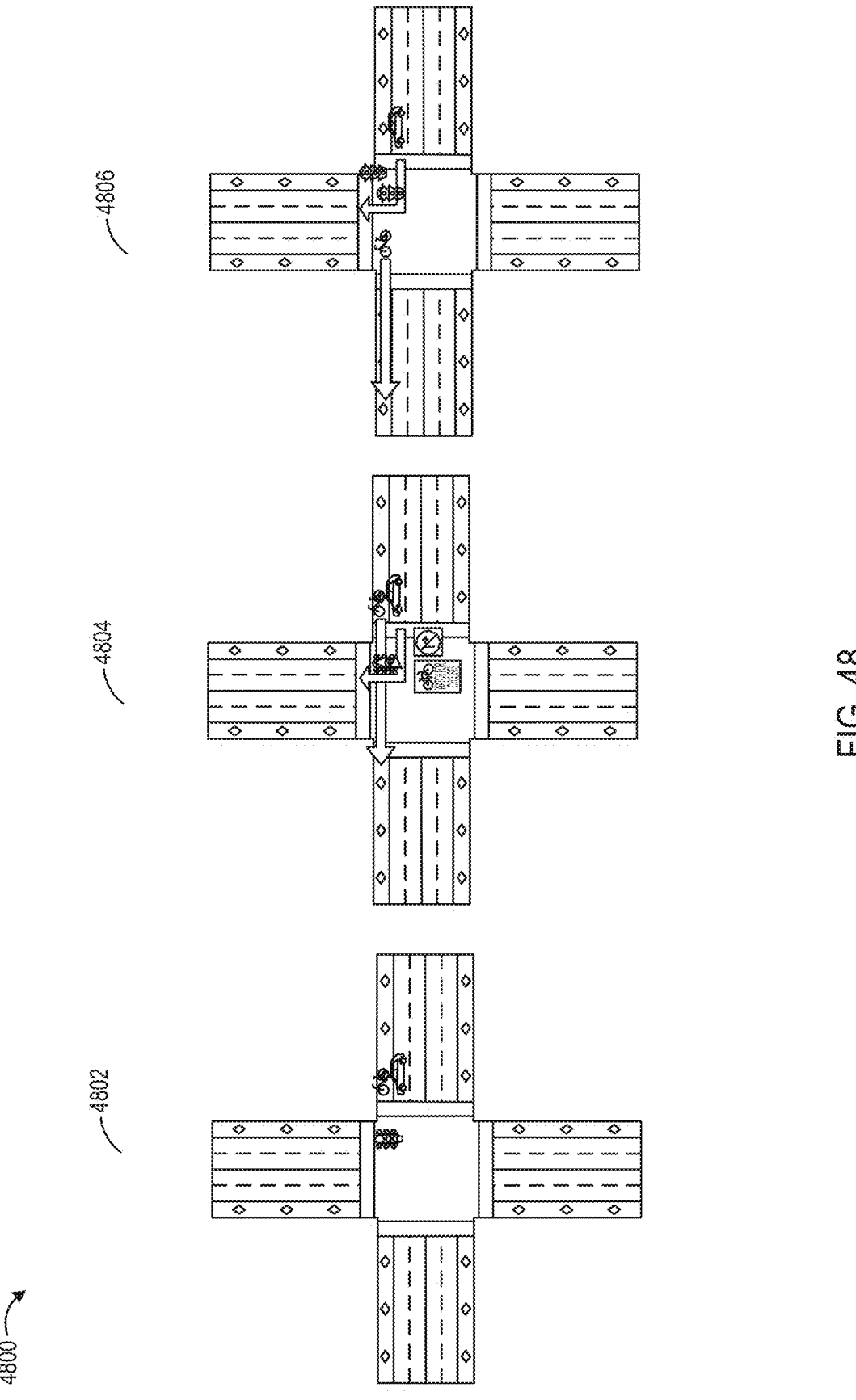

Referring now to scenario 4800 of FIG. 48, this is similar to scenario 4700 depicted in FIG. 47, but instead the cyclist and vehicle both get green, before they turn green however, the dynamic signage for the vehicle's right lane changes to caution cyclist and they get a green straight and red right arrow (no right turn allowed, straight only). As shown in 4802, 4804 and 4806, since that vehicle wants to turn right, they have to wait until all cyclists are clear, and then the light turns to a green circle and the signage is disabled.

Figure 49:
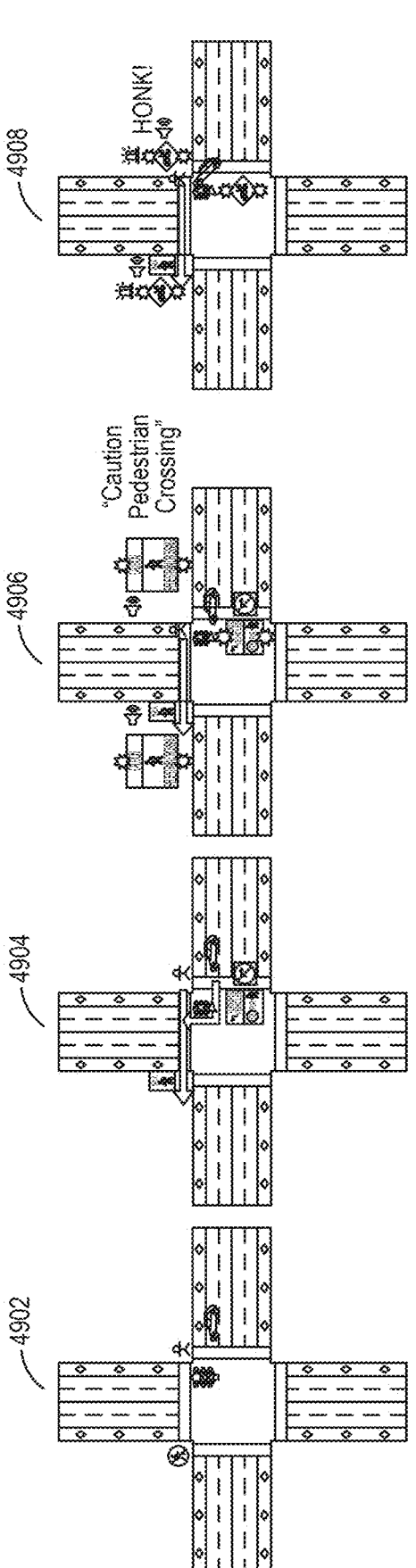

Referring now to scenario 4900 of FIG. 49, at 4902 a vehicle waits to go at a red light with an adjacent pedestrian traveling in the same direction. Slightly prior to turning green, the dynamic signage changes to Stop for Pedestrians and a right red arrow is turned on for the vehicle. At 4904, the vehicle can decide to creep forward anyway into the intersection when the pedestrians are allowed to walk, and they see a green straight arrow. At 4906, the system can detect this development (via sensor data input into AI model) and can escalate with dynamic signage, such as strobes, chirps and flashing of the dynamic sign. At 4908, the vehicle or the bicyclist may not stop in time and continue progressing, while the system can escalate further into a crash warning and alarm loudly with flashing yellow lights, crash warning signage and warnings to the crossing pedestrians (verbal and dynamic signage). In response to escalated warnings, the vehicle may stop, and the intersection resumes to its protected turn/pedestrian walk state.

Figure 50A:
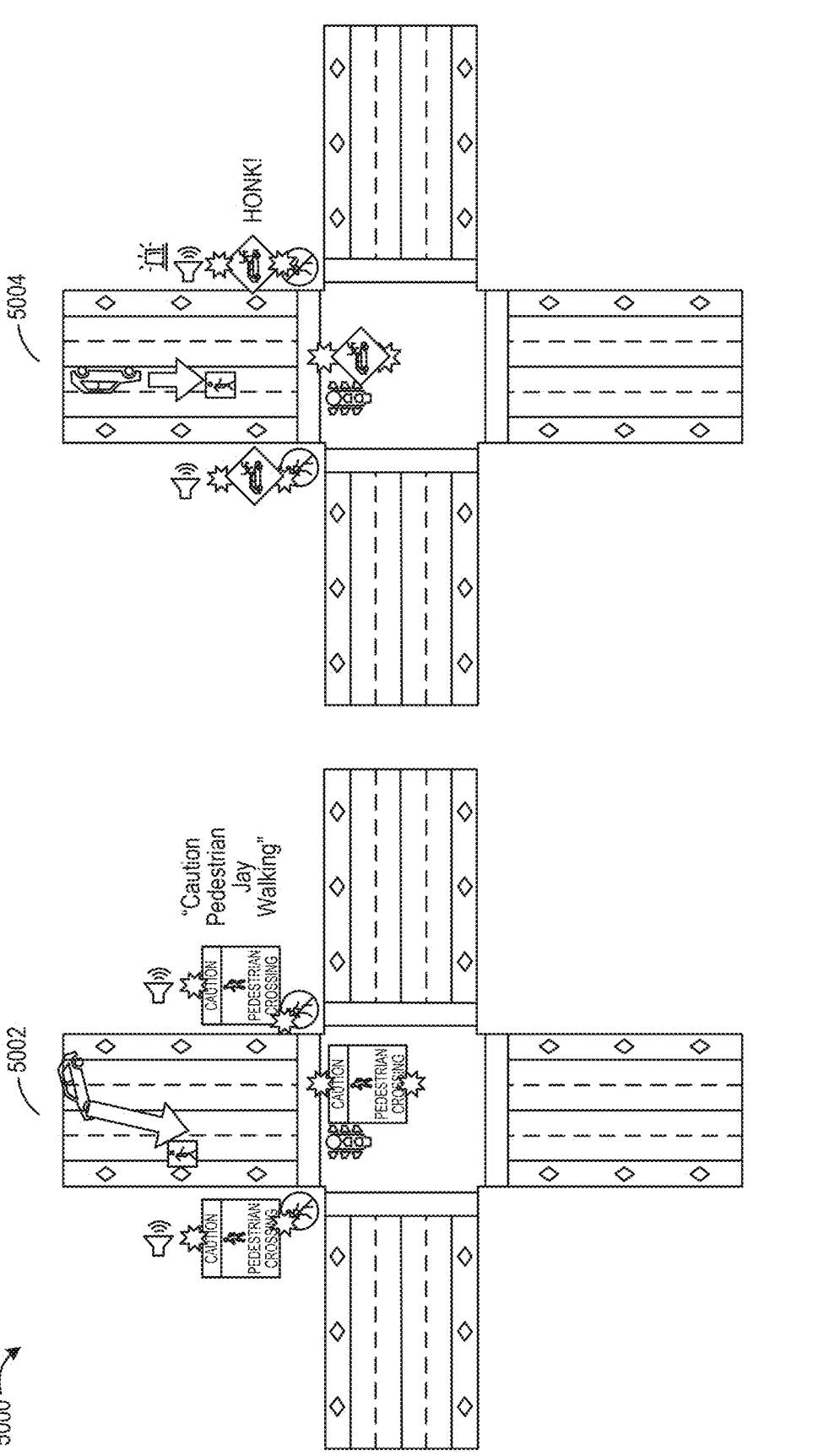

Referring now to example 5000 of FIG. 50A, at 5002, a pedestrian decides to jay walk and crosses the street when it's not particularly busy. The pedestrian may not see a car turning from a side street into their path. The system can detect the pedestrian moving and put up a pedestrian sign on its dynamic signage in all relevant (potentially conflicting) directions. The system may also announce 'Caution, pedestrian jay walking' to the intersection. The pedestrian ignores this, and the vehicle gets closer. At 5004, the system escalates to a crash warning with louder alarming and the vehicle stops and the pedestrian looks up. By utilizing the heightened and more pronounced warning, the system may prevent the collision.

Figure 50B:
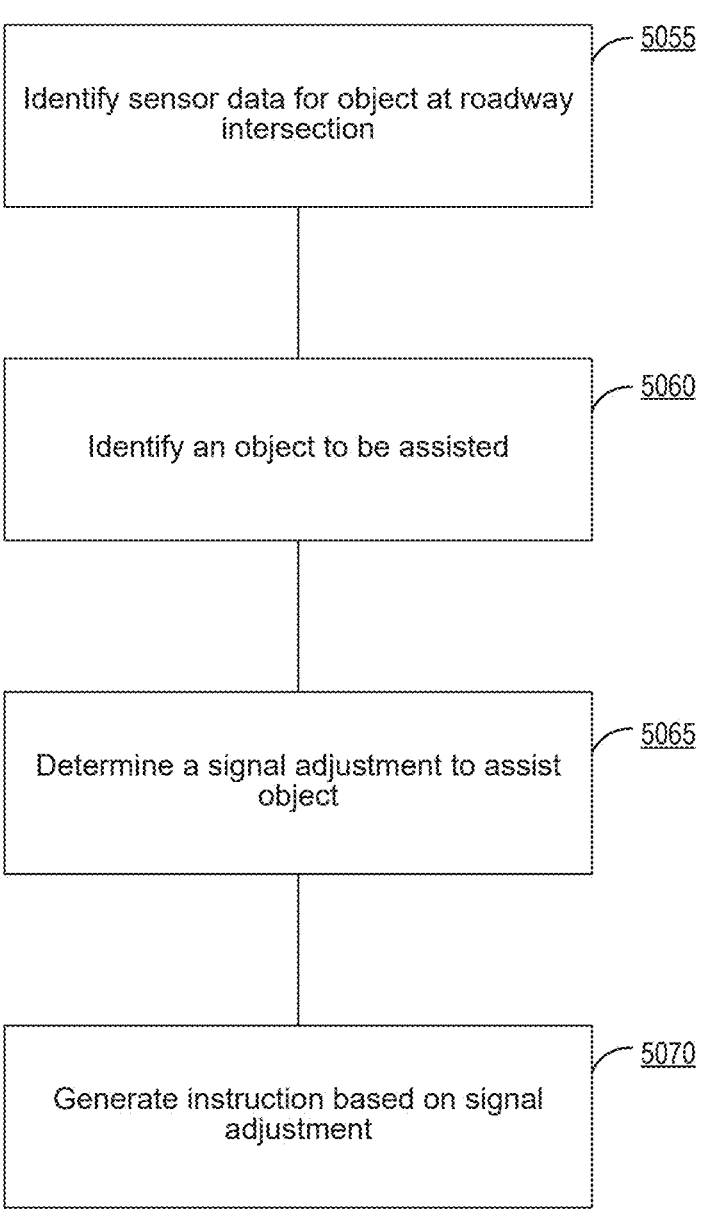
FIG. 50B illustrates a flow diagram of an example method for signal generating to assist objects based on sensor data.

Referring now to FIG. 50B, depicted is a flow diagram of a method 5050 for signal generating to assist objects traverse an intersection, based on sensor data. The method 5050 may be implemented by the data processing system, using for example, one or more processors accessing and executing instructions or data stored in a non-transient computer-readable media (e.g., memory) of the system. The method 5050 may be implemented or performed using any of the component discussed above. In brief overview, under the method 5050, a computing system may identify sensor data for objects at a roadway intersection (5055). The computing system may identify an object to be assisted in traversing the roadway intersection (5060). The computing system may determine a signal adjustment to assist the object (5065). The computing system may generate an instruction based on the signal adjustment (5070).

At 5055, the method can include a computing system (e.g., an object identifier) retrieving, obtaining, or otherwise identifying sensor data for one or more objects at a roadway intersection. For example, the method can include the one or more processors executing operations of a data processing system, identifying sensor data corresponding to one or more objects moving within an area comprising the roadway intersection. The sensor data can be from one or more sensors of a roadway intersection, such as one or more of: a lidar, a radar, a camera, night vision camera or an infrared camera.

The sensor data may correspond to one or more objects moving at, along, or about the roadway intersection. The sensor data may be retrieved from one or more sensors. The sensor data may identify or include radar data, ultrasonic data, thermal signature data, acoustic sensor, induction, camera data, and vibration data, among others. The objects may include, for example, a pedestrian, a bicycle, a motor-cycle, a passenger vehicle, a bus, a truck or a train, among others. In some embodiments, the computing system may communicate with external traffic management systems to exchange or share real-time sensor data from across a plurality of roadway sections. The sensor data may be regarding identified objects and their respective attributes and corresponding signal adjustments to facilitate coordi-nated traffic control across the plurality of roadway inter-sections.

At 5060, the method can include the computing system determining, detecting or otherwise identifying the object to be assisted in traversing the roadway intersection. The method can include the one or more processors identifying an object to be assisted in traversing the roadway intersec-tion. The object can be identified based on the sensor data input into one or more machine learning (ML) models. The ML models can be trained on a plurality of objects moving in a plurality of directions and according to a plurality of velocities within one or more areas comprising one or more roadway intersections. The ML model can identify an object of a type that is associated with a heightened vulnerability or level of assistance in a roadway traffic, such as a pedestrian in a wheelchair, a pedestrian pushing a baby stroller, a bicyclist that is a minor, or a pedestrian that is a minor (e.g., a school child). The ML model can be trained to recognize, detect, or identify the type of the object, based on image processing or image recognition training to identify object types.

With the receipt of the sensor data, the computing system (e.g., the object identifier using a trained machine learning model) may provide, input, or otherwise apply the sensor data input into one or more machine learning (ML) models. Based on inputting the sensor data to the ML models, the computing system may detect, select, or identify at least one object from the one or more objects in the sensor data to be assisted in traversing the roadway intersection. In some embodiments, the computing system may analyze the sensor data to determine a velocity and a trajectory of the object to be assisted, using the ML model.

The ML models may be initialized, trained, or otherwise established using sample training data with objects moving at roadways intersections in a set of directions and veloci-ties. The sample training data may include a label for each respective object indicating whether the respective object is to be assisted in traversing (or crossing) the roadway inter-section. The ML models may include neural networks, decision-making models, linear regression models, natural language models, random forests, classification models, generative AI models, reinforcement learning models, clus-tering models, neighbor models, decision trees, probabilistic models, classifier models, or any other type and form of models. The ML models may be trained using the historical data in accordance with supervised, weakly supervised, or unsupervised learning.

At 5065, the computing system may determine a signal adjustment to assist the object. The method can include the one or more processors determining a predicted trajectory of the object and a predicted time duration for the object to traverse the roadway intersection. The one or more proces-sors can make this determination from, or based on, the sensor data, such as frames of lidar or camera capturing the object over a time interval. For instance, the processor can determine an average speed of movement of the object by tracking the object over a sequence of sensor data frames and determining the object's speed with which it moves between two or more known locations within a time interval determined from timestamps of the frames. The method can include the one or more processors determining one or more signals to apply to the one or more signaling devices. The one or more processors can determine the one or more signals to apply to the one or more signaling devices using or via a priority matrix that maps the predicted trajectory and the predicted time duration to one or more variations of control of one or more signals for the one or more signaling devices of the roadway intersection.

The method can include the one or more processors determining, based on the sensor data, that the object (e.g., a pedestrian or a bicyclist) is present within a zone of approach to the roadway intersection. For instance, the data processing system can establish a zone of approach within the roadway intersection and can determine that the object is within the zone. The one or more processors can determine, responsive to the object being present within the zone of approach, the one or more signals of the one or more signaling devices. For instance, the method can include a processor determining whether to generate a red light or a stop signal for a signaling device for a vehicle waiting to cross the intersection along the path through which the pedestrian is to cross, while generating a green signal or a walk signal to the pedestrian. For example, a processor can determine a type of the object based on the sensor data. The type of the object can include at least one of: a pedestrian, a bicycle, a motor vehicle, a bus, a truck, a motorcycle, a scooter, a person in a wheelchair, a pedestrian pushing a baby stroller, an animal, an emergency vehicle, an autono-mous vehicle, a trailer, or a train. The types of objects may be configured along any reasonably derived ontology, char-acteristic or feature of the objects, including but not limited to the Federal Highway Administration (FHWA) vehicle classification system, to allow for extensibility and compli-ance with recognized standards or any other classification.

The priority matrix can be stored in the memory of the system and can be generated or updated dynamically based on traffic sensory data, such as traffic density and frequency of a type of the object detected by the one or more sensors. For instance, the priority matrix can be stored in the memory and include one or more weighted parameters for at least one of the object, the predicted trajectory, or the predicted time duration. The method can include a processor determining the one or more weighted parameters based on data from the one or more sensors that indicates at least one of a type of the object, a velocity of the object, or an occupancy of objects within the area. The method can include the proces-sor determining, using the priority matrix and the one or more weighted parameters, the one or more signals to apply to the one or more signaling devices.

The priority matrix can be executed, instantiated or man-aged as a multi-dimensional data structure in memory. This data structure can map predicted object trajectories and predicted time durations to specific control variations for each signaling device available at the roadway intersection. Each entry in the matrix can include weighted parameters for safety priority, throughput priority, and regulatory compliance priority, whereas the weights can be computed in real-time according to sensor inputs. For example, a pedestrian in a wheelchair approaching from a curb ramp within a 10 m zone of approach may be assigned a higher safety weight than a passenger vehicle approaching from 40 m. Zones of approach can be defined as geometric polygons or volumes relative to the intersection center, parameterized by distance, approach vector, and permitted movement type. Zone definitions can incorporate detection-confidence thresholds (e.g., minimum certainty score to accept a sensor detection) and occlusion recovery procedures (e.g., to estimate object position when temporarily obscured). When multiple objects are detected across different zones, the one or more processors can reference the mapping in the priority matrix to concurrently select compatible signal adjustments. For instance, a processor can utilize the priority matrix to output a head-start walk interval for the pedestrian while maintaining a straight-through green for non-conflicting vehicle lanes and a red light for all vehicles that could cross the path of the pedestrian.

The priority matrix can map the predicted trajectory and the predicted time duration of the object with a second predicted trajectory and a second predicted time duration of a second object of the one or more object. For instance, a processor can determine, based on the mapping of the predicted trajectory and the predicted time duration of the object with the second predicted trajectory and the second predicted time duration of the second object. The processor can apply the one or more signals to the one or more signaling devices to assist the object and the second object in traversing the roadway intersection. For instance, the processor can determine the one or more signals for the one or more signaling devices based on a priority associated with a type of the object of a plurality of types of objects within the area.

Based on inputting the sensor data to the ML models, the computing system may determine one or more signal adjustments (e.g., change of phase from red to yellow) to apply to one or more signaling devices of the roadway intersection or the application of dynamic signage, audio, or lighting changes. In determining, the computing system may identify or determine a priority for the object to be assisted based on a type of the object. The type of object may include, for example, a pedestrian, a bicycle, a motorcycle, a passenger vehicle, a bus, a truck or a train, among others. With the determination, the computing system may assign the priority to the detected object to be assisted in traversing the roadway intersection. In some embodiments, the pedestrian or the bicycle may be assigned a higher priority than a motorcycle and the motorcycle is assigned a higher priority than the passenger vehicle, the bus, the truck or the train. Based on the assigned priority, the computing system may identify or determine the one or more signal adjustment to be applied to the one or more signaling devices of the roadway intersection. Prioritization may be determined and applied on the basis of different risk categories such as efficiency opportunities or safety incident probability and severity.

The ML models may be initialized, trained, or otherwise established using sample training data with dynamic adjustment of signaling at roadway intersections to assist objects to be assisted in traversing the roadway intersections. The sample training data may be labeled with which adjustment to apply based on the object identified as to be assisted at the roadway intersection. The ML models may include neural networks, decision-making models, linear regression models, natural language models, random forests, classification models, generative AI models, reinforcement learning models, clustering models, neighbor models, decision trees, probabilistic models, classifier models, or any other type and form of models. The ML models may be trained using the historical data in accordance with supervised, weakly supervised, or unsupervised learning. The models may also be trained using emulated, simulated, generated, or using digital twin data. For instance, the method can include a processor analyzing the sensor data to determine a velocity and a trajectory of the object to be assisted. The method can include the processor generating the one or more instructions for the one or more signaling devices based on the velocity and the trajectory.

At 5070, the method can include the computing system producing output, or otherwise generating an instruction based on the signal adjustment for the signaling devices to display one or more adjusted signals to assist the object in traversing the roadway intersection. The method can include a processor generating one or more instructions for controlling the one or more signaling devices according to the one or more signals to assist the object in traversing the roadway intersection. The method can include the processor initiating, via a controller and responsive to the one or more instructions, actuation of one or more phases of the one or more signaling devices of the roadway intersection according to the time duration for the object to traverse the roadway intersection. The time duration may be a time duration determined by an AI model, trained in movement of the objects of the same type, to be sufficient for the object to cross the intersection. The method can include the processor verifying, upon initiation of the actuation of the one or more phases and based on sensor data from the one or more sensors, whether the object has traversed the roadway intersection within the predicted time duration. Upon determining that the object has completed the traversal of the roadway intersection, the method can include the processor generating the signal to control the one or more signaling devices to continue operating according to their initial signaling phase according to which the system operated prior to identifying the object within the zone of approach at 5055.

The verification of whether the object has traversed the roadway intersection within the predicted time duration can include acquiring one or more measurements of the object's position derived from any of the active sensor modalities, and comparing these positions against a traversal-completion threshold. If the object remains in the intersection beyond a predetermined time interval, the system can dynamically recalculate updated time allocations in coordination with the current signal phase schedule. Updated instructions can be generated to extend the serving signal for the assisted object, or to engage protective actions such as an all-red phase across all approaches, or a flashing-red or flashing-yellow mode to clear the intersection.

When generating a signal, the one or more processors can generate any type and form of a signal for the roadway intersection signaling devices. For instance, a processor can generate any one or more of: signaling a head-start interval for the object when the object comprises a pedestrian or a bicycle, signaling a head-start interval for a second object detected by the one or more sensors, wherein the second object comprises a motor vehicle, to traverse the roadway intersection prior to arrival of the object comprising the pedestrian or the bicycle, signaling a no-turn movement on a first signaling device of the one or more signaling devices while signaling a straight-through movement on a second signaling device of the one or more signaling devices, displaying, via a dynamic signage device associated with the roadway intersection, a message indicating no additional vehicles are permitted to enter the roadway intersection, transmitting, via a communication interface, a vehicle-to-everything (V2X) message identifying the one or more signals for the one or more signaling devices, or adjusting targeted street light illumination or sign contrast upon detecting low visibility or occlusion of the object based on the sensor data.

In the event that the system determines that the object has not traversed the intersection within the determined or predicted time duration (e.g., during the verification process), the method can include generating updated one or more instructions to adjust one or more phases of the one or more signaling devices to provide additional time for the object to traverse the roadway intersection. In an example, upon determining that the object has not traversed the roadway intersection within the predicted time duration, the method can include the processor generating one or more instructions to initiate one of an all-red light operation or a flashing light operation of the one or more signaling devices.

The instructions may identify which signal the signaling devices is to transition to assist the object in traversing the roadway intersection. In some embodiments, the computing system may generate the instructions for the signaling devices based on the velocity and the trajectory of the object. For instance, depending on the speed, the computing system may generate the instruction identifying a time at which to apply the adjustment. Depending on the trajectory, the computing system may generate the instruction to identify which signaling device the adjustment is to be applied. In some embodiments, the computing system may generate an alert for a second object in response to determining the signaling adjustment. The alert may notify the second object that the object to be assisted in traversing the roadway intersection is traversing the roadway intersection. For instance, when a pedestrian is being assisted across the intersection, an alert indicating that a pedestrian is crossing, may be displayed to vehicles facing a red light.

For example, the method can include a processor communicating, via a network, with a system for managing roadway traffic, data from the one or more sensors regarding identified objects and the one or more signals to facilitate coordinated traffic control, by the system, across a plurality of roadway intersections comprising the roadway intersection. For example, the processor can generate an alert for a second object of the one or more objects. The alert may notify the second object to adjust movement across the roadway intersection responsive to the object traversing the roadway intersection.

In further configurations, the processor can package object identification, type classification, predicted trajectory, and time-to-traverse data into a standardized inter-intersection communication format, such as a JSON or XML message type defined in a connected-vehicle or transportation-management protocol. These messages can be transmitted between different (e.g., adjacent or neighboring) upstream or downstream intersection signaling systems to synchronize assistance for the same object across multiple roadway intersections in order to allow for progressive signal adjustments along the object's route. When the object being assisted creates a potential conflict for another detected object, for example, a motorcyclist entering from a cross-street while a bus is receiving priority assistance, the one or more processors can generate a secondary alert specific to the movement and object type of the second object. The secondary alert can cause activation of one or more signals selected from a group consisting of: route-specific no-turn red arrows, targeted dynamic sign messages ("Yield! Priority User Crossing"), V2X messages addressed to the second object's onboard unit, strobe activation on a conflict approach, or illumination adjustments to targeted streetlights to increase conspicuity of the assisted object under low-visibility conditions determined by light-level or weather sensors.

The foregoing examples have been provided merely for the purpose of explanation and are in no way to be construed as limiting of the present description. While aspects of the technical solutions described herein have been described with reference to an example or an embodiment, it is understood that the words which have been used herein are words of description and illustration, rather than words of limitation. Changes can be made, within the purview of the appended claims, as presently stated and as amended, without departing from the scope and spirit of the technical solutions described herein in their aspects. Although aspects of the technical solutions have been described herein with reference to particular means, materials and embodiments, the present description is not intended to be limited to the particulars described herein; rather, the technical solutions described herein extend to all functionally equivalent structures, methods and uses, such as are within the scope of the appended claims.

Although an example computing system has been described in FIGS. 1-3, the subject matter including the operations described in this specification can be implemented in other types of digital electronic circuitry, or in computer software, firmware, or hardware, including the structures described in this specification and their structural equivalents, or in combinations of one or more of them.

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer-based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be a cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

The subject matter and the operations described in this specification can be implemented in digital electronic circuitry, or in computer software, firmware, or hardware, including the structures described in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array), GPU (graphics processing unit), NPU (neural processing unit), TPU (tensor processing unit), PLC (programmable logic controller), or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array), GPU (graphics processing unit), NPU (neural processing unit), TPU (tensor processing unit), PLC (programmable logic controller), or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks, and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods referred to in the singular may also embrace implementations including a plurality of these elements, and any references in plural to any implementation or element or act herein may also embrace implementations including only a single element. References in the singular or plural form are not intended to limit the presently described systems or methods, their components, acts, or elements to single or plural configurations. References to any act or element being based on any information, act or element may include implementations where the act or element is based at least in part on any information, act, or element.

Any implementation described herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein do not necessarily all referring to the same implementation. Any implementation may be combined with any other implementation, inclusively or exclusively, in any manner consistent with the aspects and implementations described herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as substitutions, changes and omissions can be made in the design, operating conditions and arrangement of the described elements and operations without departing from the scope of the technical solutions described herein.

References to "approximately," "substantially", or other terms of degree include variations of +/−10% from the given measurement, unit, or range unless explicitly indicated otherwise. Coupled elements can be electrically, mechanically, or physically coupled with one another directly or with intervening elements. Scope of the Systems and methods described herein is thus indicated by the appended claims, rather than the foregoing description, and changes that come within the meaning and range of equivalency of the claims are embraced therein.

What is claimed is:

1. A system comprising,
one or more processors, coupled with memory, to:
identify, from one or more sensors of a roadway intersection, sensor data corresponding to one or more objects moving within an area comprising the roadway intersection;
identify, based on the sensor data input into one or more machine learning (ML) models trained on a plurality of objects moving in a plurality of directions and according to a plurality of velocities within one or more areas comprising one or more roadway intersections, an object to be assisted in traversing the roadway intersection;
determine, from the sensor data, a predicted trajectory of the object and a predicted time duration for the object to traverse the roadway intersection;
determine, using a priority matrix mapping the predicted trajectory and the predicted time duration to one or more variations of control of one or more signals for one or more signaling devices of the roadway intersection, one or more signals to apply to the one or more signaling devices, wherein the one or more signals are determined based on a priority associated with a type of the object of a plurality of types of objects within the area;
generate one or more instructions for controlling the one or more signaling devices according to the one or more signals to assist the object in traversing the roadway intersection;
initiate, via a controller and responsive to the one or more instructions, actuation of one or more phases of the one or more signaling devices of the roadway intersection according to the time duration for the object to traverse the roadway intersection; and
verify, upon initiation of the actuation of the one or more phases and based on sensor data from the one or more sensors, whether the object has traversed the roadway intersection within the predicted time duration.

2. The system of claim 1, wherein the one or more processors are configured to:
determine, based on the sensor data, that the object is present within a zone of approach to the roadway intersection; and
determine, responsive to the object being present within the zone of approach, the one or more signals of the one or more signaling devices.

3. The system of claim 1, wherein the priority matrix is stored in the memory and is updated dynamically based on traffic density and frequency of a type of the object detected by the one or more sensors.

4. The system of claim 1, wherein the priority matrix stored in the memory comprises one or more weighted parameters for at least one of the object, the predicted trajectory, or the predicted time duration, and wherein the one or more processors are configured to:
determine the one or more weighted parameters based on data from the one or more sensors that indicates at least one of a type of the object, a velocity of the object, or an occupancy of objects within the area; and
determine, using the priority matrix and the one or more weighted parameters, the one or more signals to apply to the one or more signaling devices.

5. The system of claim 1, wherein the priority matrix further maps the predicted trajectory and the predicted time duration of the object with a second predicted trajectory and a second predicted time duration of a second object of the one or more objects, and wherein the one or more processors are configured to determine, based on the mapping of the predicted trajectory and the predicted time duration of the object with the second predicted trajectory and the second predicted time duration of the second object, the one or more signals to apply to the one or more signaling devices to assist the object and the second object in traversing the roadway intersection.

6. The system of claim 1, wherein the type of the object corresponds to at least one of: (i) a pedestrian, (ii) a bicycle, (iii) a motor vehicle, (iv) a bus, (v) a truck, (vi) a motorcycle, (vii) a scooter, (viii) a wheelchair, (ix) a stroller, (x) an animal, (xi) an emergency vehicle, (xii) an autonomous vehicle, (xiii) a trailer, or (xiv) a train.

7. The system of claim 1, wherein the one or more processors are configured to determine the one or more signals based at least in part on sensor data indicating one or more environmental conditions at the roadway intersection, the environmental conditions comprising at least one of weather conditions, road-surface conditions, visibility level, or traffic density.

8. The system of claim 1, wherein, upon determining that the object has not traversed the roadway intersection within the predicted time duration, the one or more processors are further configured to generate updated one or more instructions to adjust one or more phases of the one or more signaling devices to provide additional time for the object to traverse the roadway intersection.

9. The system of claim 1, wherein, upon determining that the object has not traversed the roadway intersection within the predicted time duration, the one or more processors are further configured to generate an instruction to initiate one of an all-red light operation or a flashing light operation of the one or more signaling devices.

10. The system of claim 1, wherein the one or more processors are configured to generate the one or more signals to include at least one of:
   (i) signaling a head-start interval for the object when the object comprises a pedestrian or a bicycle;
   (ii) signaling a head-start interval for a second object detected by the one or more sensors, wherein the second object comprises a motor vehicle, to traverse the roadway intersection prior to arrival of the object comprising the pedestrian or the bicycle;
   (iii) signaling a no-turn movement on a first signaling device of the one or more signaling devices while signaling a straight-through movement on a second signaling device of the one or more signaling devices;
   (iv) displaying, via a dynamic signage device associated with the roadway intersection, a message indicating no additional vehicles are permitted to enter the roadway intersection;
   (v) transmitting, via a communication interface, a vehicle-to-everything (V2X) message identifying the one or more signals for the one or more signaling devices; or
   (vi) adjusting targeted street light illumination or sign contrast upon detecting low visibility or occlusion of the object based on the sensor data.

11. The system of claim 1, wherein the one or more processors are configured to:
   analyze the sensor data to determine a velocity and a trajectory of the object to be assisted; and
   generate the one or more instructions for the one or more signaling devices based on the velocity and the trajectory.

12. The system of claim 1, wherein the one or more processors are configured to communicate, via a network, with a system for managing roadway traffic, data from the one or more sensors regarding identified objects and the one or more signals to facilitate coordinated traffic control, by the system, across a plurality of roadway intersections comprising the roadway intersection.

13. The system of claim 1, wherein the one or more processors are configured to generate an alert for a second object of the one or more objects, the alert to notify the second object to adjust movement across the roadway intersection responsive to the object traversing the roadway intersection.

14. A method, comprising,
   identifying, by one or more processors coupled with memory, from one or more sensors of a roadway intersection, sensor data corresponding to one or more objects moving within an area comprising the roadway intersection;

identifying, by the one or more processors, based on the sensor data input into one or more machine learning (ML) models trained on a plurality of objects moving in a plurality of directions and according to a plurality of velocities within one or more areas comprising one or more roadway intersections, an object to be assisted in traversing the roadway intersection;

determining, by the one or more processors, from the sensor data, a predicted trajectory of the object and a predicted time duration for the object to traverse the roadway intersection;

determining, by the one or more processors, using a priority matrix mapping the predicted trajectory and the predicted time duration to one or more variations of control of one or more signals for one or more signaling devices of the roadway intersection, one or more signals to apply to the one or more signaling devices, wherein the one or more signals are determined based on a priority associated with a type of the object of a plurality of types of objects within the area;

generating, by the one or more processors, one or more instructions for controlling the one or more signaling devices according to the one or more signals to assist the object in traversing the roadway intersection;

initiating, by the one or more processors, via a controller and responsive to the one or more instructions, actuation of one or more phases of the one or more signaling devices of the roadway intersection according to the time duration for the object to traverse the roadway intersection; and verifying, by the one or more processors, upon initiation of the actuation of the one or more phases and based on sensor data from the one or more sensors, whether the object has traversed the roadway intersection within the predicted time duration.

15. The method of claim 14, comprising:
   determining, by the one or more processors, based on the sensor data, that the object is present within a zone of approach to the roadway intersection; and
   determining, by the one or more processors, responsive to the object being present within the zone of approach, the one or more signals of the one or more signaling devices.

16. The method of claim 14, wherein the priority matrix is stored in the memory and is updated dynamically based on traffic density and frequency of a type of the object detected by the one or more sensors.

17. The method of claim 14, wherein the priority matrix stored in the memory comprises one or more weighted parameters for at least one of the object, the predicted trajectory, or the predicted time duration, the method comprising:
   determining, by the one or more processors, the one or more weighted parameters based on data from the one or more sensors that indicates at least one of a type of the object, a velocity of the object, or an occupancy of objects within the area; and
   determining, by the one or more processors, using the priority matrix and the one or more weighted parameters, the one or more signals to apply to the one or more signaling devices.

18. The method of claim 14, wherein the priority matrix further maps the predicted trajectory and the predicted time duration of the object with a second predicted trajectory and a second predicted time duration of a second object of the one or more objects, the method comprising:

determining, by the one or more processors, based on the mapping of the predicted trajectory and the predicted time duration of the object with the second predicted trajectory and the second predicted time duration of the second object; and applying, by the one or more processors, the one or more signals to the one or more signaling devices to assist the object and the second object in traversing the roadway intersection.

19. The method of claim 14, wherein the type of the object corresponds to at least one of: (i) a pedestrian, (ii) a bicycle, (iii) a motor vehicle, (iv) a bus, (v) a truck, (vi) a motorcycle, (vii) a scooter, (viii) a wheelchair, (ix) a stroller, (x) an animal, (xi) an emergency vehicle, (xii) an autonomous vehicle, (xiii) a trailer, or (xiv) a train.

20. A non-transitory computer-readable medium storing instructions that, when executed by at least one processor, cause the at least one processor to:

identify, from one or more sensors of a roadway intersection, sensor data corresponding to one or more objects moving within an area comprising the roadway intersection;

identify, based on the sensor data input into one or more machine learning (ML) models trained on a plurality of objects moving in a plurality of directions and according to a plurality of velocities within one or more areas comprising one or more roadway intersections, an object to be assisted in traversing the roadway intersection;

determine, from the sensor data, a predicted trajectory of the object and a predicted time duration for the object to traverse the roadway intersection;

determine, using a priority matrix mapping the predicted trajectory and the predicted time duration to one or more variations of control of one or more signals for one or more signaling devices of the roadway intersection, one or more signals to apply to the one or more signaling devices, wherein the one or more signals are determined based on a priority associated with a type of the object of a plurality of types of objects within the area;

generate one or more instructions for controlling the one or more signaling devices according to the one or more signals to assist the object in traversing the roadway intersection;

initiate, via a controller and responsive to the one or more instructions, actuation of one or more phases of the one or more signaling devices of the roadway intersection according to the time duration for the object to traverse the roadway intersection; and verify, upon initiation of the actuation of the one or more phases and based on sensor data from the one or more sensors, whether the object has traversed the roadway intersection within the predicted time duration.

* * * * *